US011504778B2

(12) United States Patent
Schaaf et al.

(10) Patent No.: US 11,504,778 B2
(45) Date of Patent: Nov. 22, 2022

(54) MINI POCKET HOLE JIG SYSTEM

(71) Applicant: Kreg Enterprises, Inc., Huxley, IA (US)

(72) Inventors: Scott Schaaf, Ankeny, IA (US); Timothy J. Forbes, Ankeny, IA (US); Neil M. Holland, Slater, IA (US); Brian Hill, Ames, IA (US)

(73) Assignee: KREG ENTERPRISES, INC., Huxley, IA (US)

( * ) Notice: Subject to any disclaimer, the term of this patent is extended or adjusted under 35 U.S.C. 154(b) by 0 days.

(21) Appl. No.: 17/114,673

(22) Filed: Dec. 8, 2020

(65) Prior Publication Data

US 2021/0138560 A1 May 13, 2021

Related U.S. Application Data

(63) Continuation of application No. 16/397,260, filed on Apr. 29, 2019, now Pat. No. 10,864,582.
(Continued)

(51) Int. Cl.
*B23B 49/00* (2006.01)
*B23B 47/28* (2006.01)
*B23B 51/00* (2006.01)

(52) U.S. Cl.
CPC .......... *B23B 49/005* (2013.01); *B23B 47/287* (2013.01); *B23B 51/009* (2013.01);
(Continued)

(58) Field of Classification Search
CPC ... B23B 47/287; B23B 49/005; B23B 51/009; B23B 2247/10; B23B 2260/088; Y10T 408/567

See application file for complete search history.

(56) References Cited

U.S. PATENT DOCUMENTS 4,421,442 A 12/1983 Lindblad
4,527,449 A * 7/1985 Sydlowski ............ B23B 31/005
408/16
(Continued)

FOREIGN PATENT DOCUMENTS

DE 102008022968 A1 * 8/2009
DE 202017101885 U1 * 5/2017 ........... B23B 47/287
(Continued)

OTHER PUBLICATIONS

European Search Report—19795766.5 based on PCT/US2019/029617 dated Dec. 17, 2021.

*Primary Examiner* — Eric A. Gates
(74) *Attorney, Agent, or Firm* — Christopher A. Proskey; BrownWinick Law Firm

(57) ABSTRACT

A pocket hole jig system is formed of a plurality of jig segments, wherein each jig segment includes a main body having a drill guide and a lock feature that protrudes outward on a first side of the main body and a recess that protrudes inward on a second side of the main body. The system also includes one or more spacers that have a main body of varying width and a lock feature that protrudes outward on a first side of the main body and a recess that protrudes inward on a second side of the main body. Jig segments and spacers may be connected together by inserting the lock feature of a jig segment or spacer into the recess of an adjacent jig segment or spacer. In one arrangement opposing jig segments and/or spacers lock together with a combination of rotational movement as well as sliding movement.

37 Claims, 128 Drawing Sheets

Related U.S. Application Data

(60) Provisional application No. 62/785,967, filed on Dec. 28, 2018, provisional application No. 62/664,335, filed on Apr. 30, 2018.

(52) U.S. Cl.
CPC ..... *B23B 2247/10* (2013.01); *B23B 2260/088* (2013.01); *Y10T 408/567* (2015.01); *Y10T 408/8925* (2015.01)

(56) References Cited

U.S. PATENT DOCUMENTS

| | | | | |
|---|---|---|---|---|
| 5,190,548 A | * | 3/1993 | Davis | A61B 17/1615 606/80 |
| 5,741,267 A | * | 4/1998 | Jorneus | A61C 8/0089 433/165 |
| 6,481,937 B1 | * | 11/2002 | Sommerfeld | B23B 47/287 408/103 |
| 6,499,221 B1 | * | 12/2002 | Kuhn | B23B 49/005 33/514 |
| 6,514,258 B1 | * | 2/2003 | Brown | A61C 1/084 408/202 |
| 6,637,988 B1 | * | 10/2003 | Park | B23B 47/287 408/103 |
| 7,048,477 B2 | * | 5/2006 | Abrams | A61B 17/1617 408/1 R |
| 7,134,814 B1 | * | 11/2006 | Park | B23B 47/287 408/103 |
| 7,771,143 B2 | * | 8/2010 | Bharadwaj | B23B 49/003 408/1 R |
| 7,967,534 B2 | * | 6/2011 | McDaniel | B23B 49/005 408/115 R |
| 8,840,345 B1 | * | 9/2014 | Park | B23B 47/287 408/115 R |
| 9,782,837 B2 | * | 10/2017 | Pelkey | B23B 47/287 |
| 10,357,831 B2 | * | 7/2019 | Evatt | B23B 47/287 |
| 2007/0041800 A1 | | 2/2007 | Santos | |

FOREIGN PATENT DOCUMENTS

| | | | | |
|---|---|---|---|---|
| EP | 1867297 A1 | * | 12/2007 | |
| FR | 684634 A | * | 6/1930 | ........... B23B 51/104 |

* cited by examiner

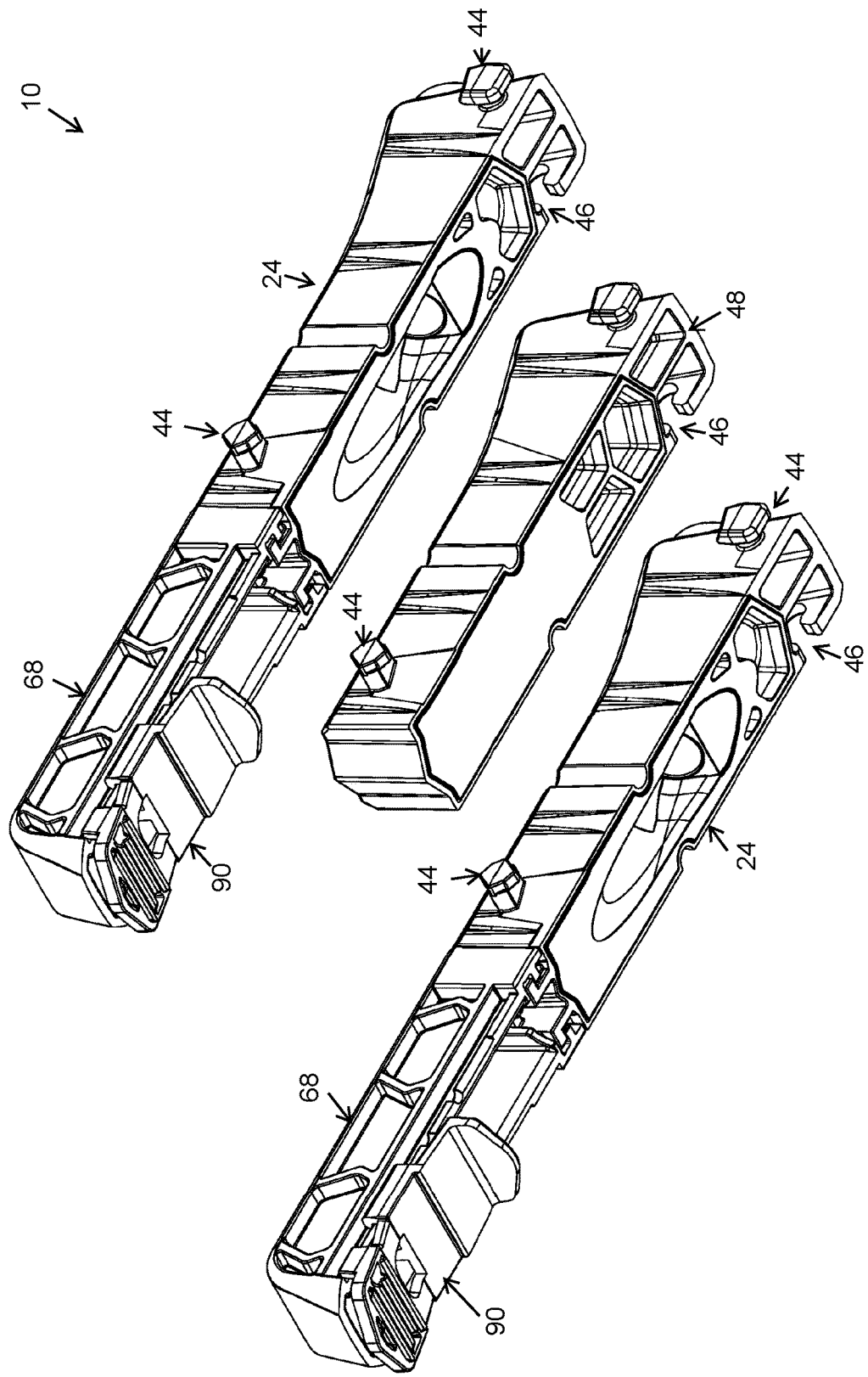

MINI POCKET HOLE JIG SYSTEM

CROSS REFERENCE TO RELATED APPLICATIONS

This application is a continuation of U.S. Utility application Ser. No. 16/397,260 which was filed on Apr. 29, 2019, which claims priority to U.S. Provisional Application No. 62/664,335 which was filed on Apr. 30, 2018, the entirety of which is incorporated herein fully by reference.

This application also claims priority to U.S. Provisional Application No. 62/785,967 which was filed Dec. 28, 2018, the entirety of which is also incorporated herein fully by reference.

FIELD OF THE DISCLOSURE

This disclosure relates generally to woodworking tools. More specifically and without limitation, this disclosure relates to a portable pocket hole jig system that provides a plurality of improved functions as well as ease of use.

BACKGROUND OF THE DISCLOSURE

Pocket hole jigs are old and well known in the art. A pocket hole jig is configured to hold a stepped drill bit at an angle so as to facilitate drilling into a workpiece at an angle. A screw is then inserted into the stepped pocket hole which joins two workpieces together thereby forming a pocket hole joint which is known for being easy to assemble and align as well as having excellent strength while also allowing for hiding of the screws used to form the joint. An example of a pocket hole jig system is owned by Applicant and assigned U.S. Pat. No. 7,798,750 and U.S. patent application Ser. No. 11/894,253 entitled Drill Guide With Removable Clamp Retainer which was filed on Aug. 20, 2007 and issued on Sep. 21, 2010, which is fully incorporated by reference herein, along with all related applications and patents. Another example of a pocket hole jig system is owned by Applicant and assigned U.S. Pat. No. 8,231,313 and U.S. patent application Ser. No. 11/947,722 entitled Adjustable Holding System which was filed on Nov. 29, 2007 and issued on Jul. 31, 2012, which is fully incorporated by reference herein, along with all related applications and patents.

While pocket hole jigs and the resulting pocket hole joinery they produce are a great improvement over prior forms of joinery, such as dowel joinery, dovetail joinery and the like, existing pocket hole jigs suffer from many disadvantages. Namely, setting up existing pocket hole jig systems is complex and not intuitive. This complexity requires many users to review the set-up instructions before use and even when doing so users are often confused and unsure of themselves. In addition, when pocket hole jig systems are set up, it is difficult for a user to know if the jig and drill bit are properly configured for their intended use. This often requires the user to do a test run before use to ensure that the jig and drill bit are properly set up for the workpieces they are using. This takes an unnecessary amount of time and unnecessarily consumes material and screws. In addition, due to the complexity and not-intuitive nature of the set-up process, pocket hole jigs are often set up for non-optimal performance. When this occurs, the resulting pocket hole joinery is not as strong as it could otherwise be and/or the wrong screws are used.

As such, for all these reasons existing pocket hole jig systems are too difficult to set-up, they are too time consuming to set up and they are too easy to improperly set-up.

Therefore, for all the reasons stated above, and the reasons stated below, there is a need in the art for a mini pocket hole jig system that improves upon the state of the art.

Another object of the disclosure is to provide a mini pocket hole jig system that provides improved functionality over prior art systems.

Yet another object of the disclosure is to provide a mini pocket hole jig system that provides improved features over prior art systems.

Another object of the disclosure is to provide a mini pocket hole jig system that is relatively inexpensive.

Yet another object of the disclosure is to provide a mini pocket hole jig system that is easy to use.

Another object of the disclosure is to provide a mini pocket hole jig system that is intuitive to use.

Yet another object of the disclosure is to provide a mini pocket hole jig system that is strong and robust.

Another object of the disclosure is to provide a mini pocket hole jig system that can be used in many applications.

Yet another object of the disclosure is to provide a mini pocket hole jig system that is practically impossible to improperly set-up.

Another object of the disclosure is to provide a mini pocket hole jig system that provides unique functionality.

Yet another object of the disclosure is to provide a mini pocket hole jig system that is fast to use and fast to set-up.

Another object of the disclosure is to provide a mini pocket hole jig system that is safe to use.

Yet another object of the disclosure is to provide a mini pocket hole jig system that saves time.

Another object of the disclosure is to provide a mini pocket hole jig system that has a compact size.

Yet another object of the disclosure is to provide a mini pocket hole jig system that is adjustable, in depth as well as width.

Another object of the disclosure is to provide a mini pocket hole jig system that has a long useful life.

Yet another object of the disclosure is to provide a mini pocket hole jig system that can be used on outside edges on workpieces as well as inside corners.

Another object of the disclosure is to provide a mini pocket hole jig system that is high quality.

Yet another object of the disclosure is to provide a mini pocket hole jig system that improves efficiencies.

Another object of the disclosure is to provide a mini pocket hole jig system that is fun to use.

Yet another object of the disclosure is to provide a mini pocket hole jig system that improves the quality of the products made using the device.

Another object of the disclosure is to provide a mini pocket hole jig system that eliminates the need to review the set-up instructions to properly set up the system.

Yet another object of the disclosure is to provide a mini pocket hole jig system that provides a visual feedback that the system is properly set-up.

These and other objects, features, or advantages of the disclosure will become apparent from the specification, figures and claims.

BRIEF DESCRIPTION OF THE DRAWINGS

FIG. 120 is another perspective view of the mini pocket hole jig system shown in FIG. 113;

FIG. 121 is a bottom perspective view of the mini pocket hole jig system shown in FIG. 113;

FIG. 122 is a perspective view of the mini pocket hole jig system shown in FIG. 113, the view showing the forward end of the mini pocket hole jig system;

FIG. 123 is another perspective view of the mini pocket hole jig system shown in FIG. 113, the view showing the forward end of the mini pocket hole jig system;

FIG. 124 is a bottom perspective view of the mini pocket hole jig system shown in FIG. 113, the view showing the forward end of the mini pocket hole jig system;

FIG. 125 is another bottom perspective view of the mini pocket hole jig system shown in FIG. 113, the view showing the forward end of the mini pocket hole jig system FIG. 126 is an exploded perspective view of the mini pocket hole jig system shown in FIG. 113, the view showing the spacer exploded from the jig segments, the view showing the tail sections attached to the jig segments;

FIG. 127 is another exploded perspective view of the mini pocket hole jig system shown in FIG. 113, the view showing the spacer exploded from the jig segments, the view showing the tail sections attached to the jig segments;

FIG. 128 is another exploded perspective view of the mini pocket hole jig system shown in FIG. 113, the view showing the bottom of the mini pocket hole jig system, the view showing the spacer exploded from the jig segments, the view showing the tail sections attached to the jig segments.

SUMMARY OF THE DISCLOSURE

Figure 1:
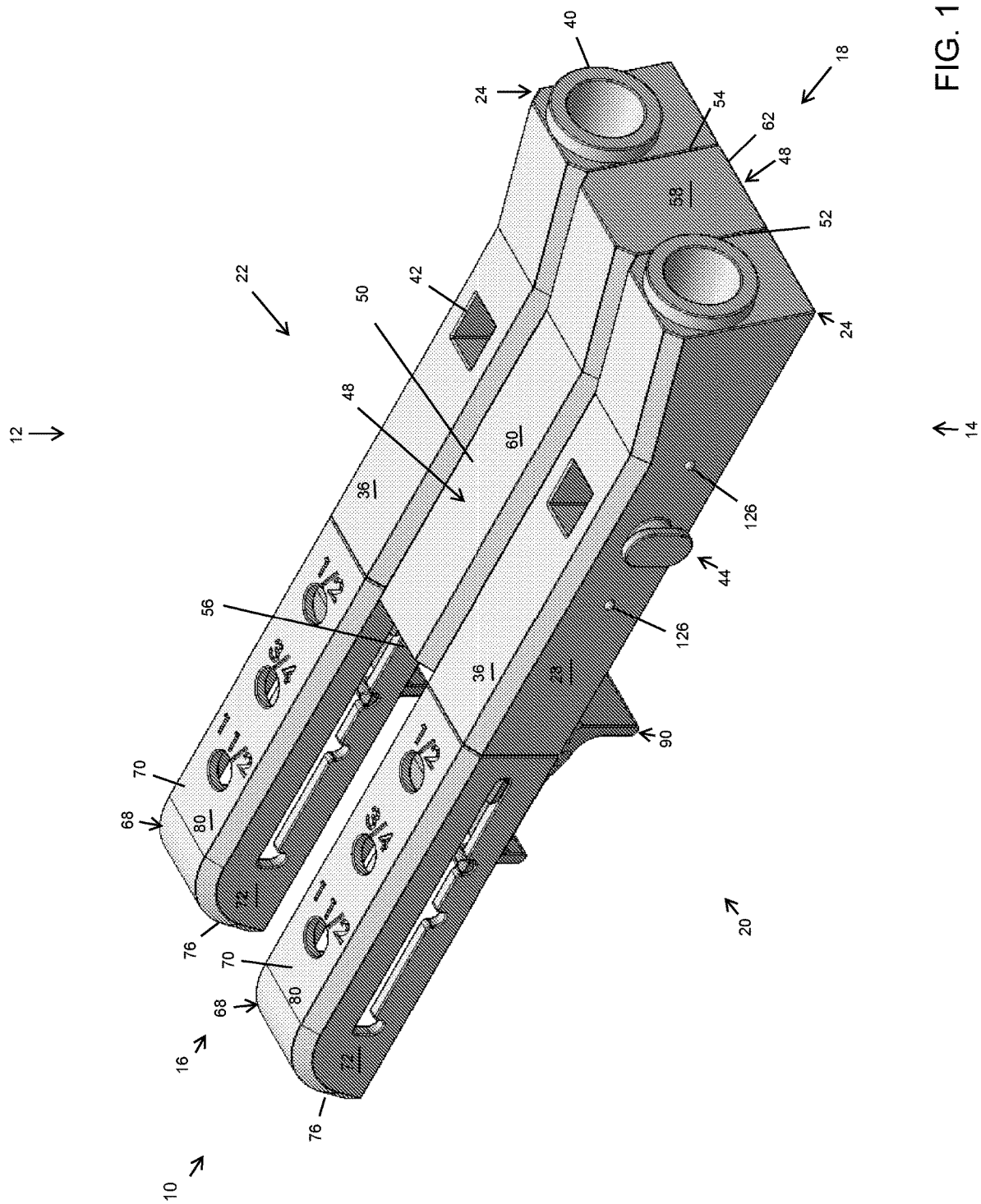
FIG. 1 is a top rear perspective view of a first embodiment of a mini pocket hole jig system, the view showing a pair of jig segments having a tail section connected to the forward end of the jig segments, the view showing the two jig segments extending in parallel spaced relation to one another and connected by a spacer positioned between the jig segments, the view showing the tail sections having a sliding stop feature positioned within the tail sections that slides in a slot in the sides of the tail section, the view showing openings in the tail section that show indicia that indicate the workpiece thickness when the stop feature is visible through the opening, the view showing a lock feature extending outward from the left side of the left-positioned jig segment, the view showing protrusions or stop features the extend outward from the side of the jig segment on each of the front and rear sides of the lock feature.

The figures show one or more embodiments of a mini pocket hole jig system. The pocket hole jig system is formed of a plurality of jig segments, wherein each jig segment includes a main body having a drill guide and at least one lock feature that protrudes outward on a first side of the main body and at least one recess that protrudes inward on a second side of the main body, wherein the lock feature(s) are opposite the recess(es). The system also includes one or more spacers that have a main body of varying widths and at least one lock feature that protrudes outward on a first side of the main body and at least one recess that protrudes inward on a second side of the main body, wherein the lock feature(s) are opposite the recess(es). Jig segments and spacers may be connected together by inserting the lock feature(s) of a jig segment or spacer into the recess(es) of an adjacent jig segment or spacer. In this way, a mini pocket hole jig may be formed of any number of jig segments spaced apart from one another at practically any spacing to form groups of pocket holes at various spacing. A tail section is connected in a removable manner to the forward end of the jig segments and/or spacers and include a stop feature that is positioned on and/or within the tail section and is spring biased and rides in slot that includes a plurality of stops that correspond to common workpiece thicknesses. The tail section includes a plurality of indicia formed of an opening in the tail section, such that when the stop feature is visible through an opening, this indicates the corresponding workpiece thickness. The clamping surface of the jig segments and spacers includes a layer of material that has a high coefficient of friction so as to help hold the jig on a workpiece with less clamping force.

DETAILED DESCRIPTION OF THE DISCLOSURE

In the following detailed description, reference is made to the accompanying drawings which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the disclosure(s). The following detailed description is, therefore, not to be taken in a limiting sense, and the scope of the disclosure(s) is defined only by the appended claims, along with the full scope of equivalents to which such claims are entitled.

As used herein, the terminology such as vertical, horizontal, top, bottom, front, back, end, sides, left, right, and the like are referenced according to the views, pieces, parts, components and figures presented. It should be understood, however, that the terms are used only for purposes of description, and are not intended to be used as limitations. Accordingly, orientation of an object or a combination of objects may change without departing from the scope of the disclosure.

While a number of embodiments are presented herein, unless stated otherwise, it is to be understood that the teaching of one embodiment applies to all other embodiments.

System: With reference to the figures, a mini pocket hole jig system 10 (or pocket hole jig system 10 or simply system 10) is presented. The pocket hole jig system 10 is formed of any suitable size, shape and design and is configured to facilitate drilling pocket holes in various workpieces in various configurations. In the arrangement shown, as one example, the pocket hole jig system 10 has a top side 12, a bottom side 14, a forward side 16, a rearward side 18, a left side 20, and a right side 22. The system 10 includes a plurality of jig segments 24 having a main body 26 having a left side 28, a right side 30, a forward end 32, a rearward end 34, a top side 36, a clamping surface 38, or bottom side, a drill guide 40, an opening 42, a lock feature 44, and a receiver 46 among other components and features. The system 10 includes a plurality of spacers 48 having a main body 50 having a left side 52, a right side 54, a forward end 56, a rearward end 58, a top side 60, a clamping surface 62, or bottom side, a lock feature 64, and a receiver 66, among other components and features. The system 10 includes a plurality of tail sections 68 having a main body 70 having a left side 72, a right side 74, a forward end 76, a rearward end 78, a top side 80, a clamping surface 82, or bottom side, a hollow interior 84, a slot 86 having a plurality of stops 88, a stop feature 90, and an indicator 92 having a plurality of openings 94, among other components and features. The system 10 includes a workpiece thickness gauge 94 having a main body 96, indicia 98 and a plurality of steps 156 that is in some examples connected to an Allen wrench 100, among other components and features. The system 10 includes a stepped drill bit 102 having a connection end 104 and a drilling end 106 and indicia 108, among other components and features. The system 10 includes a stop collar 110 having an alignment feature 112, and a fastener 114, among other components and features.

Interchangeability of Jig Segments and Spacers: It is important to note that in the arrangement shown herein both the main body 26 of jig segments 24 as well as spacers 48 include similar if not identical lock features 44 and/or receivers 46 as well as other matching features. As such, jig segments 24 and spacers 48 may be connected to one another and/or each other in an interchangeable and identical side-by-side manner. As such, reference to how two jig segments 24 connect to one another shall apply equally to how two spacers 48 connect together as well as how a jig segment 24 and spacer 48 connect together. As such, to avoid redundancy, reference to how two jig segments 24 connect to one another shall imply a connection to a spacer 48 as well, unless stated otherwise.

Jig Segments: Jig segments 24 are formed of any suitable size, shape and design and are configured to be used individually to form pocket holes as well as to be joined with other jig segments 24, tail sections 68 and/or spacers 48 to form a pocket hole jig comprised of multiple jig segments 24, tail sections 68 and/or spacers 48. In the arrangement shown, as one example, jig segments 24 include a main body 26. Main body 26 is formed of any suitable size, shape and design and is configured to be the main structural member of jig segment 24. Main body 26 may be formed of a single monolithic and unitary piece that is formed by molding, machining, 3D printing or the like, or main body 26 may be formed of multiple pieces that are joined together either in a removable manner such as by screwing, bolting, friction fitting, snap fitting or the like or joined in a permanent manner such as by gluing, adhering, welding or the like. In one arrangement, main body 26 is formed of a relatively rigid and durable plastic material, UHMW material, composite material, nylon material, fiber glass material or any other non-metallic material, or combination thereof. In an alternative arrangement, main body 26 is formed of one or more metallic materials. In another arrangement, main body 26 is formed of a combination metallic materials and non-metallic materials. In one arrangement, main body 26 is formed of a non-metallic material with a metallic drill guide 40 inserted or formed within the main body 26.

In the arrangement shown, as one example, main body 26 includes a left side 28, a right side 30, a forward end 32, a rearward end 34, a top side 36 and a bottom side or clamping surface 38. In the arrangement shown, as one example, left side 28 and right side 30 are generally flat and planar in shape and extend in a generally parallel planar relationship to one another. Left side 28 and right side 30 connect at their forward end to the outside edges of forward end 32. Left side 28 and right side 30 connect at their rearward end to the outside edges of rearward end 34. Left side 28 and right side 30 connect at their upper end to the outside edges of top side 36. Left side 28 and right side 30 connect at their lower end to the outside edges of clamping surface 38. The planes of left side 28 and right side 30 extend in approximate perpendicular planar alignment to the planes formed by forward end 32 and rearward end 34. The planes of left side 28 and right side 30 extend in approximate perpendicular planar alignment to the planes formed by top side 36 and clamping surface 38.

In the arrangement shown, as one example, forward end 32 and rearward end 34 are generally flat and planar in shape and extend in a generally parallel planar relationship to one another. Forward end 32 and rearward end 34 connect at their upper and lower ends to the top side 36 and clamping surface 38, respectively. Forward end 32 and rearward end 34 connect at their sides to left side 28 and right side 30, respectively. The planes of forward end 32 and rearward end 34 extend in approximate perpendicular planar alignment to the planes formed by top side 36 and clamping surface 38. The planes of forward end 32 and rearward end 34 extend in approximate perpendicular planar alignment to the planes formed by left side 28 and right side 30. In the arrangement shown, as one example, to ease drilling, the plane formed by the rearward end 34 of main body 26 angles forward slightly as it extends upward from clamping surface 38 to top side 36. In one arrangement, the angle the rearward end 34 angles forward is approximate equal to the angle that the drill guide 40 extends through the main body 26 such that the plane of rearward end 34 extends in approximate perpendicular alignment to the central axis of rotation of the bore of drill guide 40. Or, said another way, the central axis of rotation of the bore of the drill guide 40 extends through the plane of the rearward end 34 in an approximate perpendicular manner.

In the arrangement shown, as one example, top side 36 and clamping surface 38 are generally flat and planar in shape and extend in a generally parallel planar relationship to one another. Top side 36 and clamping surface 38 connect at their forward end to the upper and lower edges of forward end 32, respectively. Top side 36 and clamping surface 38 connect at their rearward end to the upper and lower edges of rearward end 34, respectively. Top side 36 and clamping surface 38 connect at their outside edges to left side 28 and right side 30, respectively. The planes of top side 36 and clamping surface 38 extend in approximate perpendicular planar alignment to the planes formed by forward end 32 and rearward end 34. The planes of top side 36 and clamping surface 38 extend in approximate perpendicular planar alignment to the planes formed by left side 28 and right side 30. Clamping surface 38 is generally flat and planar so as to engage and lay flat on the surface of a workpiece 116. Top side 36 extends in approximate parallel planar relationship to clamping surface 38 so as to provide a flat surface that receives the pad 118 of a clamp 120 that clamps the jig segment 24 to a workpiece 116.

In this way, main body 26 is formed of a generally elongated square or rectangular shaped member.

Drill Guide: In the arrangement shown, as one example, main body 26 includes a drill guide 40. Drill guide 40 may be formed of any suitable size, shape and design and is configured to receive and guide drill bit 102. While, main body 26 is shown as having only one drill guide 40, it is hereby contemplated that main body 26 may have any number of drill guides 40 such as two, three, four, five, six or more. In the arrangement shown, as one example, drill guide 40 is a generally circular shaped member that is configured to receive and guide stepped drill bit 102 through its bore and along its central axis. In one arrangement, drill guide 40 is formed of a metallic or hardened metallic material so as to provide strength and durability as drill guide 40 receives and guides stepped drill bit 102. Drill guide 40 may be molded into main body 26, screwed into main body 26, adhered to main body 26 or mechanically connected to main body 26 by any other manner, method or means.

In the arrangement shown, as one example, the axis of rotation of drill guide 40 that extends through the center of drill guide 40 extends at an acute angle. More specifically, in one arrangement, the angle between the plane formed by clamping surface 38 and axis of rotation of drill guide 40 on the rearward side of the main body 26 is an acute angle, whereas the angle between the plane formed by clamping surface 38 and axis of rotation of drill guide 40 on the forward side of the main body 26 is an obtuse angle. In one arrangement, the acute angle is anywhere between one degree and forty five degrees, or one degree and thirty degrees, or one degree and twenty five degrees, or one degree and twenty degrees, or one degree and fifteen degrees, or between ten degrees and twenty degrees, or between twelve degrees and eighteen degrees, and in one arrangement approximately fifteen degrees has been tested with success. Approximately fifteen degrees is shown in the figures.

In the arrangement shown, as one example, drill guide 40 extends outward from the plane formed by rearward end 34 a distance. By drill guide 40 extending outward from rearward end 34 a distance this causes the rearward end of drill guide 40 to form a stop surface that is configured to engage the stop collar 110 of drill bit 102 thereby stopping the inward movement of drill bit 102 in an accurate and efficient manner. This rearward extension of drill guide 40 provides greater wear resistance as the metallic drill guide 40 engages the stop collar 110 causing less wear, than if the stop collar 110 engaged the plastic or composite material of main body 26. In an alternative arrangement, the material of main body 26 engages the stop collar 110. In another arrangement, the rearward end of drill guide 40 is flush with the plane of rearward end 34 and as such the stop collar 110 engages the material of main body 26 and drill guide 40 simultaneously. In another arrangement, the rearward end of drill guide 40 is recessed to a protruding portion of material that forms main body 26 that extends rearward of the plane of rearward end 34 and as such the stop collar 110 engages the material of main body 26.

In one arrangement, the plane of rearward end 34 is perpendicular to the axis of rotation of drill guide 40. In this arrangement, the plane of rearward end 34 tilts slightly forward as it extends from clamping surface 38 to top side 36.

In the arrangement shown, as one example, to accommodate the upward extension of drill guide 40 as it extends rearward, the rearward portion of top side 36 angles upward in approximately parallel spaced alignment to the axis of rotation of the drill guide 40. This upward angled portion of top side 36 of main body 26 allows the forward section of main body 26 to be vertically thinner (as compared to the rearward section of main body 26) while allowing the main body 26 to consume the drill guide 40 at its rearward end despite the continued upward extension of the drill guide at the rearward end of main body 26.

Opening: In the arrangement shown, as one example, main body 26 includes an opening 42. Opening 42 may be formed of any suitable size, shape and design and is configured to allow woodchips formed during drilling to exit the jig segment 24. In the arrangement shown, as one example, opening 42 is a generally rectangular shaped opening in the top side 36 of main body 26 that extends downward into main body 26 and connects to the opening or bore formed by drill guide 40. However, any other shaped opening is hereby contemplated for use as opening 42 as is any other location on main body 26. In addition, while one opening 42 is shown for use, any other number of openings 42 are hereby contemplated for use such as two, three, four, five, six or more. In the arrangement shown, opening 42 connects to the bore formed by drill guide 40. In the arrangement shown, as one example, opening 42 connects at the lower forward end of drill guide 40 and in this way facilitates the exit of wood chips from the main body 26.

Lock Feature & Receiver: In the arrangement shown, as one example, main body 26 includes at least one lock feature 44 and at least one receiver 46. Lock feature 44 and receiver 46 are formed of any suitable size, shape and design and are configured to facilitate connection of a plurality of jig segments 24 (as well as spacers 48) together in side-to-side alignment either directly to one another or with one or more spacers 48 positioned there between. Notably, lock features 44 and receivers 46 are hereby contemplated for use connecting jig segments 24 and/or spacers 48 to any other tool or device or object as well.

In the arrangement shown, as one example, lock feature 44 is formed as a unitary part of main body 26 and extends outward from main body 26 a distance. That is, lock feature 44 is shown formed as part of main body 26 through molding, casting, machining or the like. However, it is hereby contemplated that lock feature 44 may be attached to or added to the side of main body 26 by screwing, bolting, adhering, welding or by connecting in any other manner. In the arrangement shown, as one example, lock feature 44 is positioned in a side of main body 26 between forward end 32 and rearward end 34 and extends outward in generally perpendicular alignment to the plane formed by the side 28 of main body 26. In the arrangement shown, as one example, lock feature 44 includes a generally cylindrical post 122 that extends outward a distance from the side 28 of main body 50 a distance and connects at its outward end to a foot 124. In the arrangement shown, as one example, foot 124 is a generally planar shaped member when viewed from forward end 32, rearward end 34, top side 36 or clamping surface 38 and extends, in at least some places, beyond the exterior diameter of post 122 such that foot 124 is larger, when viewed from the side, than post 122. By foot 124 being larger than post 112 this facilitates locking to other components. In the arrangement shown, as one example, foot 124 is a generally rectangular shaped member with a rounded upper end and lower end when viewed from the side which extends a greater distance between top side 36 and clamping surface 38 than it extends between forward end 32 and rearward end 34. In this way, lock feature 44 is formed of a smaller post 122 that connects to a larger foot 124 at its outward end which facilitates locking of lock feature 44 into receiver 46.

In the arrangement shown, as one example, receiver 46 is formed as a unitary part of main body 26 and extends inward into main body 26 a distance. In this arrangement, receiver 46 is positioned in a side of main body 26 between forward end 32 and rearward end 34, on a side opposite receiver 44. In the arrangement shown, as one example, receiver 46 includes an opening that is sized and shaped to receive foot 124 in a particular orientation. In the arrangement shown, as one example, when foot 124 is formed of a generally rectangular shaped member with a rounded upper end and lower end, the opening of receiver 46 is similarly shaped to allow the insertion of foot 124 therein. In this way, foot 124 may be inserted into the opening of receiver 36 with close and tight tolerances.

However, in the arrangement shown, as one example, foot 124 of lock feature 44 is vertically aligned, meaning that it is longer between top side 36 and clamping surface 38, whereas the opening of receiver 46 is longer between forward end 32 and rearward end 34 than it is between top side 36 and clamping surface 38. Said another way, the opening of receiver 46 is oriented ninety degrees to the orientation of foot 124 of lock feature 44. However, any other angle of orientation is hereby contemplated for use.

In this arrangement, to assemble two jig segments 24 together, or a jig segment 24 to a spacer 48, the two jig segments 24 are held in side-to-side alignment to one another and are rotated ninety degrees to one another so as to align the foot 124 of one jig segment 24 to the opening in the receiver 46 of the other jig segment 24. Once aligned in this manner, the foot 124 of one jig segment 24 is inserted into the opening of the receiver 46 of the other jig segment 24. Once the foot 124 is inserted into the receiver 46, the two jig segments 24 are then rotated ninety degrees to one another. In doing so, the foot 124 perpendicularly aligns to the opening of the receiver 46 thereby locking the two jig segments 24 together. That is, because the opening in the receiver 46 is horizontally longer than it is vertically tall, whereas the foot 124 is vertically taller than it is horizontally long, when the two jig segments 24 are rotated after the foot 124 is inserted within the receiver 46 the upper and lower edges of foot 124 that extends past the exterior diameter of post 122 extend past the edges of the opening of the receiver 46. That is, the upper and lower edges of foot 124 that extends past the exterior diameter of post 122 extend past the edges of the opening of the receiver 46 and are captured behind a layer of material of the main body 26 of the connected jig segment 24 or spacer 48. In this way, the foot 124 of one jig segment 24 cannot laterally pull out of the receiver 46 of the other jig segment 24. That is, the two jig segments 24 cannot laterally move away from one another. In fact, as more force is applied pulling adjacent jig segments 24 away from one another more force is applied pulling the interior surface of foot 124 of one jig segment 24 or spacer 48 into the interior surface adjacent the opening of receiver 46 of the adjacent jig segment 24 or spacer 28 thereby strengthening the connection between the two components. In one arrangement, to facilitate a stronger connection, an interior portion of the receiver 46, that receives foot 124, includes a stop feature, detent, cam surface or other feature that engages the upper and/or lower edges of the foot 124 or any other portion of foot 124 upon full rotation or full installation thereby locking the two components in a fully assembled and aligned state and helping to frictionally hold the two components in this fully assembled and fully rotated state by imparting a frictional force upon the foot 124. This arrangement may also provide a frictional feedback to the user to indicate the fully assembled state.

To separate the two jig segments 24, the two jig segments 24 are simply rotated in the opposite direction, until the periphery of foot 124 is aligned with the opening 42 and once aligned the foot 124 is simply laterally pulled through the opening 42 thereby separating the two jig segments 24 and/or spacers 48.

In one arrangement, to further hold two jig segments 24 together in a fully aligned state, as well as to indicate to the user that the two jig segments 24 are fully assembled and aligned with one another, one side of jig segment 24 includes one or more protrusions 126 and the other or opposite side includes one or more recesses 128. When two jig segments 24 are connected together in side-to-side alignment and are rotated into full locking engagement with one another, the protrusions 126 of one jig segment 24 are received within the recesses 128 of the other jig segment 24. In this way, the engagement of protrusions 126 and recesses 128 help to hold jig segments 24 in a fully locked and aligned state.

Figure 4:
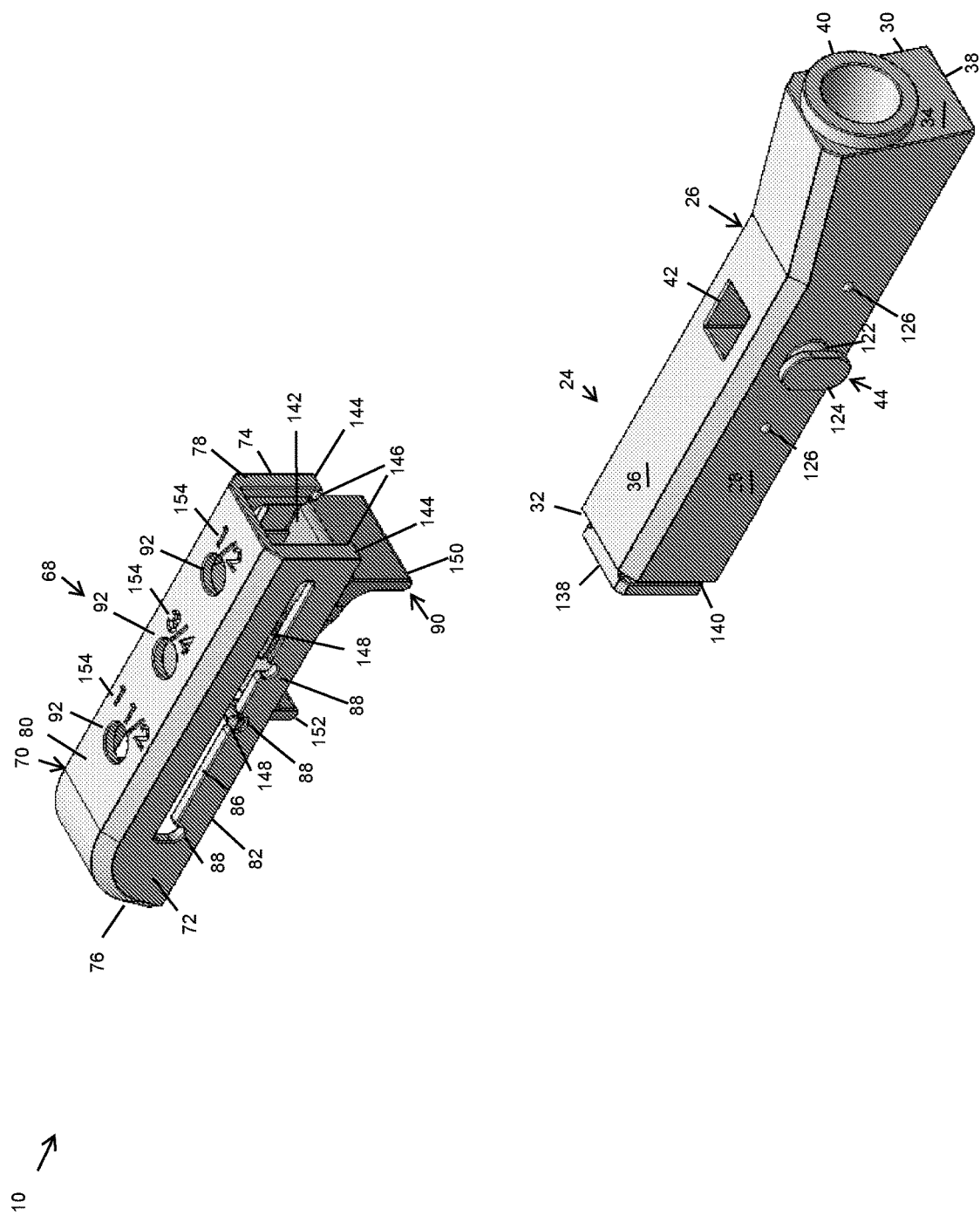
FIG. 4 is a top rear perspective view of a single jig segment and tail section of the mini pocket hole jig system shown in FIG. 1, the view showing a jig segment and a tail section exploded from one another, the view showing the rearward end of the tail section aligned to slide down over the connector at the forward end of the jig segment thereby connecting the tail section to the jig segment.
Figure 5:
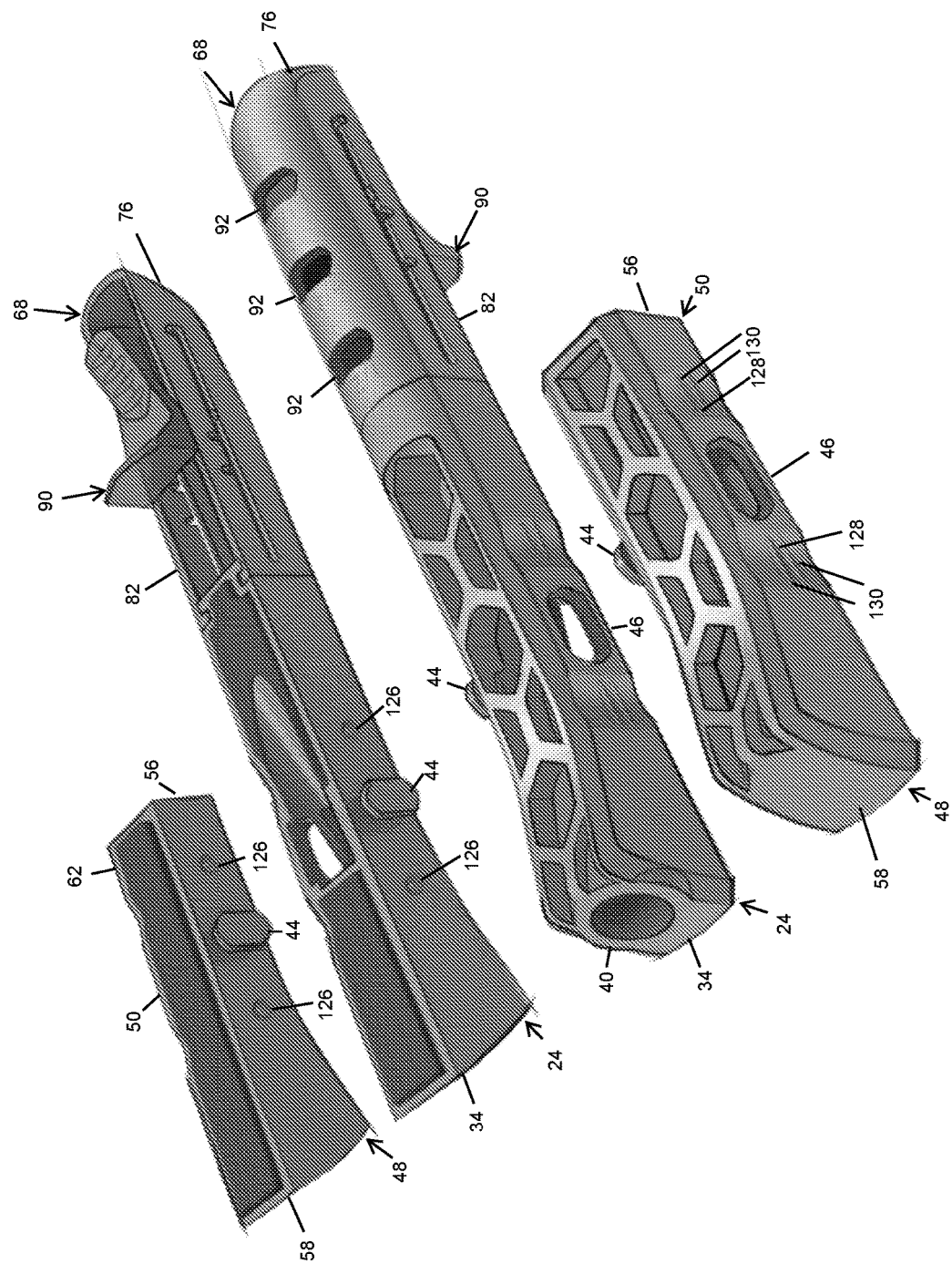
FIG. 5 is a perspective view of artistic renderings of another embodiment of a mini pocket hole jig system that is similar to that shown in FIGS. 1-4, the view showing two jig segments having main bodies with tail sections attached and an exploded spacer, the view showing one jig segment and spacer upright and the other jig segment and spacer upside down, the view showing a planar bottom surface to the jig segment and spacer that includes a layer of grippy material, the view showing the upper surface of the jig segment having a large-pattern honeycomb structure for support and rigidity as well as material and weight savings, the view showing the tail section being hollow with stop feature positioned therein and visible through openings at various workpiece thicknesses, the view showing the upper spacer and main body having a protrusion extending outward from the side of the jig segment in front of the lock feature and another protrusion extending outward from the side of the jig segment rearward of the lock feature, the view showing the lower spacer and jig segment have a pair of laterally extending bars with a space between positioned in front of a receiver in the side of the jig segment and another pair of laterally extending bars with a space between positioned rearward of the receiver in the side of the jig segment wherein the space between the bars that serve to receive the protrusions when the lock feature of one jig segment or spacer is received within the receiver of another jig segment or spacer.

In one arrangement, (as is shown in FIGS. 1-10), as one example, jig segments 24 include a pair of protrusions 126 in one side of main body 26 with one protrusion 126 positioned forward of lock feature 44 and another protrusion 126 positioned rearward of lock feature 44. In one arrangement, protrusions 126 are small rounded or spherical members that extend outward of from the side of main body 26. In one arrangement, (as is shown in FIG. 5) recesses 128 include a recess in the side of main body 26, on a side opposite protrusion 126 and aligned with protrusion 126. In this arrangement, recess 128 includes a vertically aligned groove that extends from the top side 36 to the clamping surface 38 of main body 26 and includes a pair of bars 130 positioned within the recess 128. As the jig segments 24 are rotated into alignment with one another, the protrusion 126 of one jig segment 24 is received within the recess 128 of the other jig segment 24. As the two jig segments 24 are almost fully rotated into planar alignment with one another, the protrusion 126 of one jig segment 24 engages a bar 130 within the recess 128 of the other jig segment 24. Once enough pressure is applied, the protrusion 128 moves over the bar 130 and is held or captured within the low spot between the two bars 130. In this position, the two jig segments 24 are fully aligned with one another, meaning that the top side 36 and clamping surface 38 are aligned with one another to facilitate clamping onto a workpiece 116. In this position, additional force must be applied to force the protrusion 126 out of the low spot between the bars 130 which helps to hold the jig system 10 in a fully assembled position. By using two bars 130, the two jig segments 24 positioned within grooves that extend the entire vertical length of the jig segments 24 may be rotated either way, clockwise or counterclockwise, to assemble or disassemble the two jig segments 24. This increases the versatility of the jig segments 24 as well as increases the ease of use.

In one arrangement, when the protrusions 126 of one jig segment 24 are held within the recesses 128 between bars 130 of an adjacent jig segment 24 there is contact and pressure pushing the opposing jig segments 24 away from one another. This engagement and pressure helps to form a secure connection between the lock feature 44 of one jig segment 24 and the receiver 46 of the other jig segment 24 thereby forming a strong and stable connection between opposing jig segments 24. This connection forms a frictional engagement between adjacent jig segments 24 that helps to hold the position of adjacent jig segments 24 in a unified and aligned manner. This engagement also provides a firm and rigid feeling system 10 that does not have any wobble, rattling, give or relative movement among the individual components of the system 10. In addition, this engagement also provides alignment between the individual components of the system 10 thereby ensuring that all components form a planar top surface and planar bottom surface that extends across all components of the system 10.

Figure 11:
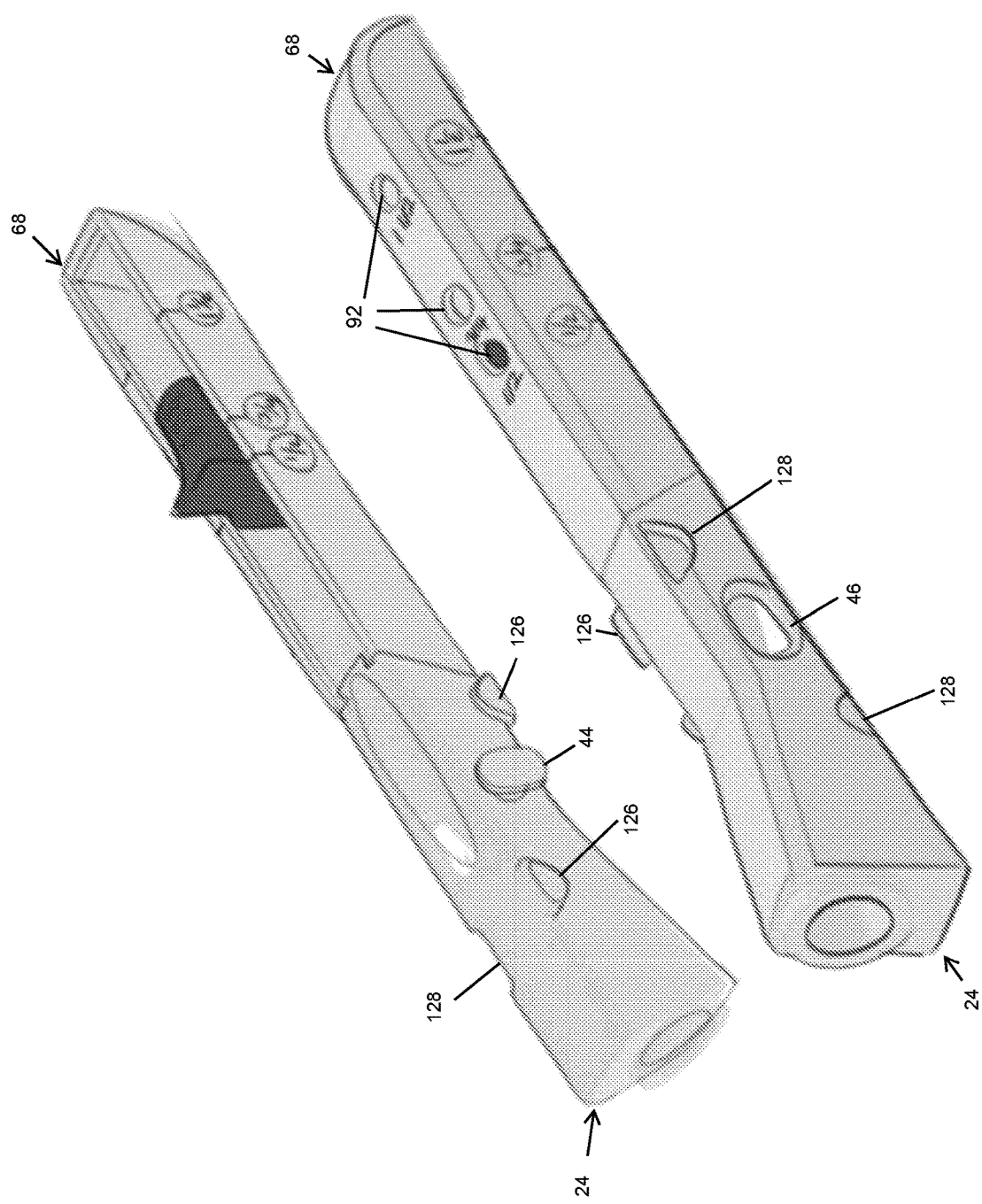
FIG. 11 is a perspective view of artistic renderings of another embodiment of a mini pocket hole jig system that is similar to that shown in FIGS. 1-5, and FIG. 5, and FIG. 6, and FIG. 7 and FIG. 8, and FIG. 9, and FIG. 10, the view showing two jig segments with tail sections attached, the view showing one jig segment upright and the other jig segment upside down, the view showing a protrusion connected to the upper edge of the jig segment forward of the lock feature and a protrusion connected to the lower edge of the jig segment rearward of the lock feature, the view showing a similarly aligned recess connected to the upper surface forward of a receiver on the opposite side of the jig segment and a recess connected to the lower edge of the jig segment rearward of the receiver, wherein the recesses are configured to receive the protrusions in locking fashion when the lock feature of one jig segment or spacer is positioned within the receiver of another jig segment or spacer.
Figure 12:
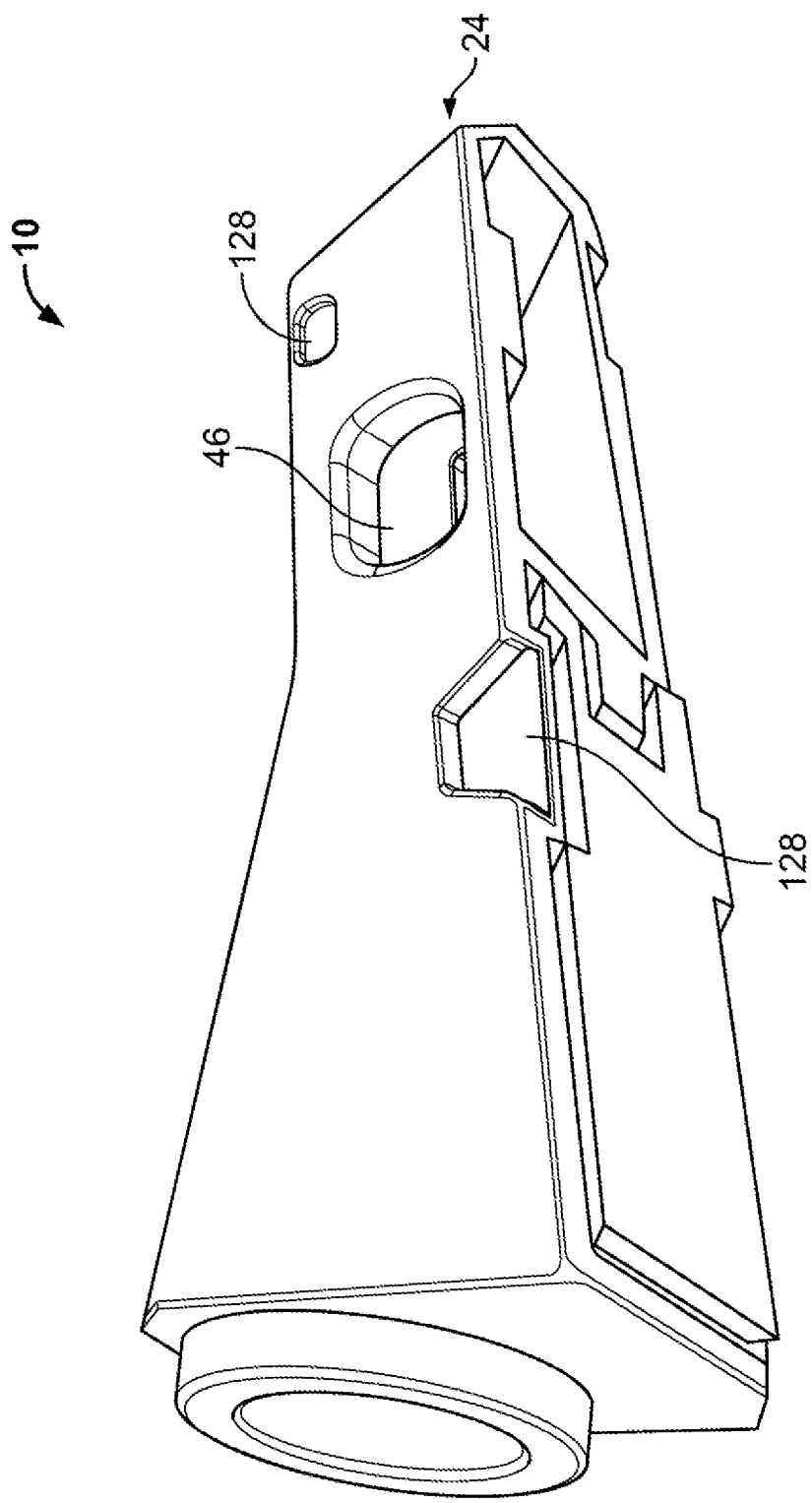
FIG. 12 is a perspective view of another embodiment of a mini pocket hole jig system that is similar to that shown in FIG. 11 the view showing a single recess in the side of the jig segment rearward of the receiver.
Figure 13:
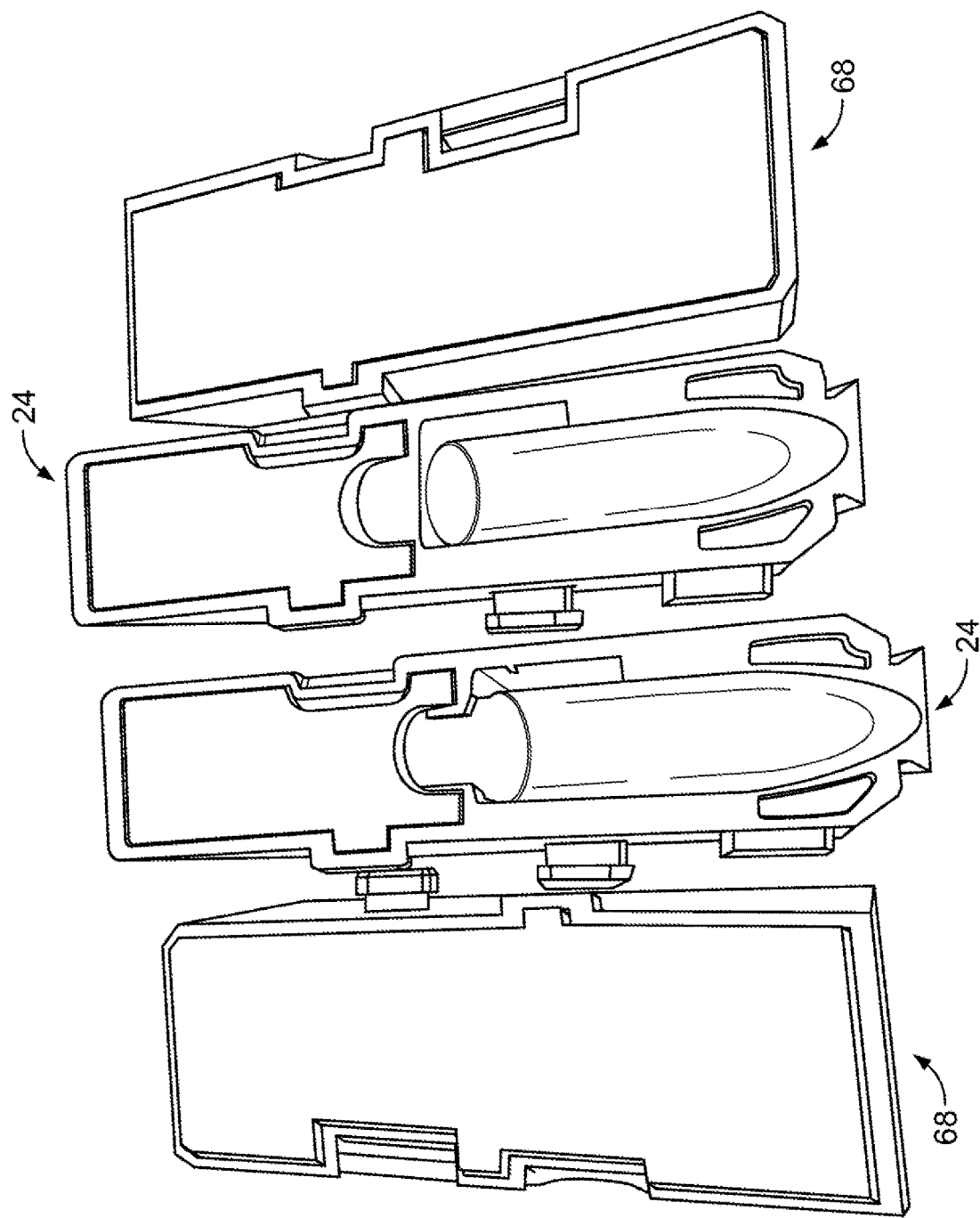
FIG. 13 is a perspective view of another embodiment of a mini pocket hole jig system that is similar to that shown in FIG. 11, the view showing two jig segments and two spacers upside down, the view showing a protrusion connected to the upper edge of the jig segment or spacer forward of the lock feature and a protrusion connected to the lower edge of the jig segment or spacer rearward of the lock feature, the view showing a similarly aligned recess connected to the upper surface forward of a receiver on the opposite side of the jig segment or spacer and a recess connected to the lower edge of the jig segment or spacer rearward of the receiver, wherein the recesses are configured to receive the protrusions in locking fashion when the lock feature of one jig segment or spacer is positioned within the receiver of another jig segment or spacer and they are twisted together.
Figure 14:
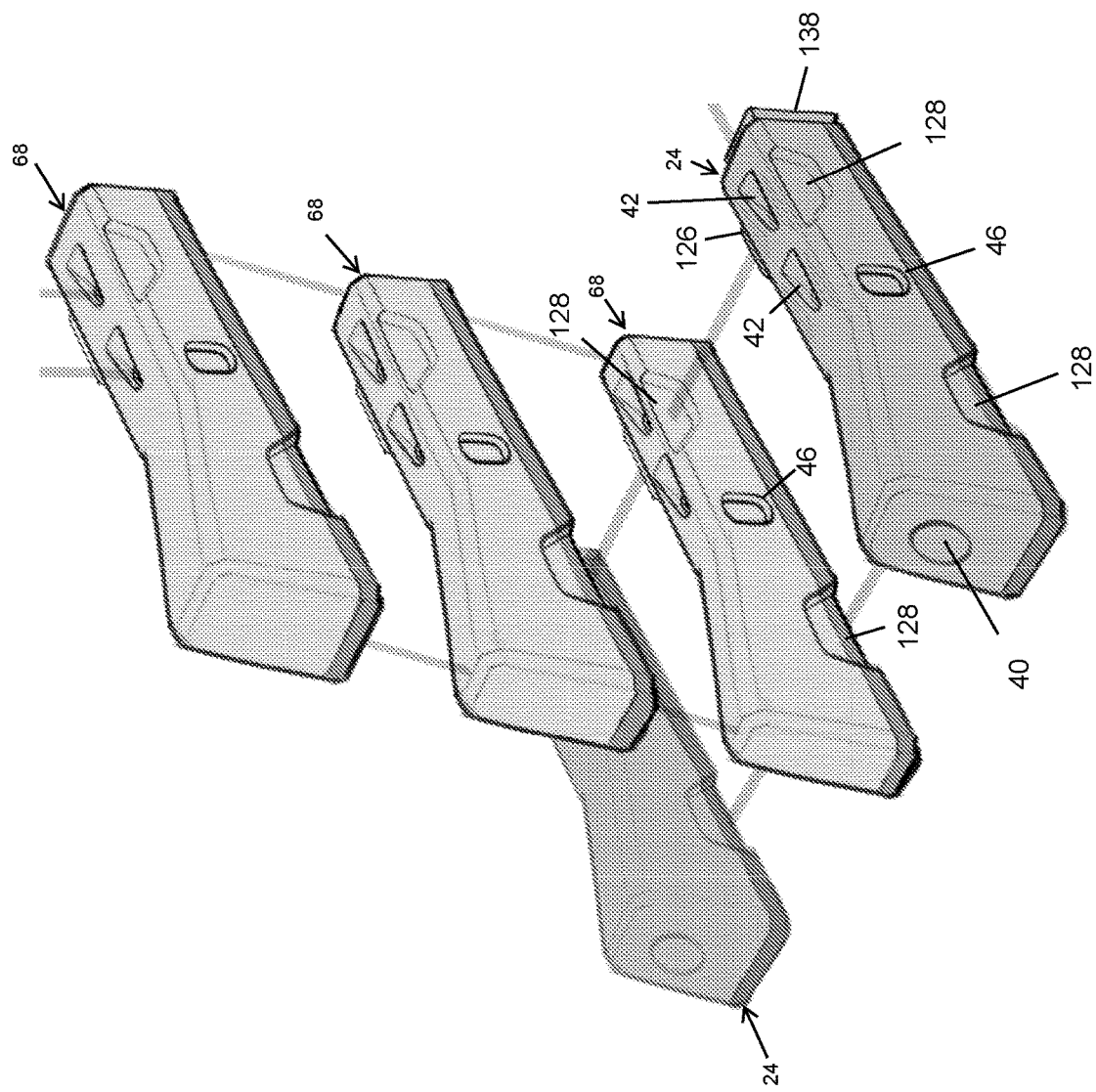
FIG. 14 is a perspective view of an artistic rendering of another embodiment of a mini pocket hole jig system that is similar to that shown in FIG. 13, the view showing two jig segments and a spacer in exploded fashion, the view showing a protrusion connected to the upper edge of the jig segment and spacer forward of the lock feature and a hidden protrusion connected to the lower edge of the jig segment and spacer rearward of the lock feature, the view showing a similarly aligned recess connected to the upper surface forward of a receiver on the opposite side of the jig segment and spacer and a recess connected to the lower edge of the jig segment and spacer rearward of the receiver, wherein the recesses are configured to receive the protrusions in locking fashion when the lock feature of one jig segment or spacer is positioned within the receiver of another jig segment or spacer and they are twisted together.

In another arrangement, (as is shown in FIG. 11) jig segments 24 include a pair of protrusions 126, with one protrusion 126 positioned at the intersection of a sidewall and the top side 36 on one side of the lock feature 44, and another protrusion 126 positioned at the intersection of a sidewall and the clamping surface 38 on the other side of the lock feature 44. In the arrangement shown, as one example, the upper protrusion 126 is positioned forward of the lock feature 44 and the lower protrusion 126 is positioned rearward of the lock feature 44, however the opposite arrangement is also contemplated for use, as is the use of a plurality of protrusions 126 on the forward and/or rearward sides of the lock feature 44. Similarly, in this arrangement, jig segments 24 include a pair of recesses 128, with one recess 128 positioned at the intersection of a sidewall and the top side 36 on one side of the lock feature 44 and another recess 128 positioned at the intersection of a sidewall and the clamping surface 38 on the other side of the lock feature 44. In the arrangement shown, as one example, the recesses 128 is positioned forward of the lock feature 44 and the recesses 128 is positioned rearward of the lock feature 44, however the opposite arrangement is also contemplated for use, as is the use of a plurality of recesses 128 on the forward and/or rearward sides of the lock feature 44. In the arrangement shown, as one example, these protrusions 126 and recesses 128 are generally triangular in shape or rounded in shape when viewed from the side, however any other shape is hereby contemplated for use. In this arrangement, as the two jig segments 24 rotated into planar alignment with one another, the protrusions 126 of one jig segment 24 engages the recesses 128 of the other jig segment 24. The engagement of the protrusion 126 with the edges of the recess 128 stop the two jig segments 24 in a fully aligned position thereby preventing over rotation. Once enough pressure is applied, the protrusions 126 move into and are frictionally held within the recesses 128 of the other jig segment 24 and are frictionally held in place due to frictional engagement between opposing jig segments 24. In one arrangement protrusions 126 include a lip that fits behind a flange in recesses 128 thereby preventing the two jig segments from pulling apart from one another when fully assembled. In another arrangement protrusions 126 are over-sized and engage recesses 128 in a manner that force the two jig segments 24 away from one another thereby tightening the connection between receiver 46 and lock feature 44 of opposing jig segments 24 thereby helping to hold the two jig segments 24 in a fully assembled and aligned position, this may include a detent-engagement arrangement and/or a friction-fit-engagement arrangement. In this fully assembled position, the two jig segments 24 are fully aligned with one another. In this position, additional force must be applied to force the protrusions 126 out of the recesses 128 due to the frictional engagement. In an alternative arrangement, only one protrusion 126 and recess 128 may be present, either forward of or rearward of lock feature 44. In another alternative arrangement, more than one protrusion 126 and recess 128 may be present, either forward of or rearward of lock feature 44, such as two, three, four, five, six or more.

Figure 15:
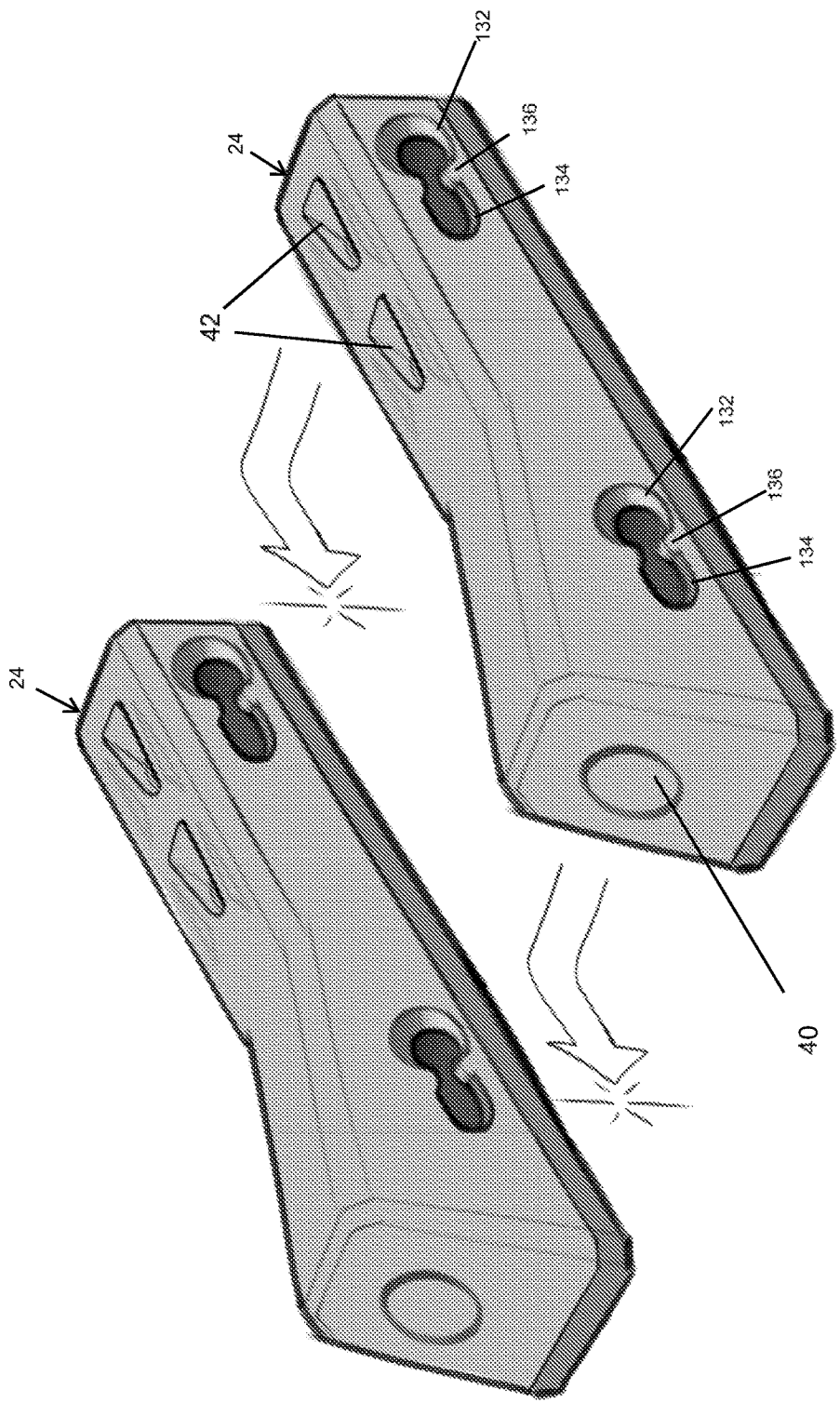
FIG. 15 is a perspective view of an artistic rendering of another embodiment of a mini pocket hole jig system, the view showing two jig segments that include a pair of receivers in the side of the jig segment that include a key hole shaped member that forms receiver one toward the forward end of the main body and one toward the rearward end of the main body, these receivers receive lock features therein that facilitate connection by laterally sliding the two jig segments relative to one another in accordance with the arrows shown on the drawing.
Figure 16:
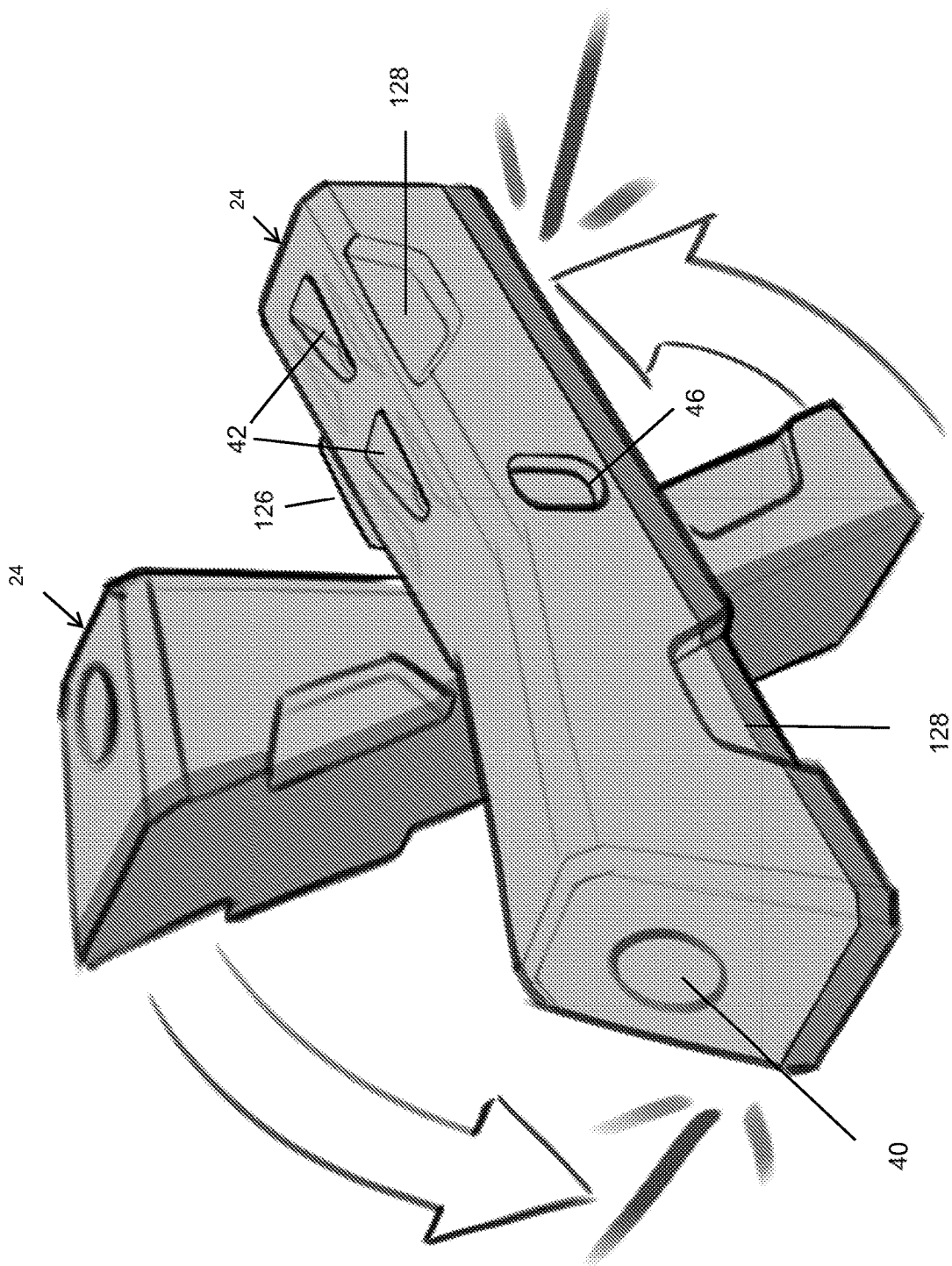
FIG. 16 is a perspective view of an artistic rendering of another embodiment of a mini pocket hole jig system that is similar to that shown in FIG. 14, the view showing two jig segments connected at their middle and rotated with respect to one another, the view showing a recess connected to the upper surface forward of a receiver on the opposite side of the jig segment from a protrusion and a recess connected to the lower edge of the jig segment rearward of the receiver, wherein the recesses are configured to receive the protrusions in locking fashion when the lock feature of one jig segment is rotated into the receiver of another jig segment and they are twisted together relative to one another in accordance with the arrows shown on the drawing.

In another arrangement, (as is shown in FIG. 15), jig segments 24 include a pair of receivers 46 that include a key hole shaped member that forms receiver 46. In the arrangement shown, as one example, a pair of receivers 46 are placed in a side of the main body 26, one toward the forward end 32 of the main body 26 and one toward the rearward end 34 of the main body 26, however any number of receivers 46 are hereby contemplated for use. That is, the receivers 46 include an opening having a first section 132, a second section 134 and a waist 136. In this arrangement, the first section 132 is larger than the second section 134 and is configured to receive the foot 124 of lock feature 44 therein with close and tight tolerances so as to allow insertion of foot 124 into receiver 46. Second section 134 is smaller than first section 132 and is large enough to receive post 122 therein but is smaller than foot 124 and as such foot 124 is retained by this portion of receiver 46 which prevents lateral pull-out of the foot 124. Waist 136 is narrower than both first section 132 and second section 134 and is configured to allow the passage of post 122 from one of the first section 132 and the second section 134 to the other of the first section 132 and the second section 134, but as the post 122 moves through waist 136 the waist 136 applies frictional force to the post 122 thereby requiring force to move the post 122 from one of the first section 132 and the second section 134 to the other of the first section 132 and the second section 134. In this way, the friction imparted upon post 122 by waist 136 helps to hold the two jig segments 24 in a locked position as additional force must be applied to unlock the two jig segments 24 once locked.

In this arrangement, the foot 124 of one jig segment 24 is configured to be inserted within the first section 132 of the receiver 46 of the other jig segment 24. Once the foot 124 is inserted within the first section 134, the two jig segments 24 are moved with respect to one another such that the foot 124 moves from the first section 132 to the second section 134. In the arrangement show, this movement is lateral or along the forward-to-back length of jig segments 24. In doing so, sufficient force must be applied when the waist 136 frictionally engages the post 122. Once sufficient force is applied and the post 122 passes waist 136, the foot 124 is held within second section 134 and as the opening of second section 134 is smaller than the foot 124, the jig segments 24 cannot be laterally pulled apart, and therefor they are locked together. To disassemble the two jig segments 24, the jig segments 24 are slid in an opposite direction and the opposite process is performed. In this way, the two jig segments 24 can be quickly and easily assembled and disassembled in side-to-side locking alignment.

Figure 17:
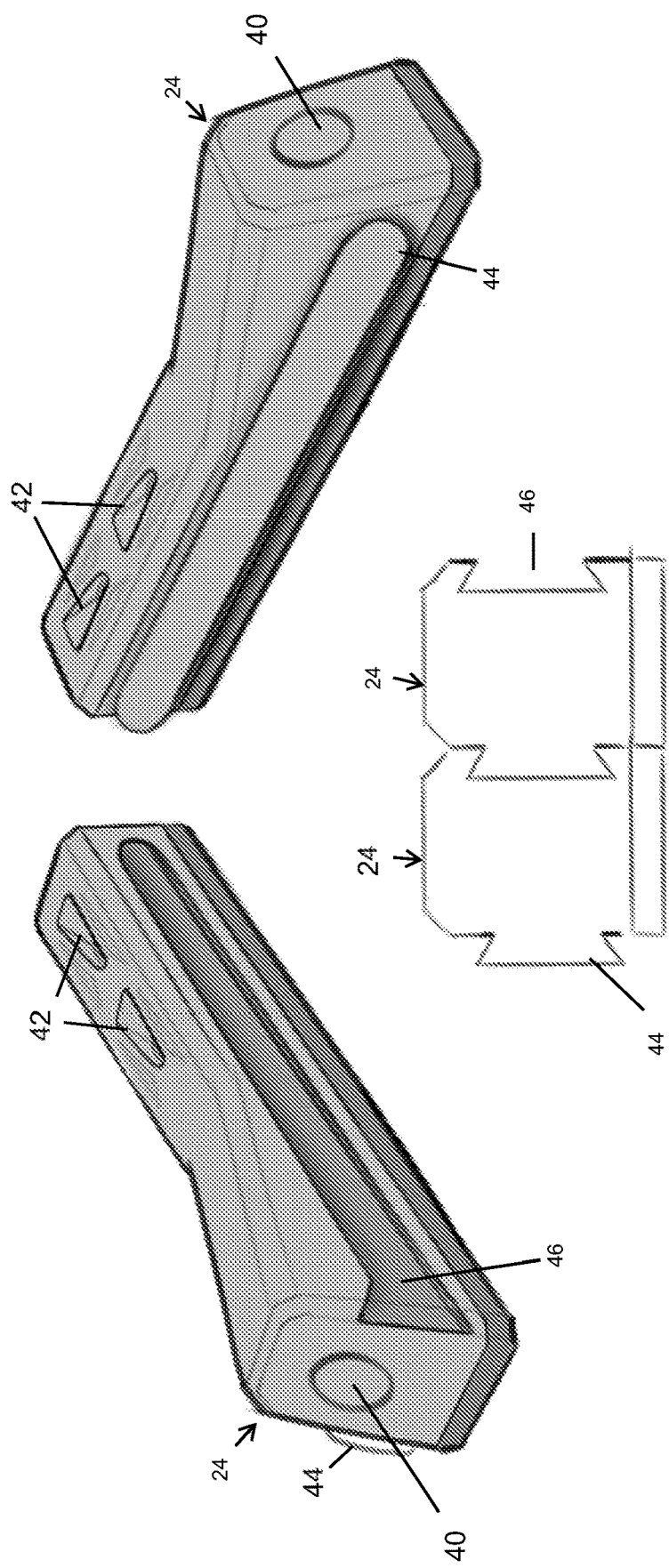
FIG. 17 is a perspective view of an artistic rendering of another embodiment of a mini pocket hole jig system, the view showing two jig segments having lock feature and receiver take the form of a dove-tail arrangement or locking rail and groove arrangement wherein the groove and rail extend a majority of the portion of the length of the jig segments wherein the two jig segments are connected to one another by sliding the lock feature of one jig segment into the groove of the other jig segment and sliding them until they are in a parallel aligned state.

In another arrangement, (as is shown in FIG. 17), the lock feature 44 and receiver 46 take the form of a dove-tail arrangement or other locking rail and groove arrangement. That is, in the arrangement shown, as one example, one side of jig segments 24 include lock feature 44 that extends outward from one side of the main body 26 a distance. In this arrangement, the outward portion of lock feature 44 is wider than the inward portion of lock feature 44. In one arrangement, as is shown, the outward face of lock feature 44 is generally planar in shape and extends in parallel spaced alignment to the plane formed by the side of main body 26 and the walls that connect to the outward planar face of the lock feature 44 extend at an angle inward as they extend toward main body 26 of jig segment 24. This is known as a dove tail feature. In this arrangement, the receiver 46 has a similar, but opposite, shape. That is, as is shown, the inner face of receiver 46 is generally planar in shape and extends in parallel spaced alignment to the plane formed by the side of main body 26 and the walls that connect to the inner planar face of the receiver extend at an angle. In this arrangement, the lock feature 44 and receiver 46 extend a length of the side of the main body 26 and the receiver opens to the forward end 32 of the main body 26. In this arrangement, two jig segments 24 are connected together by aligning the two jig segments 24 in side-to-side alignment, and inserting the forward end of the lock feature 44 of one jig segment 24 into the rearward end of the receiver 46 of the other jig segment 24. The jig segments 24 are then slid with respect to one another until the forward end of the lock feature 44 engages the forward end of the receiver 46 at which point the two jig segments 24 are fully assembled and aligned. This full insertion may be accompanied by a detent-engagement arrangement and/or a friction-fit-engagement arrangement that helps hold the two jig segments 24 together in locking engagement with one another at the point of full assembly. In this position, due to the lock feature 44 being wider at its outward side than at its inward side, the engagement of the lock feature 44 within the receiver 46 prevents the two jig segments 24 from being laterally pulled apart. While only a single dovetail feature lock feature 44 and only a single dovetail feature receiver 46 is presented in this arrangement it is hereby contemplated that multiple dovetail feature lock features 44 and multiple dovetail feature receivers 46 may be used in association with the connection of adjacent jig segments 24 and/or spacers 48. These multiple dovetail feature lock features 44 and multiple dovetail feature receivers 46 may be vertically stacked with respect to one another, such as one above the other. These multiple dovetail feature lock features 44 and multiple dovetail feature receivers 46 may be laterally aligned with respect to one another, such as one at the forward end and one at the rearward end. A combination of laterally stacked and laterally positioned dovetail features is also contemplated as well.

Any other arrangement of connecting two adjacent jig segments 24 and/or spacers 48 is hereby contemplated for use, as is any combination of manners or methods presented herein.

Grip Material: In one arrangement, jig segments 24 include a layer of grip material on the clamping surface 38 of jig segment 24 (as well as the clamping surface 62 of spacer 48). That is, in use the clamping surface 38 engages the surface of a workpiece 116. It is highly desirable that once the jig segment 24 is placed in position on the workpiece 116 and clamped in place that the jig segment 24 does not move during a drilling operation. If the jig segment 24 moves during a drilling operation this can ruin the pocket hole and/or the workpiece 116 as well as cause injury. As such, it is important that the jig segment 24 not move after clamping. However, the small size of system 10, which correlates with a small surface area of contact between system 10 and workpiece 116 makes it difficult to firmly hold the jig system 10 in place.

To provide maximum durability and strength and rigidity and ruggedness, the main body 26 of jig segment 24 is formed of a hard material such as a plastic material, composite material, a nylon material, a fiber glass material or any other non-metallic material, or combination thereof. Alternatively, a metallic material is used which has superb hardness, but a low coefficient of friction. Alternatively, a combination or metallic material and non-metallic material is used. While hard materials are good for durability, strength, rigidity and ruggedness, hard materials tend to have a low coefficient of friction. That is, hard materials tend to slide easily when placed on a surface or other object. The easier the jig segment 24 slides when placed on workpiece 116, the more pressure must be applied to keep the jig segment 24 in place during drilling. To correct this problem, a layer of grip material is placed on the clamping surface 38. This grip material has a higher coefficient of friction than the material that forms the main body 26. Coefficient of friction describes the ratio of the force of friction between two bodies and the force pressing them together. The higher the coefficient of friction, the more force is required to cause the two bodies to slide with respect to one another. One drawback to using a material that has a high coefficient of friction, such as a compressible rubber or composite material, is that the higher the coefficient of friction the less-durable the material tends to be. As such, by forming the main body 26 of a harder material that is strong and durable (but has a lower coefficient of friction) and placing a grip material on the clamping surface 38 that has a higher coefficient of friction is the best of both worlds in that this provides a jig segment 24 that is hard and durable while also having a high coefficient of friction. By adding the grip layer on the clamping surface 38 this allows a user to apply less clamping pressure with less risk of the jig segment 24 moving. Or, said another way, the user may apply the same clamping pressure to jig segment 24 while producing a greater level of grip. This allows the use of conventional bar clamps, which apply less pressure than face clamps, and are more-commonly owned by do-it-yourselfers than face clamps.

Figure 2:
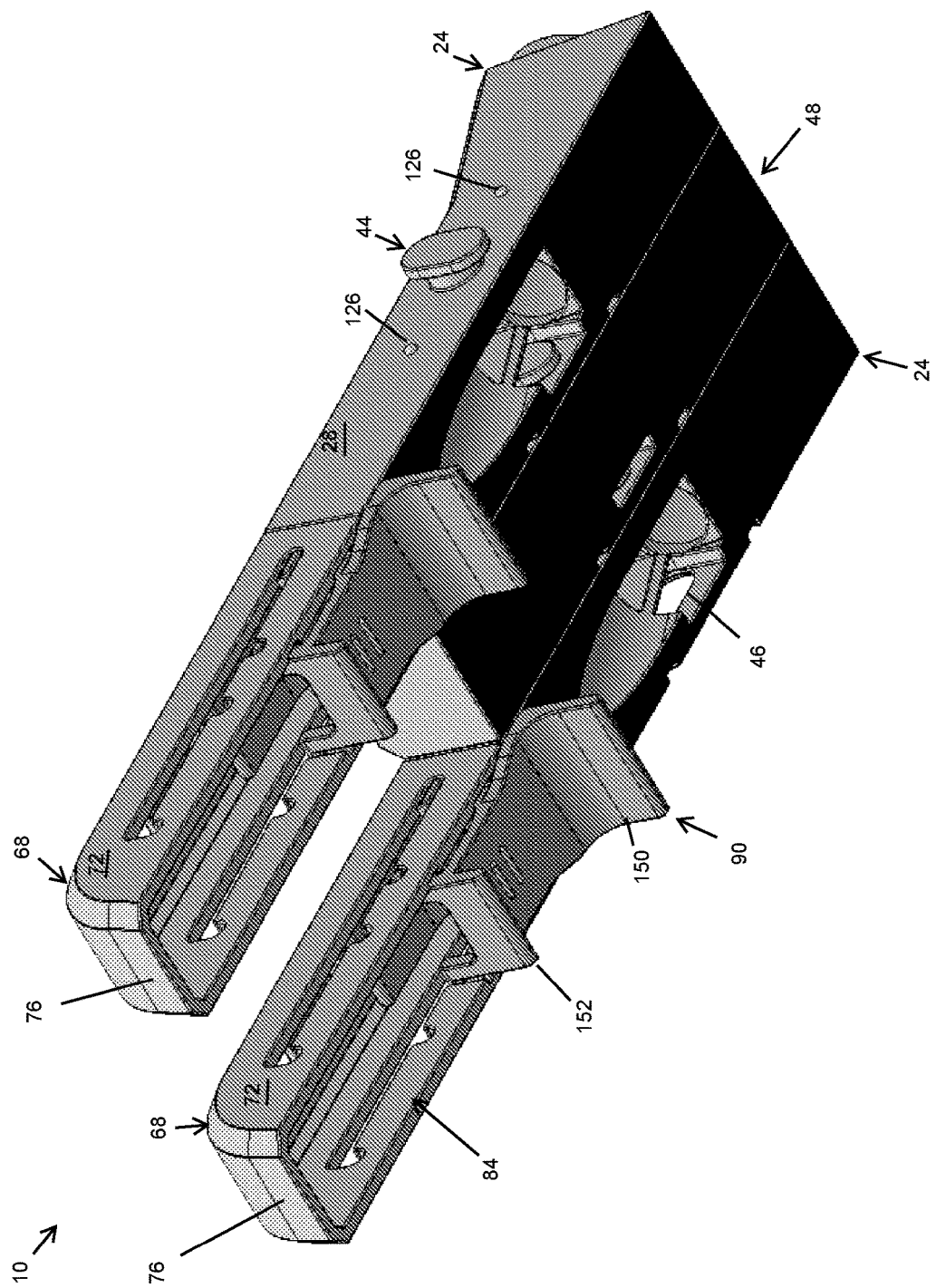
FIG. 2 is a bottom front perspective view of the mini pocket hole jig system shown in FIG. 1, the view showing a flat bottom planar surface that extends across the aligned jig segments as well as the middle-positioned spacer, the view showing the flat bottom planar surface having a layer of grippy material with a high coefficient of friction, the view showing bore formed by the drill guide extending through the bottom surface of the jig segments at an angle, the view showing the stop feature positioned within the hollow interior of the tail section.
Figure 3:
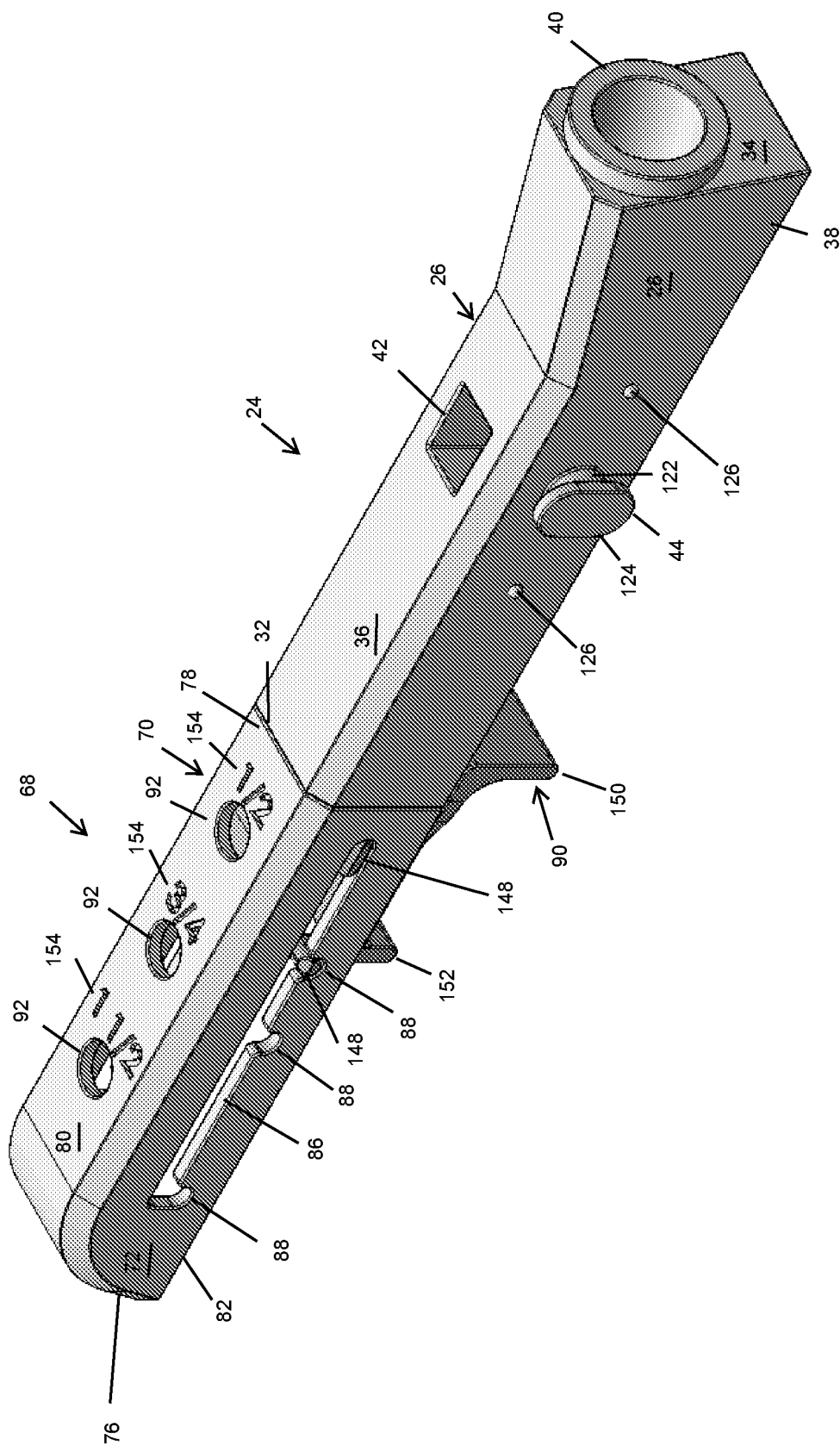
FIG. 3 is a top rear perspective view of a single jig segment and tail section of the mini pocket hole jig system shown in FIG. 1, the view showing a jig segment with a tail section connected to the forward end of the jig segment.
Figure 6:
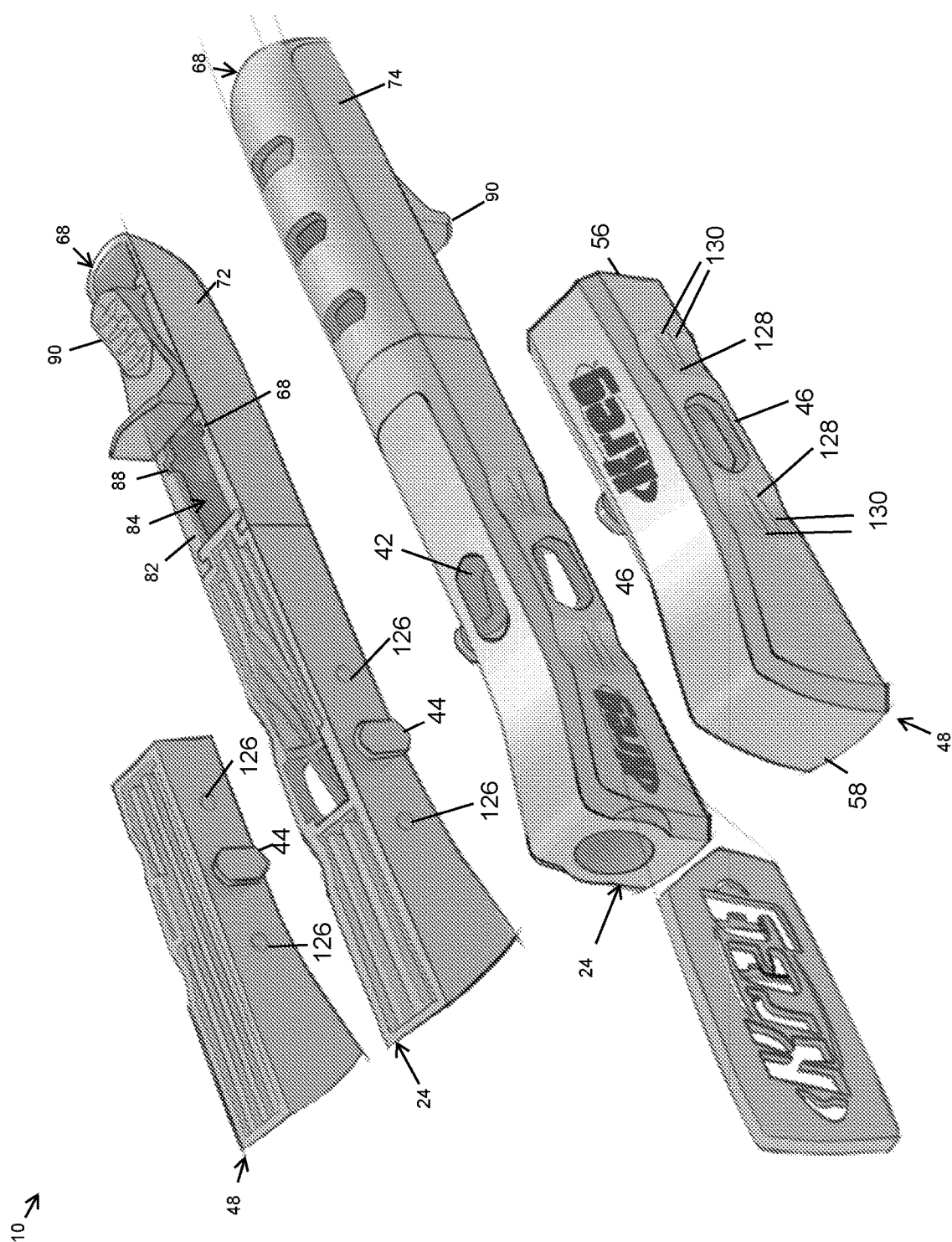
FIG. 6 is a perspective view of artistic renderings of another embodiment of a mini pocket hole jig system that is similar to that shown in FIGS. 1-4, and FIG. 5, the view showing two jig segments with tail sections attached and an exploded spacer, the view showing one jig segment and spacer upright and the other jig segment and spacer upside down, the view showing the bottom surface of the spacer and jig segment having strips of grippy material thereon.
Figure 7:
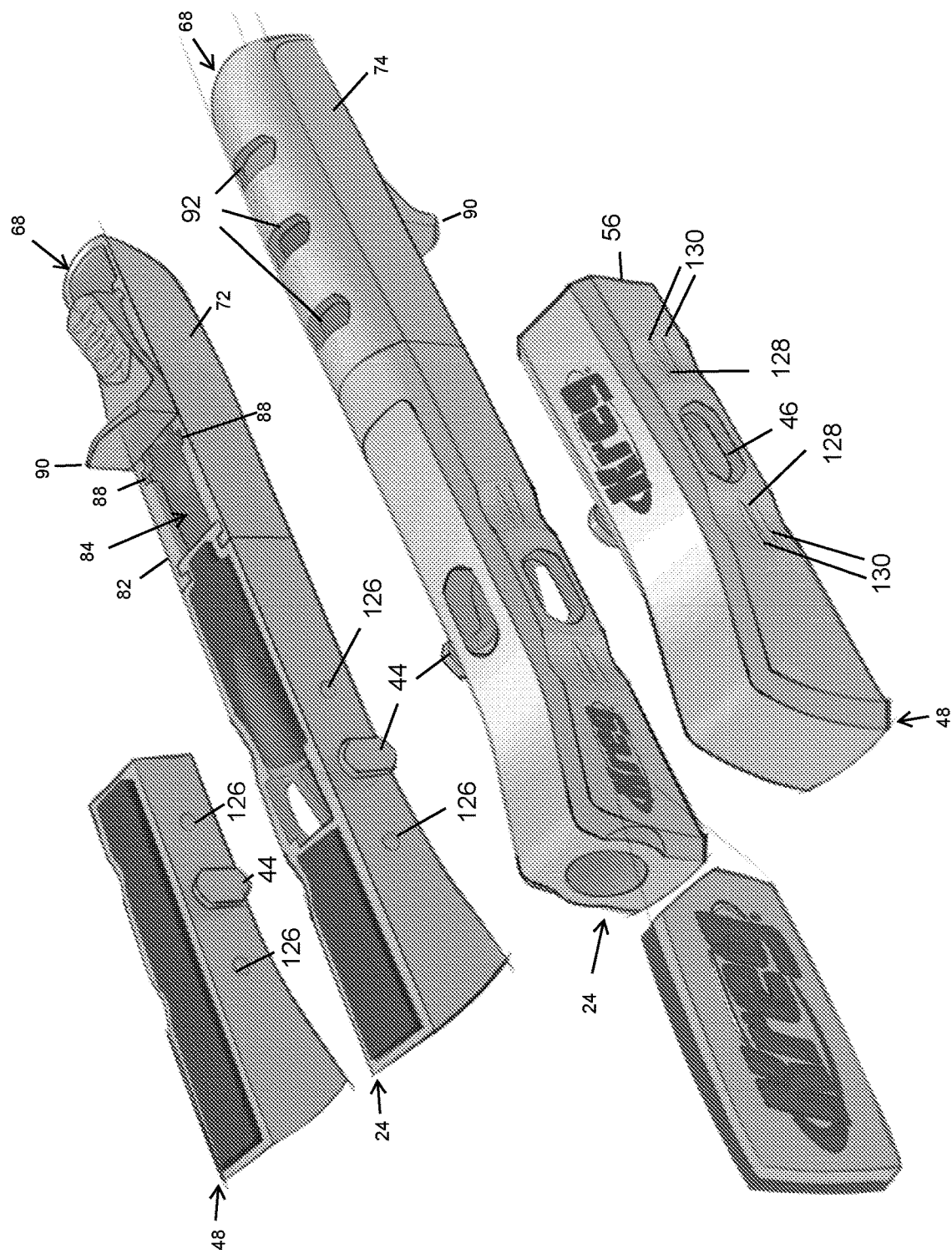
FIG. 7 is a perspective view of artistic renderings of another embodiment of a mini pocket hole jig system that is similar to that shown in FIGS. 1-5, and FIG. 5, and FIG. 6, the view showing two jig segments with tail sections attached and an exploded spacer, the view showing one jig segment and spacer upright and the other jig segment and spacer upside down.
Figure 8:
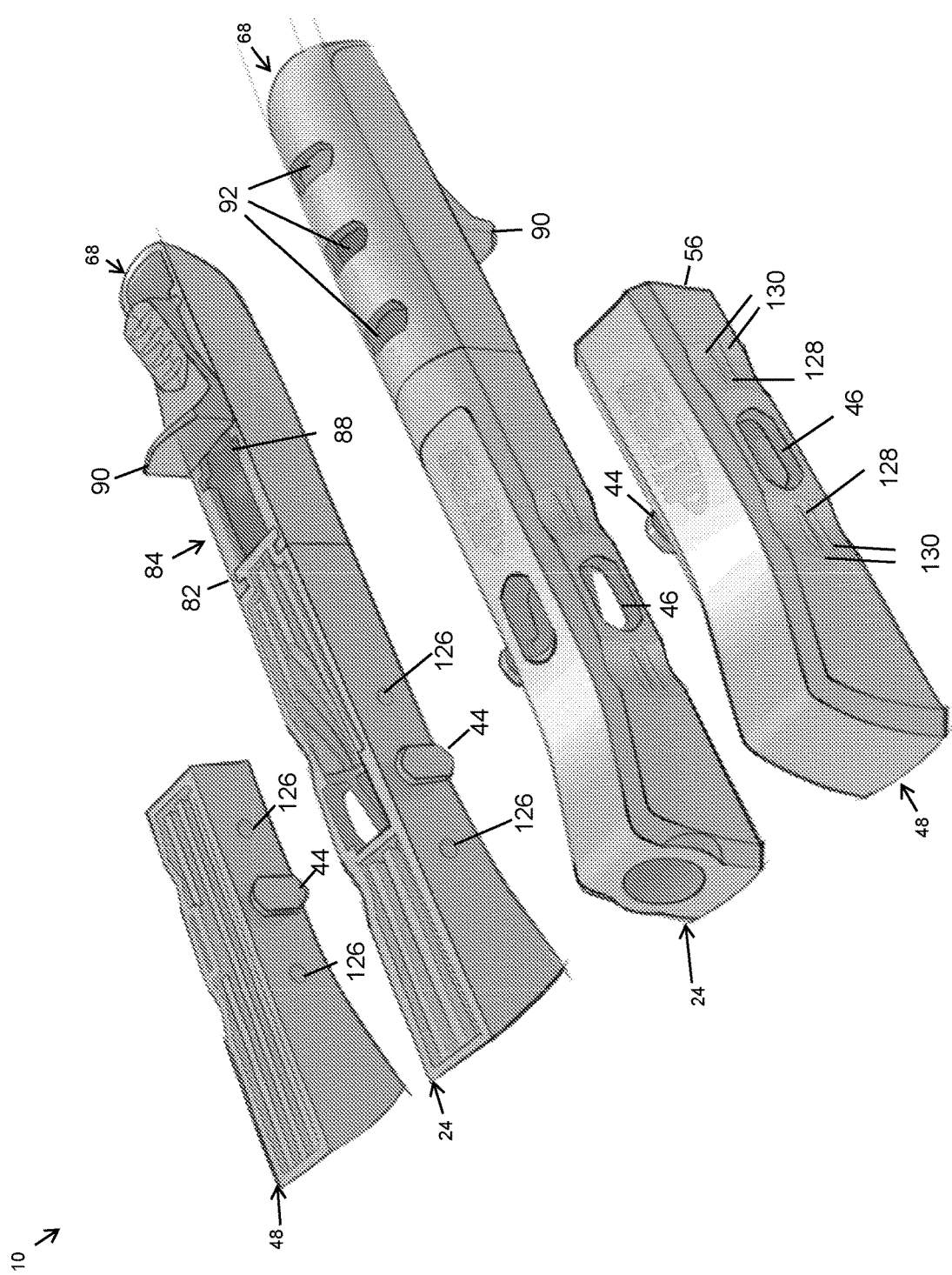
FIG. 8 is a perspective view of artistic renderings of another embodiment of a mini pocket hole jig system that is similar to that shown in FIGS. 1-5, and FIG. 5, and FIG. 6, and FIG. 7, the view showing two jig segments with tail sections attached and an exploded spacer, the view showing one jig segment and spacer upright and the other jig segment and spacer upside down.
Figure 9:
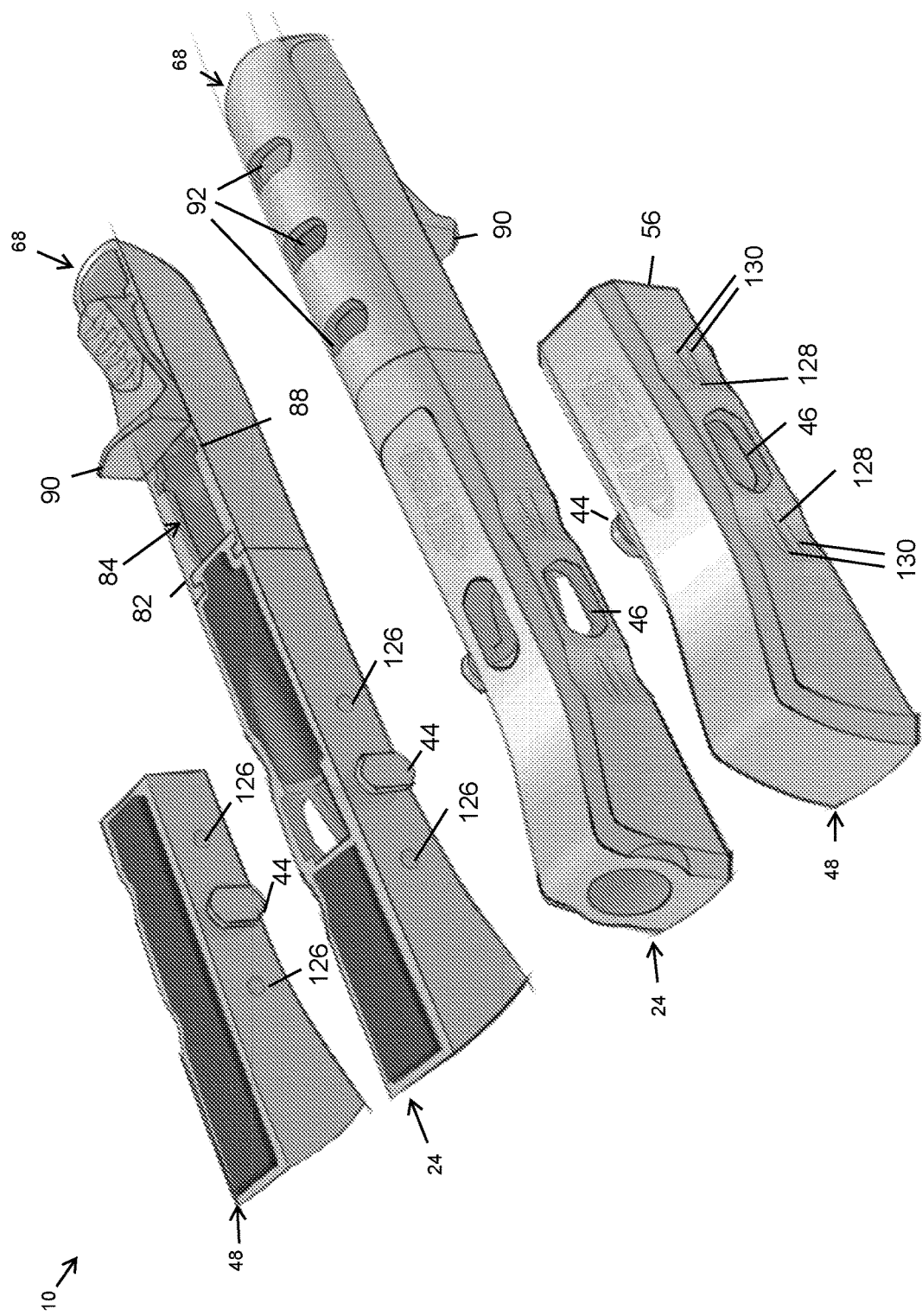
FIG. 9 is a perspective view of artistic renderings of another embodiment of a mini pocket hole jig system that is similar to that shown in FIGS. 1-5, and FIG. 5, and FIG. 6, and FIG. 7 and FIG. 8, the view showing two jig segments with tail sections attached and an exploded spacer, the view showing one jig segment and spacer upright and the other jig segment and spacer upside down.
Figure 10:
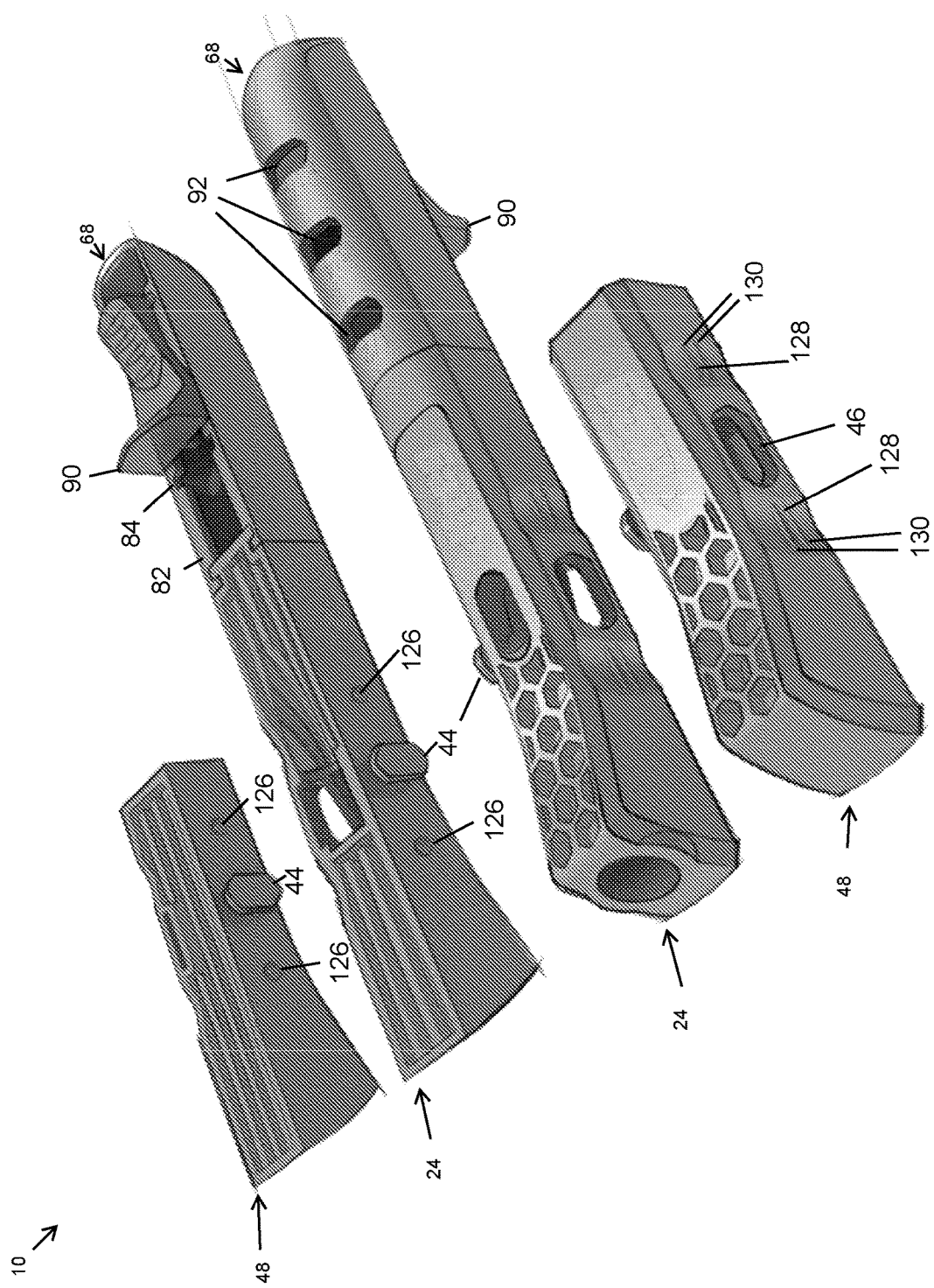
FIG. 10 is a perspective view of artistic renderings of another embodiment of a mini pocket hole jig system that is similar to that shown in FIGS. 1-5, and FIG. 5, and FIG. 6, and FIG. 7 and FIG. 8, and FIG. 9, the view showing two jig segments with tail sections attached and an exploded spacer, the view showing one jig segment and spacer upright and the other jig segment and spacer upside down, the view showing the upper surface of the spacer and jig segment having a small-pattern honeycomb structure for support and rigidity as well as material and weight savings.

Grip material may be attached to main body 26 any manner, method or means. In one arrangement, grip material is adhered to the clamping surface 38 of main body 26. In another arrangement, grip material is molded into or onto the clamping surface 38 of main body 26 in a dual-molding or dual durometer molding manner. Grip material may be sprayed onto or deposited onto the clamping surface. Grip material may be added to main body 26 by any other manner, method or means. This grip material may cover all of the clamping surface 38 of the jig segment 24, as is shown in FIG. 2. This grip material may cover all but the exterior peripheral edge of the clamping surface 24, as is shown in FIG. 5. This grip material may cover strips of the clamping surface 38, as is shown in FIG. 6. This grip material may be flush with the bottom surface of jig segment 24. Alternatively, this grip material may protrude below the bottom surface of jig segment 24 to ensure first contact with workpiece 116 before compression by a clamp 120. Any other arrangement is hereby contemplated for use.

Connector: The forward end 32 of main body 26 includes a connector 138. Connector 138 is formed of any suitable size, shape and design and is configured to facilitate the connection of tail section 68 to main body 26. In the arrangement shown, as one example, connector 138 is formed of a protrusion that extends forward from the forward end 32 of main body 26 a distance and is slightly smaller than the periphery of main body 26. In the arrangement shown, as one example, wherein the forward end 32 of main body 26 is square in shape, connector 138 is similarly square shaped. In this arrangement, connector 138 is slightly smaller in size and shape and extends perpendicularly out of the plane of forward end 32 and terminates in a flat planer face at its forward end that extends in approximate parallel spaced alignment to the plane formed by the forward end 32 of main body 26. In this arrangement, as one example, a groove 140 is positioned along the sides of connector 138 that extends from the top side of connector 138 to the bottom side of connector 138. Groove 140 may also be present in the top side of the connector 138 and extend across the width of connector 138 from side-to-side. Connector 138 and its grooves 140 are configured to receive the rearward end of tail section 68 thereon. In this way, the presence of groove 140 in connector 138 forms a flange or lip at the forward end 32 of jig segment 24 that is received and/or held onto by the rearward end of tail section 68.

Spacer: Spacers 48 are formed of any suitable size, shape and design and are configured to connect between two jig segments 24 so as to position adjacent jig segments at desired spacing from one another to form a pocket hole jig 10 comprised of multiple jig segments 24 at various spacing. As spacers 48 are configured to connect to jig segments 24, in one arrangement spacers 48 are largely formed in the same size, shape and configuration as jig segments 24 without drill guide 40 and without the attachment of a tail section 68 thereto. As such, unless stated specifically otherwise, the disclosure provided herein with respect to the size, shape and configuration of segments 24 is hereby repeated for spacers 48, except for the connection of tail sections 68 and the use of drill guides 40.

That is, the arrangement shown, as one example, spacer 48 includes a main body 50. Main body 50 is formed of any suitable size, shape and design and is configured to be the main structural member of spacer 48. Main body 50 may be formed of a single monolithic and unitary piece that is formed by molding, machining, 3D printing or the like, or main body 50 may be formed of multiple pieces that are joined together either in a removable manner such as by screwing, bolting, friction fitting, snap fitting or the like or joined in a permanent manner such as by gluing, adhering, welding or the like. In one arrangement, main body 50 is formed of a plastic material, composite, nylon, fiber glass or other non-metallic material, or combination thereof. Alternatively, a metallic material is used which has superb hardness, but a low coefficient of friction. Alternatively, a combination or metallic material and non-metallic material is used.

In the arrangement shown, as one example, main body 50 includes a left side 52, a right side 54, a forward end 56, a rearward end 58, a top side 60 and a bottom side or clamping surface 62. In the arrangement shown, as one example, left side 52 and right side 54 are generally flat and planar in shape and extend in a generally parallel planar relationship to one another. Left side 52 and right side 54 connect at their forward end to the outside edges of forward end 56. Left side 52 and right side 54 connect at their rearward end to the outside edges of rearward end 58. Left side 52 and right side 54 connect at their upper end to the outside edges of top side 60. Left side 52 and right side 54 connect at their lower end to the outside edges of clamping surface 62. The planes of left side 52 and right side 54 extend in approximate perpendicular planar alignment to the planes formed by forward end 56 and rearward end 58. The planes of left side 52 and right side 54 extend in approximate perpendicular planar alignment to the planes formed by top side 60 and clamping surface 62.

In the arrangement shown, as one example, forward end 56 and rearward end 58 are generally flat and planar in shape and extend in a generally parallel planar relationship to one another. Forward end 56 and rearward end 58 connect at their upper and lower ends to the top side 60 and clamping surface 62. Forward end 56 and rearward end 58 connect at their sides to left side 52 and right side 54. The planes of forward end 56 and rearward end 58 extend in approximate perpendicular planar alignment to the planes formed by top side 60 and clamping surface 62. The planes of forward end 56 and rearward end 58 extend in approximate perpendicular planar alignment to the planes formed by left side 52 and right side 54.

In the arrangement shown, as one example, top side 60 and clamping surface 62 are generally flat and planar in shape and extend in a generally parallel planar relationship to one another. Top side 60 and clamping surface 62 connect at their forward end to the upper and lower edges of forward end 56. Top side 60 and clamping surface 62 connect at their rearward end to the upper and lower edges of rearward end 58. Top side 60 and clamping surface 62 connect at their outside edges to left side 52 and right side 54. The planes of top side 60 and clamping surface 62 extend in approximate perpendicular planar alignment to the planes formed by forward end 56 and rearward end 58. The planes of top side 60 and clamping surface 62 extend in approximate perpendicular planar alignment to the planes formed by left side 52 and right side 54. Clamping surface 62 is generally flat and planar so as to engage and lay flat on the surface of a workpiece 116. Top side 60 extends in approximate parallel planar relationship to clamping surface 62 so as to provide a flat surface that receives the pad 118 of a clamp 120 that clamps the spacer 68 to a workpiece 116.

In this way, main body 50 is formed of a generally elongated square or rectangular shaped member. In one arrangement, the rearward end 58 of main body 50 of spacer 48 tilts slightly forward as it extends from clamping surface 62 to top side 60, so as to mimic the size and shape of the main body 26 of jig segments 24. Similarly, in one arrangement, the rearward end of the top side 60 extends upward, similar to the rearward end of the top side 36 of jig segments 24, so as to mimic the size and shape of the main body 26 of jig segments 24. In an alternative arrangement, the upward extension at rearward end of top side is not present as this upward extension is not needed as there is no drill guide 40 in spacer 48. Alternatively, in other arrangements, a drill guide 40 is present in spacer 48 but no tail section 68 is connected to spacer 48. In an alternative arrangement a tail section 68 is connected to spacer 48.

Lock Feature & Receiver: In the arrangement shown, main body 50 of spacers 48 includes a lock feature 44 and a receiver 56. Lock feature 44 and receiver 46 are formed of any suitable size, shape and design and are configured to facilitate connection to the lock feature 44 and receiver 46 of jig segments 24. In this way, a pocket hole jig system 10 may be formed of a pair of jig segments 24 connected together in side-to-side alignment with one or more spacers 48 positioned between the jig segments 24.

As the lock features 44 and receivers 46 of spacers 48 and jig segments 24 are configured to connect together to one another in a mating arrangement, the lock features 44 and receivers 46 of spacers 48 and jig segments 24 are similar if not identical to one another. As such, the disclosure provided herein with respect to the lock features 44 and receivers 46 of jig segments 24 is hereby repeated for spacers 48. As such, spacers 48 connect in side-to-side alignment to with jig segments 24 in the same way described herein with respect to connecting jig segments 24 in side-to-side alignment. To facilitate various spacing of jig segments 24, spacers 48 may be formed of any width, from narrow to wide. Narrow spacers 48 may be as narrow as ¼ of an inch, or ⅓ of an inch or ½ of an inch, or any other width. Wide spacers 48 may be as wide as an inch or more.

Spacer-To-Spacer Connection: To be clear, in some applications it may be desirable to connect two or more spacers 48 to one another in side-to-side alignment to as to set the optimum spacing between adjacent jig segments 24. As the sides of jig segments 24 and spacers 48 are essentially identical, any number of jig segments 24 and spacers 48 may be connected in side-to-side alignment in any arrangement. As one example, in the arrangement, wherein a 2×6 board is being used and the jig segments 24 and spacers 48 are one inch wide, it may be desirable to have a pair of jig segments 24 connected to a pair of spacers 48 positioned between the jig segments 24. This arrangement results in jig 10 that is four inches wide in overall width that positions the center of two pocket holes three inches apart (which, if centered on the 2×6—which is only 5.5 inches wide—places the center of each pocket hole 1.25 inches inward from the outward edges of the 2×6) which may provide optimum results. Any number of spacers 48, of any width, may be connected in side-to-side alignment to attain the optimum spacing between jig segments 24.

Tail Section: Tail sections 68 are formed of any suitable size, shape and design and are configured to connect to the forward end 32 of jig segments 24 and/or spacers 48 and serve to facilitate the placement of the jig segment 24 at the desired distance from the edge of a workpiece 116. In the arrangement shown, as one example, tail section 68 includes a main body 70. Main body 70 is formed of any suitable size, shape and design and is configured to be the main structural member of tail section 68. Main body 70 may be formed of a single monolithic and unitary piece that is formed by molding, machining, 3D printing or the like, or main body 50 may be formed of multiple pieces that are joined together either in a removable manner such as by screwing, bolting, friction fitting, snap fitting or the like or joined in a permanent manner such as by gluing, adhering, welding or the like. In one arrangement, main body 70 is formed of a plastic material, composite, nylon, fiber glass or other non-metallic material, or combination thereof. Alternatively, a metallic material is used which has superb hardness, but a low coefficient of friction. Alternatively, a combination or metallic material and non-metallic material is used.

In the arrangement shown, as one example, main body 70 includes a left side 72, a right side 74, a forward end 76, a rearward end 78, a top side 80 and a bottom side or clamping surface 82. In the arrangement shown, as one example, left side 72 and right side 74 are generally flat and planar in shape and extend in a generally parallel planar relationship to one another. Left side 72 and right side 74 connect at their forward end to the outside edges of forward end 76. Left side 72 and right side 74 connect at their rearward end to the outside edges of rearward end 78. Left side 72 and right side 74 connect at their upper end to the outside edges of top side 80. Left side 72 and right side 74 connect at their lower end to the outside edges of clamping surface 82. The planes of left side 72 and right side 74 extend in approximate perpendicular planar alignment to the planes formed by forward end 76 and rearward end 78. The planes of left side 72 and right side 74 extend in approximate perpendicular planar alignment to the planes formed by top side 80 and clamping surface 82.

In the arrangement shown, as one example, forward end 76 and rearward end 78 are generally flat and planar in shape and extend in a generally parallel planar relationship to one another. Forward end 76 and rearward end 78 connect at their upper and lower ends to the top side 80 and clamping surface 82, respectively. Forward end 76 and rearward end 78 connect at their sides to left side 72 and right side 74, respectively. The planes of forward end 76 and rearward end 78 extend in approximate perpendicular planar alignment to the planes formed by top side 80 and clamping surface 82. The planes of forward end 76 and rearward end 78 extend in approximate perpendicular planar alignment to the planes formed by left side 72 and right side 74.

In the arrangement shown, as one example, top side 80 and clamping surface 82 are generally flat and planar in shape and extend in a generally parallel planar relationship to one another. Top side 80 and clamping surface 82 connect at their forward end to the upper and lower edges of forward end 76, respectively. Top side 80 and clamping surface 82 connect at their rearward end to the upper and lower edges of rearward end 78, respectively. Top side 80 and clamping surface 82 connect at their outside edges to left side 72 and right side 74, respectively. The planes of top side 80 and clamping surface 82 extend in approximate perpendicular planar alignment to the planes formed by forward end 76 and rearward end 78. The planes of top side 80 and clamping surface 82 extend in approximate perpendicular planar alignment to the planes formed by left side 72 and right side 74. Clamping surface 82 is generally flat and planar so as to engage and lay flat on the surface of a workpiece 116. Top side 80 extends in approximate parallel planar relationship to clamping surface 82 so as to provide a flat surface that receives the pad 118 of a clamp 120 that clamps the tail section 68 to a workpiece 116, however in some arrangements it may be more desirable to clamp on top of the main body 26 of jig segments 24 and the main body 50 of spacer 48.

Tail section 68 is configured to connect in a removable manner to the forward end 32 of main body 26 of jig segments 24. By tail section 68 being removable allows the jig segments 24 to be used on inside corners when the tail section 68 is removed, and also allows the jig segments 24 to be used on the edge of workpieces 116 when the tail section 68 is in place. Tail section 68 is configured to be quickly and easily and in a secure manner connected to the forward end 32 of main body 26 of jig segment 24 by sliding over the connector 138 and connecting to connector 138 in frictional locking engagement. In one arrangement, as one example, to facilitate this connection, the rearward end 78 of tail section 68 includes an opening 142 that is configured to fit over and engage and receive connector 138 in locking frictional engagement. In one arrangement, as is shown, opening 142, when viewed from the rearward side of tail section 68 is generally square in shape and has a size and shape that is configured to receive the connector 138 therein. In this arrangement, the lower end of opening 142 is open at its bottom side such that the tail section 68 may slide over the connector 138 of main body 26. In the arrangement shown, to facilitate locking engagement, the opening 142 includes a flange 144 that extends inward along the sides of opening 142 and is configured to be received within the groove 140 of connector 138. In the arrangement, where connector 138 includes a groove 140 along its top surface, a flange 144 is positioned along the top side of the opening 142 that is configured fit within this portion of the groove 140. In one arrangement, as is shown in FIG. 4, small protrusions 146 are positioned at the lower end of flange 144 and extend inward a distance. The purpose of these protrusions 146 are configured to provide an increased amount of resistance upon insertion of connector 138 into opening 142 as well as to help hold the tail section 68 onto the connector 138 when in place. That is, when tail section 68 is fully installed over the connector 138, these protrusions 146 fit around the lower end of connector 138 with frictional and locking engagement thereby helping to hold tail section 68 onto jig segment 24.

To attach tail section 68 to main body 26 of jig segment 14, the tail section 68 is positioned above the jig segment 14 and the opening 142 of tail section 68 is aligned with the connector 138 of jig segment 14. In doing so, the plane of the rearward end 78 of tail section 68 is aligned with the plane of the forward end 32 of jig segment 14. In this position, the flange 144 of opening 142 is aligned with the groove 140 of connector 138. Once aligned, the jig segment 24 and tail section 68 are moved toward one another until the protrusions 146 positioned at the lower end of flange 144 engage the connector 138. As force is applied that overcomes the frictional engagement between protrusions 146 and connector 138, the tail section 68 slightly deforms to allow connector 138 to fit within opening 142. As the tail section 68 slides downward on jig segment 24, the flange 144 of opening 142 fits within the groove 140 of connector 138. This continues until the top of opening 142 engages the top of connector 138 and at this fully assembled position, the protrusions 146 at the lower end of flange 144 move past the lower end of connector 138 and move inward toward one another around the lower end of connector 138 thereby holding the tail section 68 onto the connector 138. In this position, the flange 144 of opening 142 is seated within the groove 140 of connector 138 and the rearward end 78 of tail section 68 is in planar engagement and alignment with the forward end 32 of jig segment 24. In this way, the connector 138 of jig segment 24 and opening 142 of tail section 68 cooperate to quickly, easily and in a secure manner connect jig segment 24 and tail section 68.

To remove tail section 68 from jig segment 24, tail section 68 is moved upward with respect to jig segment 24. Sufficient force is applied to cause the protrusions 146 in the lower end of flange 144 to move around connector 138. Once sufficient force is applied to cause the protrusions 146 in the lower end of flange 144 to move around connector 138, the tail section 68 is slid upward until the two components are free of one another.

Stop Feature: Tail section 68 includes a stop feature 90. Stop feature 90 is formed of any suitable size, shape and design and is configured to facilitate the placement of the jig segment 24 at the desired distance from an edge of a workpiece 116 based on the thickness of the workpiece 116. In one arrangement, as is shown, stop feature 90 fits within the hollow interior 84 of tail section 68 and slides a distance between the forward end 76 of main body 70 and the rearward end 78 of main body 70. To facilitate this sliding engagement, stop feature 90 is spring biased and includes at least one arm 148 on each side of the stop feature 90 that fits within a slot 86 in tail section 68 that extends a distance between the forward end 76 of main body 70 and the rearward end 78 of main body 70. In one arrangement, as is shown, stop feature 90 includes an arm 148 positioned at the forward end of the stop feature 90 and an arm 148 positioned at the rearward end of the stop feature 90, both of which are received within slot 86. The use of two arms 148 help to provide stability and alignment to stop feature 90 relative to tail section 68. In addition, the use of two arms 148 helps to lock both sides of stop feature 90 in place when they are received within stops 88 thereby ensuring the stop feature 90 remains in place when set. This slot 86 includes a plurality of stops 88 therein that are configured to receive the forward positioned arms 148 when the stop feature 90 is positioned at various common thicknesses of workpieces 116. In one arrangement, these stops 90 are positioned at ½ inch, ¾ inch and 1½ inch positions, however any other common thickness is hereby contemplated for use.

In one arrangement, as is shown, stop feature 90, when viewed from the side, is generally formed in a U-shape, with an upper section that rides along the interior surface of the top side 80 of tail section, a lower section that rides along the interior surface of clamping surface 82, and a center section that connects the upper section and lower section of stop feature 90. In one arrangement, this U-shaped stop feature 90 is spring biased outward. Or, said another way, when the stop feature 90 is positioned within the hollow interior 84 of tail section 68 the upper section and lower section have an outward force. This outward force forces the arms 148 positioned at the forward end of stop feature 90 into the stops 88 positioned in the lower surface of slot 86. It is this spring bias that maintains the stop feature 90 at its desired position when the rearward arms 148 are received within a set of stops 88 in slot 86.

A rearward flange 150 extends downward from stop feature 90 adjacent its rearward end. Rearward flange 150 is configured to provide a stop surface on its rearward side that engages an edge of a workpiece 116. As such, in one arrangement, rearward flange 150 extends generally perpendicularly below the clamping surface or lower surface of tail section 68 a distance so as to provide a flat surface upon which to engage an edge of the workpiece 116. A forward flange 152 extends downward from stop feature 90 adjacent its rearward end. Forward flange 152 is configured to provide a grip surface for a user to adjust the position of the stop feature 90 within the tail section 68. Forward flange 152 is positioned below forward positioned arms 148 and allows the user to easily push up on or adjacent the forward flange 152 thereby moving the forward positioned arms 148 out of the stops 88 of slot 86 thereby allowing the stop feature 90 to be slid along slot 86 within tail section 68. As the forward flange 152 is pushed upward, the spring bias of stop feature 90 is overcome thereby allowing the forward arms 148 to be moved upward and out of stops 88 in slot 86 thereby allowing adjustment of the position of stop feature 90.

Tail section 68 includes a plurality of openings 92 in the top side 80 of main body 70 that provides visibility to the position of the stop feature 90 within the tail section 68. That is, when the stop feature 90 is visible through one of the openings 92 in tail section 68 that is the thickness of the workpiece 116 that the stop feature 90 is set for. In one arrangement, as is shown, these openings 92 are circular in shape, however any other shape is hereby contemplated for use such as oval, rectangular, triangular, square or any other shape. Also, in one arrangement, as is shown, indicia 154 is positioned adjacent each opening 92. Indicia 154 indicates the thickness of the workpiece 116 that the stop feature 90 is set for when the stop feature 90 is visible through that particular opening 92. Indicia 154 may be writing or printing on the tail section 68, etching into the material of tail section 68, raised lettering or any other form of indicia or marking.

In this way, tail section 68 is easily attached to and removed from jig segments 24 and the stop feature 90 is easily adjusted for varying thicknesses of workpieces 116 and the setting is easily visible through openings 92.

Alternative Arrangement—Slots & Stop Feature:

In FIGS. 1-5, tail section 68 includes a slot 86 that extends a forward to back length of tail section 68 and is positioned in the sides 72, 74 of tail section 68. This slot 86 receives the arms 148 of stop feature 90 and facilitates guidance of the stop feature 90 as it moves within tail section 68. This slot 86 also facilitates locking the stop feature 90 in place at predetermined positions through engagement of arms 148 into stops 88. While this arrangement is effective, due to the intended use of the jig system 10, the jig system 10 is clamped onto a workpiece 116, a slot 86 that extends a length of the tail section 68 has a tendency to weaken the sides 72, 74 of tail section 68 which can cause collapse or crushing of the tail section 68 if the tail section 68 is clamped with too much pressure.

To avoid crushing of the tail section 68, and to strengthen the sides 72, 74 of the tail section 68, in an alternative arrangement, with reference to FIGS. 6-10, tail section 68 has solid sides 72, 74. In this arrangement, stop feature 90 fits within the hollow interior 84 and arms 148 fit within stops 88 positioned in the outward edges of the bottom side 81 of tail section 68. In this arrangement, the wall of the bottom side 82 extends inward slightly a distance and partially closes the lower end of the hollow interior 84 of tail section 68 and includes stops 88 therein, which, in one arrangement, as is shown, are recesses or notches or the like. This configuration and arrangement provides the ability to position stop feature 90 at the desired workpiece thickness settings, while also not weakening the strength of sides 72, 74 of tail section 68. Any other configuration of tail section 68 and/or sides 72, 74 is hereby contemplated for use.

Workpiece Thickness Gauge: In one arrangement, system 10 includes a workpiece thickness gauge 94. Workpiece thickness gauge 94 is formed of any suitable size, shape and design and is configured to facilitate quick and easy and confident measuring of the thickness of workpiece 116 so as to facilitate proper setting of the stop feature 90 of the tail section 68 and the stop collar 110 on the stepped drill bit 102. In the arrangement shown, as one example, workpiece thickness gauge 94 includes a main body 96 that includes a plurality of steps 156 therein. Each step 156 is configured to be associated with a common workpiece thickness, such that when a workpiece 116 fits within a step 156 the workpiece thickness gauge 94 provides a measurement of its thickness. In one arrangement, as is shown, the workpiece thickness gauge 94 includes indicia 98 associated with each step 156. This indicia 156 indicates the thickness of the workpiece 116. The user can then take this measurement and set the position of stop feature 90 of tail section 68 to the appropriate corresponding position. These distances or measurements or steps 156 also correlate to common screw lengths, as such, each step 156 has an assigned screw length. In this way, the use of the workpiece thickness gauge 94 takes a lot of the guesswork out of the where to position the stop feature 90 and the stop collar 110 of the stepped drill bit 102 when drilling pocket holes using system 10.

In one arrangement, workpiece thickness gauge 94 is a standalone component. In another arrangement, the main body 96 of workpiece thickness gauge 94 is operatively connected to, molded onto, formed as a single piece with, formed as part of, or formed around an Allen wrench 100 which is used to adjust the position of the stop collar 110 of the stepped drill bit 102 by facilitating tightening and loosening of the fastener 114 of the stop collar 110. In this way, the combination of the workpiece thickness gauge 94 with Allen wrench 100 improves efficiencies by combining two needed tools to use the system 10 into a single tool or component thereby reducing the number of parts or pieces of the system 10.

Figure 25:
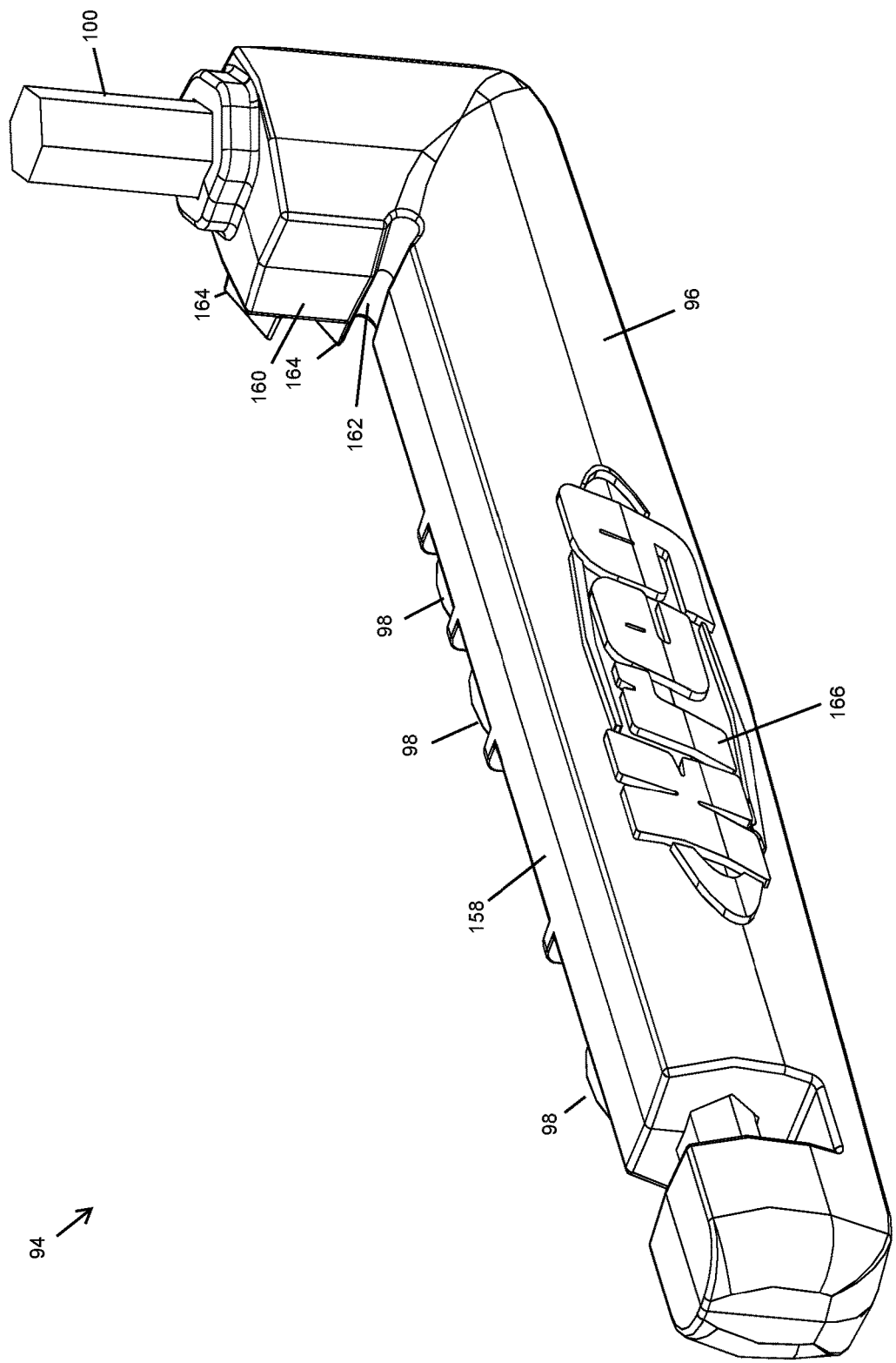
FIG. 25 is a perspective view of another embodiment of a workpiece thickness gauge having a an embedded Allen wrench and a plurality of indicia that correspond to various workpiece thicknesses.
Figure 26:
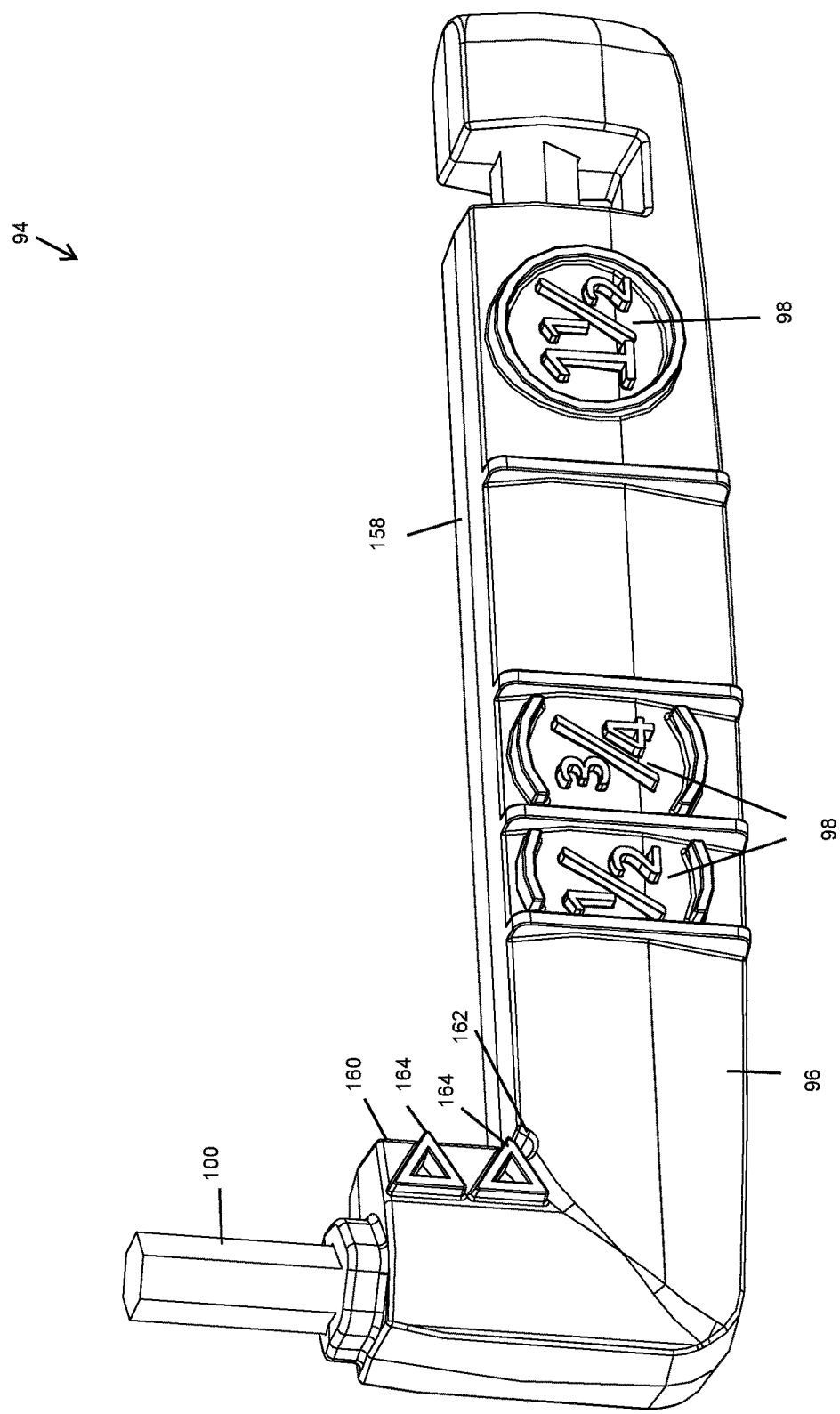
FIG. 26 is another perspective view of the workpiece thickness gauge shown in FIG. 25.
Figure 27:
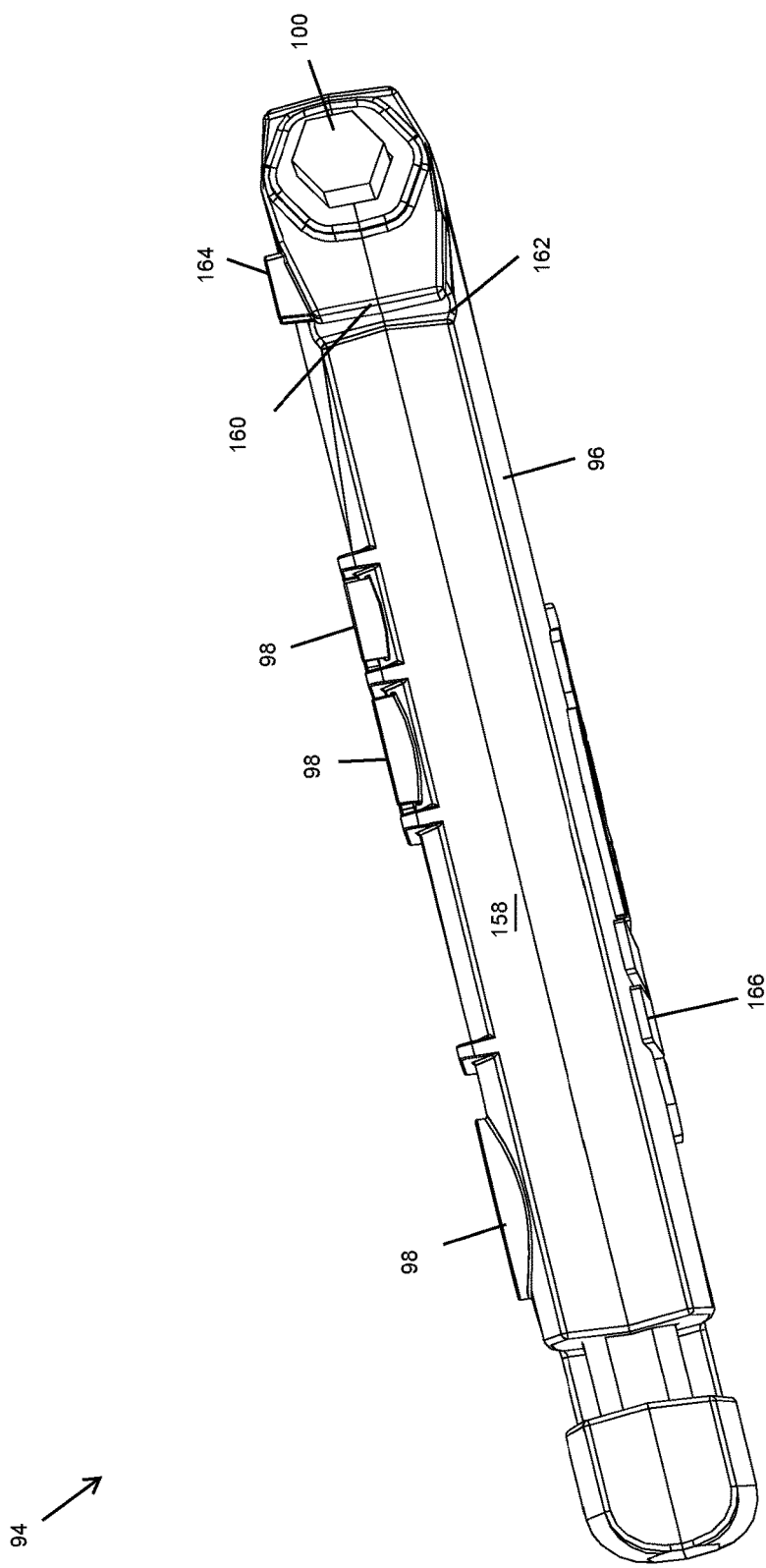
FIG. 27 is another perspective view of the workpiece thickness gauge shown in FIG. 25.
Figure 28:
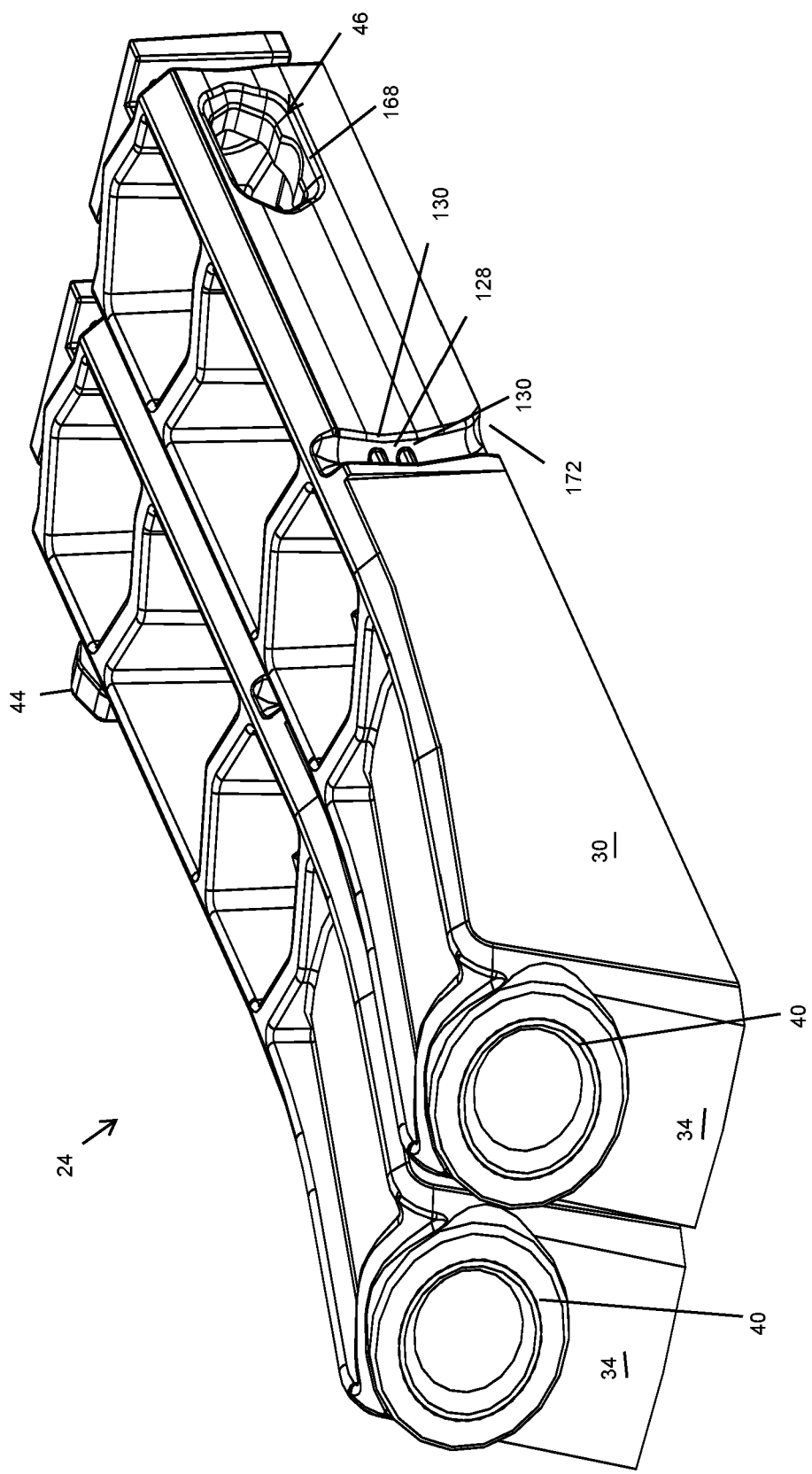
FIG. 28 is a perspective view of another embodiment of a mini pocket hole jig system, the view showing two jig segments joined together at their forward end by the connection of a lock feature of one jig segment into the receiver of the other jig segment; the view showing a receiver in the forward end of one of the jig segments, the view showing a groove in the sidewall of the jig segment rearward of the receiver with a pair of bars extending across the groove that form a recess between the bars that are configured to receive a protrusion therein when two jig segments are connected together and rotated in parallel alignment.
Figure 29:
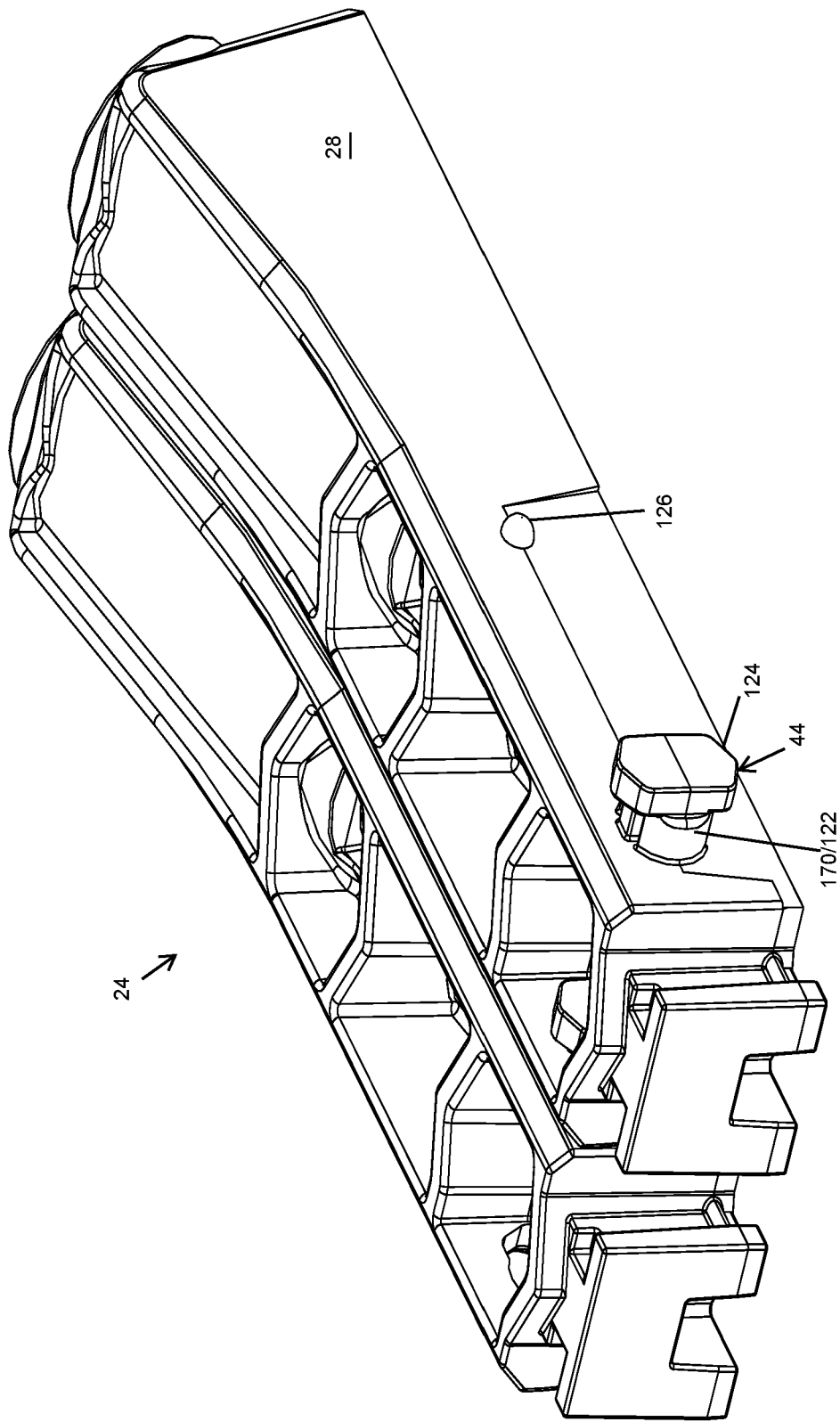
FIG. 29 is another perspective view of the embodiment of a mini pocket hole jig system shown in FIG. 28, the view showing two jig segments joined together at their forward end by the connection of a lock feature of one jig segment into the receiver of the other jig segment; the view showing a lock feature in the forward end of one of the jig segments, the view showing a protrusion in the sidewall of the gig segment rearward of the lock feature that is configured to be received within the groove and between the bars of an adjacent jig segment when two jig segments are connected together and fully rotated in parallel alignment.
Figure 30:
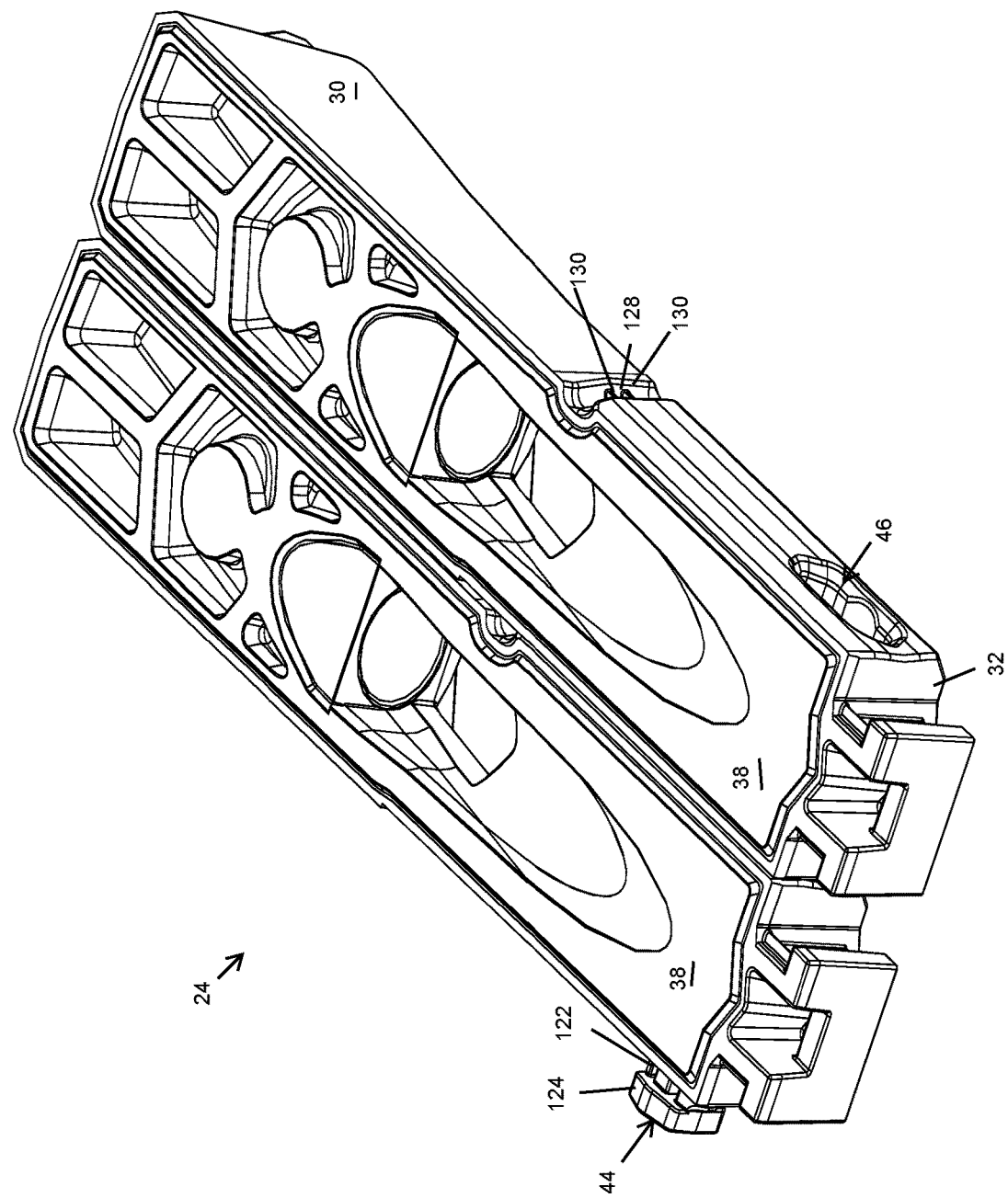
FIG. 30 is bottom perspective view of the embodiment of a mini pocket hole jig system shown in FIG. 28, the view showing two jig segments joined together at their forward end by the connection of a lock feature of one jig segment into the receiver of the other jig segment; the view showing a receiver in the forward end of one of the jig segments, the view showing a groove in the sidewall of the jig segment rearward of the receiver with a pair of bars extending across the groove that form a recess between the bars that are configured to receive a protrusion therein when two jig segments are connected together and rotated in parallel alignment.
Figure 31:
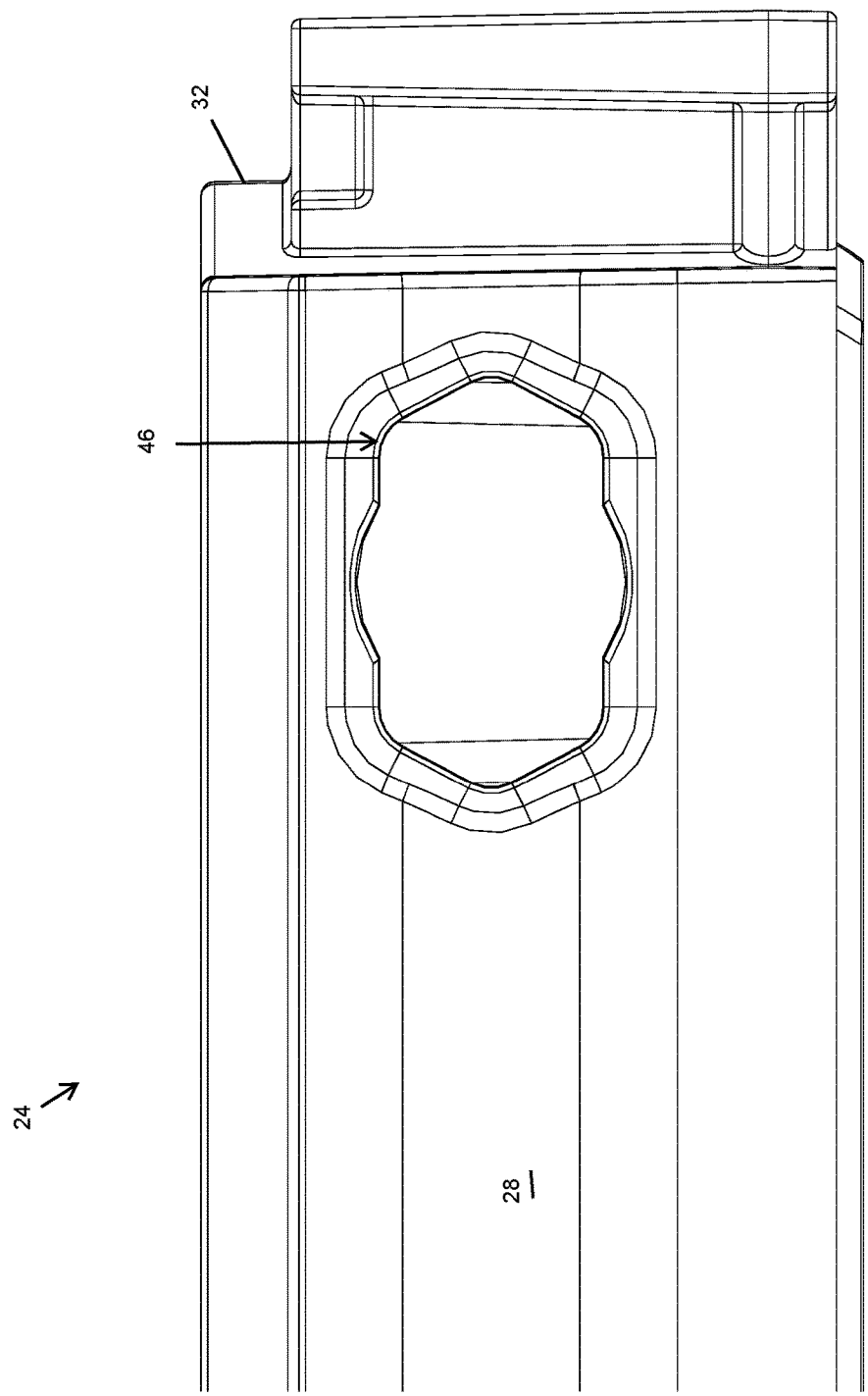
FIG. 31 is a close-up side elevation view of the forward end of the embodiment of a mini pocket hole jig system shown in FIG. 28, the view showing the receiver in the sidewall adjacent the forward end of the jig segment, the view showing the connector in the forward end of the jig segment that is used to connect a tail section.
Figure 32:
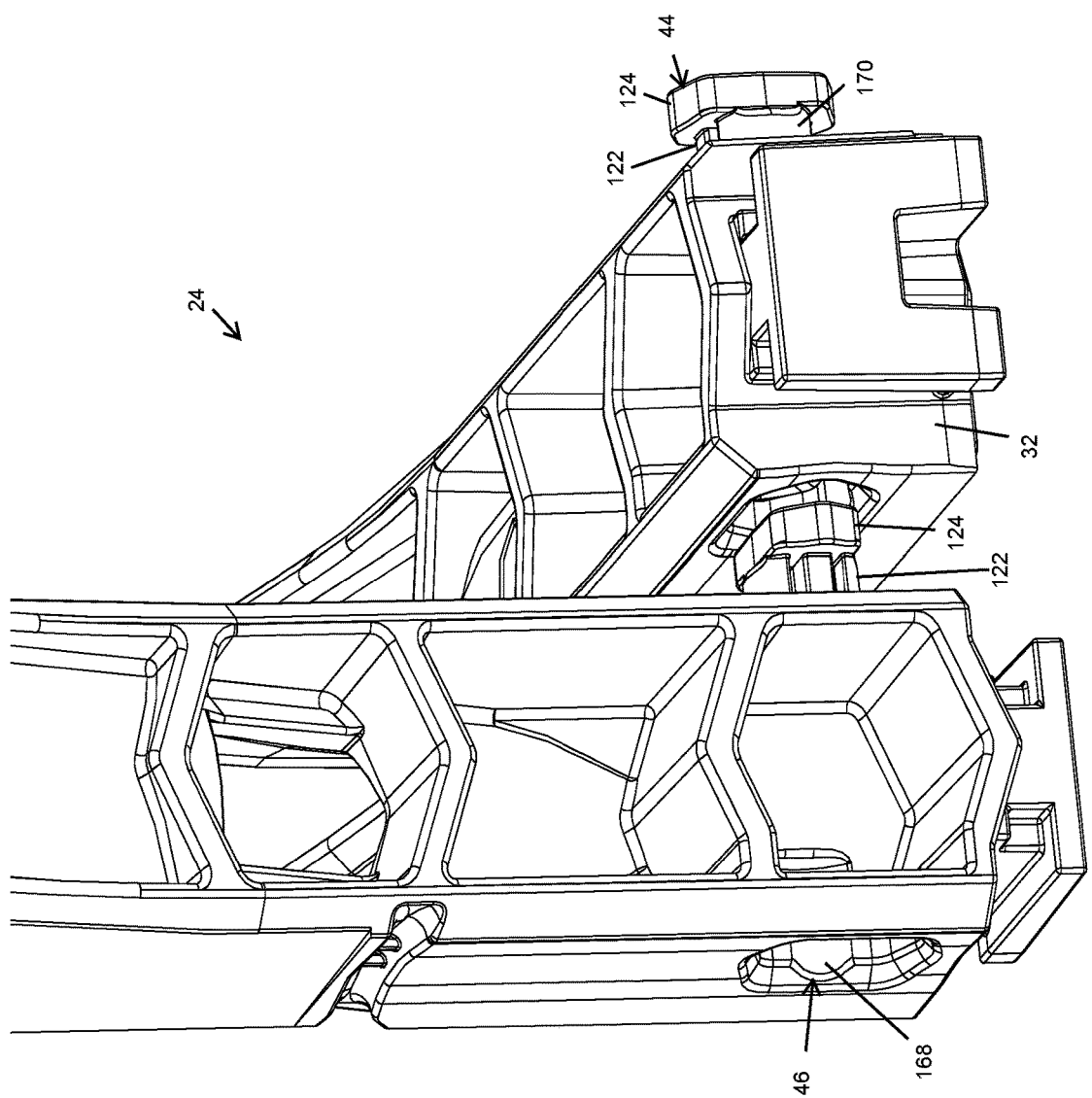
FIG. 32 is a close-up perspective view of the forward end of the embodiment of a mini pocket hole jig system shown in FIG. 28, the view showing the lock feature extending outward from the sidewall adjacent the forward end of one jig segment about to be inserted into the receiver in the sidewall adjacent the forward end of the other jig segment, the view showing the two jig segments rotated at about a perpendicular manner to one another to facilitate insertion of the lock feature of one jig segment into the receiver of the other jig segment.
Figure 33:
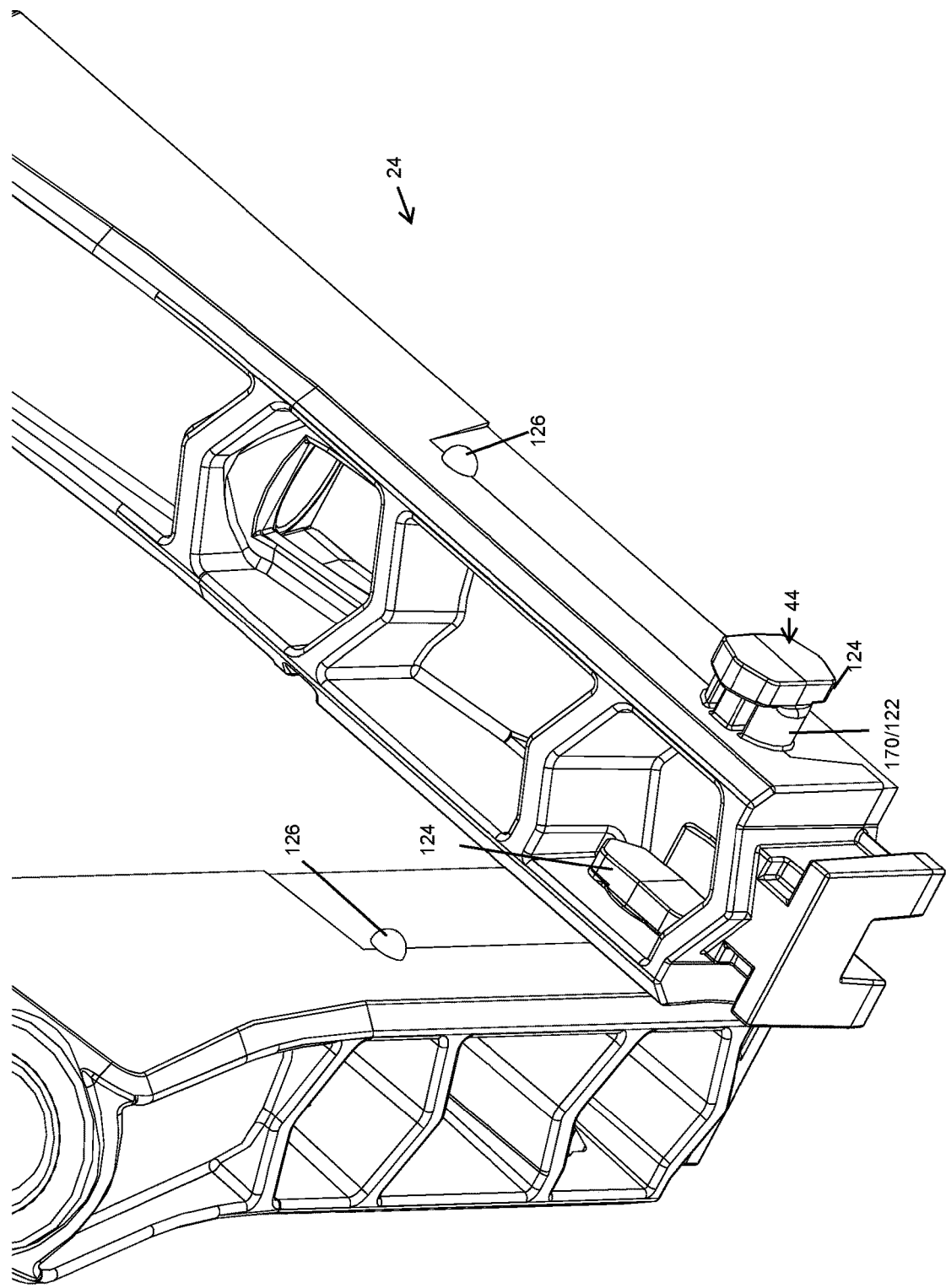
FIG. 33 is a close-up perspective view of the forward end of the embodiment of a mini pocket hole jig system shown in FIG. 28, the view showing the lock feature extending outward from the sidewall adjacent the forward end of one jig segment that has been inserted into the receiver in the sidewall adjacent the forward end of the other jig segment, the view showing the two jig segments rotated at about a perpendicular manner to one another to facilitate insertion of the lock feature of one jig segment into the receiver of the other jig segment.
Figure 34:
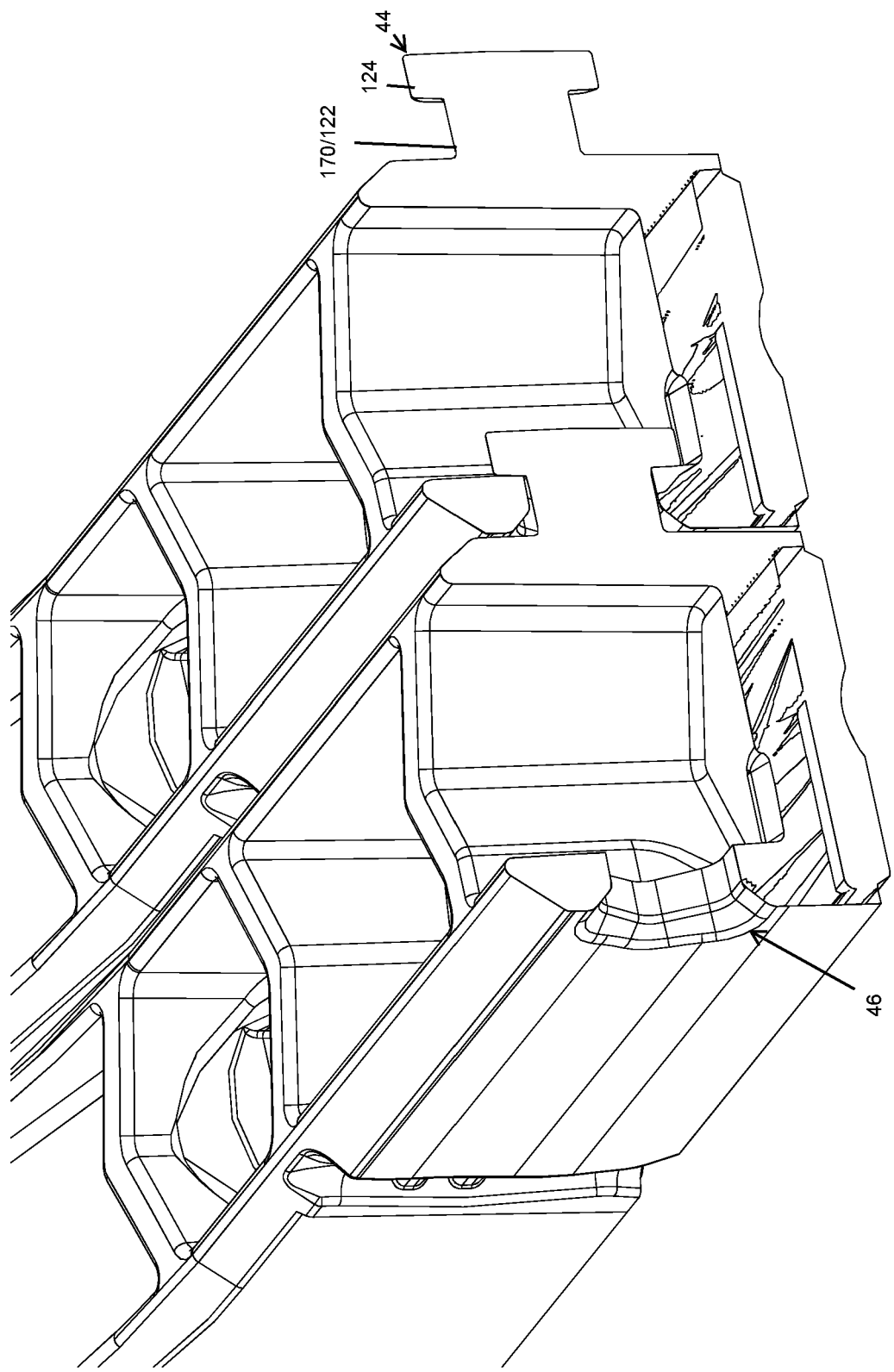
FIG. 34 is a close-up perspective section view of the forward end of the embodiment of a mini pocket hole jig system shown in FIG. 28, the view showing the lock feature extending outward from the sidewall adjacent the forward end of one jig segment inserted into the receiver in the sidewall adjacent the forward end of the other jig segment, the view showing the two jig segments rotated to a parallel alignment with one another to facilitate locking of the lock feature of one jig segment into the receiver of the other jig segment, the section view cutting through the approximate center of the lock feature and receiver of the jig segments from top to bottom.
Figure 35:
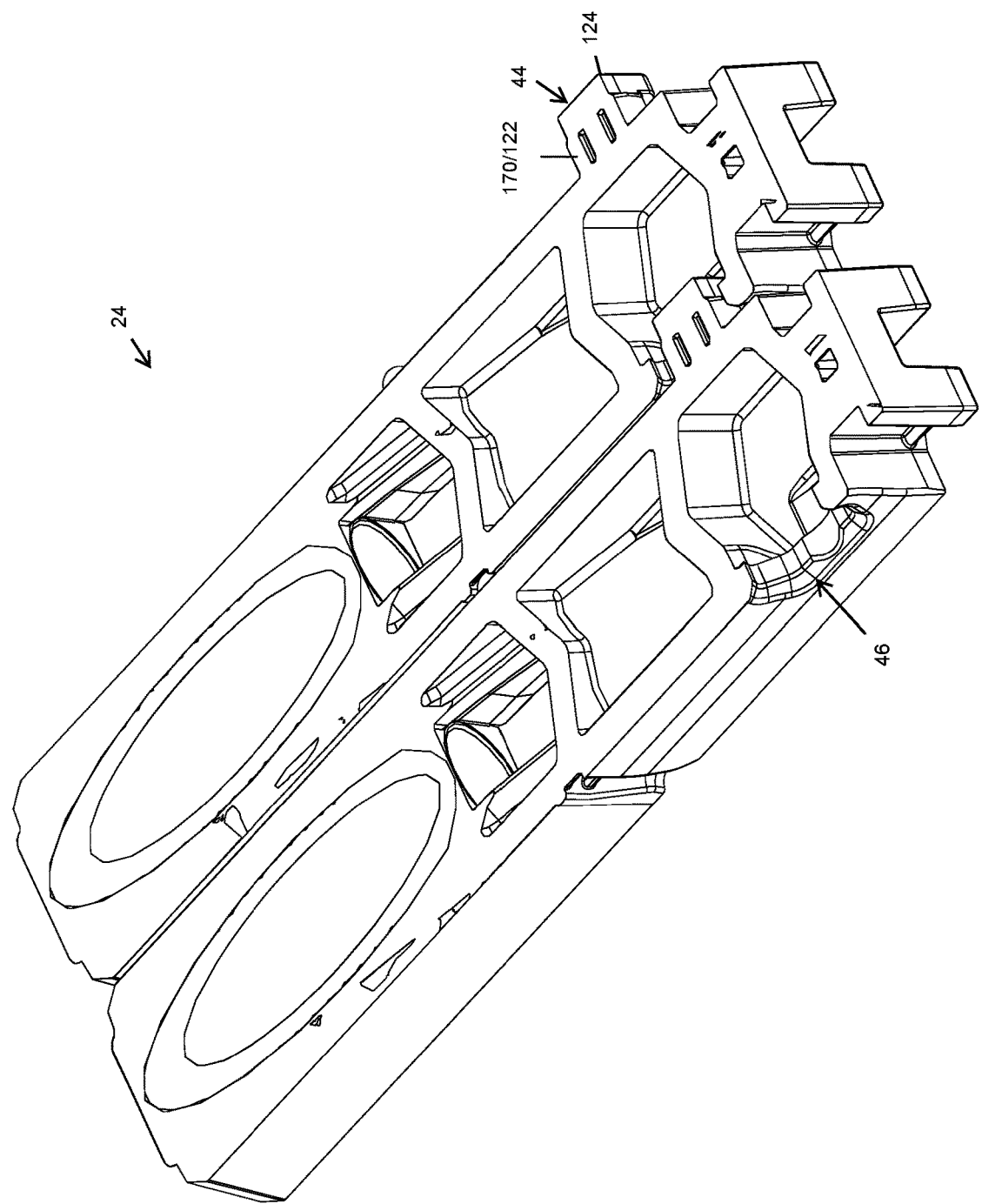
FIG. 35 is a perspective section view of the embodiment of a mini pocket hole jig system shown in FIG. 28, the view showing the lock feature extending outward from the sidewall adjacent the forward end of one jig segment inserted into the receiver in the sidewall adjacent the forward end of the other jig segment, the view showing the two jig segments rotated to a parallel alignment with one another to facilitate locking of the lock feature of one jig segment into the receiver of the other jig segment, the section view cutting through the approximate center of the lock feature and receiver of the jig segments from the forward end to the rearward end of the jig segments.

An alternative arrangement of workpiece thickness gauge 94 is presented with respect to FIGS. 25, 26 and 27. In this arrangement, main body 96 is formed around or molded onto, or formed integral with Allen wrench 100. In this arrangement, main body 96 follows the Allen wrench 100 around the ninety degree bend a distance before terminating. In this way, main body 96 forms a generally flat upper surface 158 that extends in approximate perpendicular planar arrangement to a generally flat interior surface 160. In use, an edge of a workpiece 116 is placed on the upper surface 158 and on the side surface 160 and the indicia 98 indicate the approximate thickness of workpiece 116. In the arrangement shown, the indicia 98 are positioned between a line on each side. When an edge of a workpiece 116 falls between the lines on each side of the indicia 98, the stop collar 110 is to be set to the indicia 98 and a corresponding screw length is to be used. To ensure that burrs or other aberrations that are often present on the corner of a workpiece 116 do not interfere with accurate measurement, a recess 162 is positioned at the intersection of upper surface 158 and side surface 160 that provides a relief for these burrs or other aberrations. Also present on main body 96, adjacent side surface 160 is indicia 164 that indicate the edge of a workpiece 116 is intended to be placed flush against the side surface 160. In the arrangement shown, this indicia 164 takes on the form of a plurality of arrows, however any other design or configuration is contemplated for use. A logo 166 is also shown in a side of main body 96 that indicates the manufacturer of main body 96. Any other form, shape or configuration of workpiece thickness 94 gauge is hereby contemplated for use.

With reference to FIGS. 98-108 an alternative configuration of a workpiece thickness gauge 94 is presented that includes a main body 96 having a plurality of indicia 98 thereon and a recess 162 that is similar to the above-presented embodiments that is wrapped around an Allen wrench 100. This arrangement allows for measurement on either side of the Allen wrench.

Drill Bit & Stop Collar: In one arrangement, system 10 includes a drill bit 102 having a stop collar 110 therein. Drill bit 102 and stop collar 110 are formed of any suitable size, shape and design and is configured to facilitate stepped pocket holes at the desired depth. In the arrangement shown, as one example, drill bit 102 extends a length from a connection end 104 that is configured to receive the chuck of a conventional drill, and a drilling end 106, that is configured to drill into workpiece 116. In one arrangement, drilling end 106 includes a stepped feature, which is a smaller diameter section. The inclusion of the stepped feature in drill bit 102 is what forms the stepped pocket holes. The portion of the hole formed by the stepped feature receives and provides alignment to the shank of a screw, whereas the larger diameter portion of the hole receives the head of the screw.

Stop collar 110 is configured to be placed over the drill bit 102 at a position between the connection end 104 and the drilling end 106. The stop collar 110 is positioned by tightening a fastener 114, such as a conventional screw or bolt in the stop collar 110, against the drill bit 102, such as using Allen wrench 100. The position of the stop collar 110 affects the depth of the pocket hole. The optimum depth of the pocket hole is dependent on the thickness of the workpiece 116. As such, setting the proper position of the stop collar 110 is important. However, being certain what the proper position of the stop collar 110 should be has been challenging to date.

To ease the process of properly positioning the stop collar 110 on the drill bit 102 indicia 108 is placed on drill bit 102 at positions that correspond to common thicknesses of workpieces 116. Indicia 108 is any visible indication or marking placed on or into the exterior surface of drill bit 102 such as printing, writing, etching, laser-marking, coloring, painting or any other visible marking or combination thereof. In one arrangement, as is shown, in FIGS. 18, 19, 20 and 23 indicia 108 includes marking the thickness of workpiece 116 on the shank of the drill bit 102 such as, ¼, ½, ¾, 1, 1¼, and 1½, and the like. In another arrangement, these measurement markings are contained within a band that wraps around the drill bit 102 in a continuous and uninterrupted manner and includes markings that indicate the thickness of workpiece 116 within the band. This band of marking may or may not be formed of a color. When the band of indicia 108 is used, the width of the band of indicia 108 may correspond to the width of the stop collar 110 such that when the stop collar 110 covers the entirety of the band of indicia 108 the stop collar 110 is properly aligned. Or, said another way, when the edges of the stop collar 110 are aligned with the edges of the band of indicia 108 the stop collar 110 is properly aligned. In an alternative arrangement, the band of indicia 108 is slightly wider than the stop collar 110 such that the band extends beyond the stop collar 110 on each side of the stop collar 110 when the stop collar 110 is centered on the band. In an alternative arrangement, the band of indicia 108 is slightly narrower than the stop collar 110 such that the band is completely covered by the stop collar 110 when the stop collar 110 is centered on the band.

Figure 18:
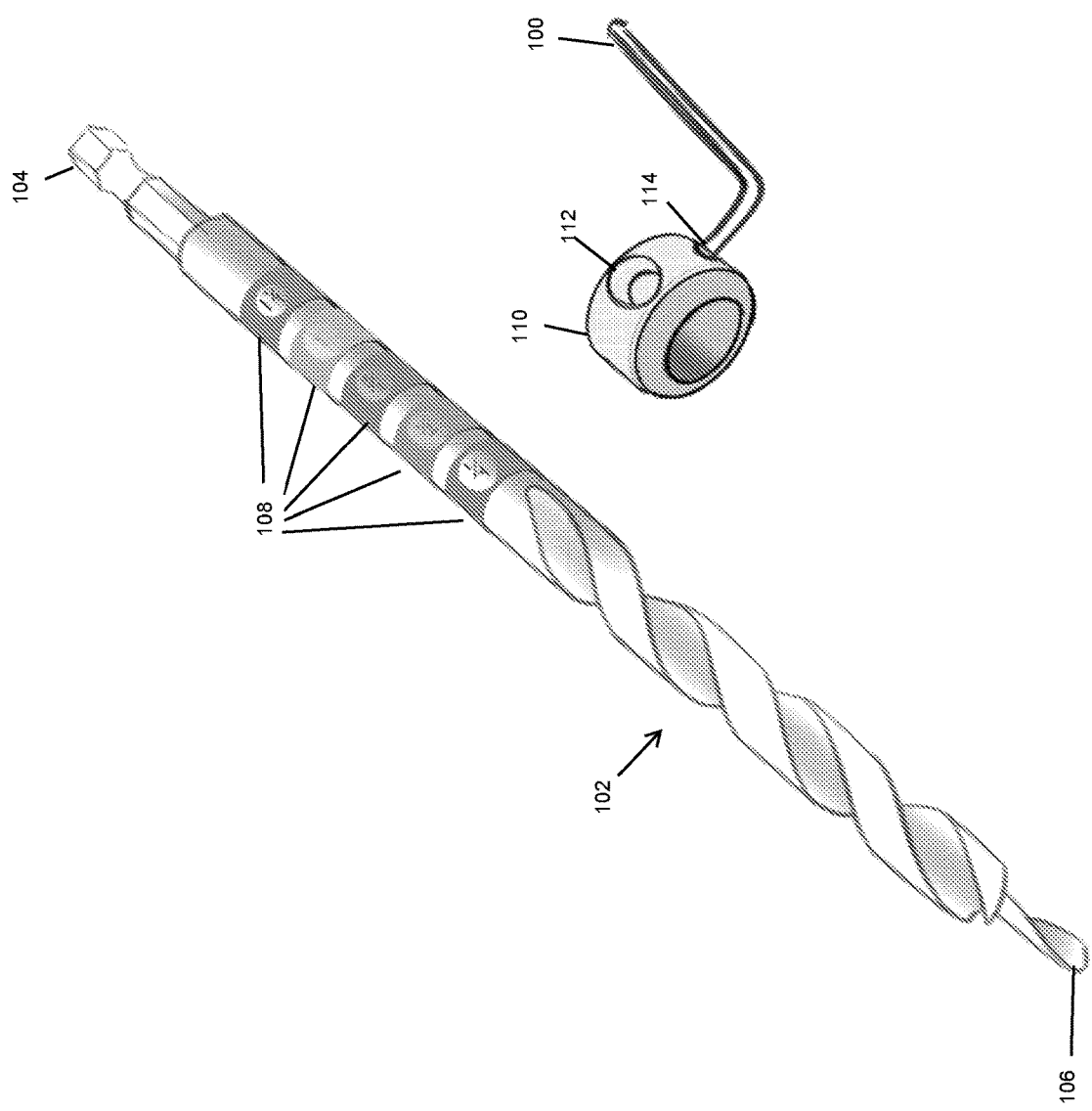
FIG. 18 is a perspective view of stepped drill bit having a plurality of rings around the shaft of the drill bit, wherein each indicia also includes a numerical value for the workpiece thickness, the view also showing a stop collar with an alignment feature that is formed of a hole in the stop collar that is configured to be aligned with the alignment feature.

In one arrangement, indicia 108 is colored. The use of coloring in association with indicia 108 helps to draw attention to the indicia 108 and makes the indicia 108 easier to see and therefor makes it easier for the user to align the stop collar 110 to the band. The use of coloring in association with indicia 108 also can be used to ease the process of selecting the proper position for stop collar 110. In one arrangement, as is shown in FIG. 18, each indicia 108 is associated with a different color. In this arrangement, each indicia 154 on tail section 68 may be associated with the same color as may be each step 156 on the workpiece thickness gauge 94. In this way, a color-coordinated system 10 is presented ensuring that when each of the elements, stop collar 110, stop feature 90 and workpiece thickness gauge 94 correspond to the same color the system 10 is properly set. This color may also correspond to a color on the screws that are to be used. That is, when the workpiece thickness gauge 94 indicates a blue color for the thickness of workpiece 116, the stop collar 110 is aligned over the blue band of indicia 108 on the drill bit 102 and the stop feature 90 of tail section 68 is moved to the blue position, and screws are used that are marked with a blue marking.

Figure 19:
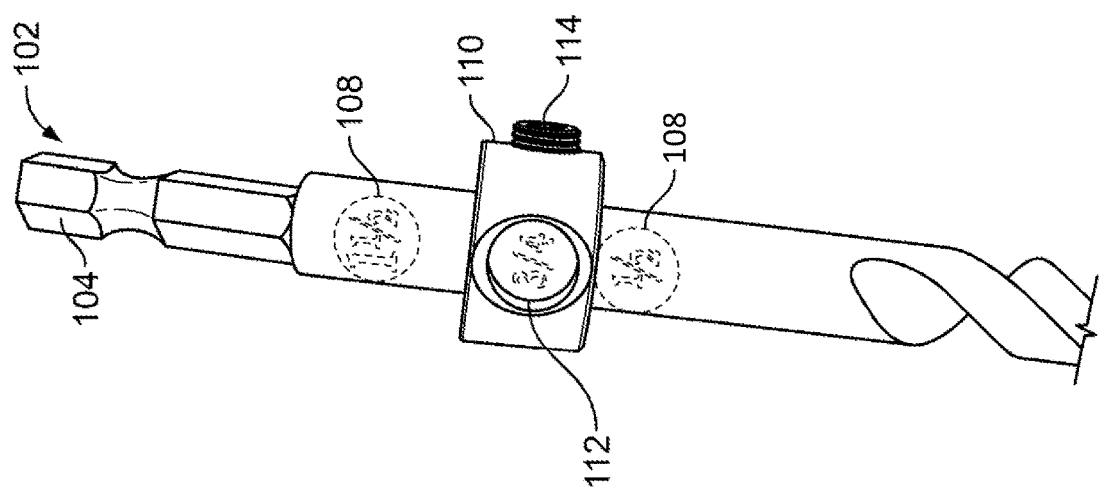
FIG. 19 is a perspective view of stepped drill bit similar to that shown in FIG. 18, the view showing the stepped drill bit having a plurality of measurement indicia laser etched into the shaft of the drill bit, each measurement indicia having a numerical value that is held within a circle that corresponds in size and shape to an alignment feature in a stop collar positioned around the shaft of the stepped drill bit, the view showing the alignment feature being a circular opening in the stop collar.
Figure 23:
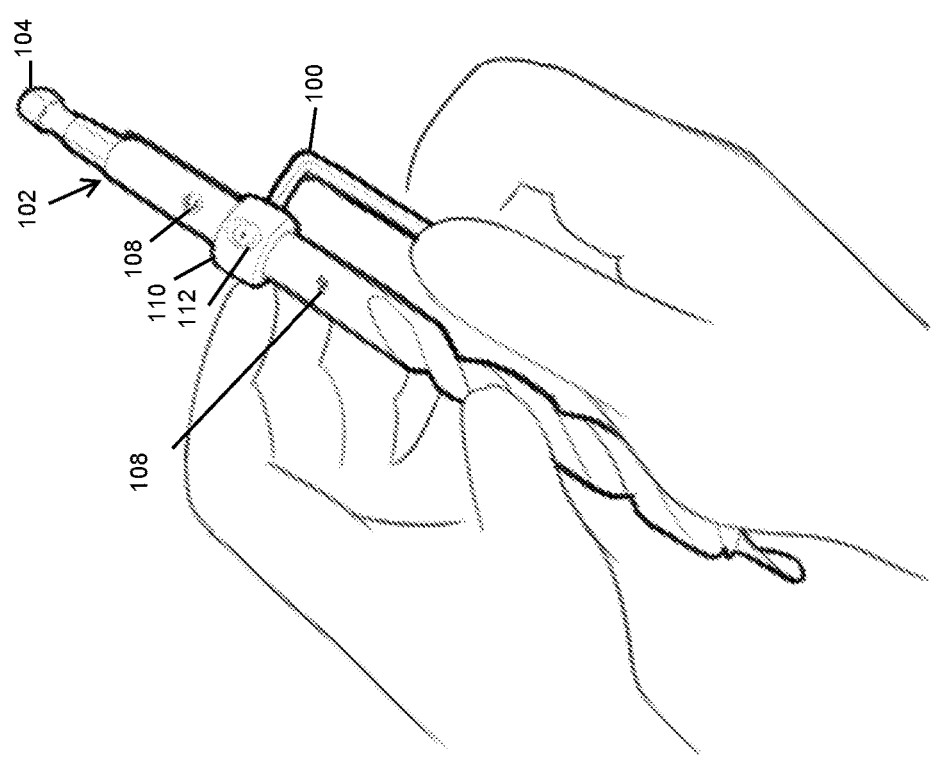
FIG. 23 is a perspective view of stepped drill bit similar to that shown in FIG. 18 and FIG. 19, the view showing the stepped drill bit having a plurality of measurement indicia laser etched into the shaft of the drill bit, each measurement indicia having a numerical value that is held within a circle that corresponds in size and shape to an alignment feature in a stop collar positioned around the shaft of the stepped drill bit, the view showing the alignment feature being a circular opening in the stop collar.
Figure 24:
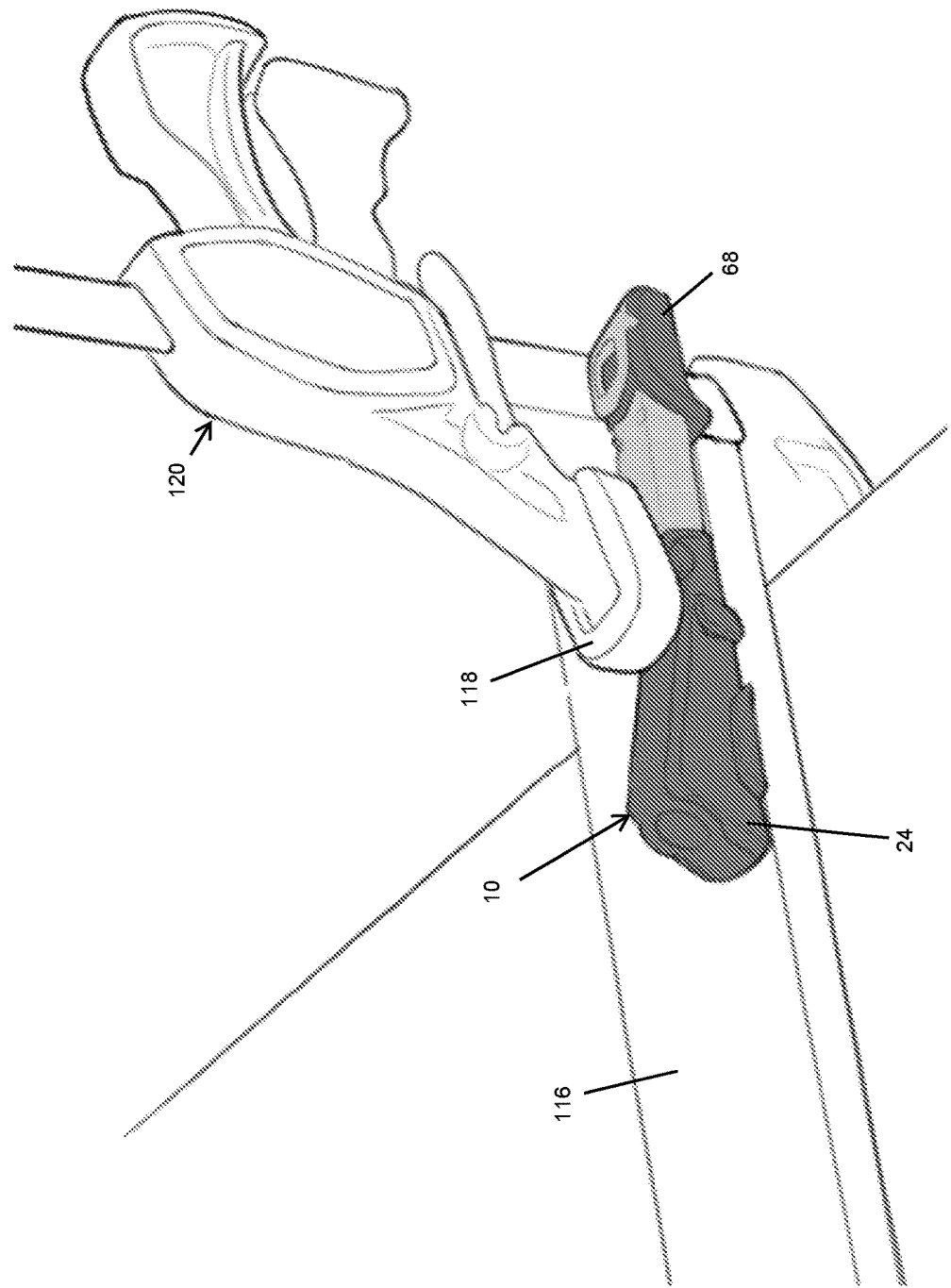
FIG. 24 is a perspective view of a mini pocket hole jig system similar to that shown in FIGS. 1-17 clamped to workpiece with a clamp.

In one arrangement, to facilitate proper setting of the stop collar 110, stop collar includes an alignment feature 112. Alignment feature 112 is formed of any suitable size, shape and design and is configured to allow the user to easily understand and ensure that the stop collar 110 is positioned at the proper position on drill bit 102. In one arrangement, as is shown in FIGS. 18, 19 and 23, alignment feature 112 is a circular opening in stop collar 110. In this arrangement, when the indicia 108 on drill bit 102 is visible through and centered on the opening of alignment feature 112 the stop collar 110 is properly set. In the arrangement shown, this opening of alignment feature 112 is generally circular in shape and is centered in the stop collar 110, and to provide additional accuracy a circular feature is positioned around the indicia 108 (and within the band, when the band is present) on drill bit 102 of corresponding size such that when the edges of the circular opening of alignment feature 112 are aligned with the edges of the circular feature surrounding the indicia 108 the stop collar 110 is precisely set. While a circular shape is shown for use in stop collar 110 as well as for the feature around indicia 108, any other size, shape and design is hereby contemplated for use such as square, rectangular, oval, triangular, octagonal or any other shape or feature.

Figure 20:
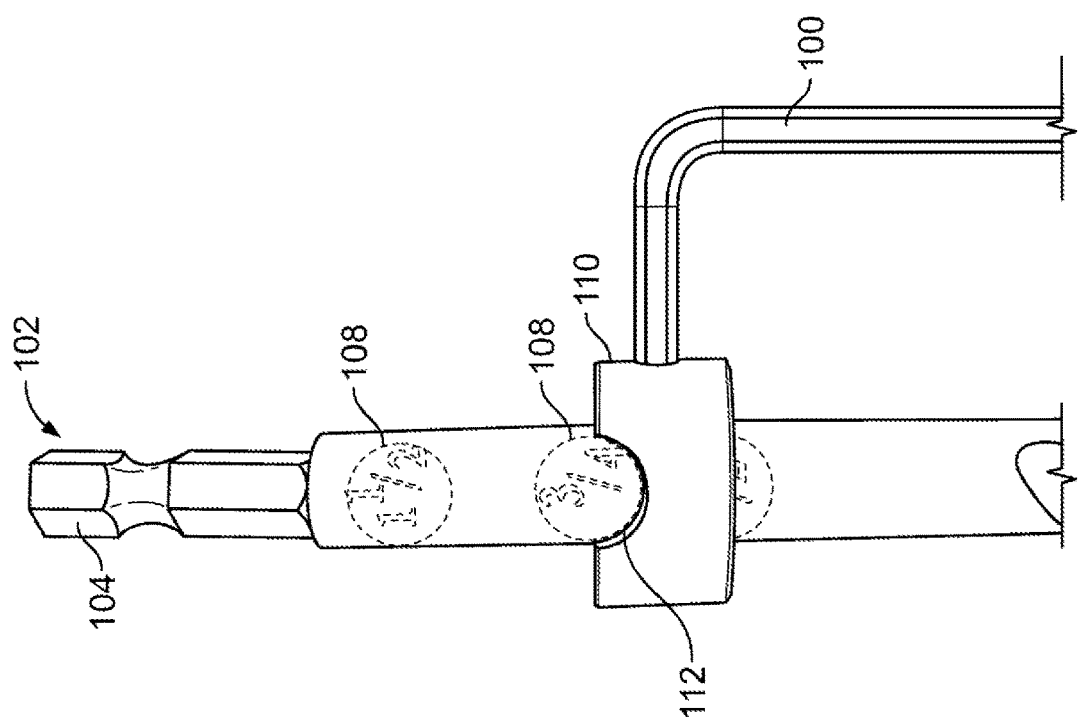
FIG. 20 is a perspective view of stepped drill bit similar to that shown in FIG. 18 and FIG. 19, the view showing the stepped drill bit having a plurality of measurement indicia laser etched into the shaft of the drill bit, each measurement indicia having a numerical value that is held within a circle that corresponds in size and shape to an alignment feature in a stop collar positioned around the shaft of the stepped drill bit, the view showing the alignment feature being a half-circular opening in the stop collar.
Figure 21:
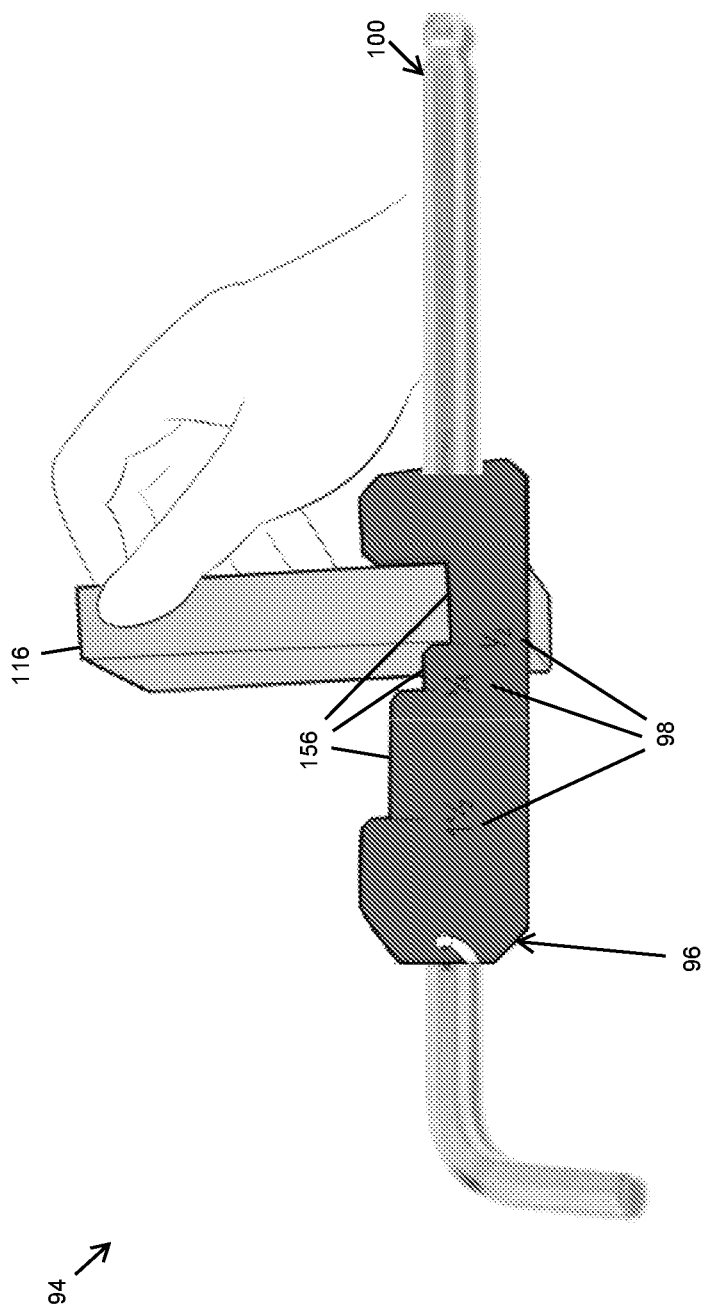
FIG. 21 is a perspective view of workpiece thickness gauge having an Allen wrench extending through the workpiece thickness gauge, the view showing the workpiece thickness gauge having a plurality of steps with indicia that correspond to various workpiece thicknesses.
Figure 22:
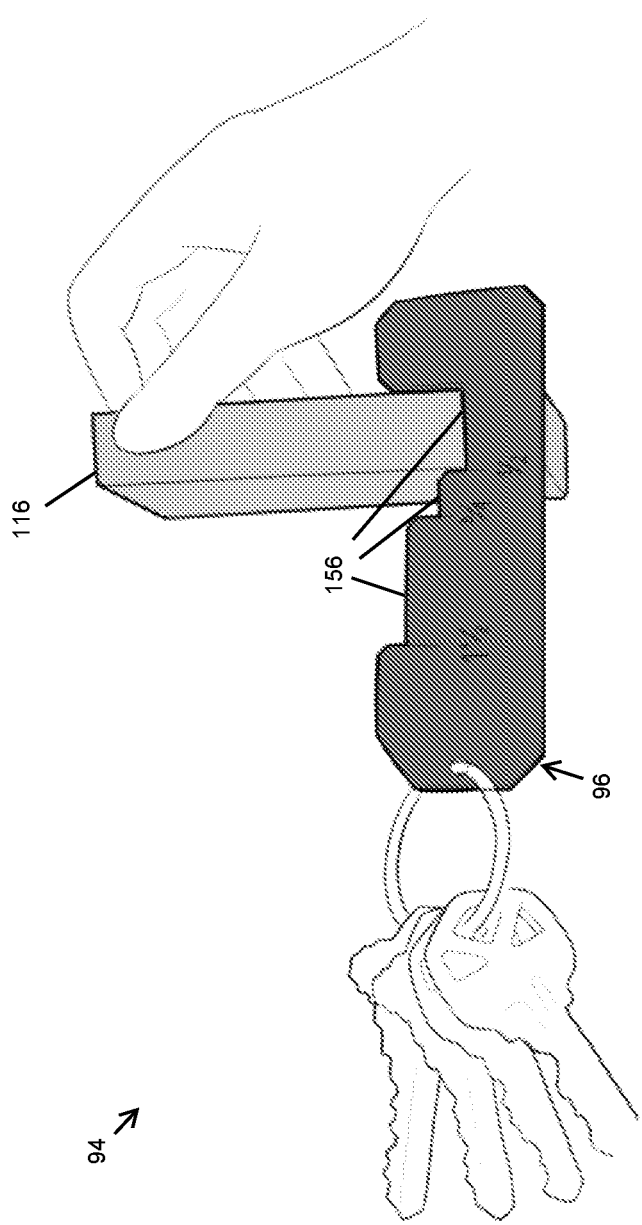
FIG. 22 is a perspective view of a workpiece thickness gauge similar to that showing in FIG. 20 the view showing a key chain ring attached to the workpiece thickness gauge instead of an Allen wrench, the view showing the workpiece thickness gauge having a plurality of steps with indicia that correspond to various workpiece thicknesses.

In another arrangement, as is shown in FIG. 20, alignment feature 112 is a semi-circular cutout in one side of stop collar 110. In this arrangement, when the semi-circular alignment feature 112 of stop collar 110 cradles the circular feature surrounding indicia 108 the stop collar 110 is properly positioned. In one arrangement, this semicircular cut-out of alignment feature 112 is positioned approximately in the middle of stop collar 110 such that the stop collar 110 can be placed on drill bit 102 in either orientation and the positioning is not affected. Alternatively, the cut-out of alignment feature is positioned toward one side of the stop collar 110.

Once the stop collar 110 is properly positioned, the fastener 114 extending through the stop collar 110 is tightened using Allen wrench 100 and the stop collar 110 is fixed in place and the drill bit 102 is ready for use. In one arrangement, grooves are positioned at the position wherein fastener 114 engaged drill bit 102 when stop collar 110 is properly aligned. These grooves then receive fastener therein and helps to properly align the stop collar 110 at the precise positioning when the fastener 114 is tightened and is received within the groove at a particular indicia 108.

In Operation: With reference to FIGS. 1-14, the mini pocket hole jig system 10 is formed of a plurality of jig segments 24 connected together in side-to-side alignment, either directly to one another or by positioning one or more spacers 48 between adjacent jig segments 24, by aligning the foot 124 of one jig segment 24 with the receiver 46 of an adjacent jig segment 24 or spacer 48. Once the foot 124 is aligned with the receiver 46 the foot 124 is inserted within the receiver 46 the two components are rotated ninety degrees (or any other amount or more or less depending on the configuration) with respect to one another thereby locking the foot 124 of one components in the receiver 46 of the adjacent component. The mini pocket hole jig system 10 is assembled by connecting any number of jig segments 24 and/or spacers 48 in side-to-side alignment for the desired application. Spacers 48 of various thickness are selected based on the desired side-by-side spacing of jig segments 24 and the resulting pocket holes.

When the resulting mini pocket hole jig system 10 of the desired number of jig segments 24 and/or spacers 48 is formed and the system 10 is to be used on an inside corner, tail sections 68 are not attached. In contrast, when the resulting mini pocket hole jig system 10 of the desired number of jig segments 24 and/or spacers 48 is formed and the system 10 is to be used on the side or end of a workpiece 116, tail sections 68 are attached.

Tail sections 68 are attached by sliding the rearward end of the tail section 68 over the forward end of the jig segments 24 until the connector 138 is fully received within the opening 142 in the rearward end 78 of tail section 68. When tail sections 68 are fully attached to jig segments 24, the flange of the tail sections 68 are received within the groove 140 of the connector 138 and the protrusions 146 in the lower end of flanges 144 grip onto the connector 138 thereby holding the tail section 68 onto connector 138.

When fully assembled the top surfaces of jig segments 24, spacers 48 and tail sections 68 are in planar alignment with one another. When fully assembled the clamping surfaces of jig segments 24, spacers 48 and tail sections 68 are in planar alignment with one another.

Next, the user measures the thickness of workpiece 116 by using workpiece thickness gauge 94. Based on the reading from the workpiece thickness gauge 94, the user adjusts the stop feature 90 of tail section 68 to the corresponding thickness. This is accomplished by pressing up on the forward end of stop feature 90 adjacent forward flange 152 until the forward arm 148 comes out of the stop 88 that it is held within. In doing so, the user must overcome the spring bias of the stop feature 90. Next, the user laterally slides the stop feature 90 within slot 86 until the stop feature 90 is visible through the opening 90 in the top side 80 of the tail section 68 that corresponds with the workpiece thickness reading from workpiece thickness gauge 94. Once the stop feature 90 is in the desired position, the user releases the stop feature 90 and forward arm 148 falls into the associated stop 88 under the spring bias of the stop feature 90.

Next, the user sets the stop collar 110 on drill bit 102 by aligning the alignment feature 112 of the stop collar 110 with the indicia 108 on drill bit 102 that corresponds with the workpiece thickness reading from workpiece thickness gauge 94. Next, the user tightens the fastener 114 using Allen wrench 100.

Next, the user places the clamping surface of the jig segments 24, spacers 48 and tail sections 68 on the upper surface of the workpiece 116 and the jig system 10 is slid forward along the workpiece 116 until the edge of the workpiece 116 is engaged in a flush and flat manner to the rearward surface of rearward flange 150 of stop feature 90. Once in this position, one or more clamps 120 are used to clamp the jig system 10 to the workpiece 116. More specifically, the pad 118 of one or more clamps 120 is placed on the top surface of the jig segments 24, spacers 48 and tail sections 68 and then the clamp 120 is tightened. By having the top and bottom surfaces of jig segments 24, spacers 48 and tail sections 68 in planar alignment to one another this facilitates even clamping and pressure across the jig system 10. As the jig system 10 is clamped to the workpiece 116 the layer of grip material is forced upon the surface of the workpiece 116. Due to the high coefficient of friction of the grip material, upon clamping, the jig system 10 tends to stay in place on the workpiece 116 because the grip material does not easily slide upon the surface of the workpiece 116.

Once clamped in place, pocket holes are drilled in the workpiece 116 by inserting the drill bit 102 into the drill guides 40 until the stop collar 110 engages the rearward end of drill guide 40 which protrudes slightly rearward from the rearward end 34 of jig segment 24. During drilling, wood chips and debris formed during drilling pass through the bore formed by drill guide 40 and exit the drilling area through the opening 42 in the top surface of the jig segments 24 that connects to the hollow bore of the drill guide 40, thereby facilitating a cleaner and nicer drilled hole. Once all pocket holes are drilled, the clamp 120 is released and the pocket hole jig 10 is removed.

This process is repeated for all workpieces 116 and the pocket hole jig system 10 is assembled and disassembled, configured and reconfigured, based on the particular uses.

In one arrangement, the system is sold as a kit having a plurality of jig segments 24, a plurality of spacers 48, of the same size or of various sizes, a plurality of tail sections 68, at least one stepped drill bit 102, at least one stop collar 110, at least one workpiece thickness gauge 94 and an Allen wrench 100 that may or may not be formed as part of the workpiece thickness gauge 94 so that the system may be configured in a countless number of configurations.

Alternative Arrangement—Lock Feature and Receiver:

With reference to FIGS. 28-35 an alternative arrangement of a lock feature 44 and receiver 46 is presented. In this arrangement, receiver 46 includes a recess 168 that is sized and shaped to receive a protrusion 170 positioned on post 122 of lock feature 44. When viewed from the side, a recess 168 is positioned approximately in the middle of the upper side and lower side of receiver 46. In the arrangement shown, as one example, when viewed from the side, these recesses 168 are semi-circular in shape or curved in shape. These recesses 168 are sized and shaped to receive similarly shaped protrusions 170 on post 122 of lock feature 44. However, protrusions 170 of lock feature 44 are positioned on the forward and/or rearward side of post 122, so as to facilitate insertion of post 122 into receiver 46 when the adjacent jig segments 24 and/or spacers 48 are connected in a perpendicular manner. In one arrangement, as is shown, when viewed from the side, protrusions 170 on posts 122 extend slightly past the forward and back sides of foot 124. Also, as is shown, the outward edge of protrusion 170 on posts 122 is angled or chamfered toward foot 124. This angled feature helps to guide the foot 124 within the hollow interior of jig segment 24 and/or spacer 48 as the two components are rotated with respect to one another thereby ensuring full insertion and locking of the adjacent jig segments 24 and/or spacers 48 that are connected together.

By recesses 168 of receiver 46 receiving the protrusions 170 of post 122 of lock feature 44 within close and tight tolerances, this engagement provides alignment to the adjacent jig segments 24 and/or spacers 48 that are being connected together. Said another way, without the engagement of recesses 168 and protrusions 170, the adjacent jig segments 24 and/or spacers 48 that are being connected together can move relative to one another as the post 122 can move around within the oblong-shaped receiver 46. By including recesses 168 in receivers 46 and protrusions 170 in posts 122 this ensures the lock feature 44 is centered within the receiver 46. This centering provides alignment and guidance and ensures that the adjacent jig segments 24 and/or spacers 48 that are being connected together are easily locked together in a quick, easy and simple manner.

Also shown in this arrangement, as one example, bars 130 and recess 128 are positioned within a groove 172 that extends the vertical length of the sides of jig segments 24 and/or spacers 48. This groove 172 is configured to receive and guide protrusion 126 in the side of jig segment 24 and/or spacers 48 toward and into the recess 128 between bars 130. This guidance provided by groove 172 to protrusion 126 ensures proper and easier locking of the adjacent jig segments 24 and/or spacers 48.

Figure 36:
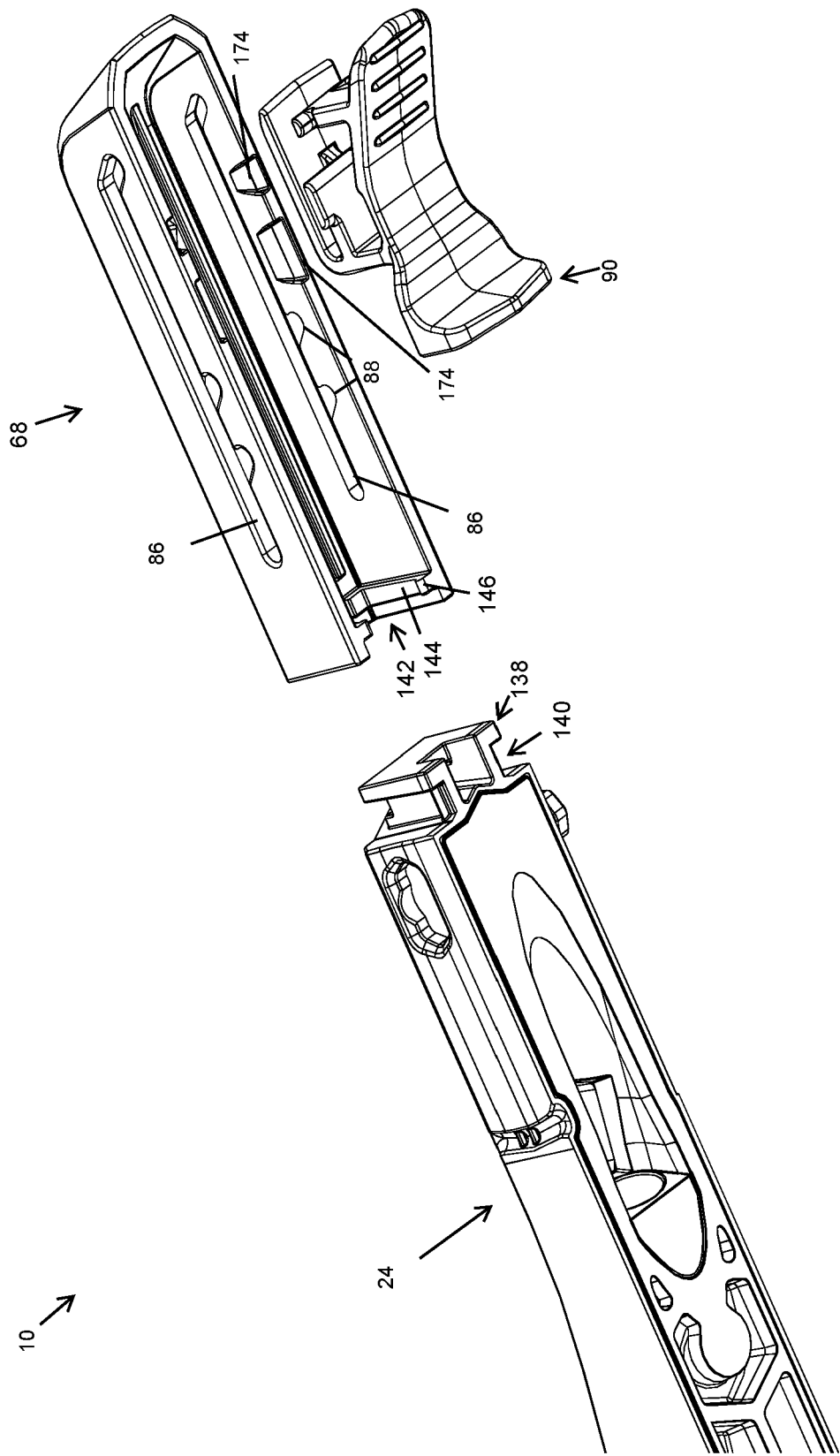
FIG. 36 is a perspective exploded view of the embodiment of a mini pocket hole jig system shown in FIG. 28, the view showing the tail section exploded from the forward end of the jig segment, the view showing the stop feature exploded from the tail section, the view showing the tail section having a hollow interior that receives the stop feature therein, the view showing a pair of opposed grooves with stops therein that are aligned to fit various workpiece thicknesses.
Figure 37:
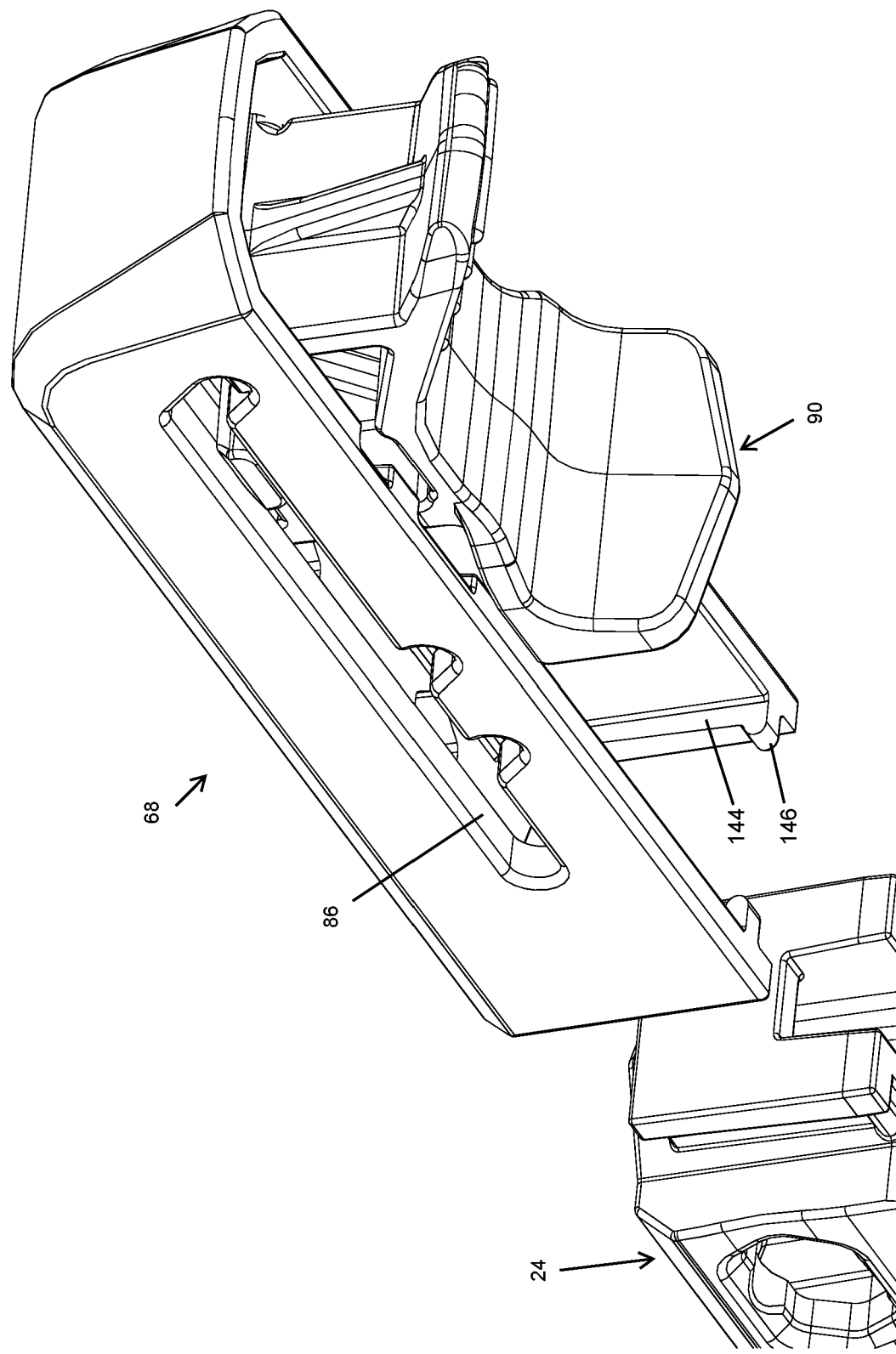
FIG. 37 is another perspective exploded view of the embodiment of a mini pocket hole jig system shown in FIG. 28, the view showing the tail section exploded from the forward end of the jig segment.
Figure 38:
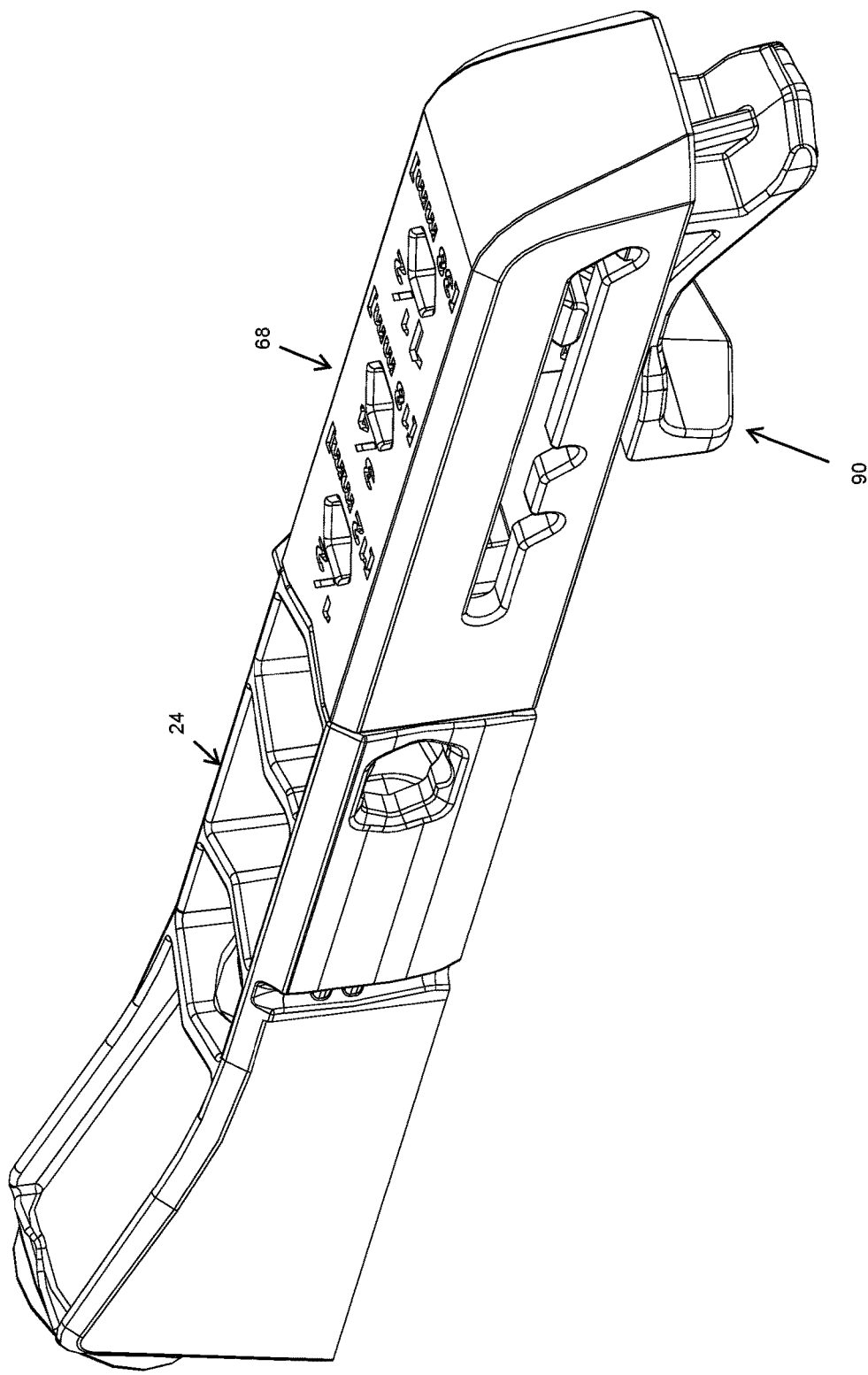
FIG. 38 is another perspective view of the embodiment of a mini pocket hole jig system shown in FIG. 28, the view showing the tail section attached to the forward end of the jig segment.
Figure 39:
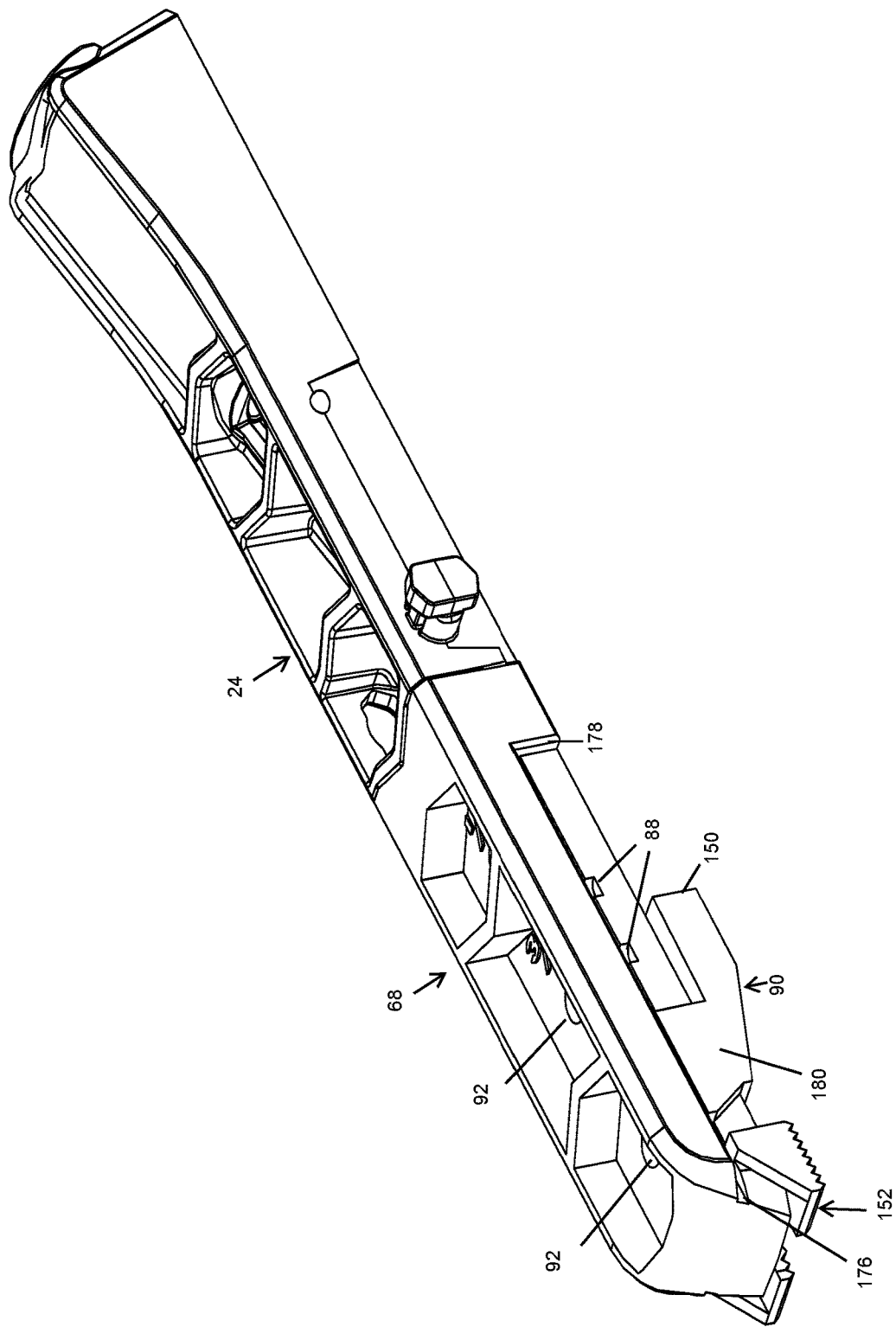
FIG. 39 is a perspective view of another embodiment of a mini pocket hole jig system, the view showing another embodiment of a tail section that does not have the hollow interior and slot as is presented in FIGS. 36-38, the view showing the stop feature fitting around the lower end of the tail section and having a pair of flanges with guides that fit within a groove that extends along the lower sides of the tail section.
Figure 40:
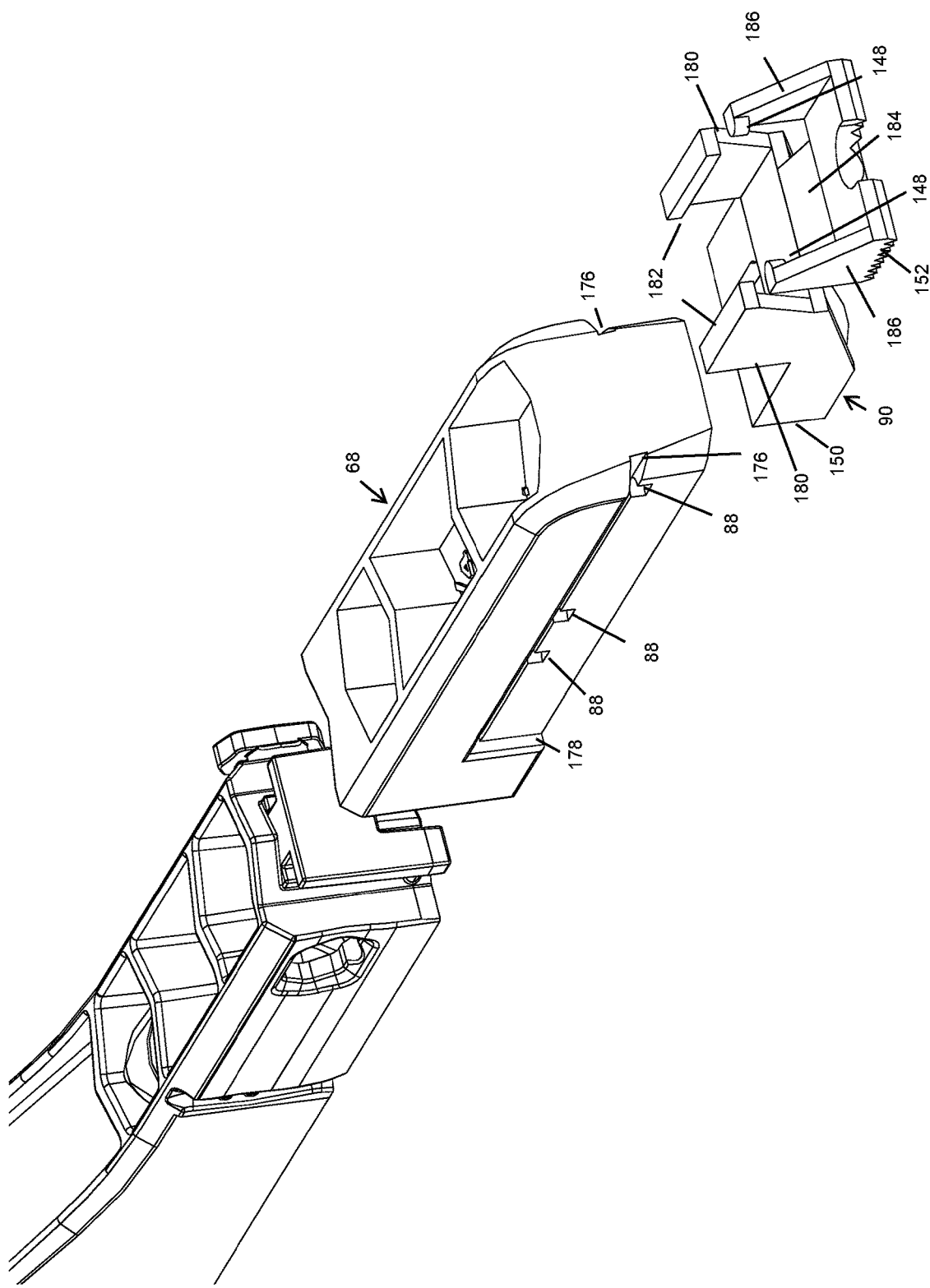
FIG. 40 is a perspective exploded view of the mini pocket hole jig system shown in FIG. 39, the view showing the tail section exploded from the jig segment, the view showing the stop feature exploded from the tail section.
Figure 41:
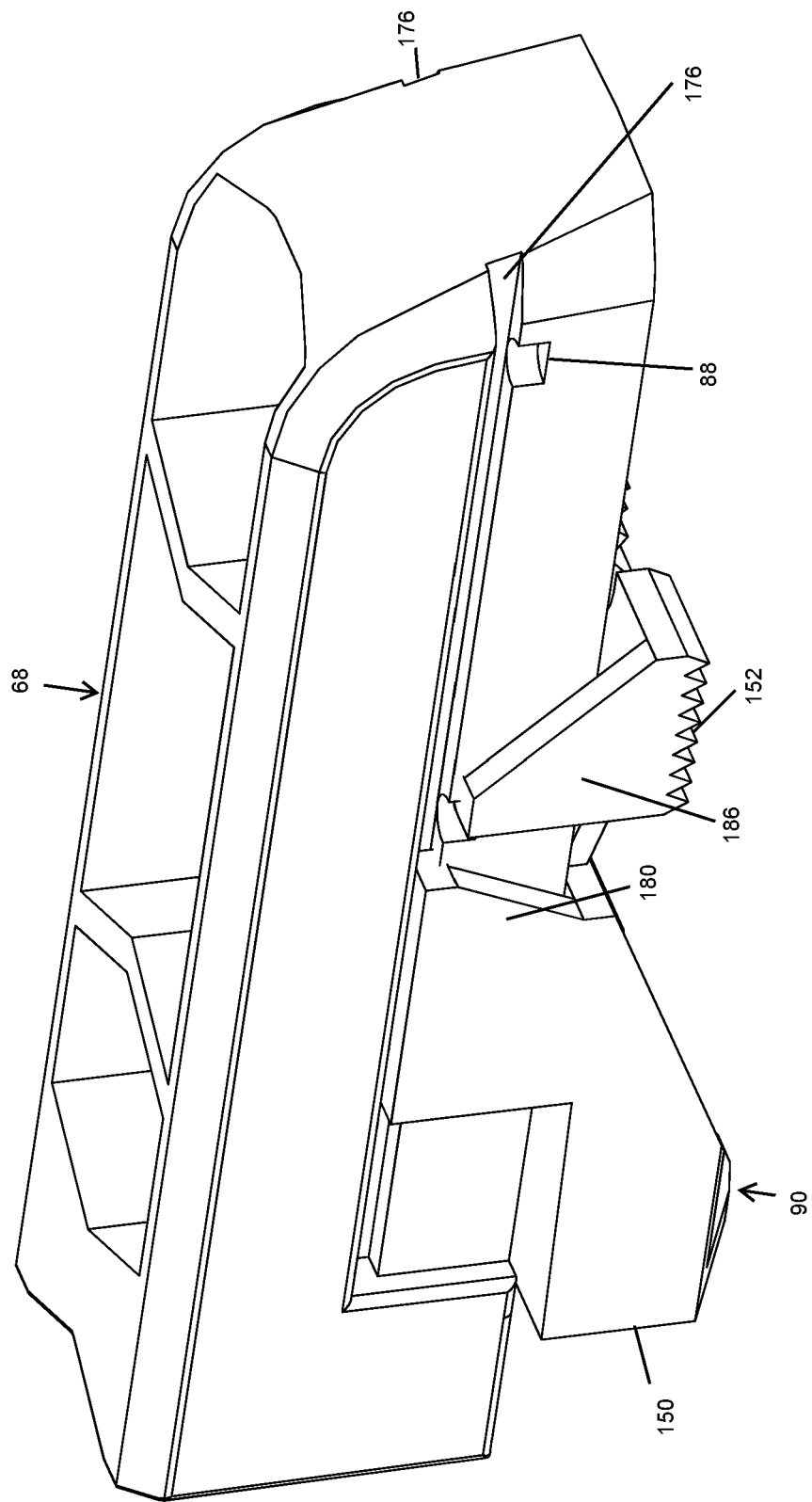
FIG. 41 is a perspective view of the tail section of a mini pocket hole jig system shown in FIG. 39, the view showing the stop feature attached to the bottom side of the tail section and engaged within the groove of the tail section.
Figure 42:
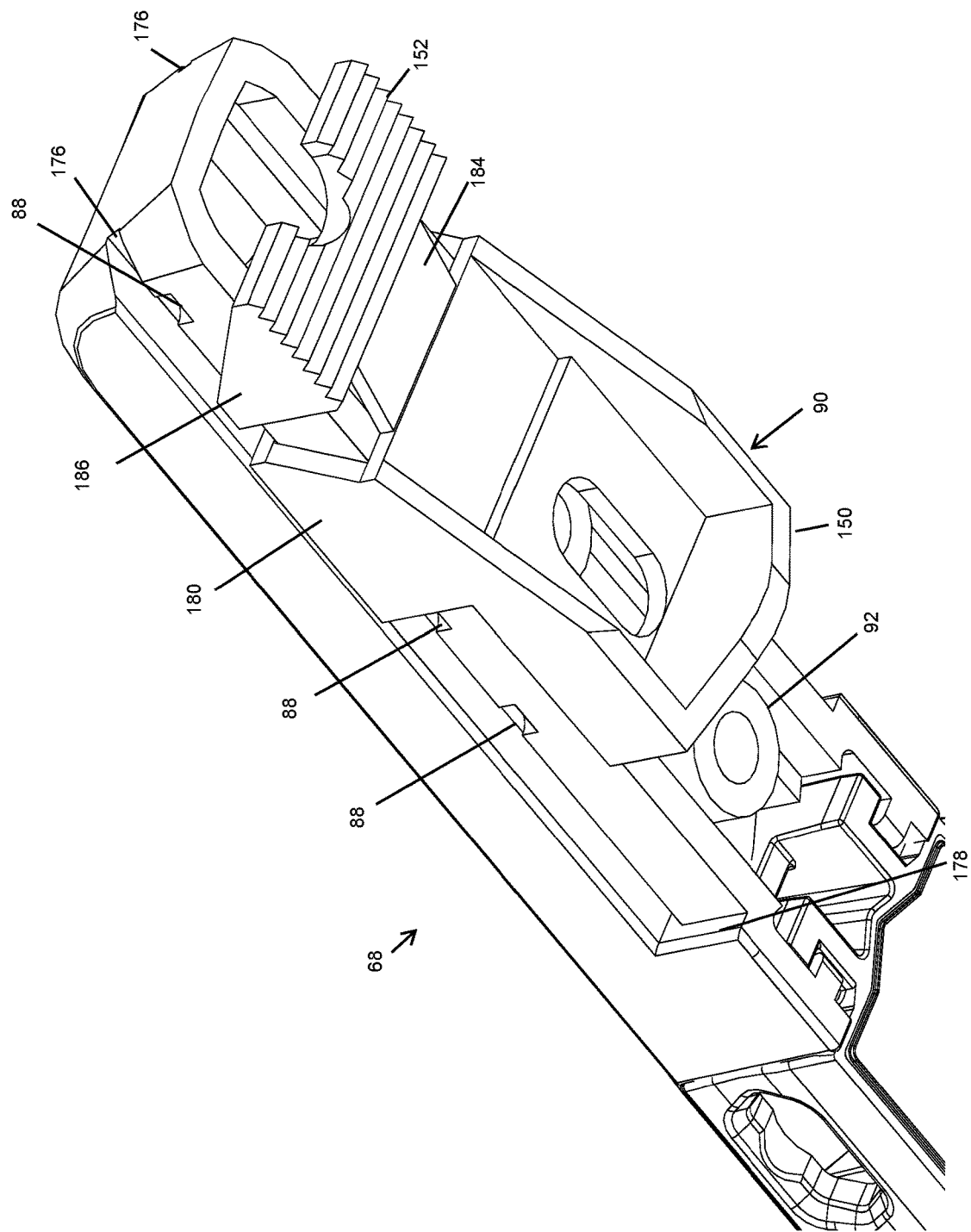
FIG. 42 is a bottom perspective view of the tail section of a mini pocket hole jig system shown in FIG. 39, the view showing the stop feature attached to the bottom side of the tail section and engaged within the groove of the tail section, the view showing the tail section connected to the forward end of the jig segment.
Figure 43:
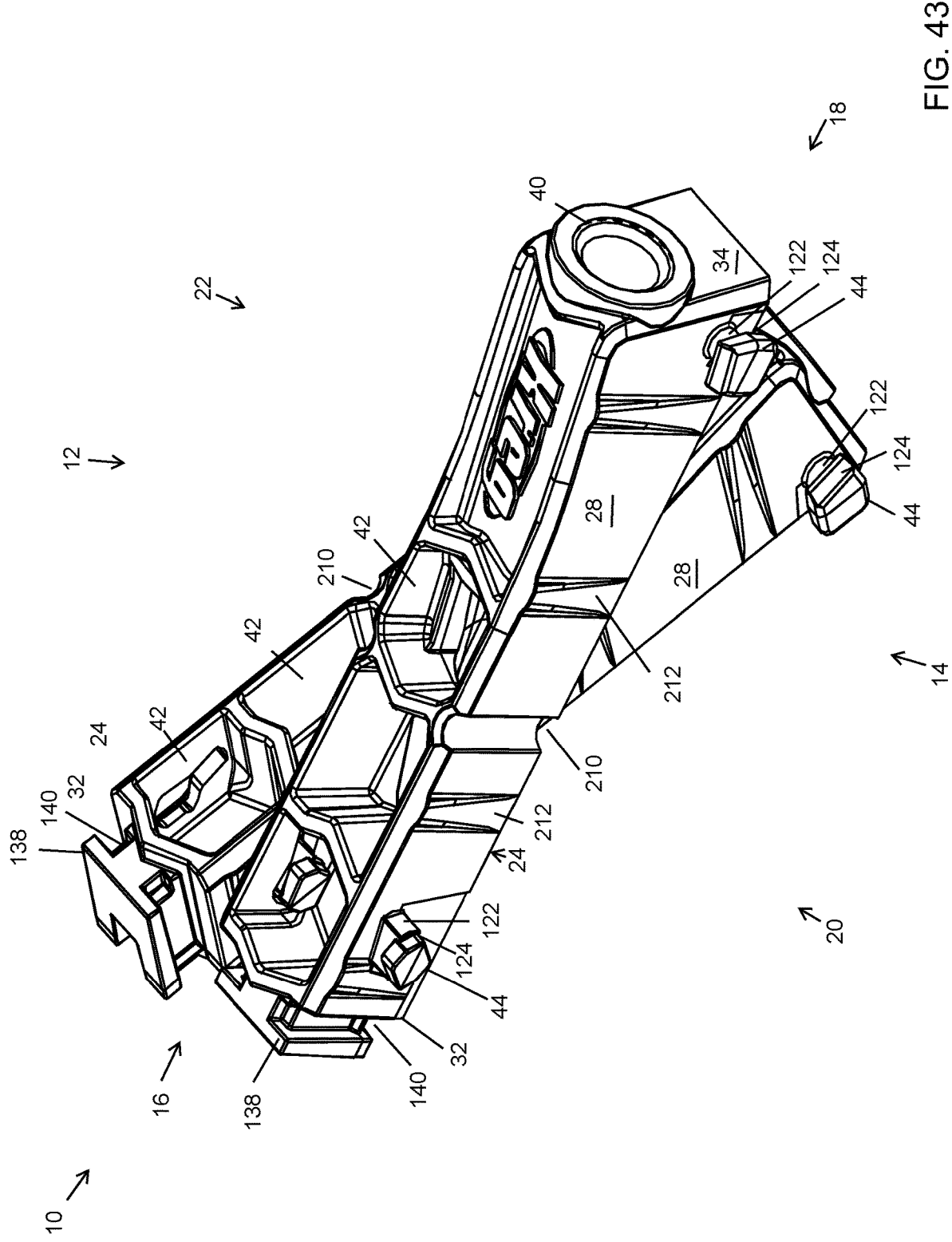
FIG. 43 is a perspective view of another embodiment of a mini pocket hole jig system, the view showing adjacent jig segments that connect to one another with a combination of rotational movement as well as sliding movement, the view showing the jig segments having a lock feature extending outward from the forward end of the jig segment as well as a lock feature extending outward from the rearward end of the jig segment on one side of the jig segment, the view showing a receiver positioned in the forward end of the jig segment as well as a receiver positioned in the rearward end of the jig segment on an opposite side of the jig segment as the lock features, the view showing the adjacent jig segments connected at their forward ends by the insertion of a forward lock feature of one jig segment in the forward receiver of the other jig segment, the view showing the adjacent jig segments rotated at an angle to one another, the view showing semi-circular screw receivers positioned in the side walls of the jig segments at about their middle, the view showing a plurality of vertically extending ramps positioned in the sidewalls that protrude outward slightly from the sidewalls that help to push the adjacent jig segments away from one another when they are slid into a fully locked position, the view showing the forward positioned receiver as a hole in the forward end of the sidewall of the jig segment, the view showing the rearward positioned receiver opening to a slot in the lower surface of the sidewall so as to facilitate insertion of the lock feature when the two jig segments are rotated together.
Figure 44:
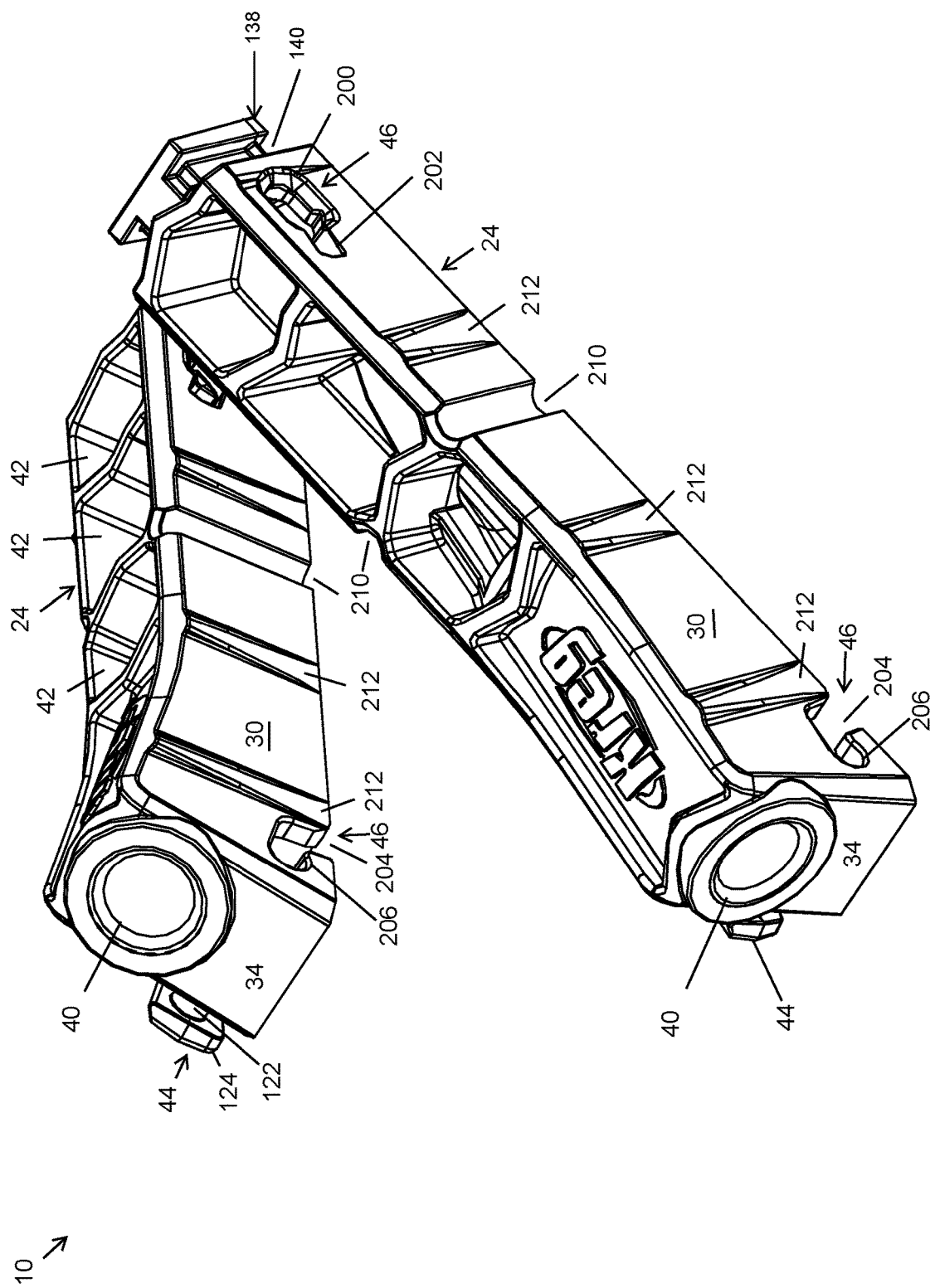
FIG. 44 is another perspective view of the mini pocket hole jig system shown in FIG. 43 the view showing another angle of the mini pocket hole jig system.
Figure 45:
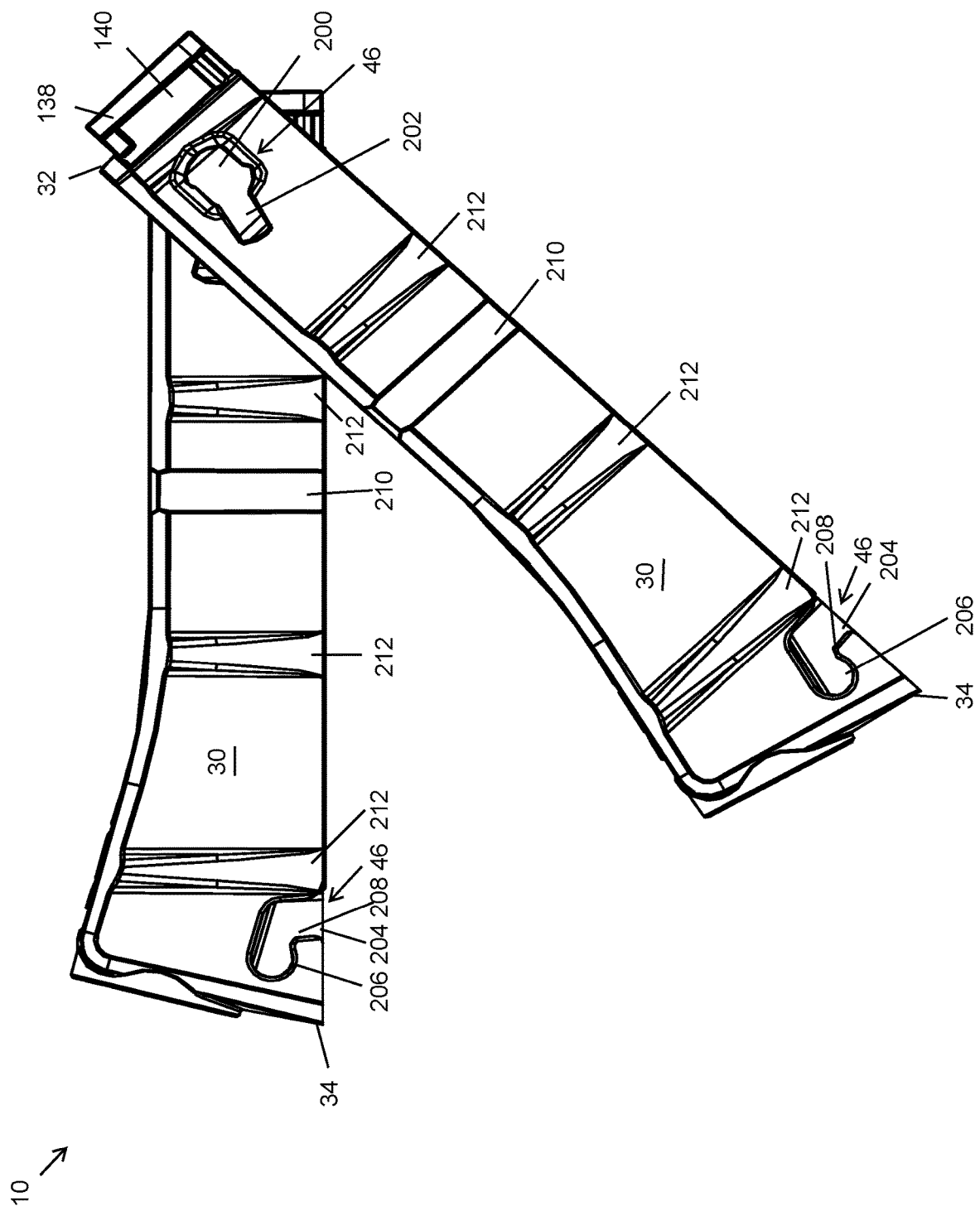
FIG. 45 is a side elevation view of the mini pocket hole jig system shown in FIG. 43.
Figure 46:
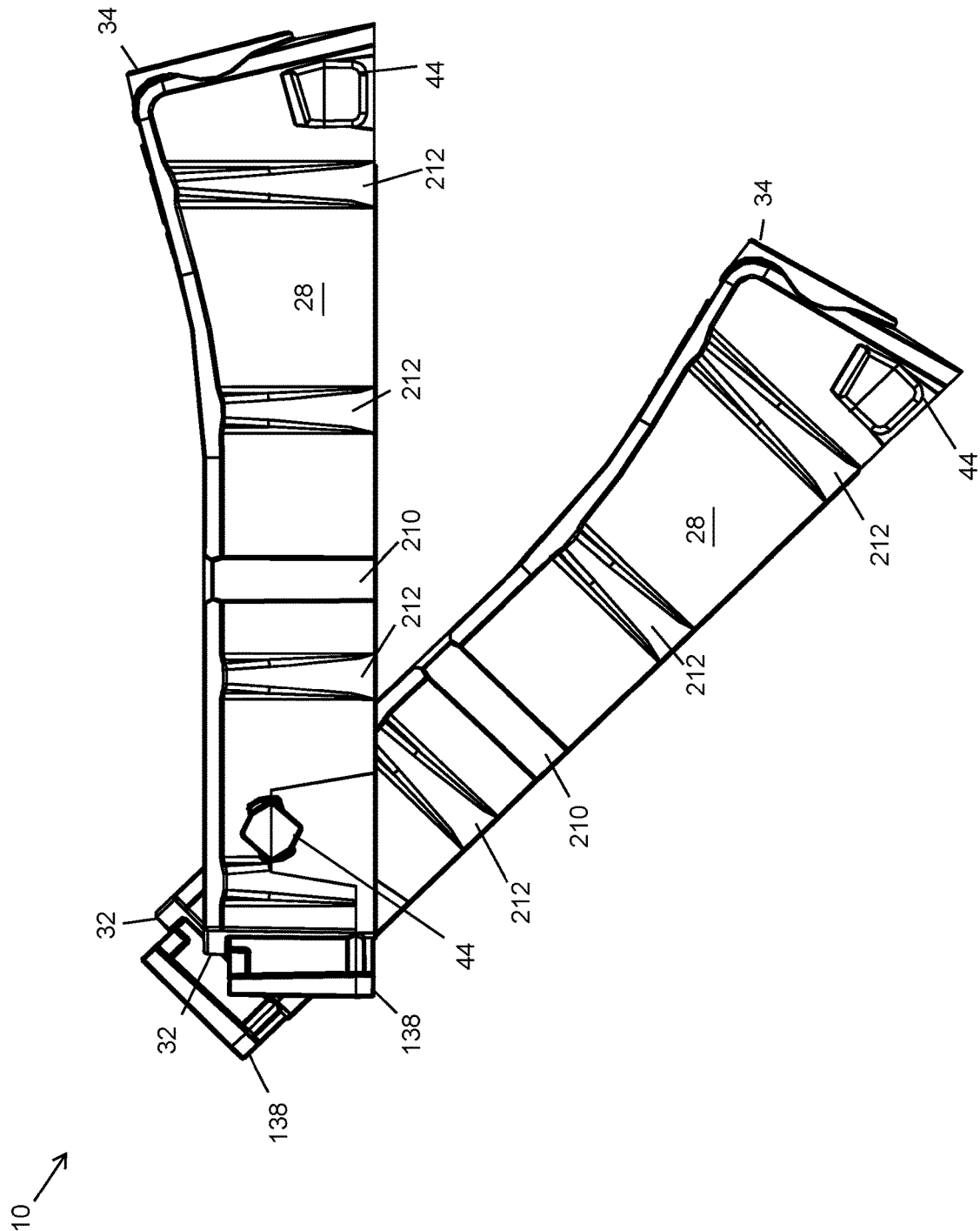
FIG. 46 is another side elevation view of the mini pocket hole jig system shown in FIG. 43.
Figure 47:
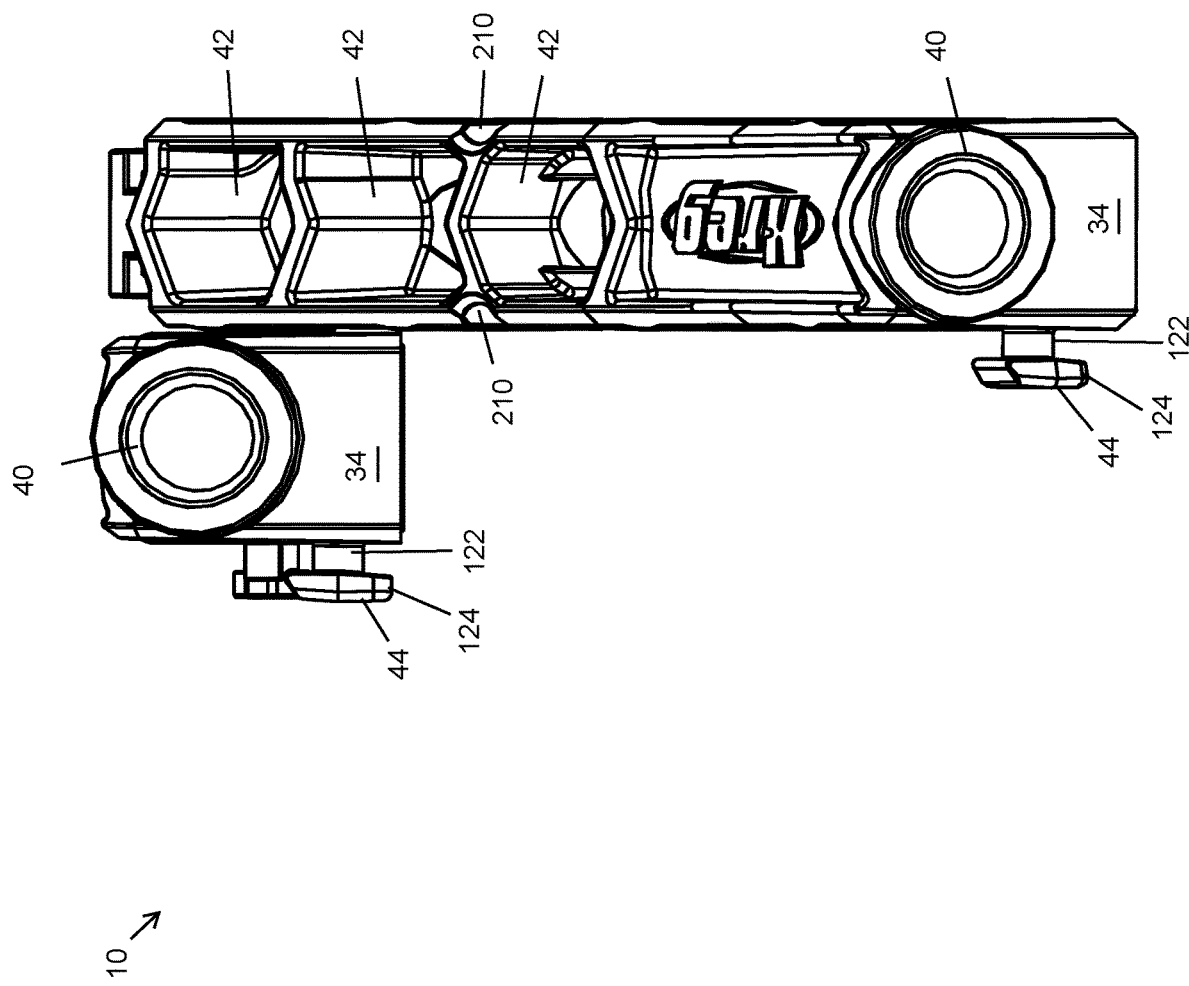
FIG. 47 is a rear elevation view of the mini pocket hole jig system shown in FIG. 43.
Figure 48:
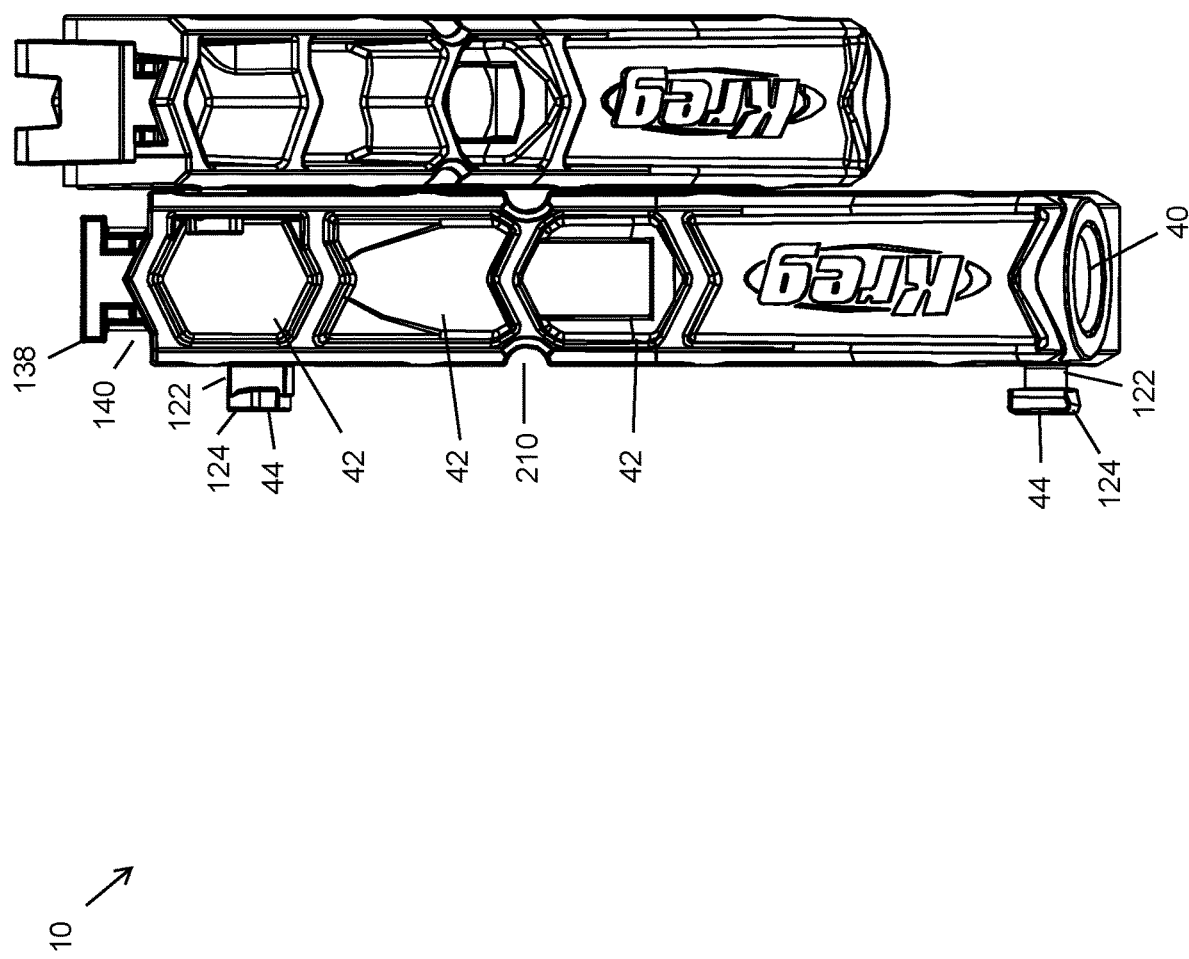
FIG. 48 is a top elevation view of the mini pocket hole jig system shown in FIG. 43
Figure 49:
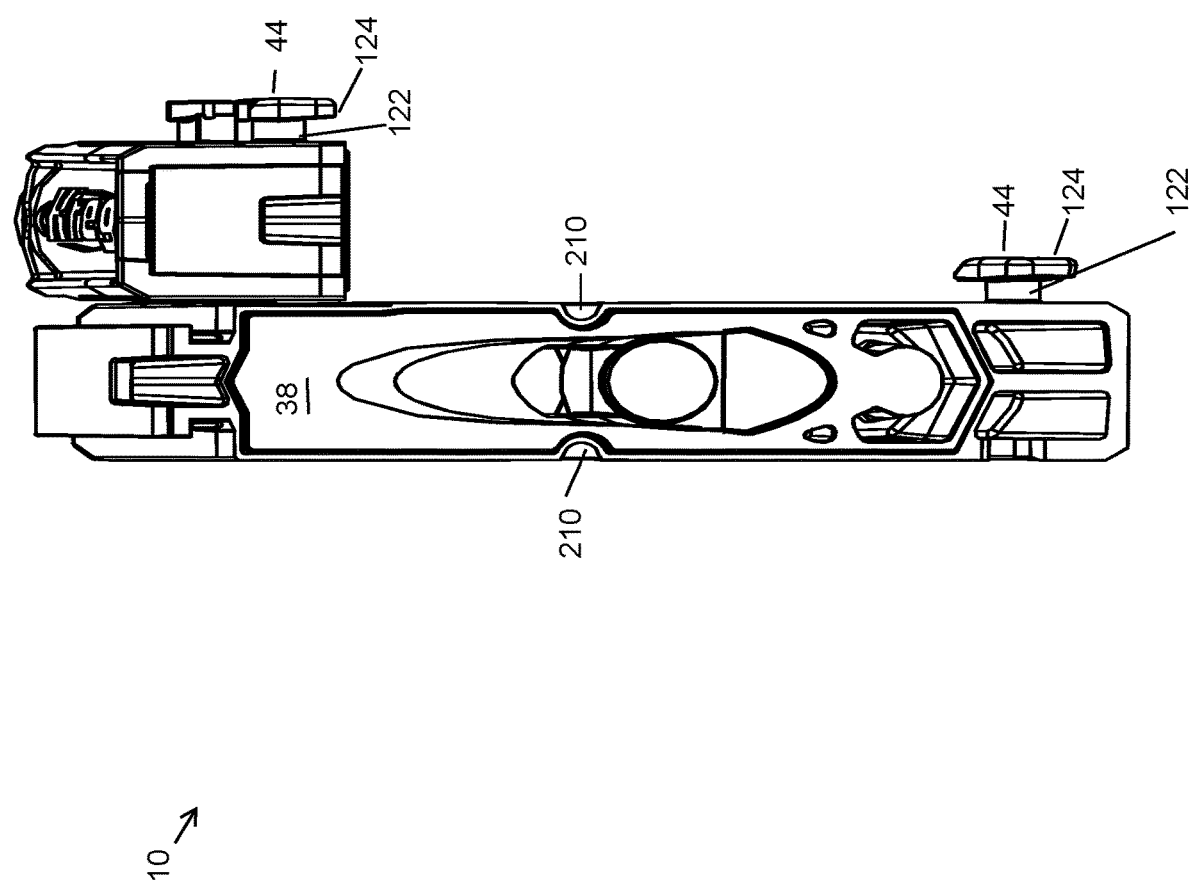
FIG. 49 is a bottom elevation view of the mini pocket hole jig system shown in FIG. 43.
Figure 50:
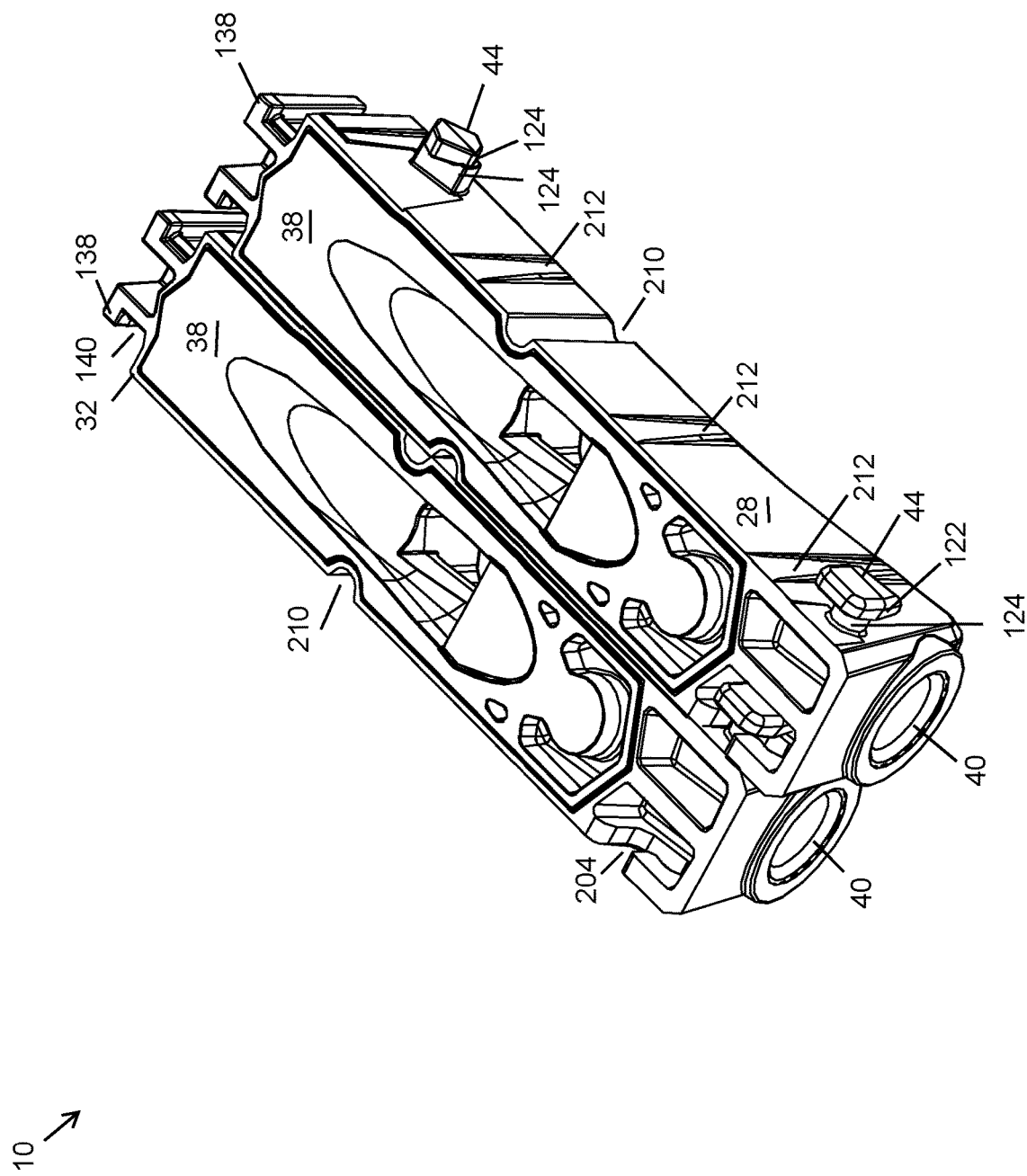
FIG. 50 is a bottom perspective view of the mini pocket hole jig system shown in FIG. 43, the view showing the two jig segments rotated into a parallel alignment with one another, the view showing the rearward lock feature of one of the jig segments positioned within the rearward receiver of the other jig segment, the view showing the two jig segments staggered with respect to one another, or said another way, the view showing the two jig segments laterally offset from one another.
Figure 51:
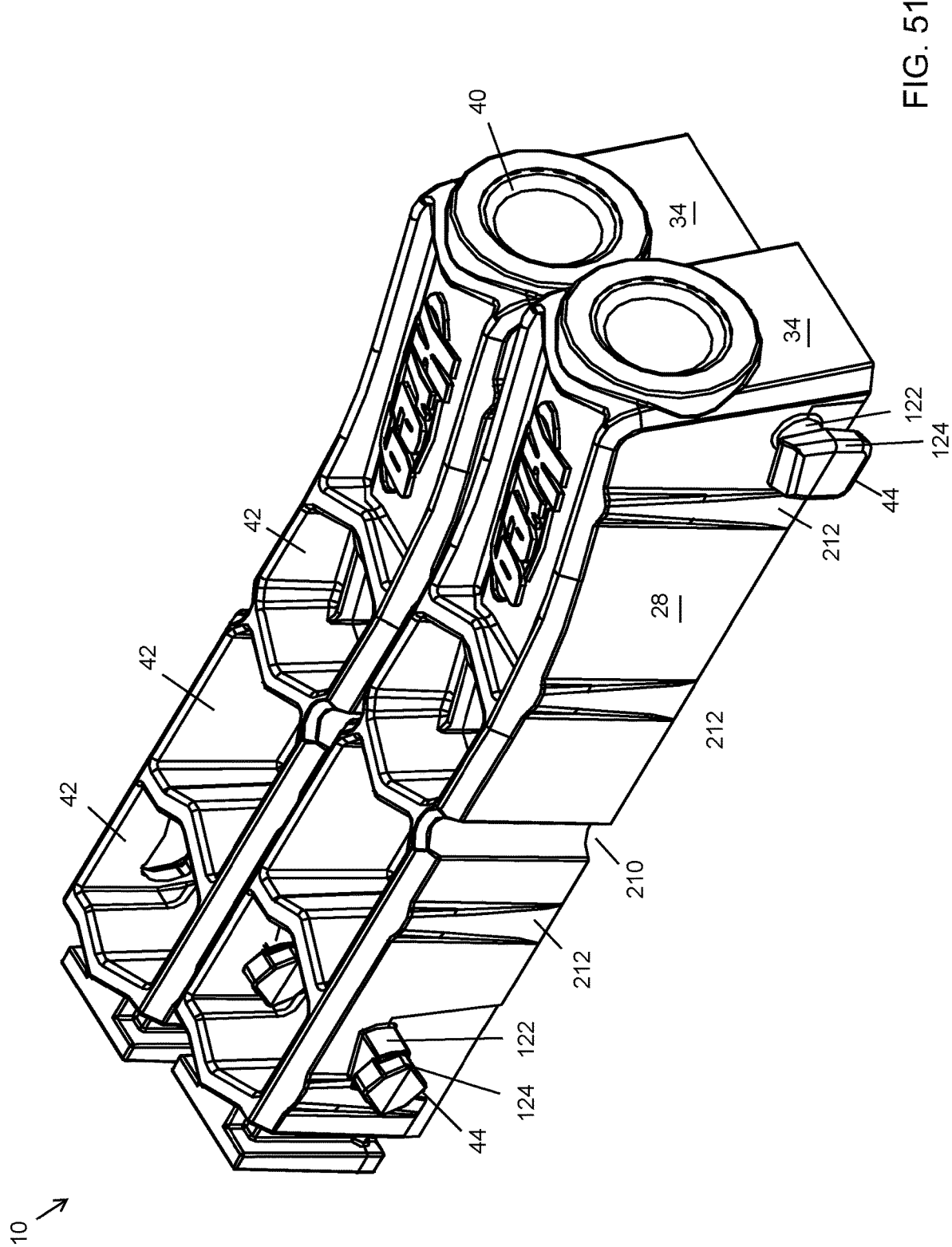
FIG. 51 is a top perspective view of the mini pocket hole jig system shown in FIG. 43 in the parallel aligned arrangement but laterally offset alignment shown in FIG. 50.
Figure 52:
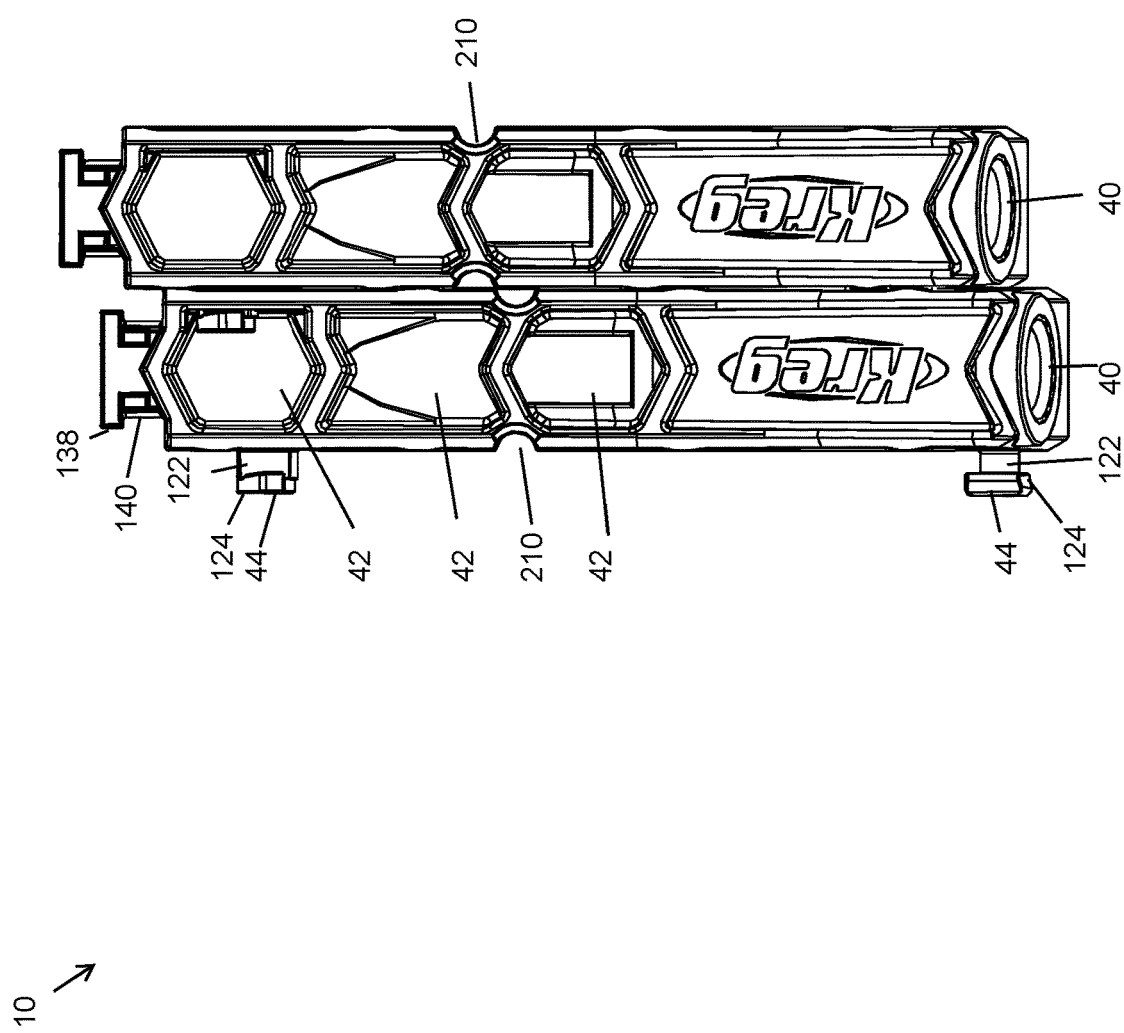
FIG. 52 is a top elevation view of the mini pocket hole jig system shown in FIG. 43 in the parallel aligned arrangement but laterally offset alignment shown in FIG. 50.
Figure 53:
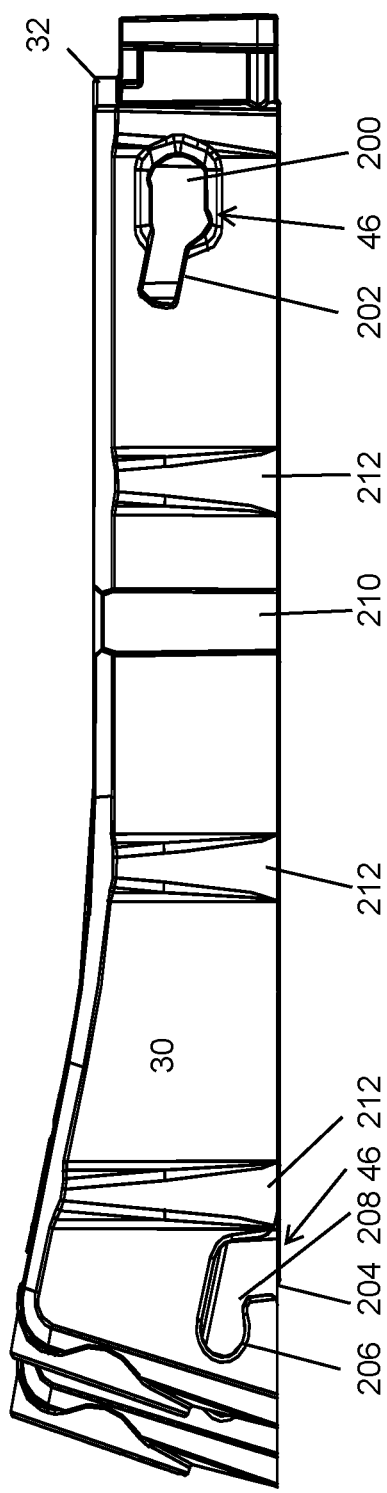
FIG. 53 is a side elevation view of the mini pocket hole jig system shown in FIG. 43 in the parallel aligned arrangement but laterally offset alignment shown in FIG. 50.
Figure 54:
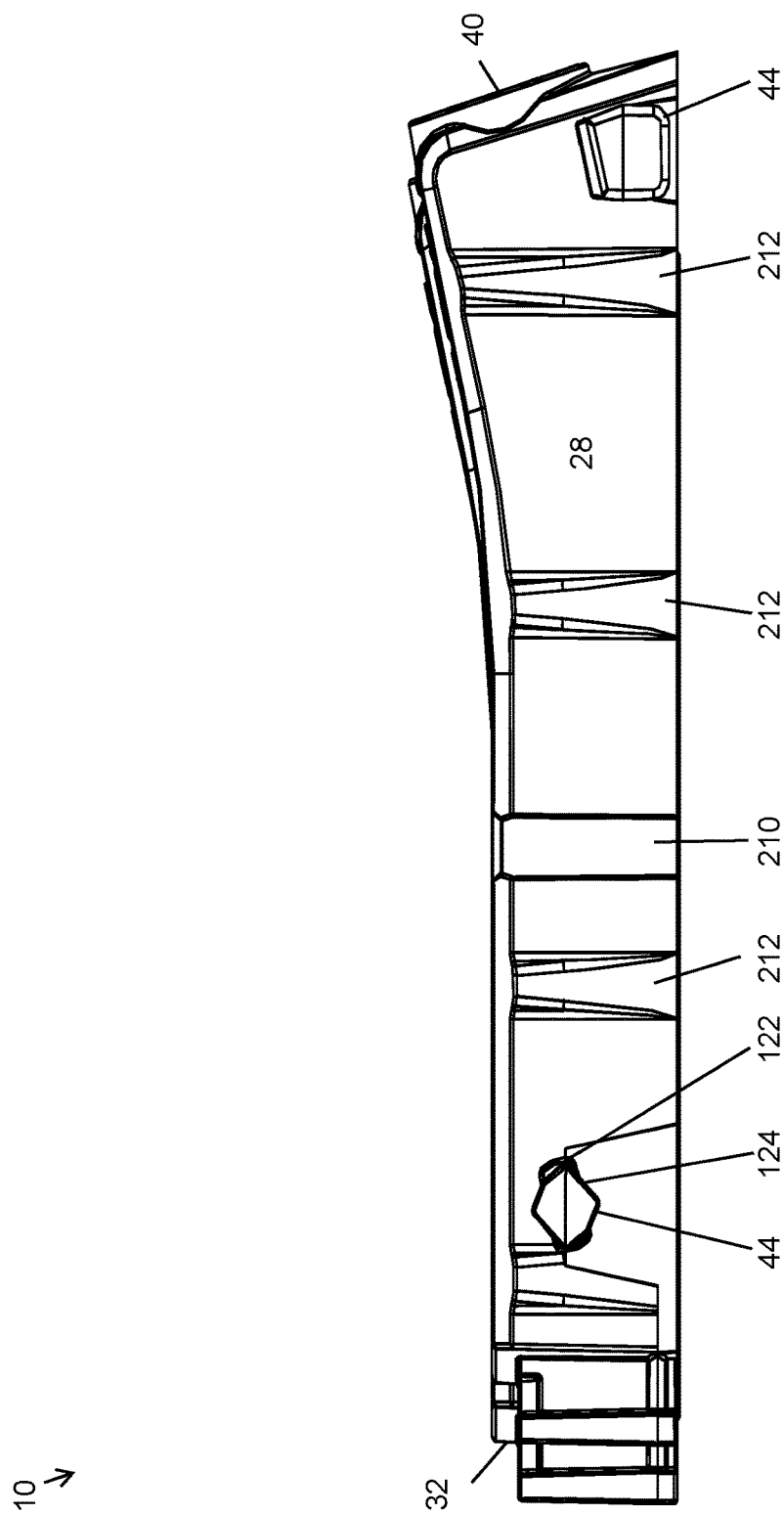
FIG. 54 is another side elevation view of the mini pocket hole jig system shown in FIG. 43 in the parallel aligned arrangement but laterally offset alignment shown in FIG. 50.
Figure 55:
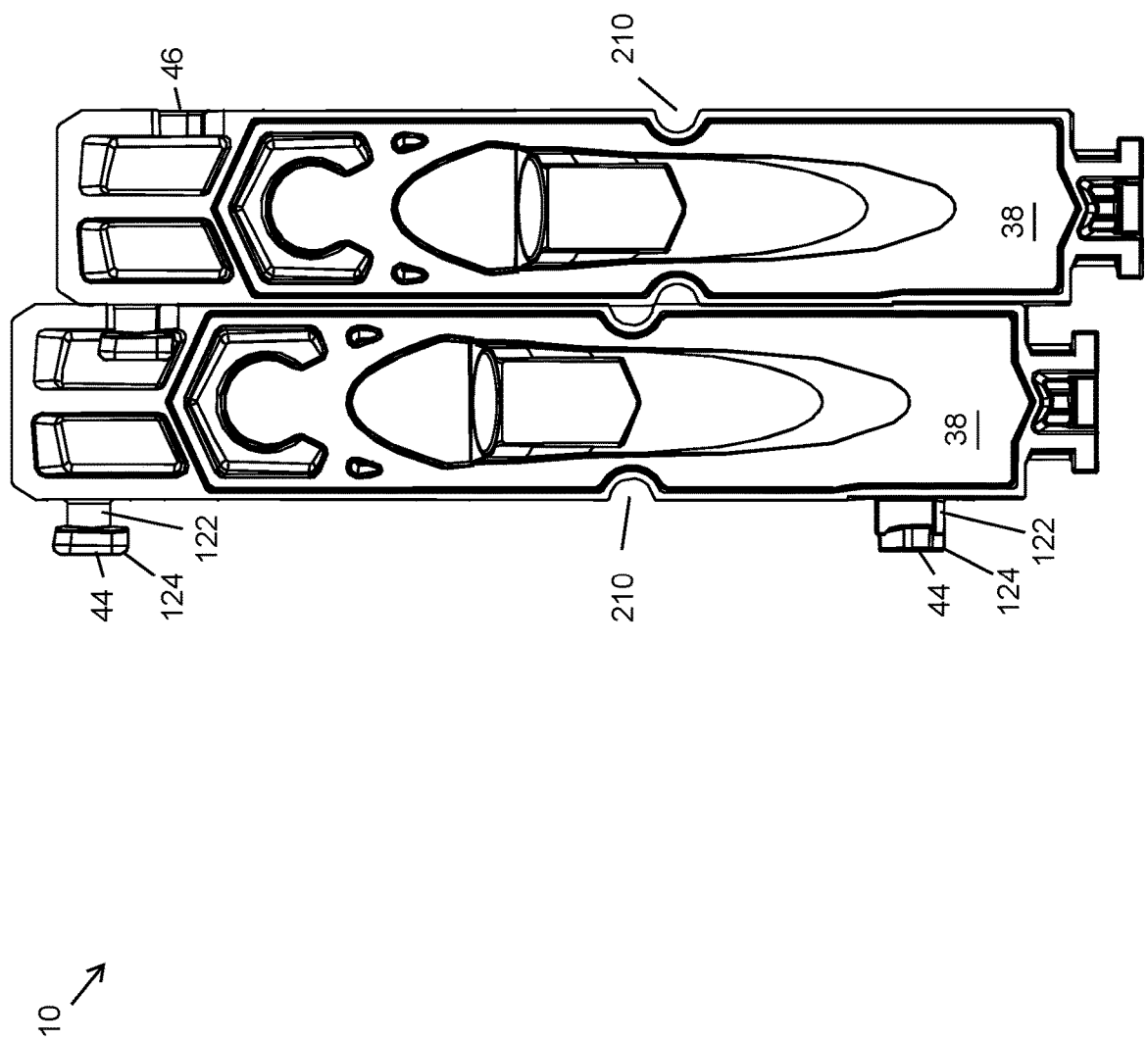
FIG. 55 is a bottom elevation view of the mini pocket hole jig system shown in FIG. 43 in the parallel aligned arrangement but laterally offset alignment shown in FIG. 50
Figure 56:
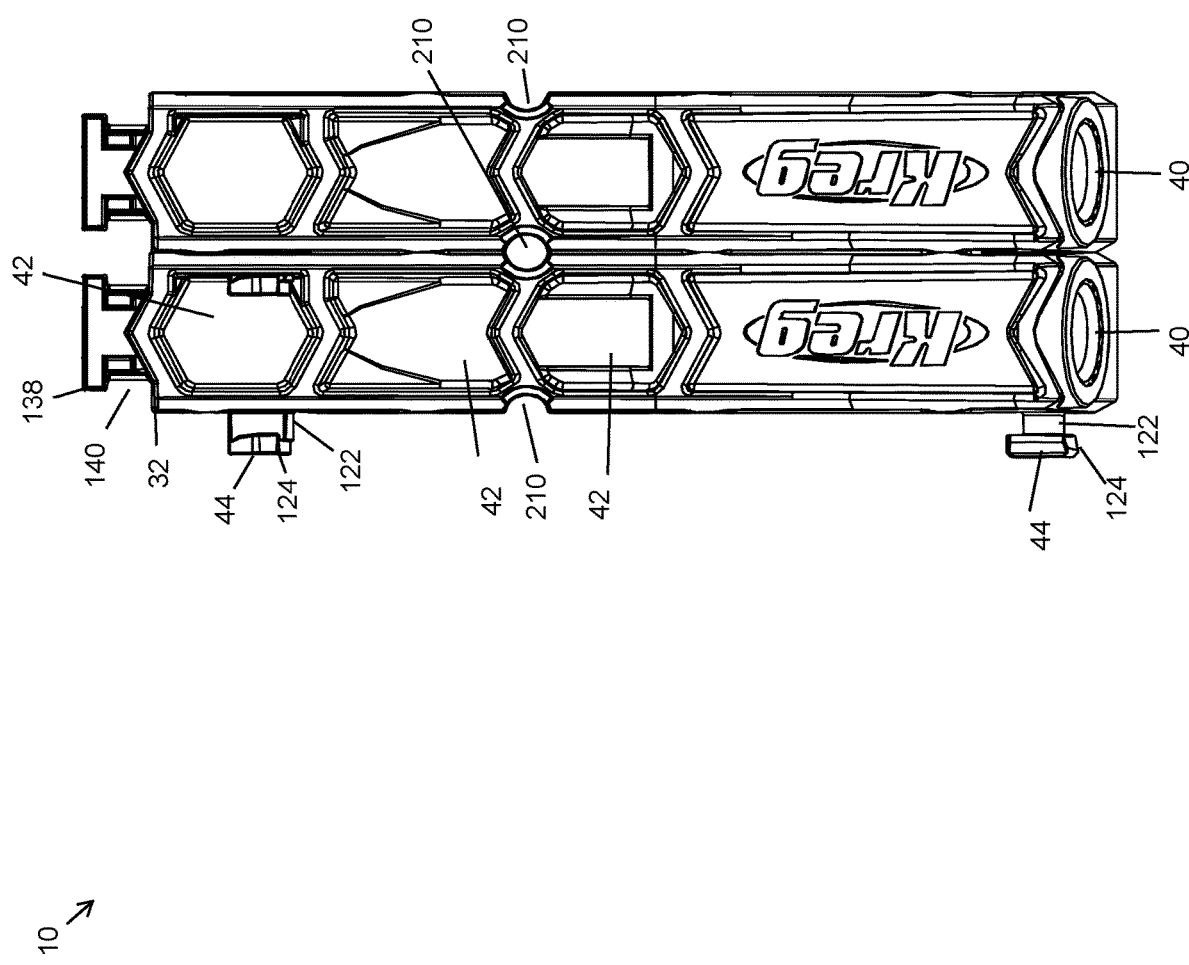
FIG. 56 is a top elevation view of the mini pocket hole jig system shown in FIG. 43 in the parallel aligned and laterally aligned arrangement after the two jig segments have rotated with respect to one another as well as after the two jig segments have been laterally slid with respect to one another into a fully locked position.
Figure 57:
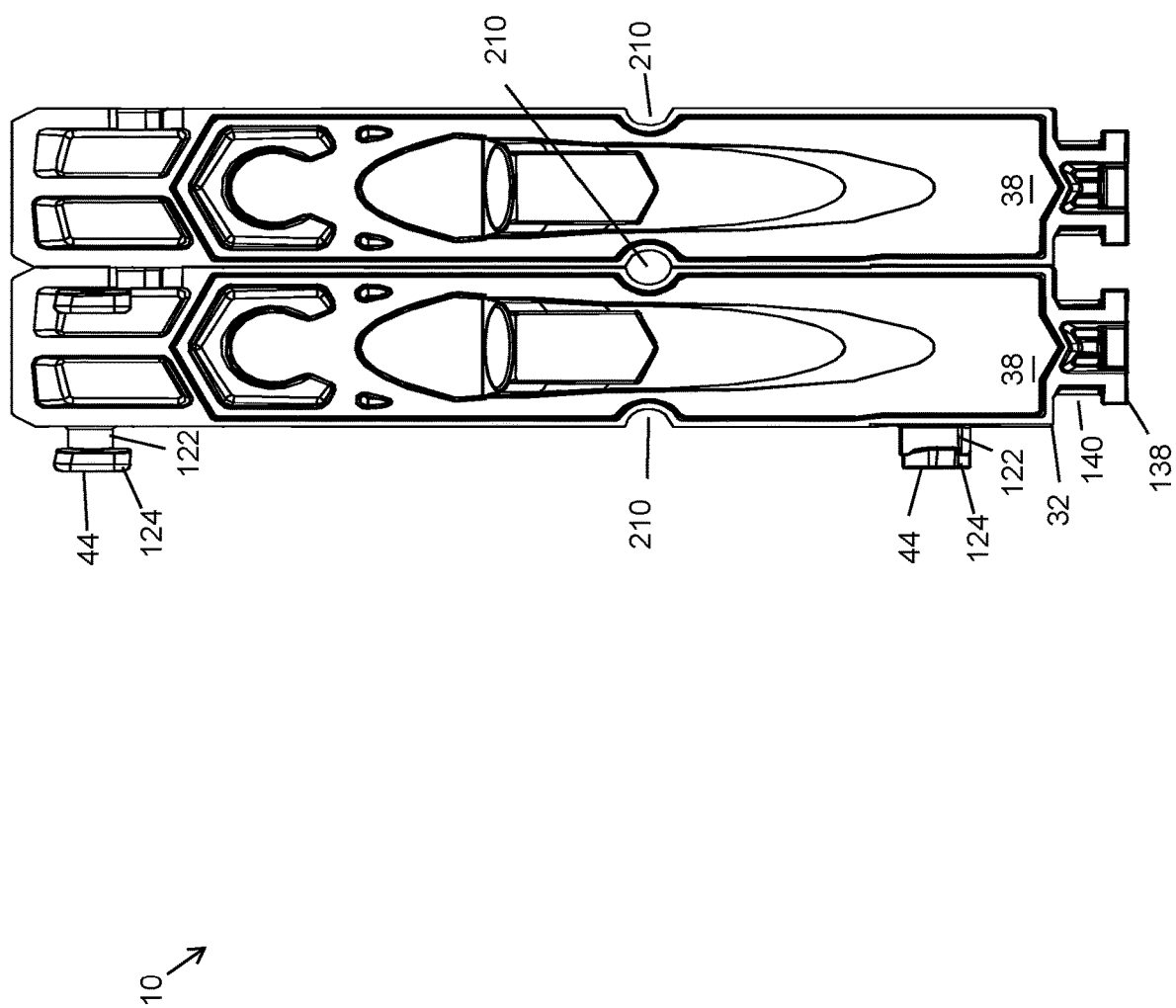
FIG. 57 is a bottom elevation view of the mini pocket hole jig system shown in FIG. 43 in the parallel aligned and laterally aligned arrangement shown in FIG. 56.
Figure 58:
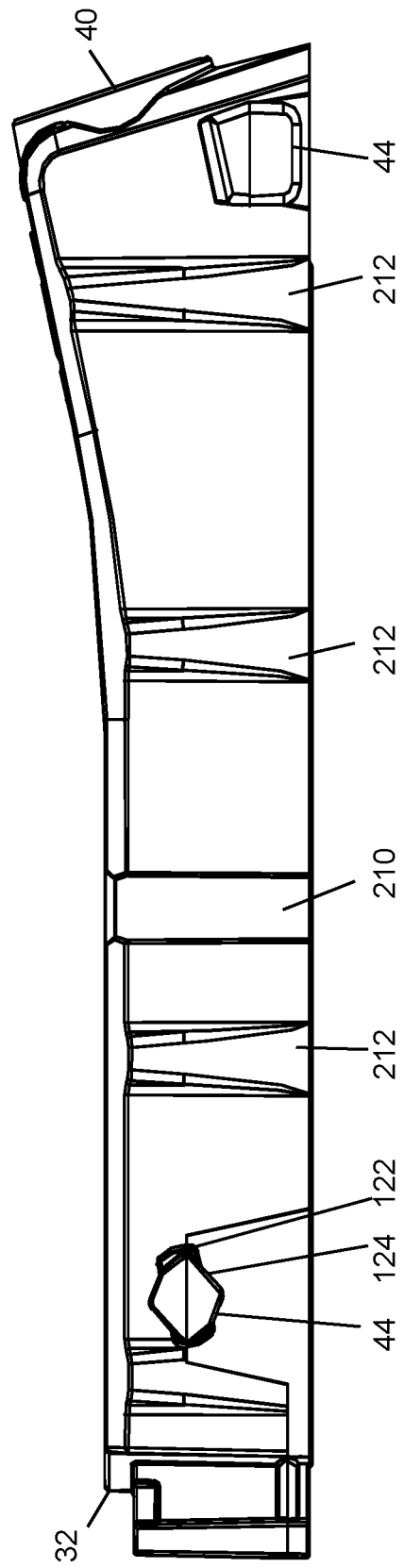
FIG. 58 is a side elevation view of the mini pocket hole jig system shown in FIG. 43 in the parallel aligned and laterally aligned arrangement shown in FIG. 56.
Figure 59:
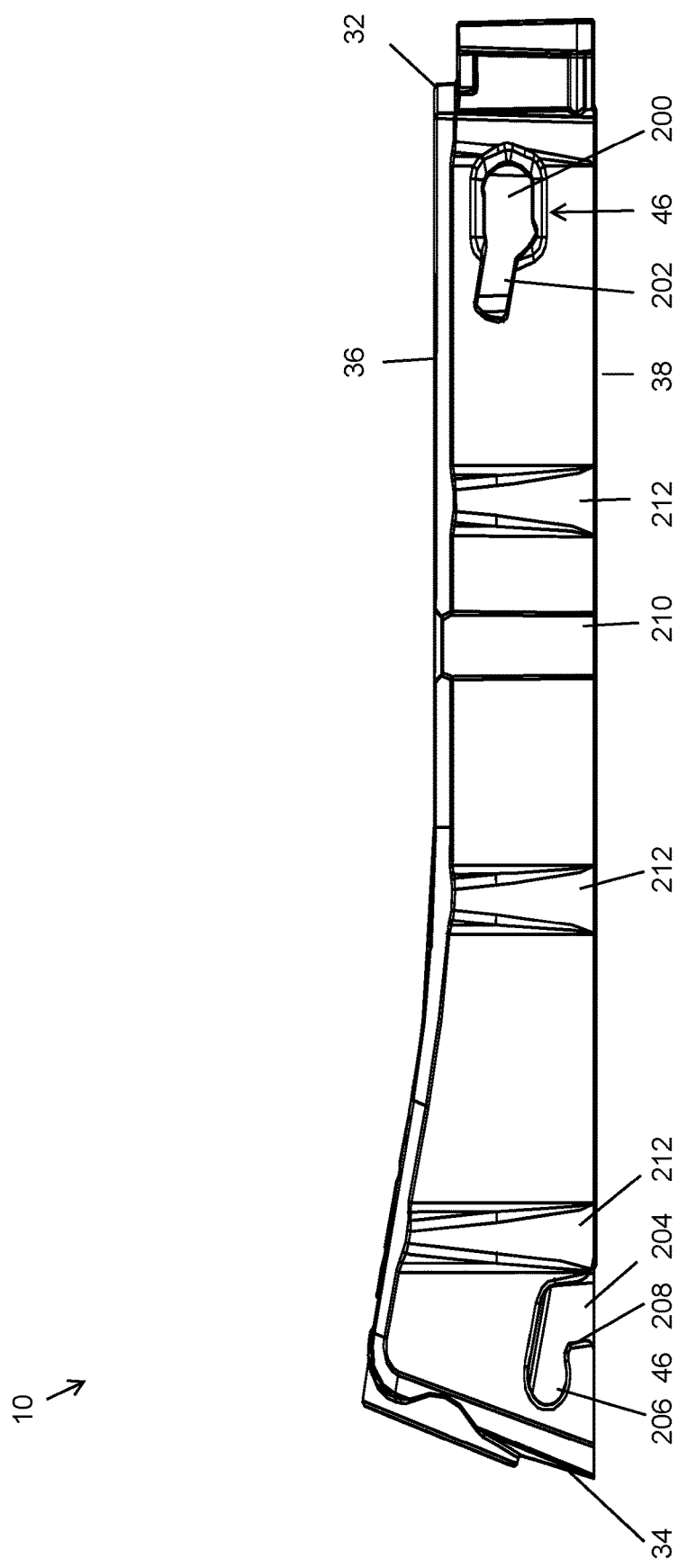
FIG. 59 is another side elevation view of the mini pocket hole jig system shown in FIG. 43 in the parallel aligned and laterally aligned arrangement shown in FIG. 56.
Figure 60:
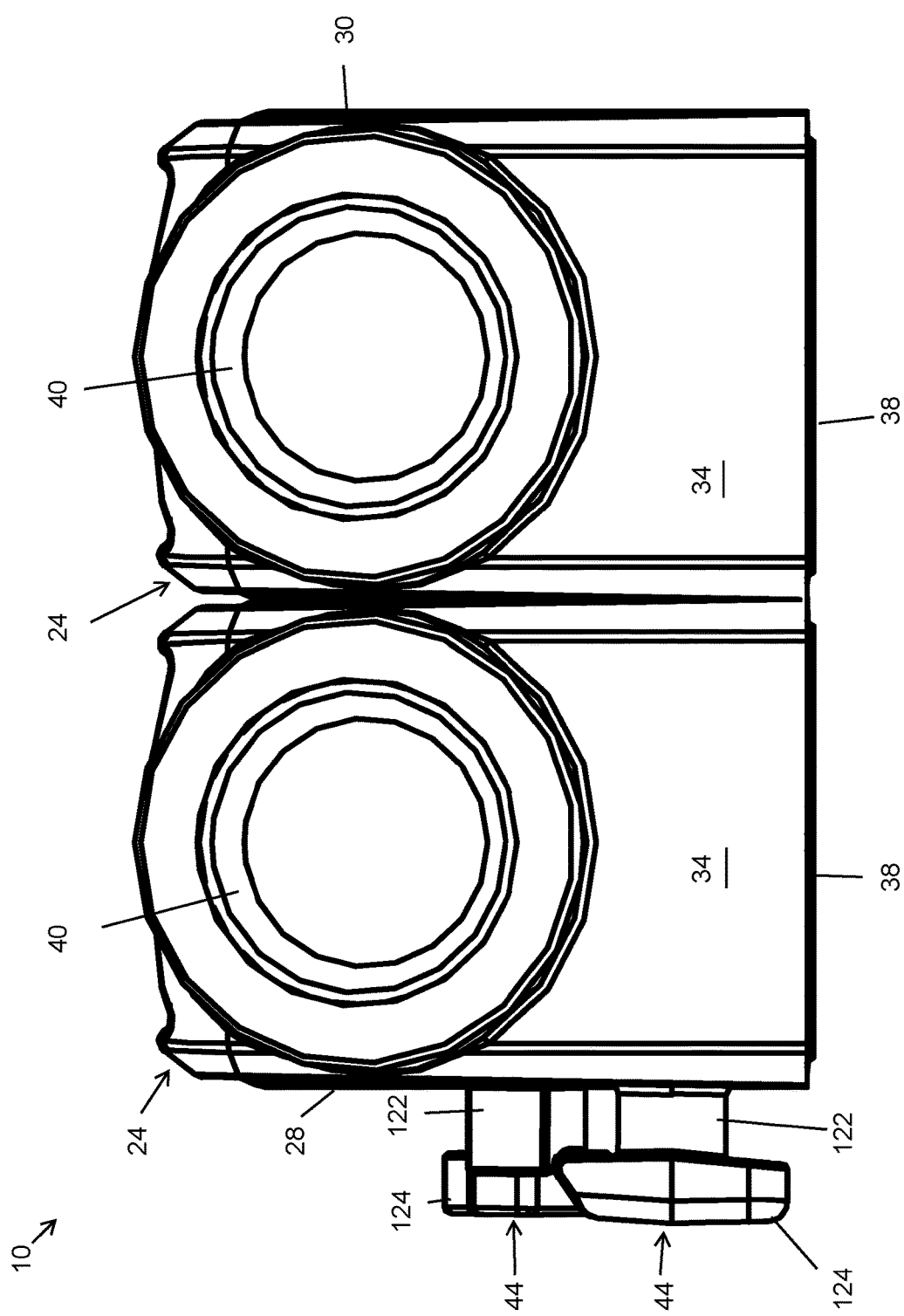
FIG. 60 is a rear elevation view of the mini pocket hole jig system shown in FIG. 43 in the parallel aligned and laterally aligned arrangement shown in FIG. 56.
Figure 61:
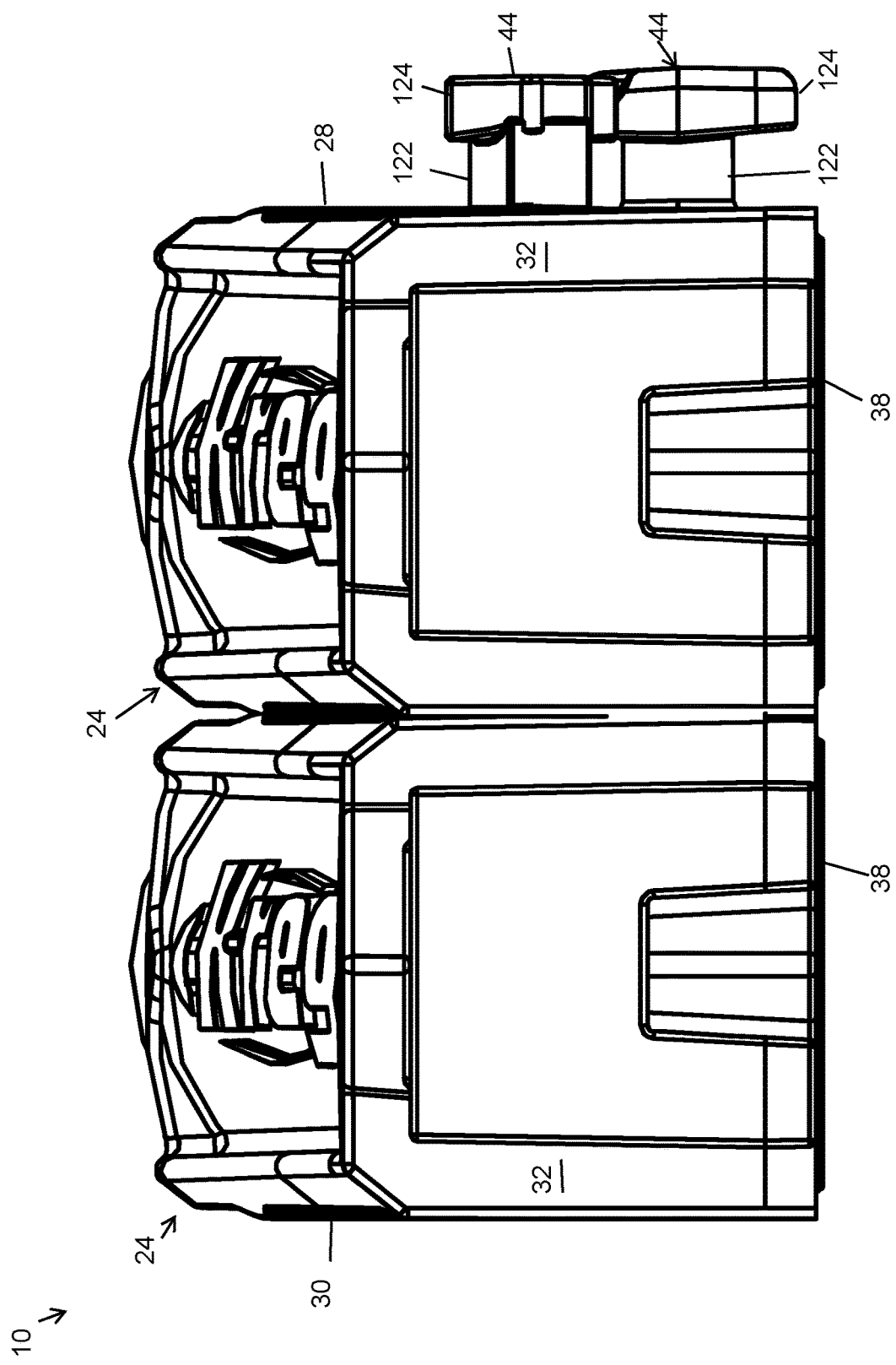
FIG. 61 is a front elevation view of the mini pocket hole jig system shown in FIG. 43 in the parallel aligned and laterally aligned arrangement shown in FIG. 56.
Figure 62:
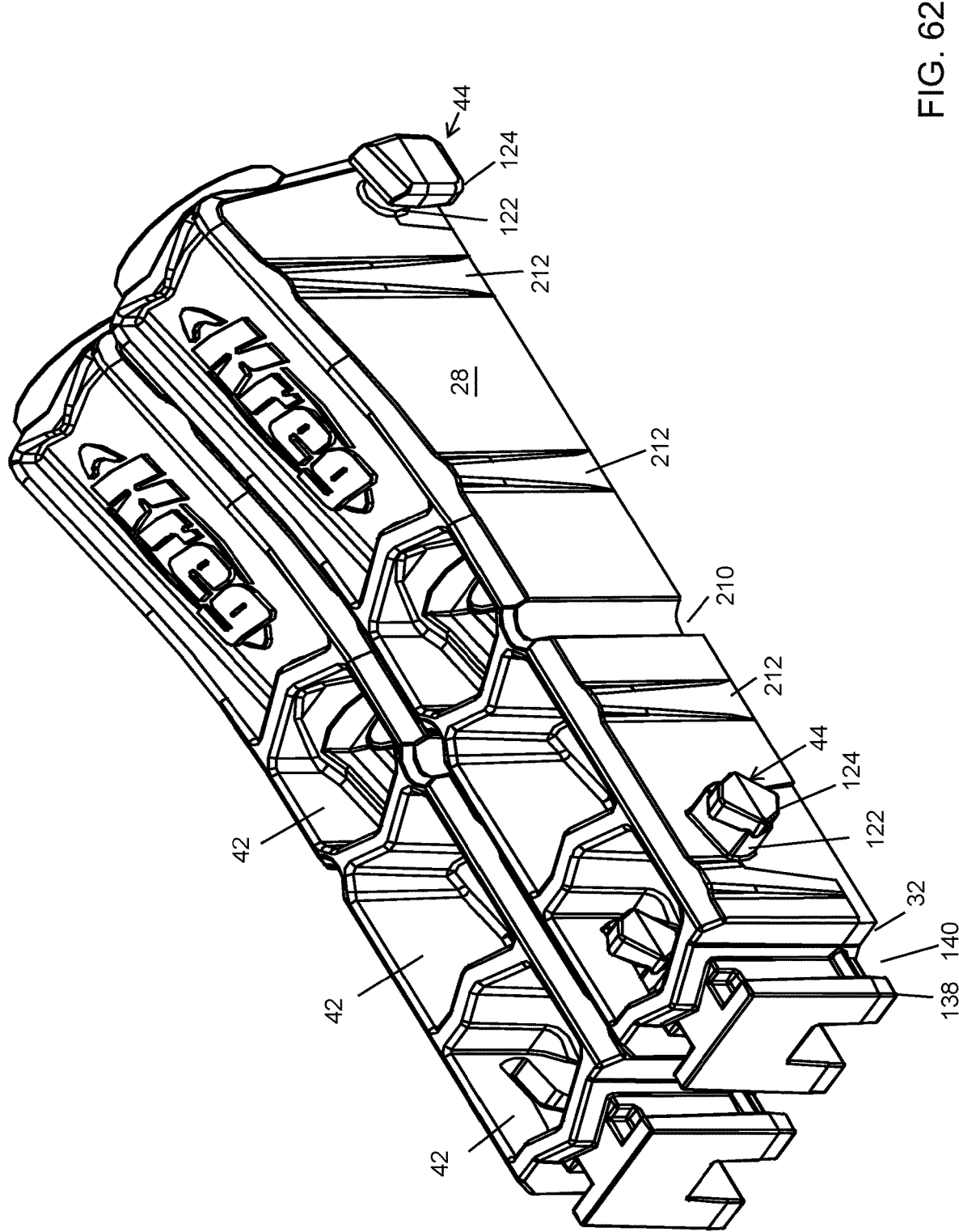
FIG. 62 is a perspective view of the mini pocket hole jig system shown in FIG. 43 in the parallel aligned and laterally aligned arrangement shown in FIG. 56.
Figure 63:
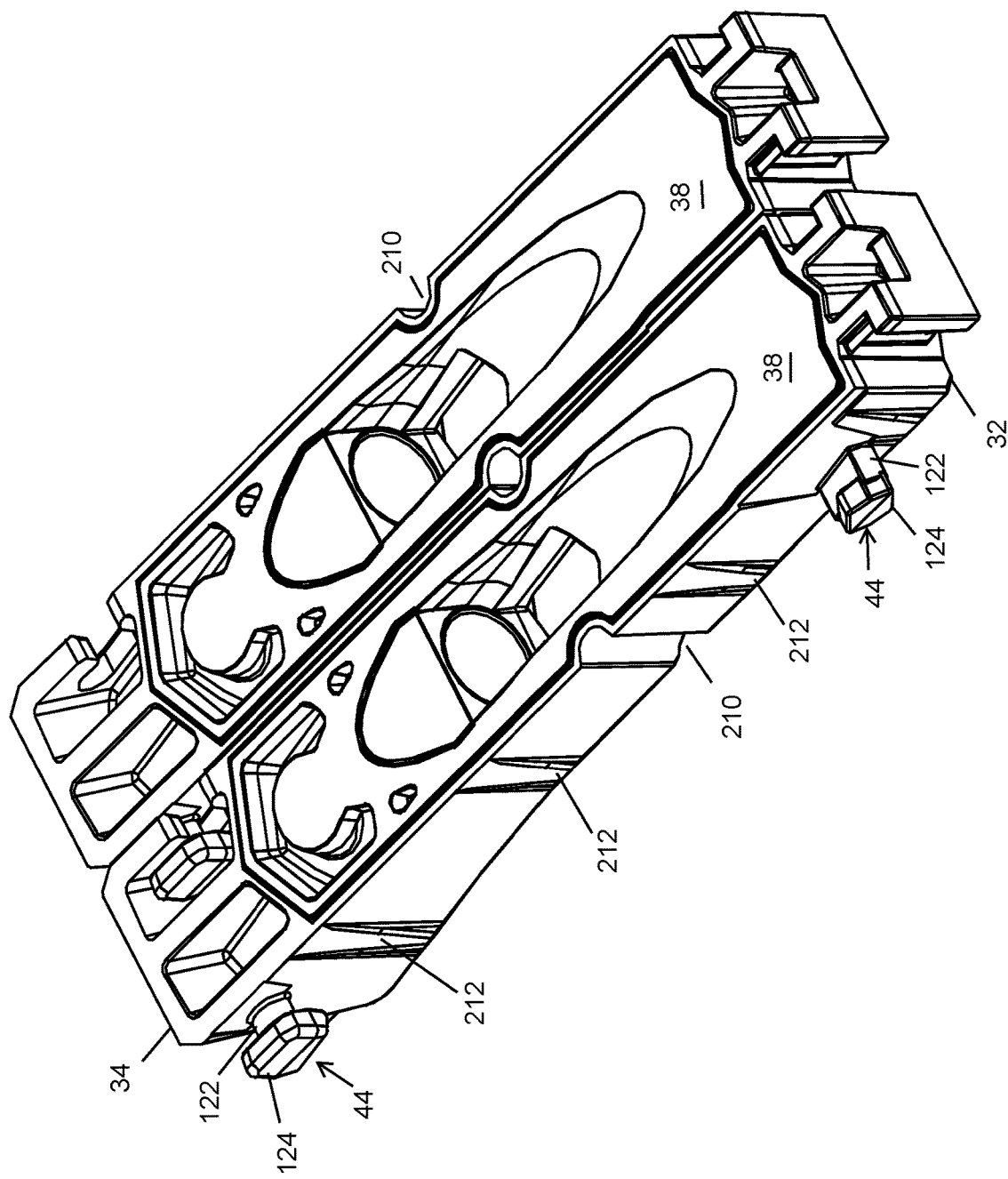
FIG. 63 is a bottom perspective view of the mini pocket hole jig system shown in FIG. 43 in the parallel aligned and laterally aligned arrangement shown in FIG. 56.
Figure 64:
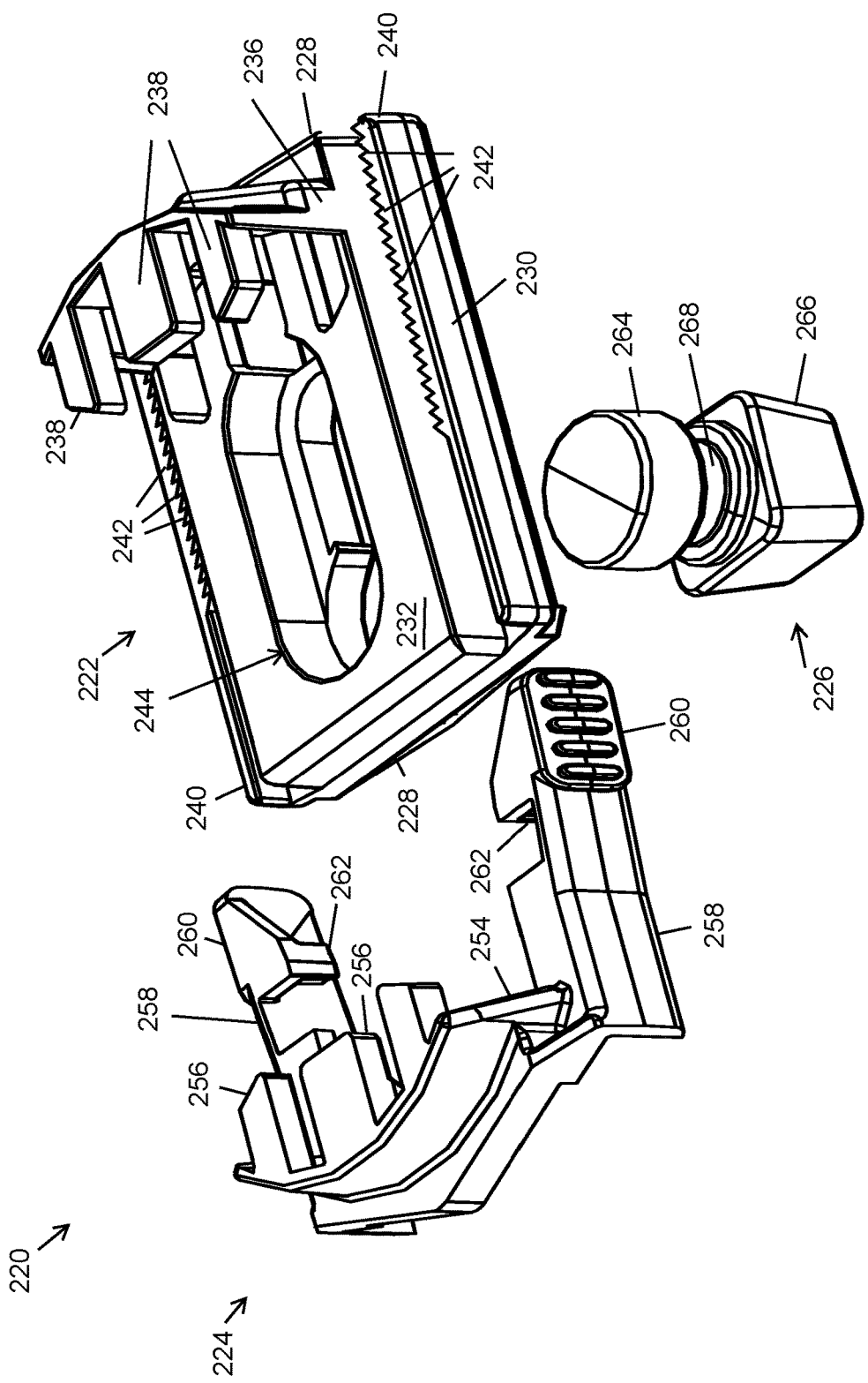
FIG. 64 is a perspective exploded view of a clamp pad attachment mechanism for use with the mini pocket hole jig system presented herein, the view showing the base exploded from adjustment member, the view showing the connector exploded from the base.
Figure 65:
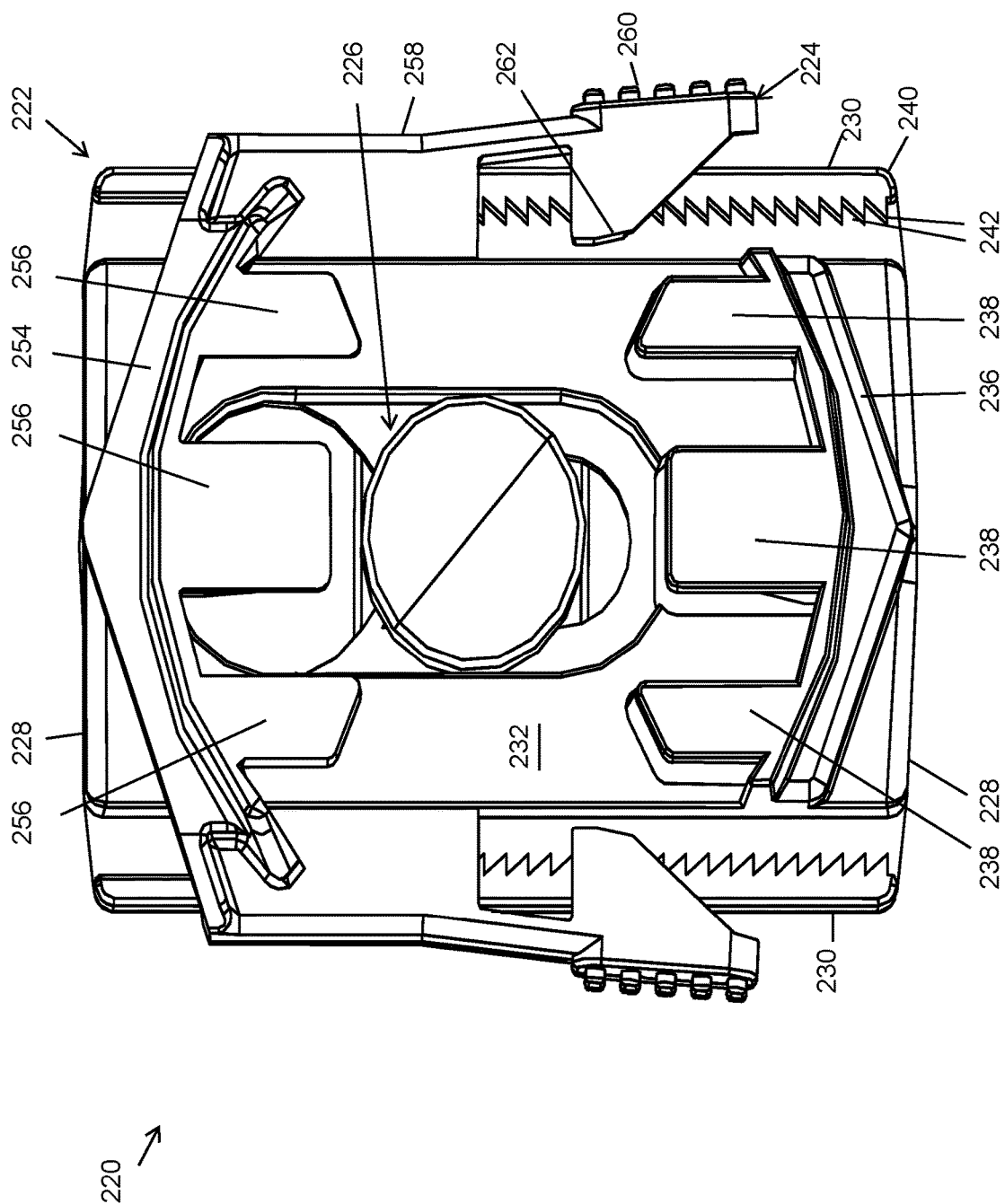
FIG. 65 is a top elevation view of the clamp pad attachment mechanism shown in FIG. 64, the view showing the connector connected to the base, the view showing the adjustment member connected to the base.
Figure 66:
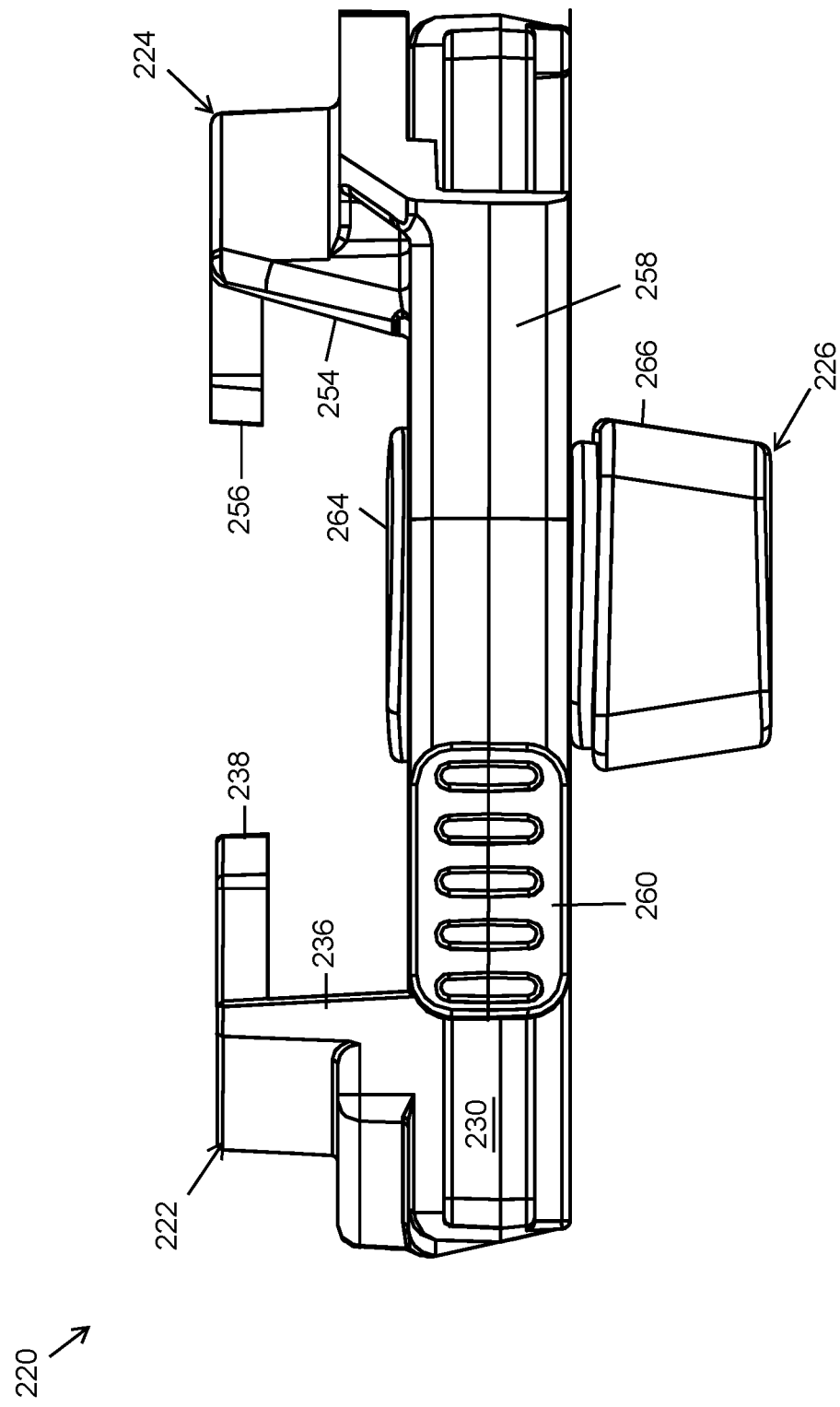
FIG. 66 is a side elevation view of the clamp pad attachment mechanism shown in FIG. 64.
Figure 67:
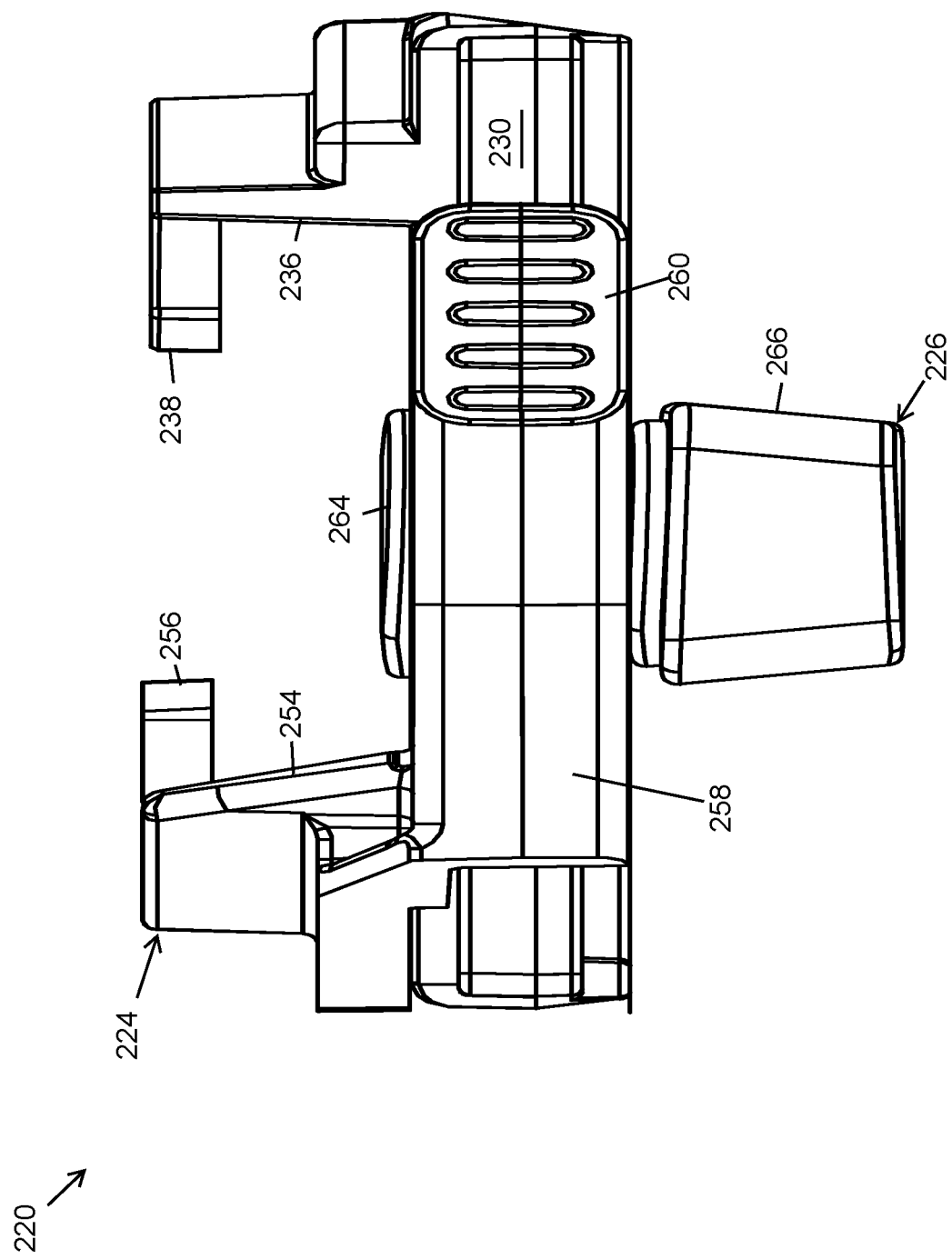
FIG. 67 is another side elevation view of the clamp pad attachment mechanism shown in FIG. 64.
Figure 68:
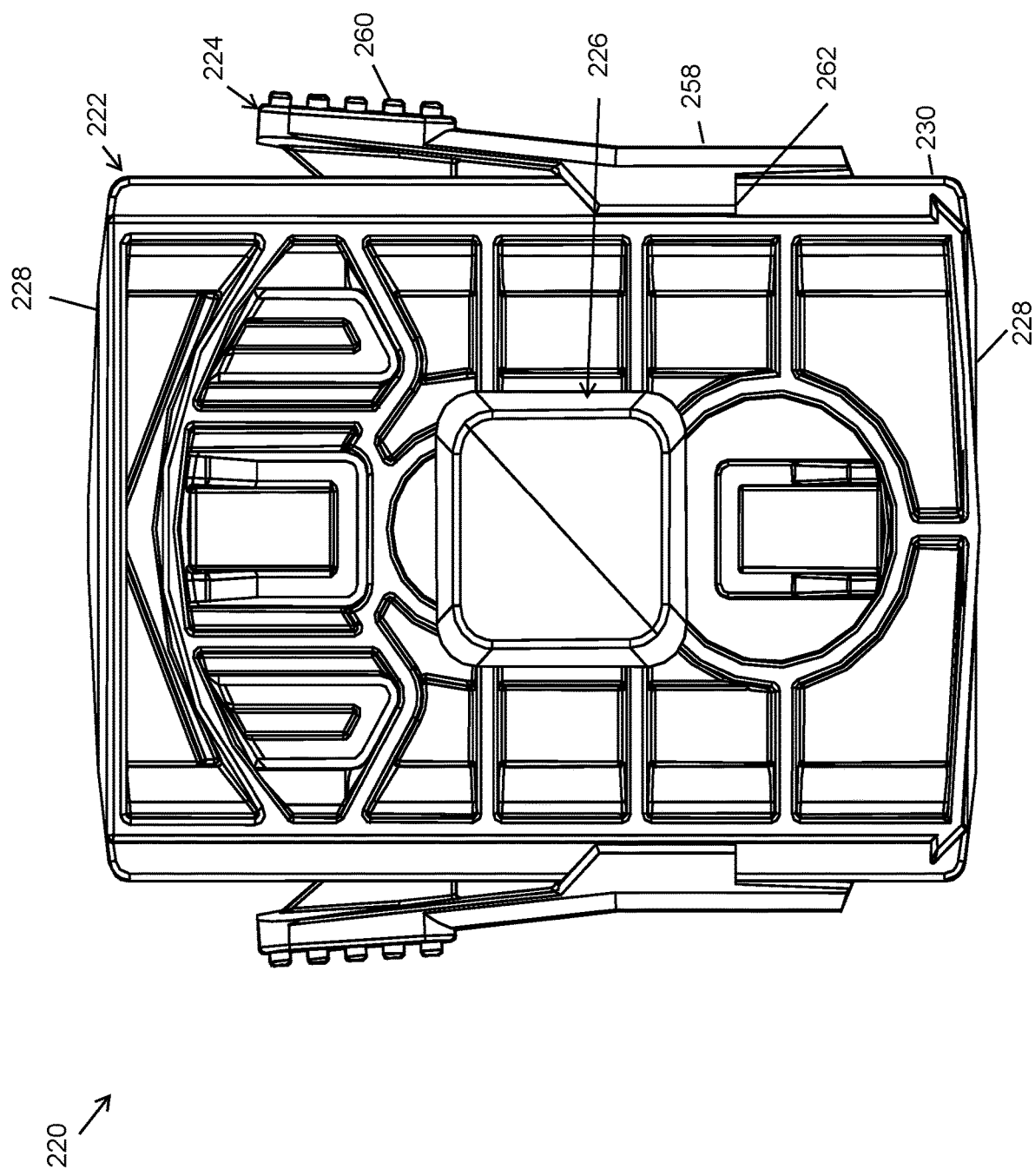
FIG. 68 is a bottom elevation view of the clamp pad attachment mechanism shown in FIG. 64.
Figure 69:
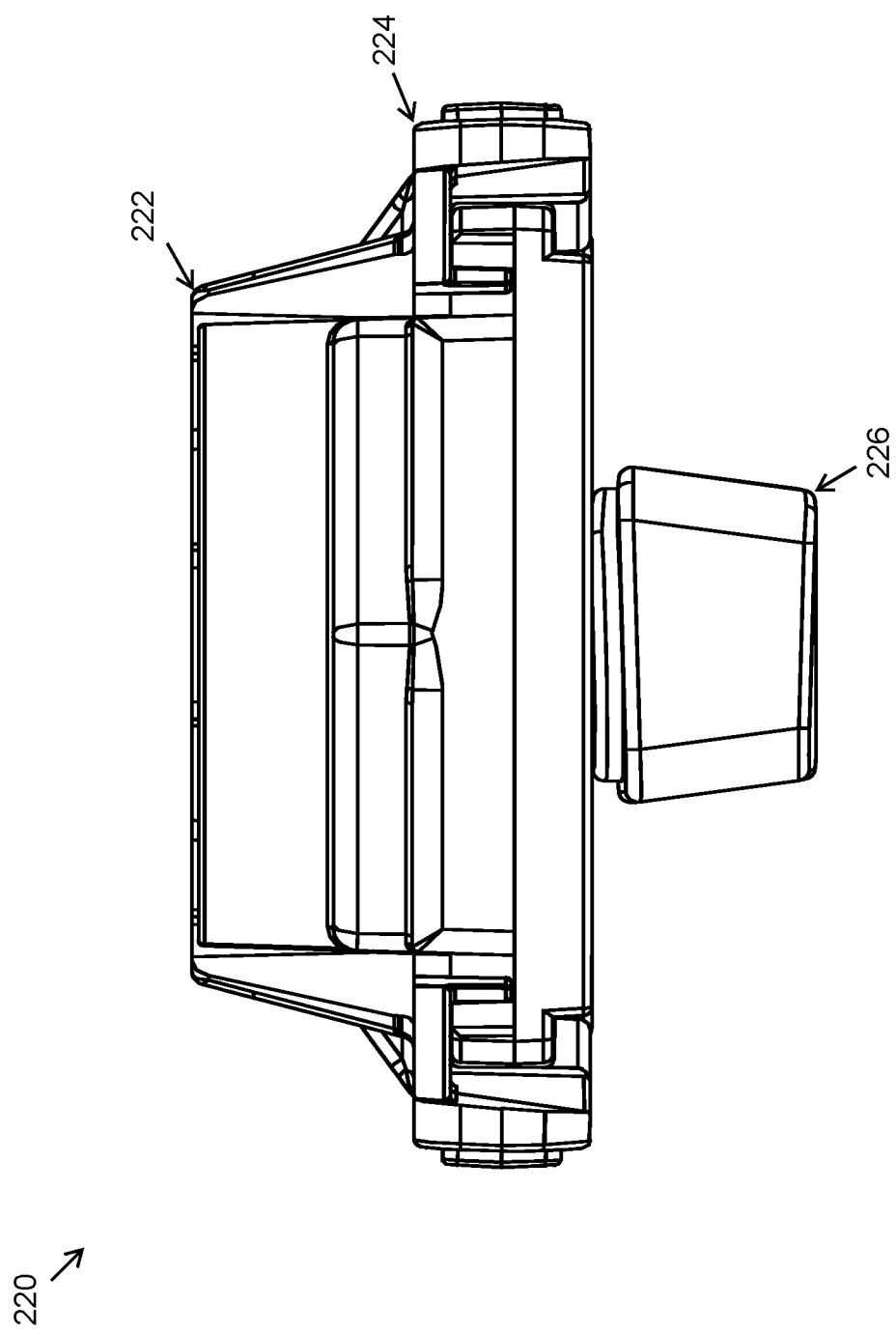
FIG. 69 is a front elevation view of the clamp pad attachment mechanism shown in FIG. 64.
Figure 70:
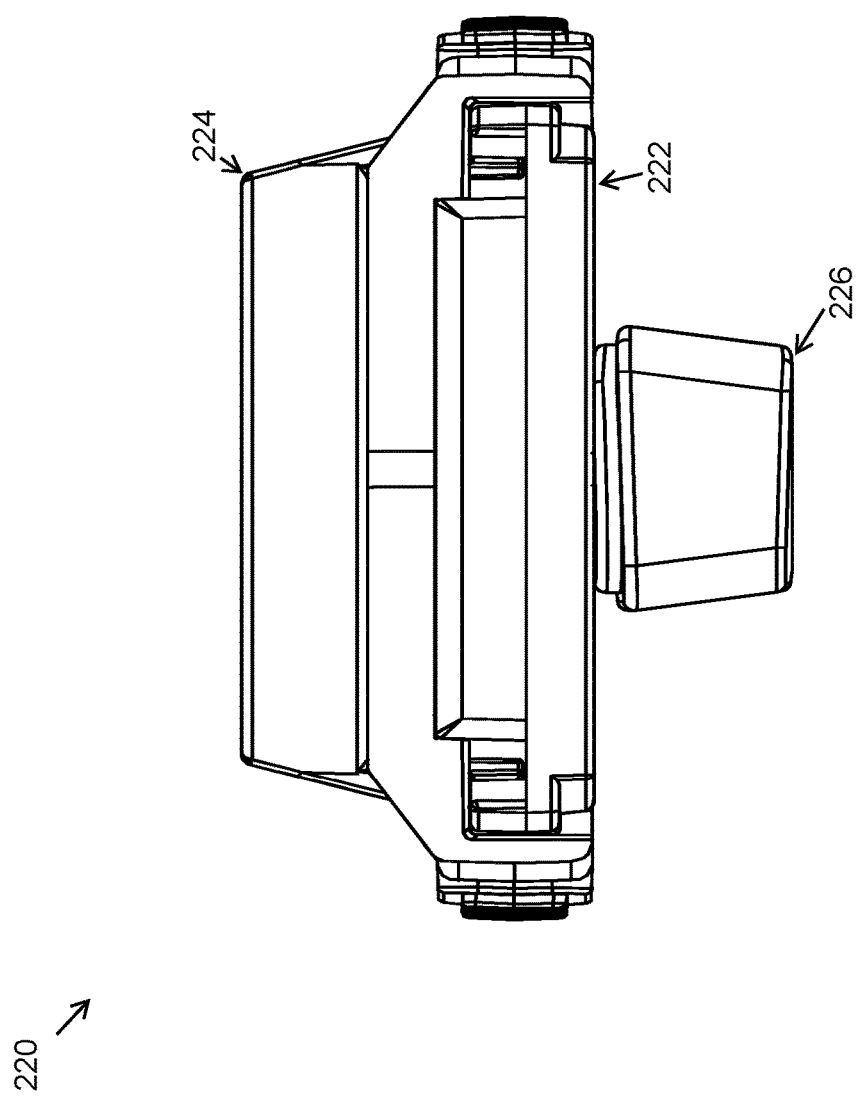
FIG. 70 is a rear elevation view of the clamp pad attachment mechanism shown in FIG. 64.
Figure 71:
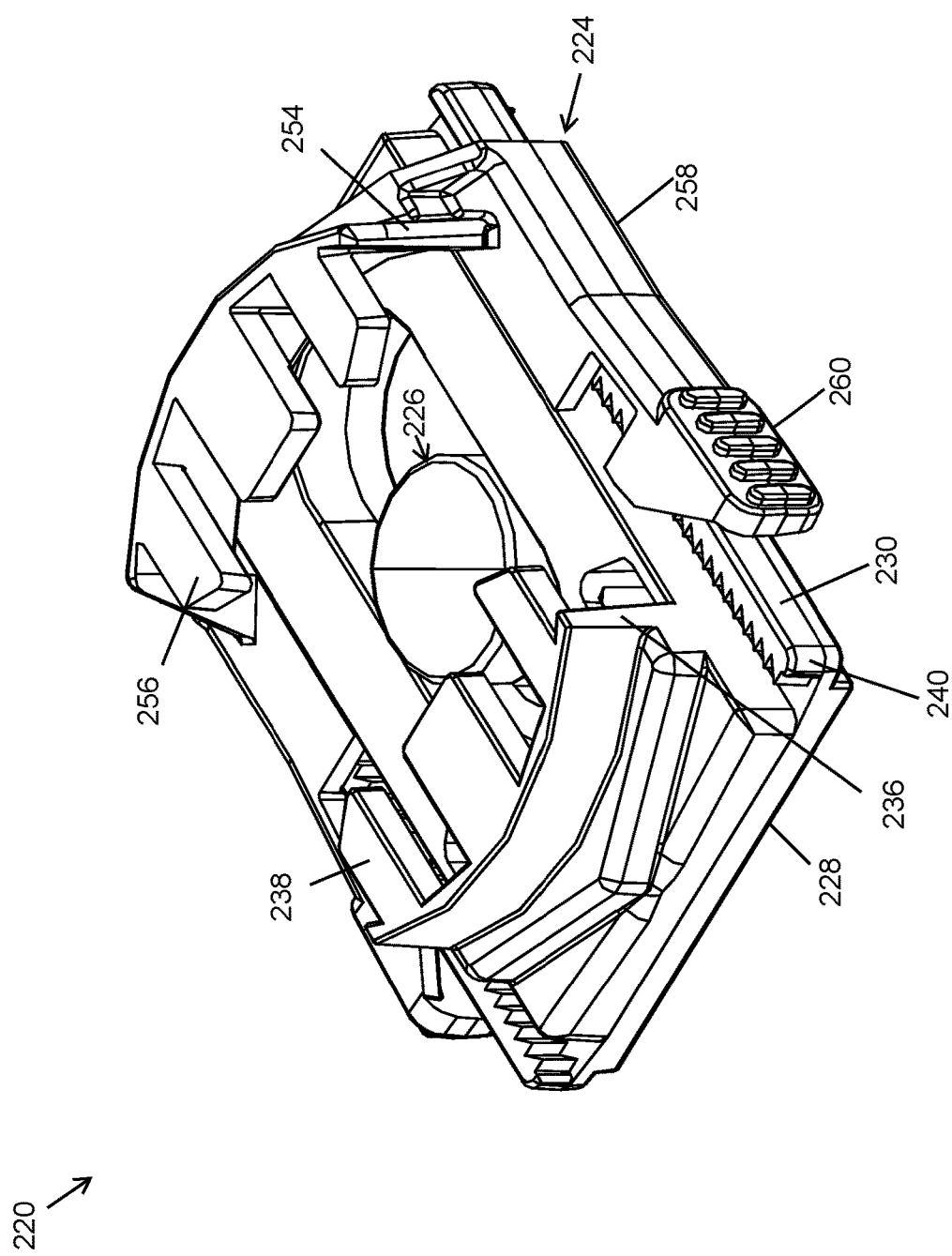
FIG. 71 is a top perspective view of the clamp pad attachment mechanism shown in FIG. 64.
Figure 72:
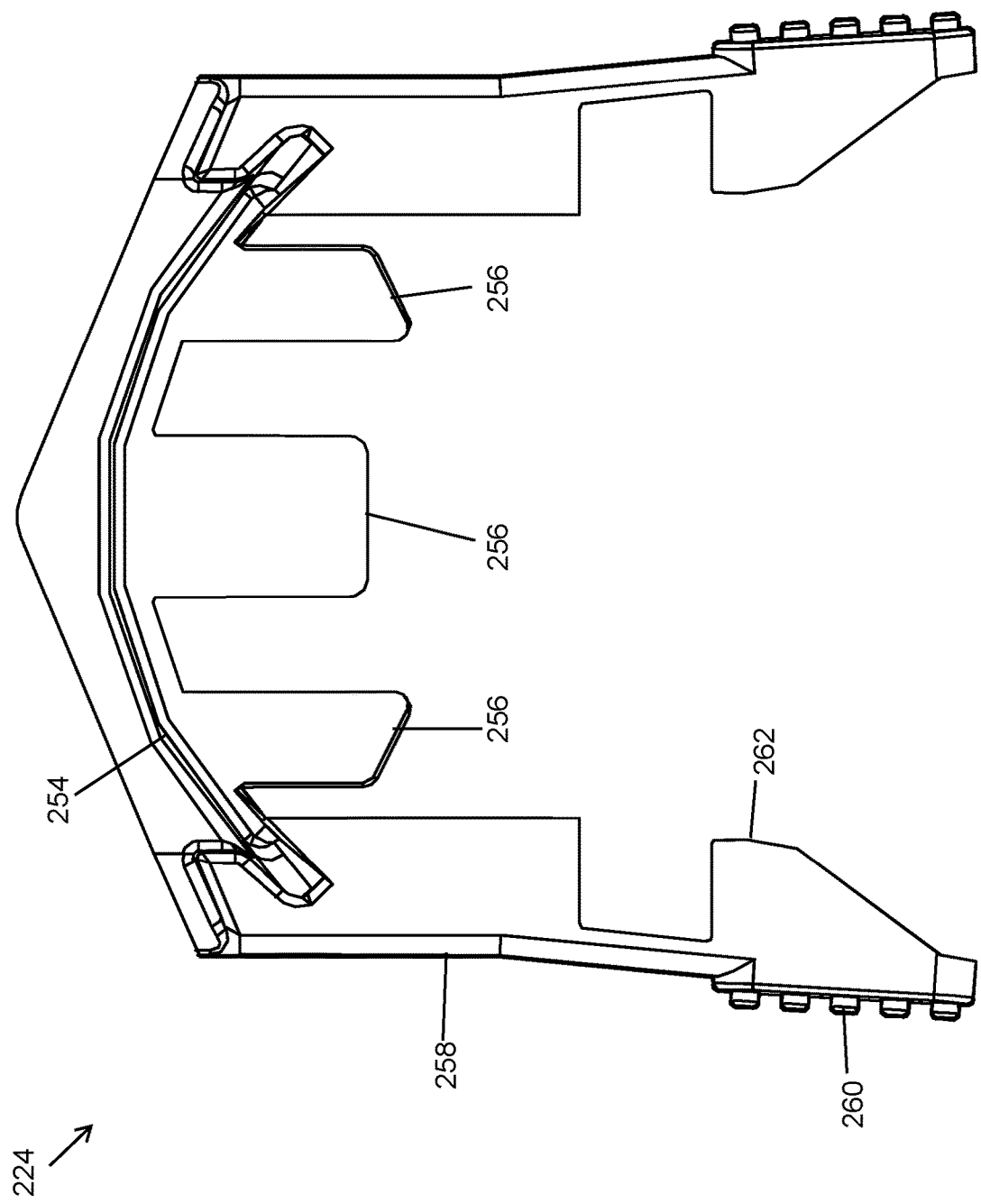
FIG. 72 is a top elevation view of the adjustment member of the clamp pad attachment mechanism shown in FIG. 64.
Figure 73:
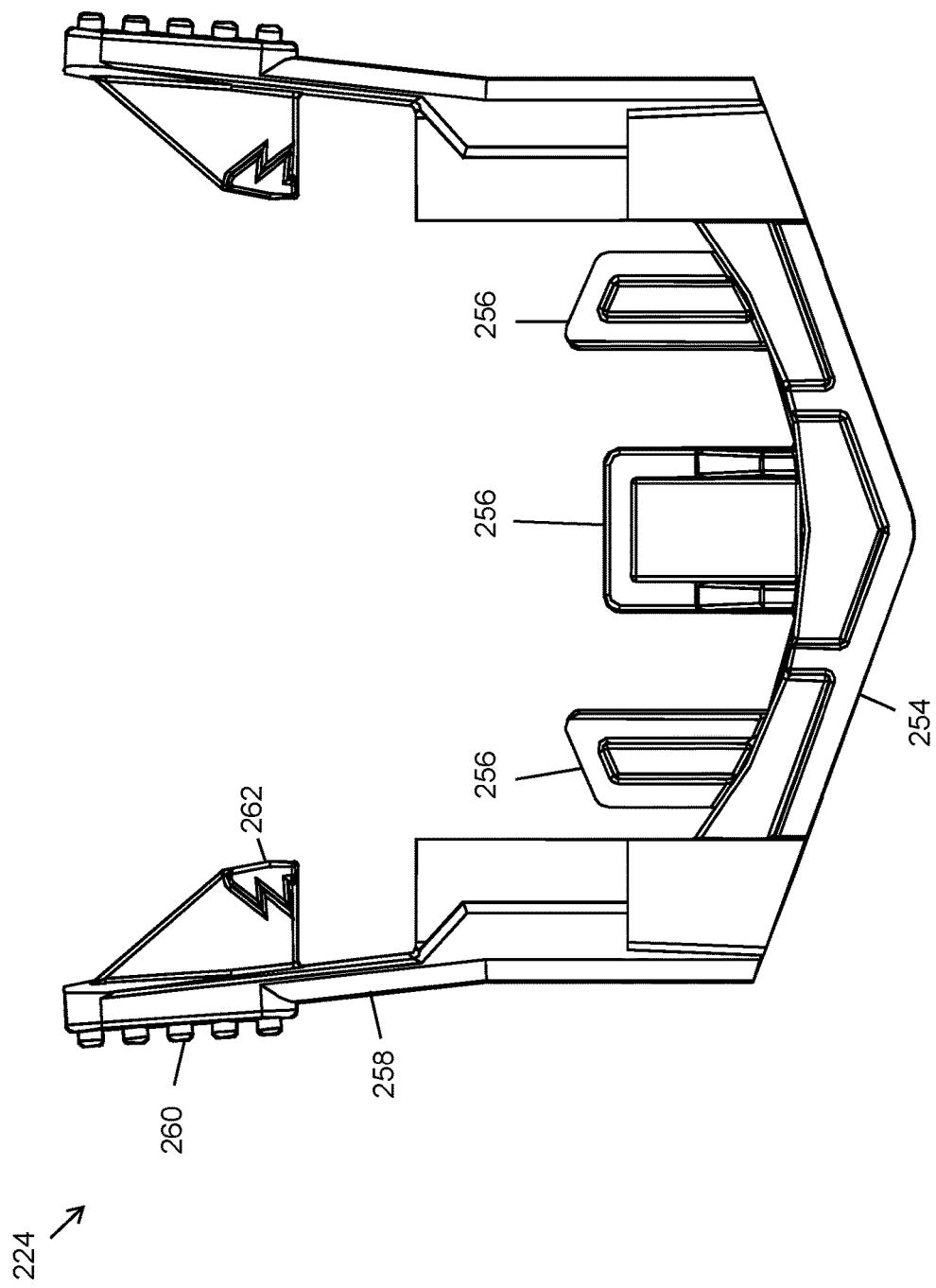
FIG. 73 is a bottom elevation view of the adjustment member of the clamp pad attachment mechanism shown in FIG. 64.
Figure 74:
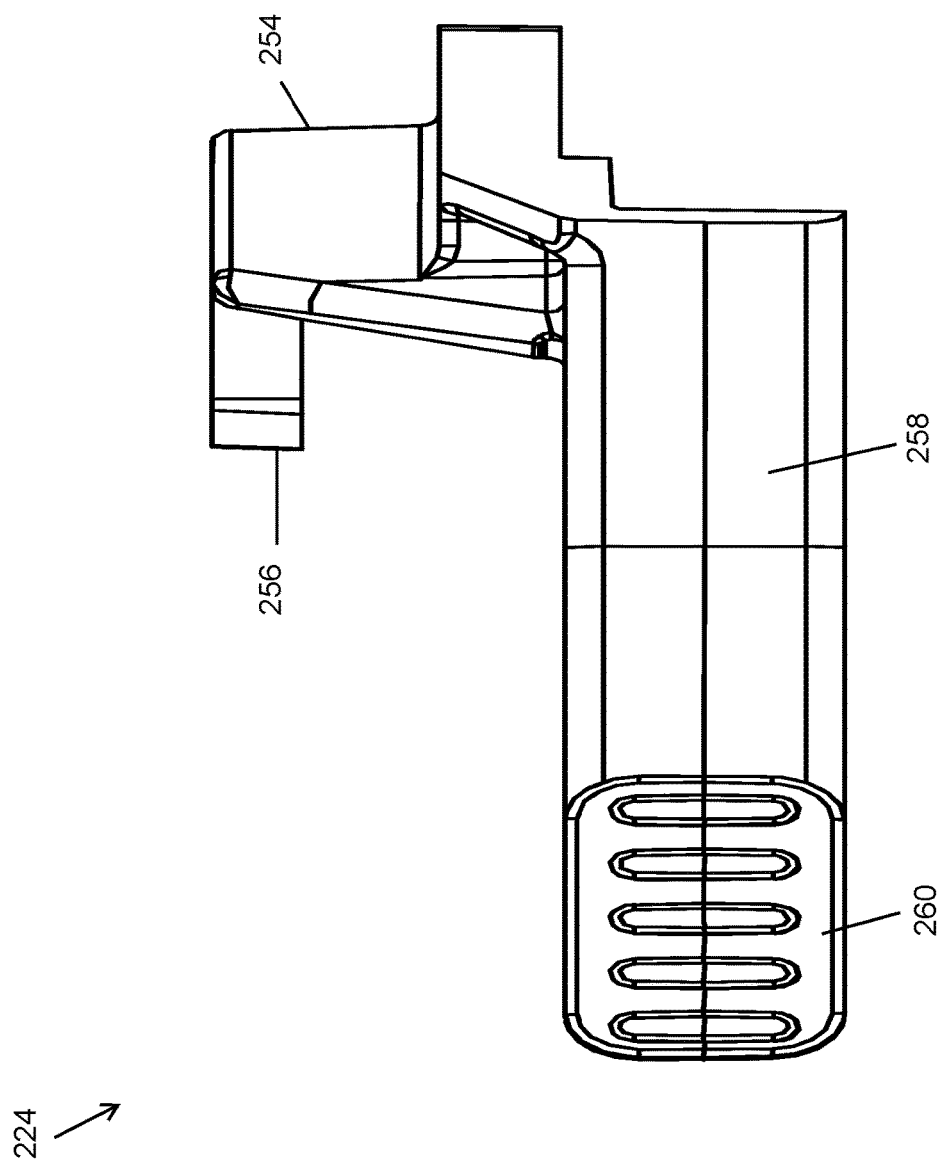
FIG. 74 is a side elevation view of the adjustment member of the clamp pad attachment mechanism shown in FIG. 64.
Figure 75:
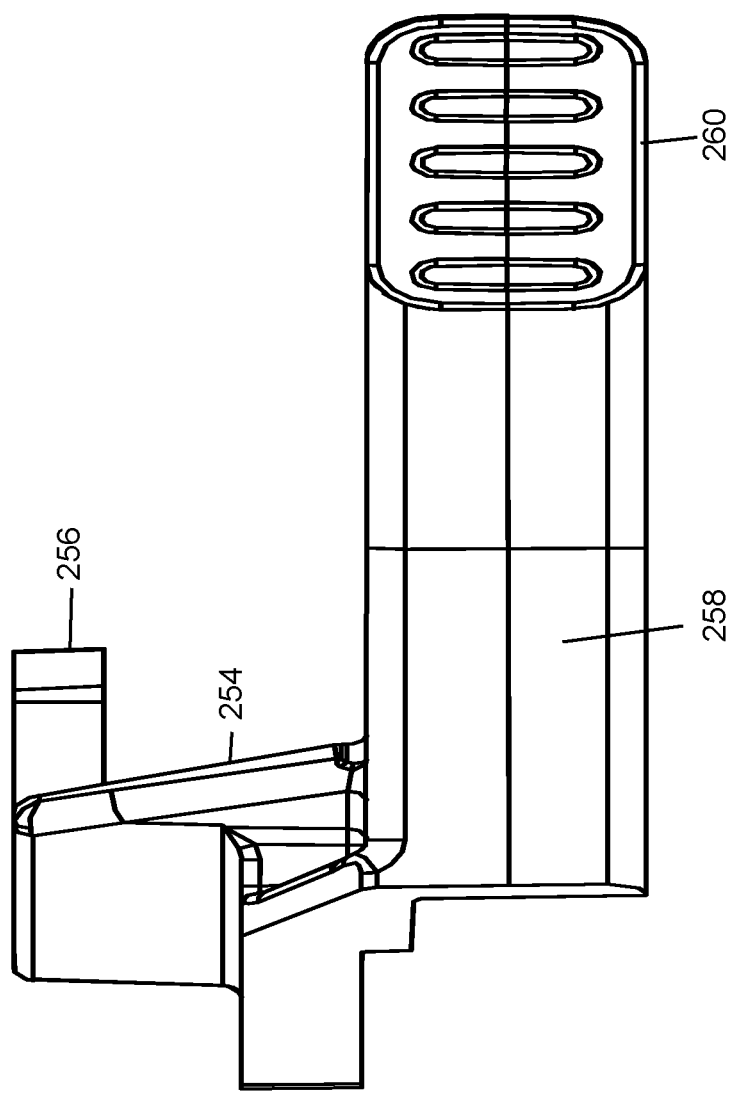
FIG. 75 is another side elevation view of the adjustment member of the clamp pad attachment mechanism shown in FIG. 64.
Figure 76:
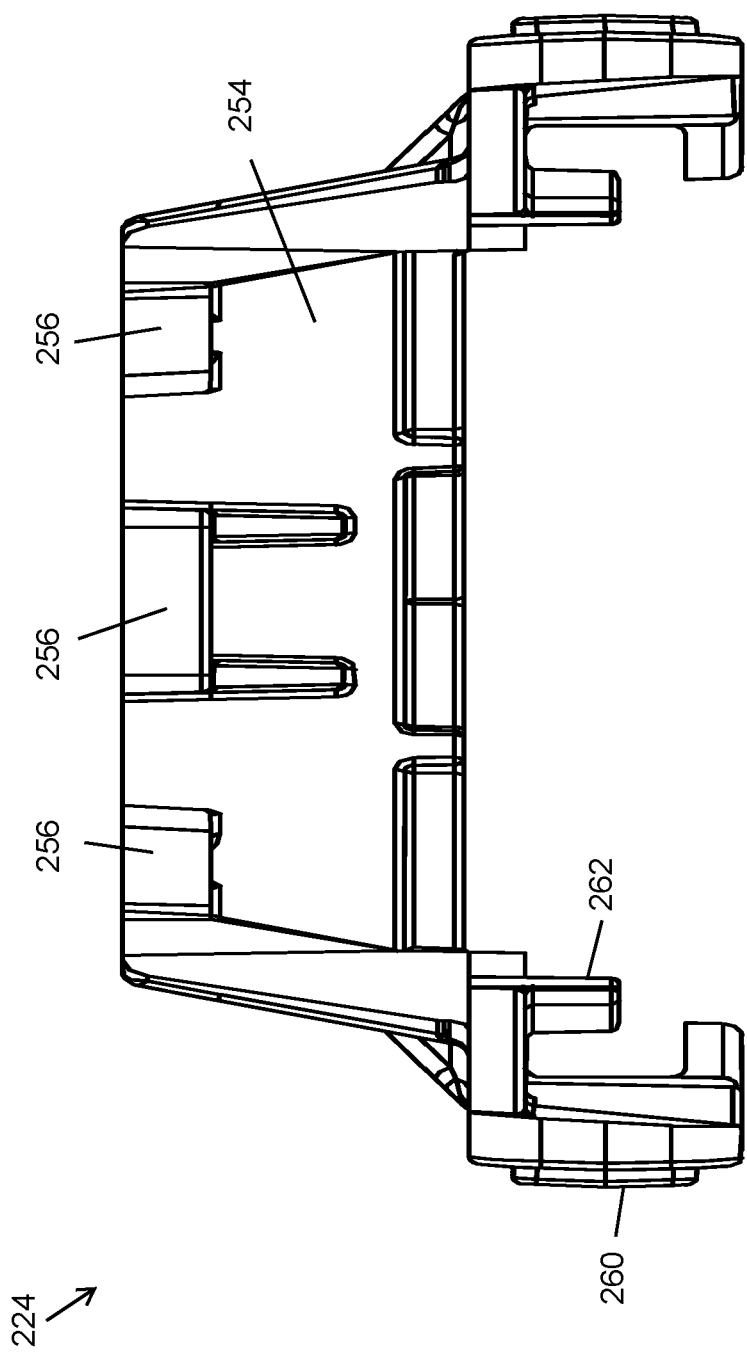
FIG. 76 is a front elevation view of the adjustment member of the clamp pad attachment mechanism shown in FIG. 64.
Figure 77:
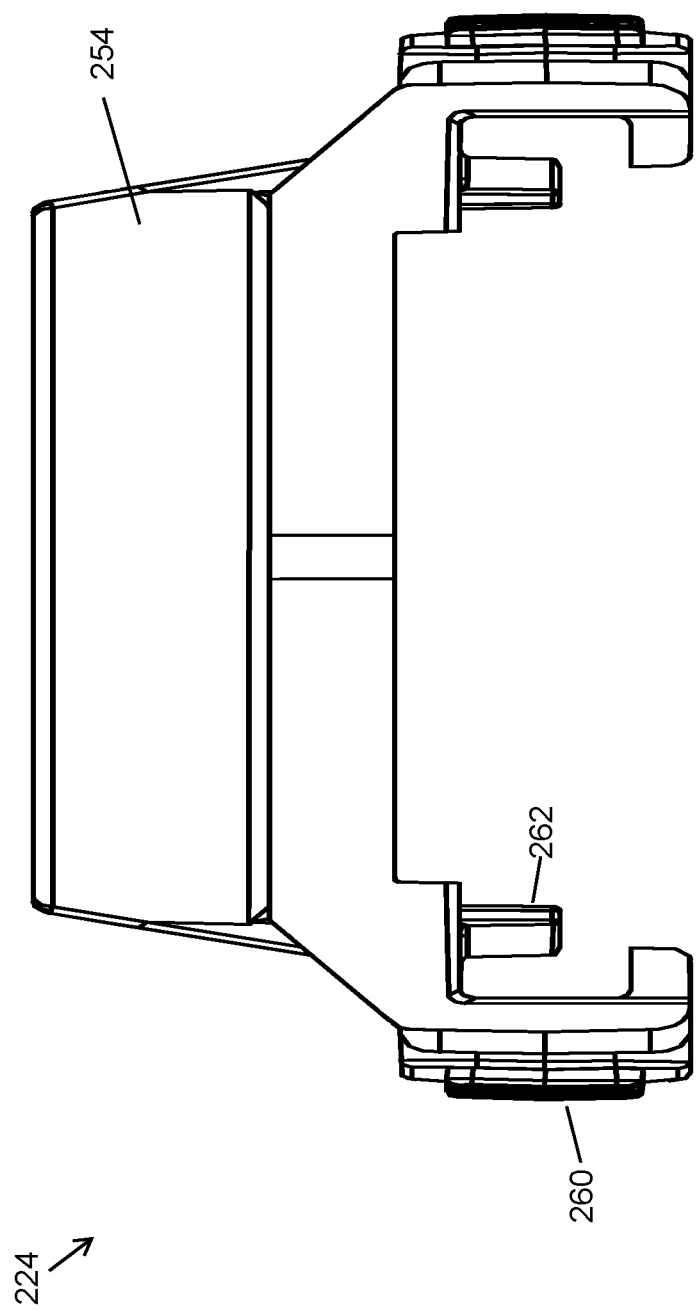
FIG. 77 is a rear elevation view of the adjustment member of the clamp pad attachment mechanism shown in FIG. 64.
Figure 78:
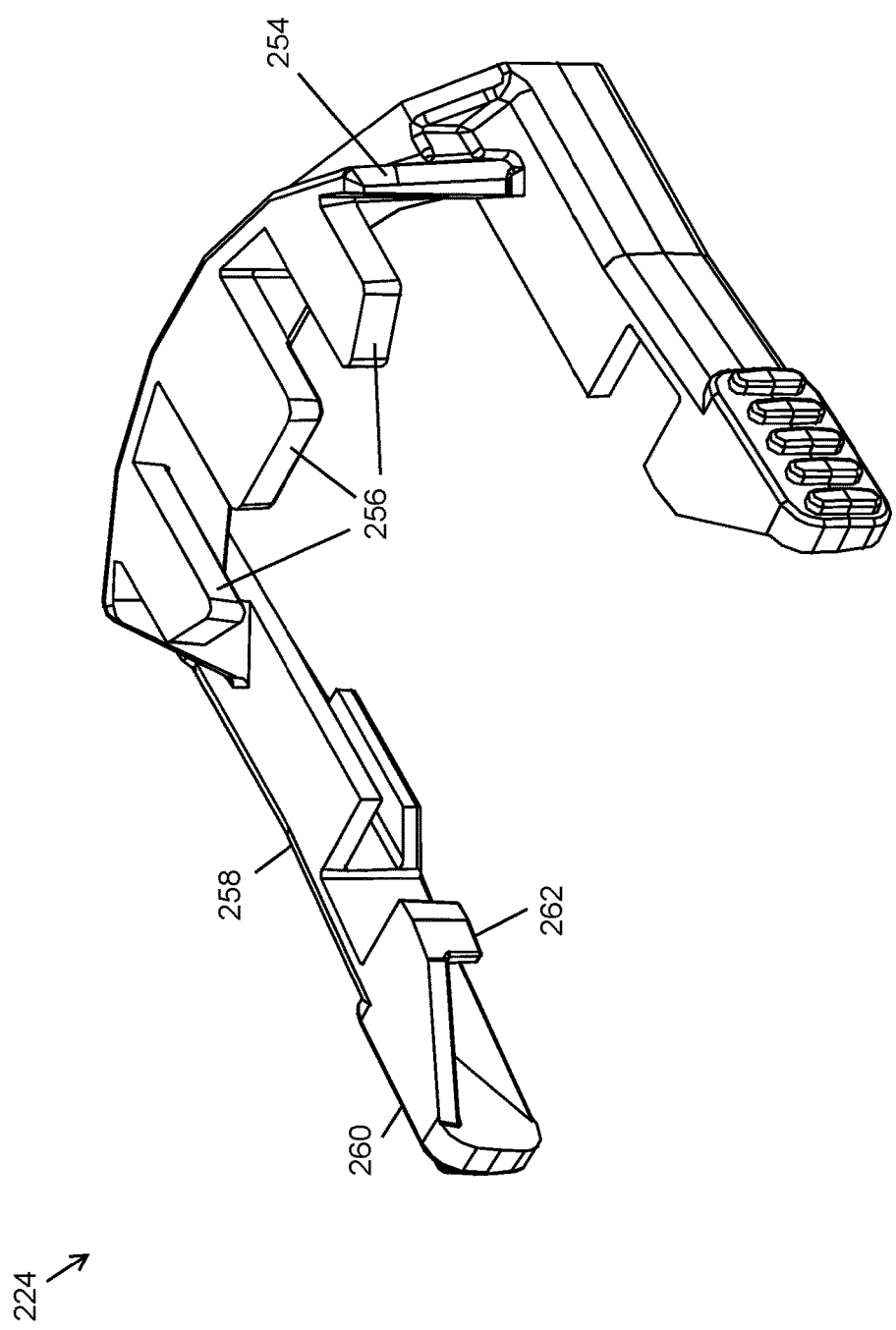
FIG. 78 is a perspective view of the adjustment member of the clamp pad attachment mechanism shown in FIG. 64.
Figure 79:
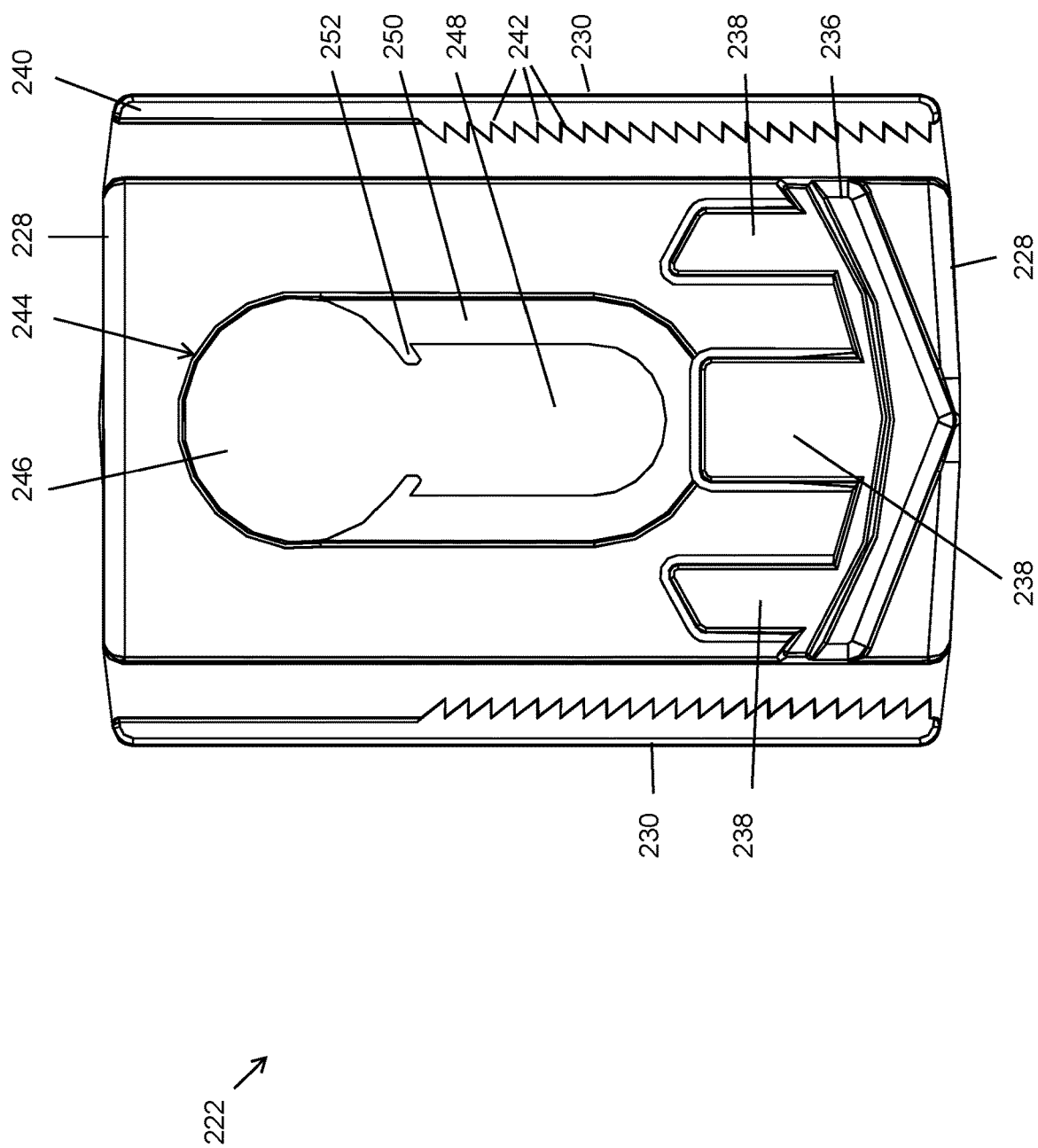
FIG. 79 is a top elevation view of the base of the clamp pad attachment mechanism shown in FIG. 64.
Figure 80:
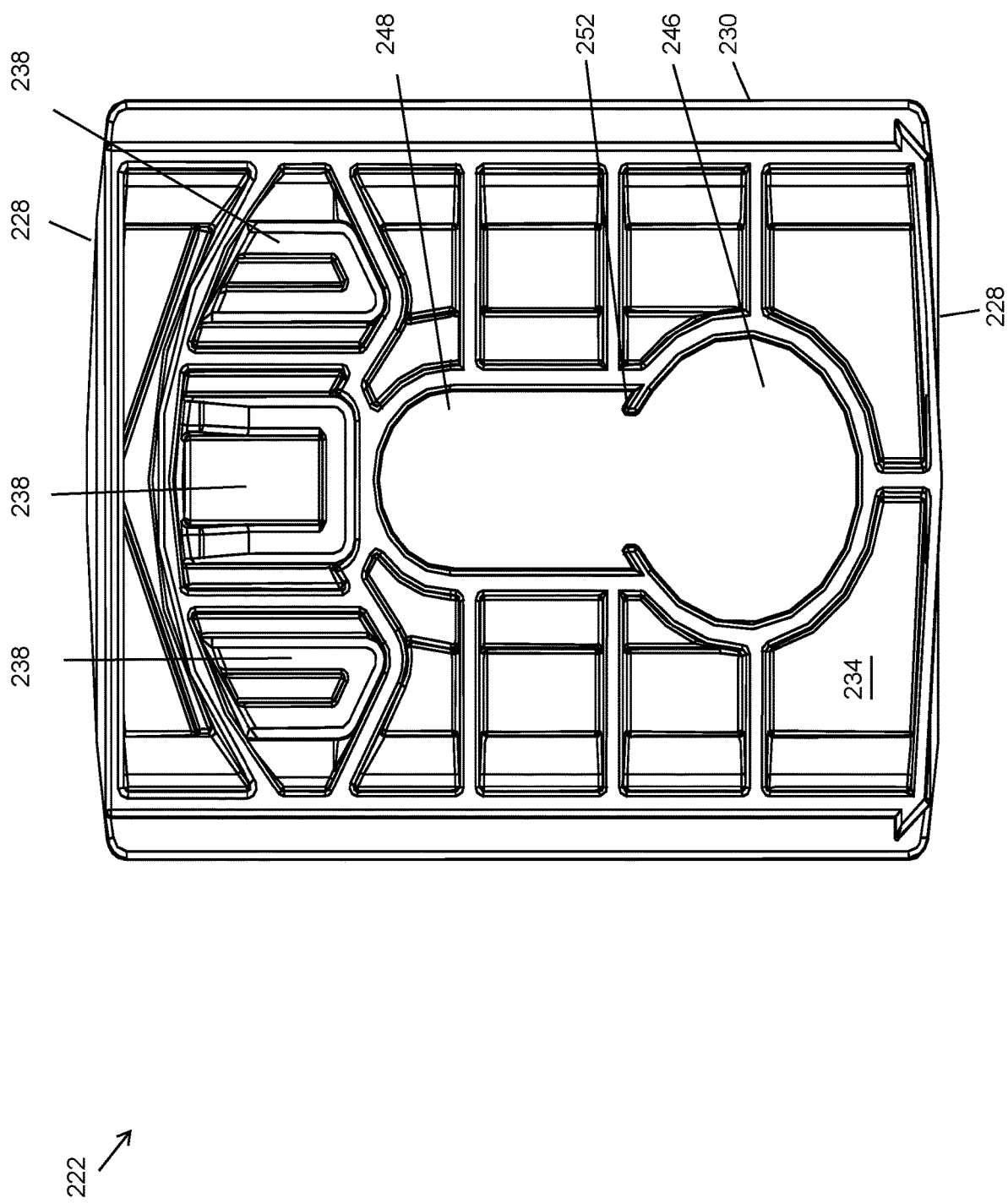
FIG. 80 is a bottom elevation view of the base of the clamp pad attachment mechanism shown in FIG. 64.
Figure 81:
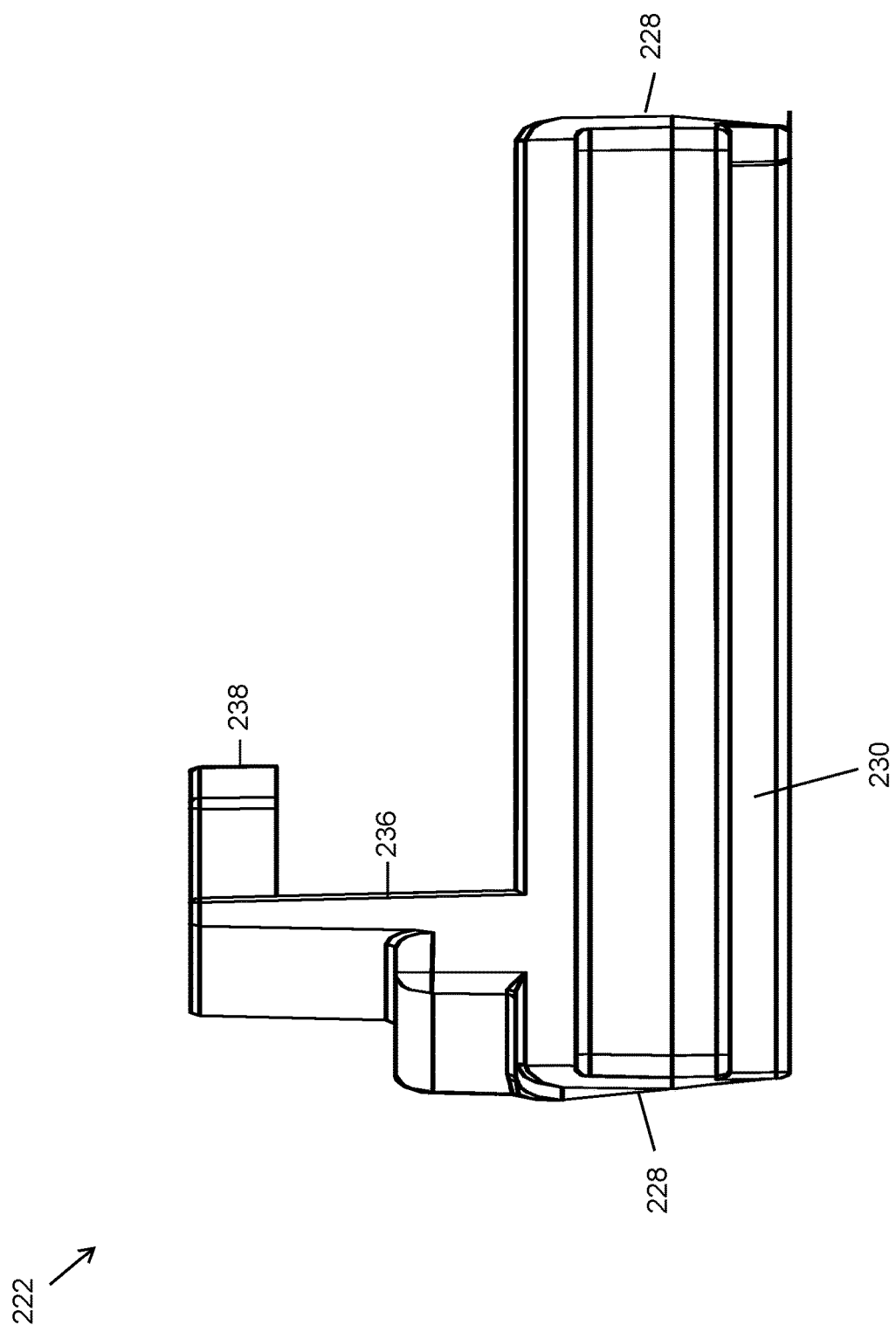
FIG. 81 is a side elevation view of the base of the clamp pad attachment mechanism shown in FIG. 64.
Figure 82:
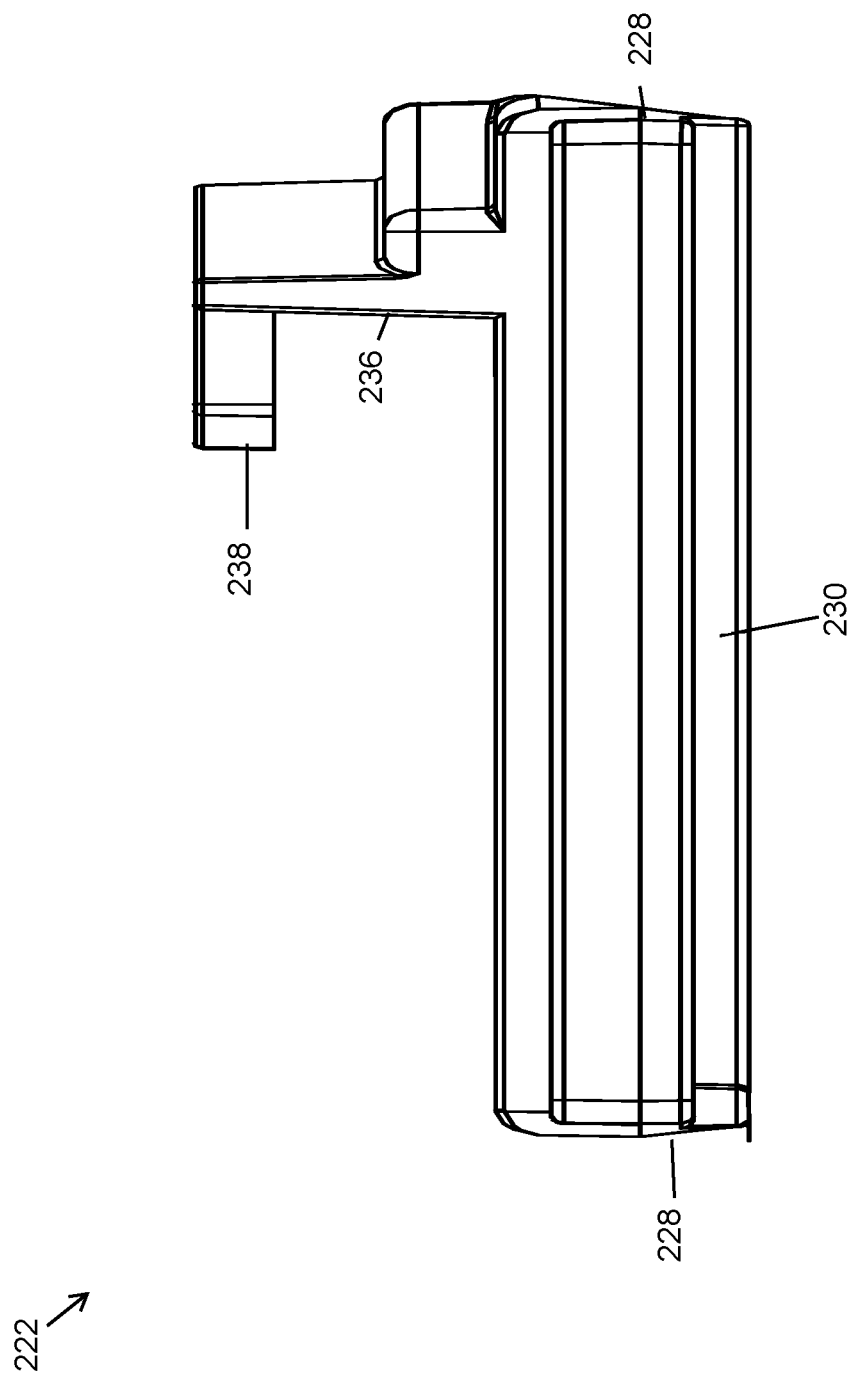
FIG. 82 is another side elevation view of the base of the clamp pad attachment mechanism shown in FIG. 64.
Figure 83:
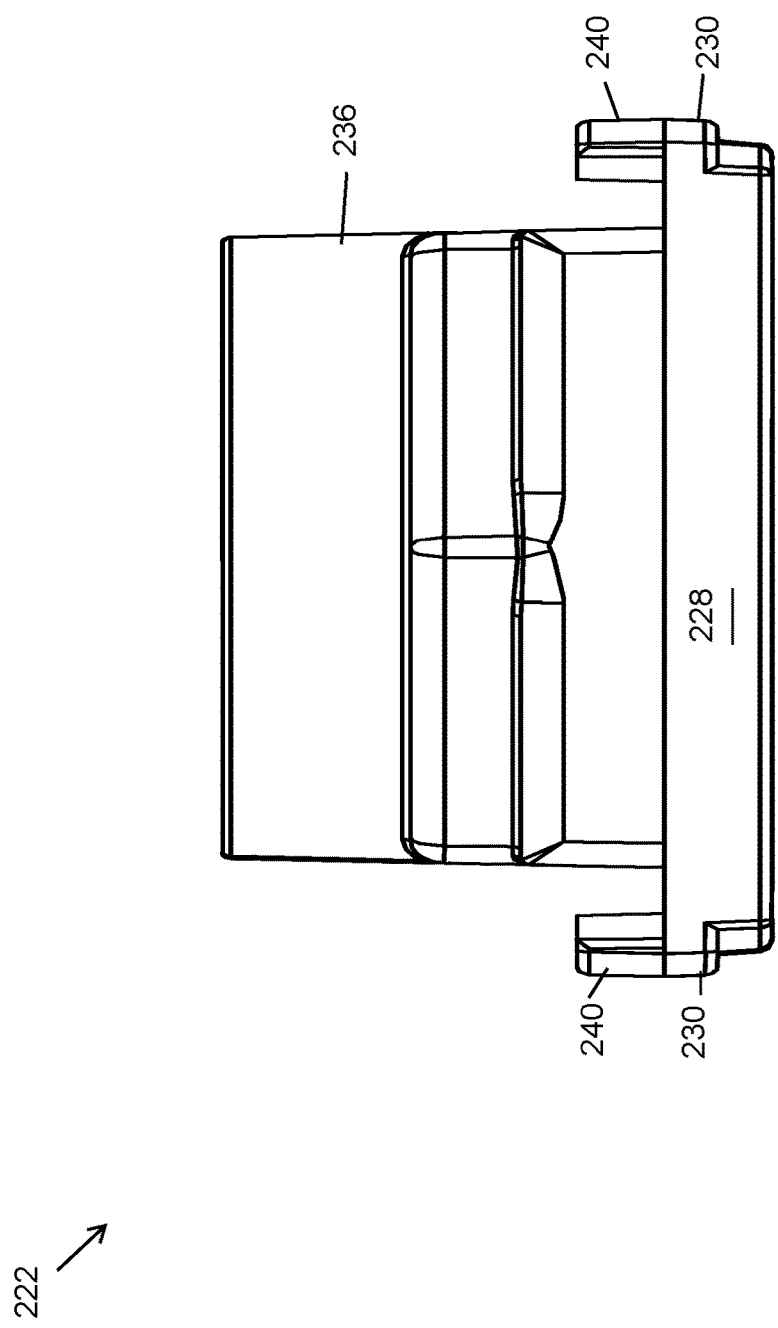
FIG. 83 is front elevation view of the base of the clamp pad attachment mechanism shown in FIG. 64.
Figure 84:
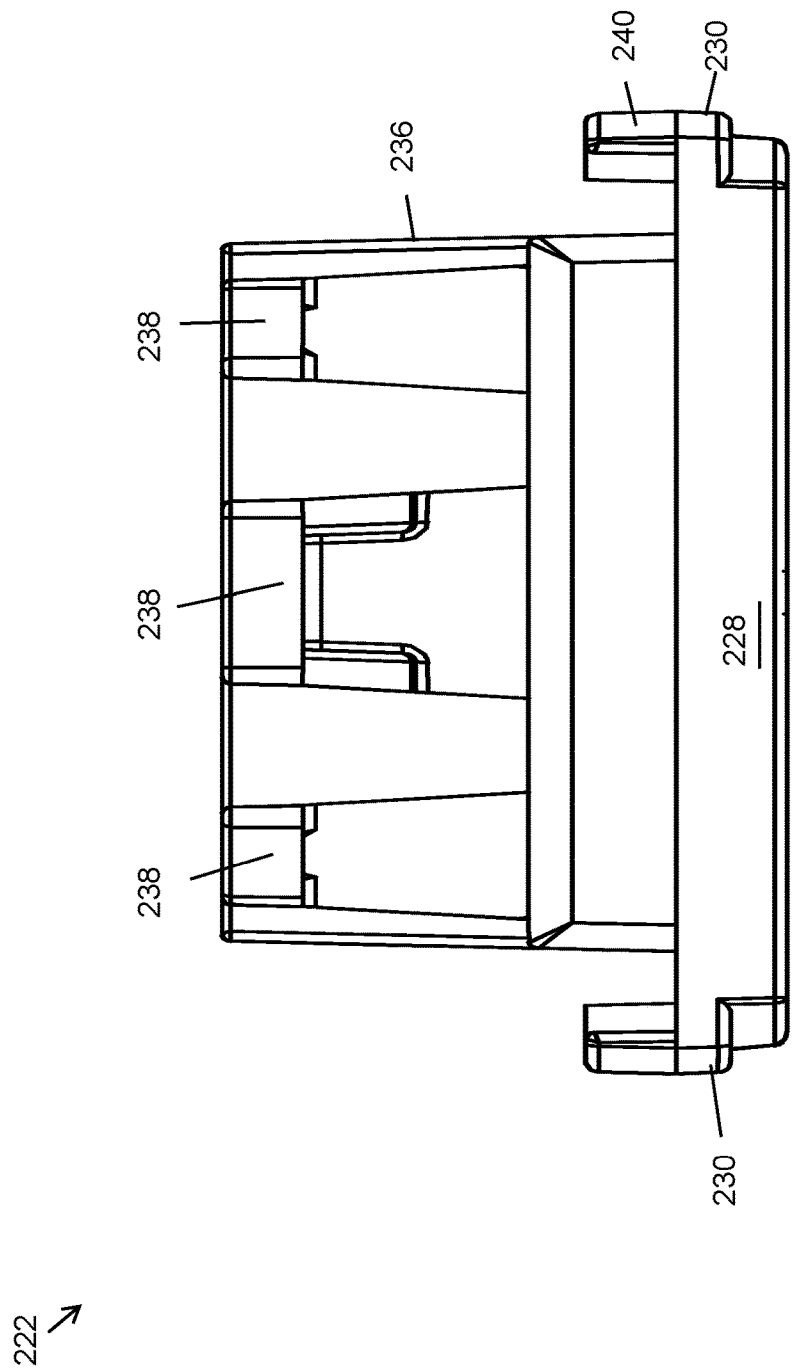
FIG. 84 is another side elevation view of the base of the clamp pad attachment mechanism shown in FIG. 64.
Figure 85:
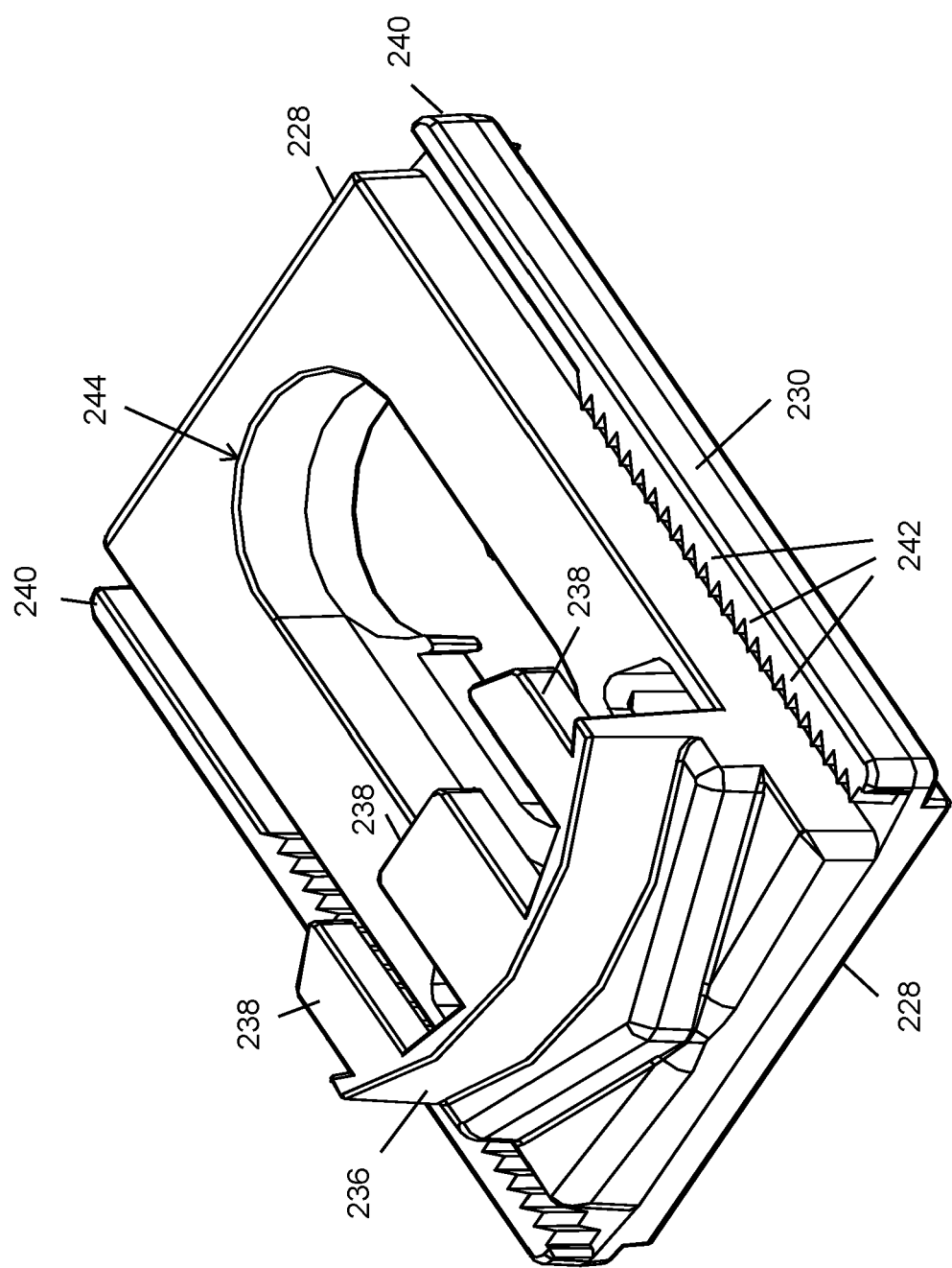
FIG. 85 is a perspective view of the base of the clamp pad attachment mechanism shown in FIG. 64.
Figure 86:
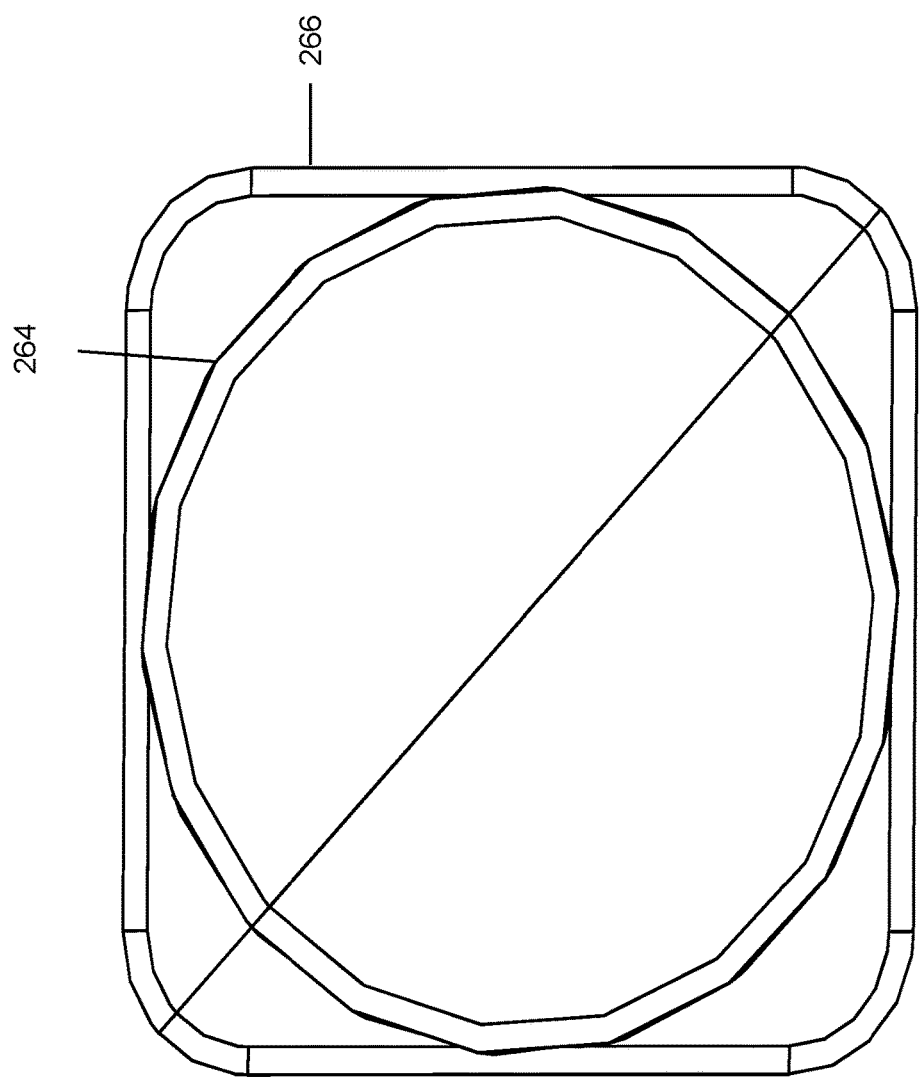
FIG. 86 is a top elevation view of a connector of the clamp pad attachment mechanism shown in FIG. 64.
Figure 87:
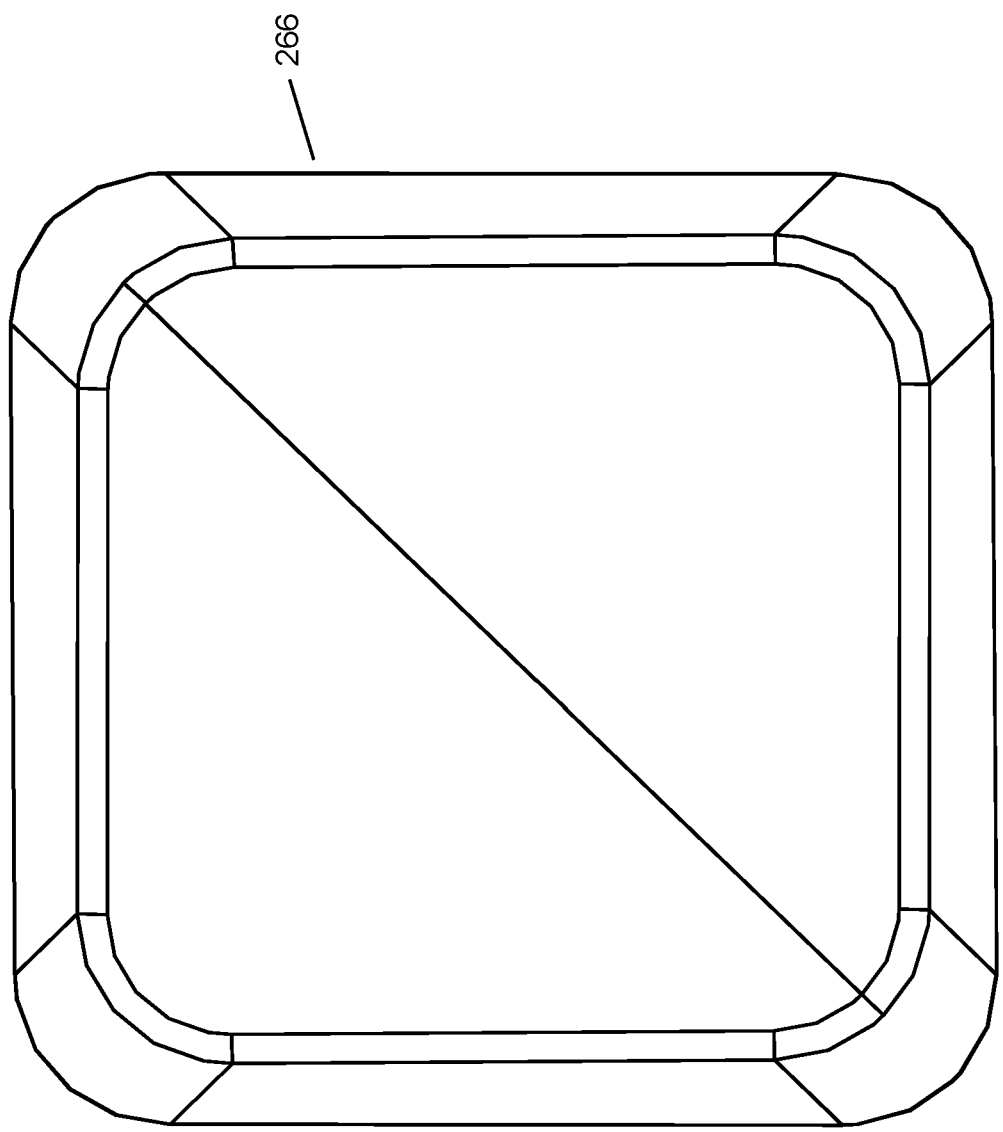
FIG. 87 is a bottom elevation view of a connector of the clamp pad attachment mechanism shown in FIG. 64.
Figure 88:
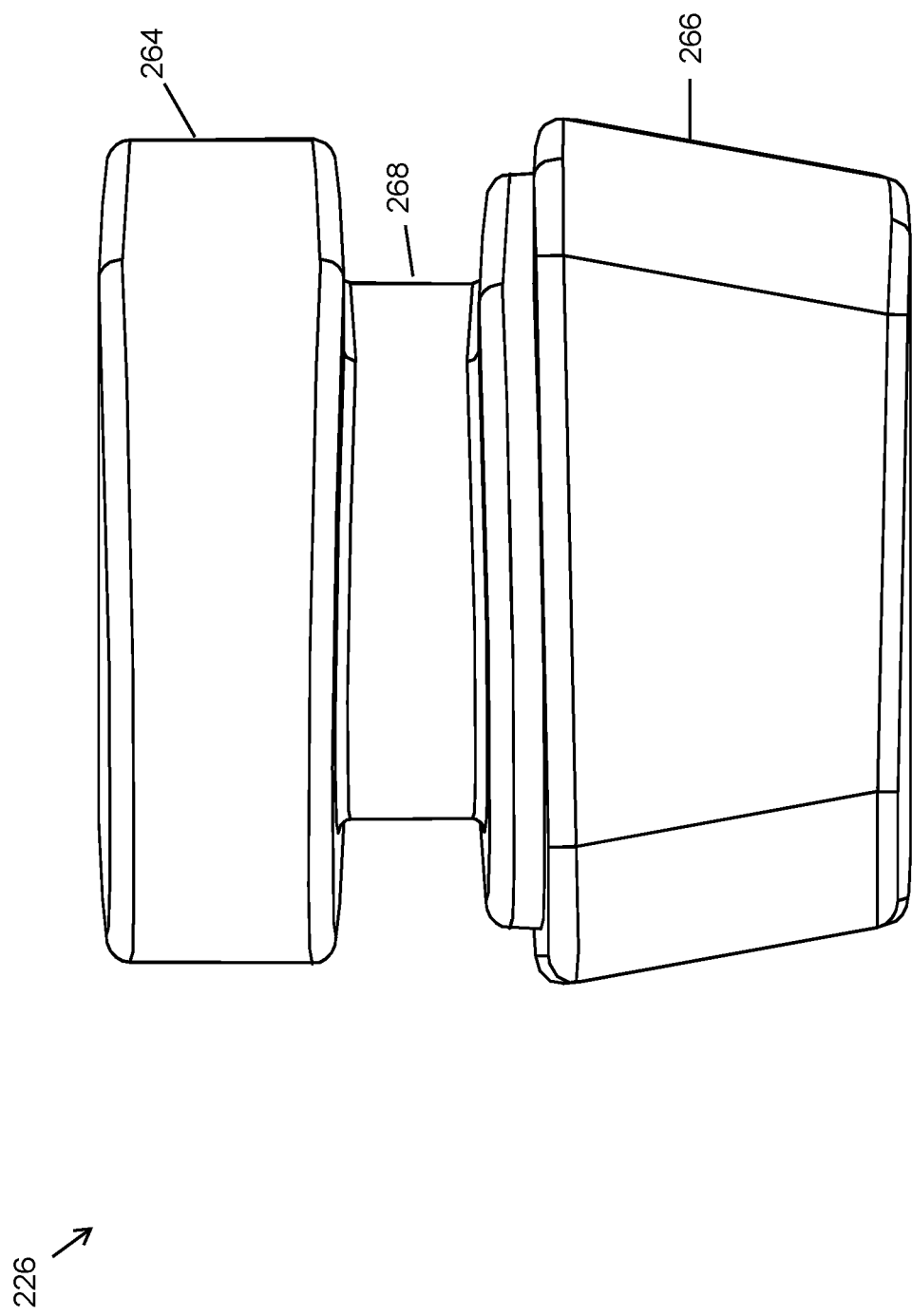
FIG. 88 is a side elevation view of a connector of the clamp pad attachment mechanism shown in FIG. 64.
Figure 89:
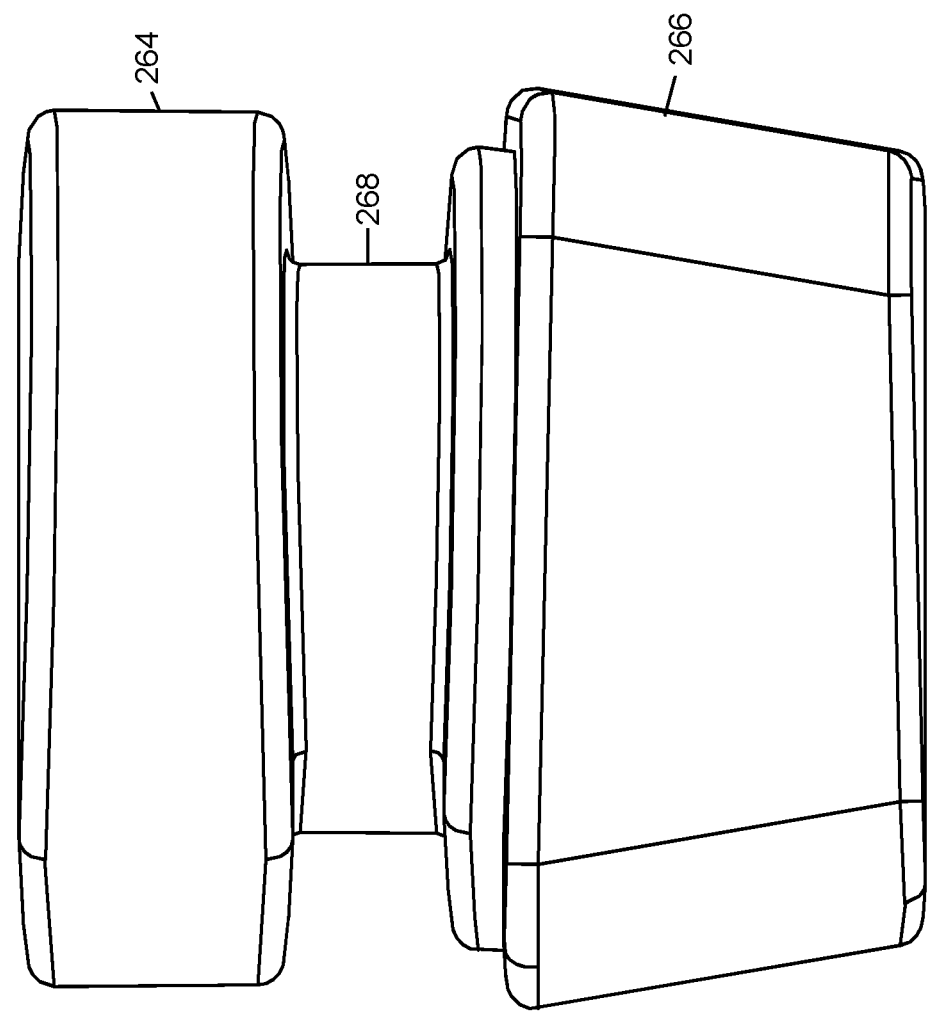
FIG. 89 is another side elevation view of a connector of the clamp pad attachment mechanism shown in FIG. 64.
Figure 90:
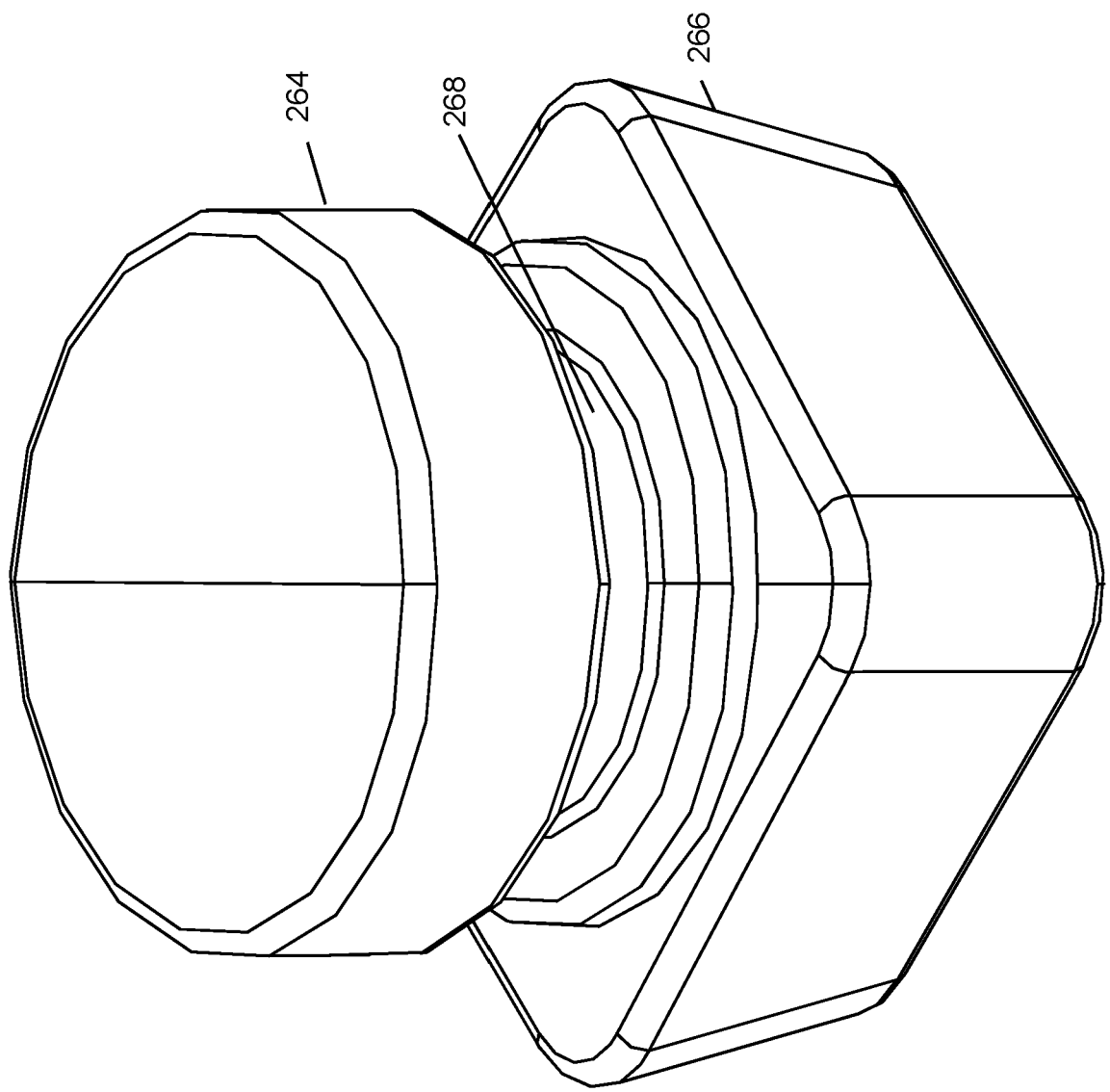
FIG. 90 is a perspective view of a connector of the clamp pad attachment mechanism shown in FIG. 64.
Figure 91:
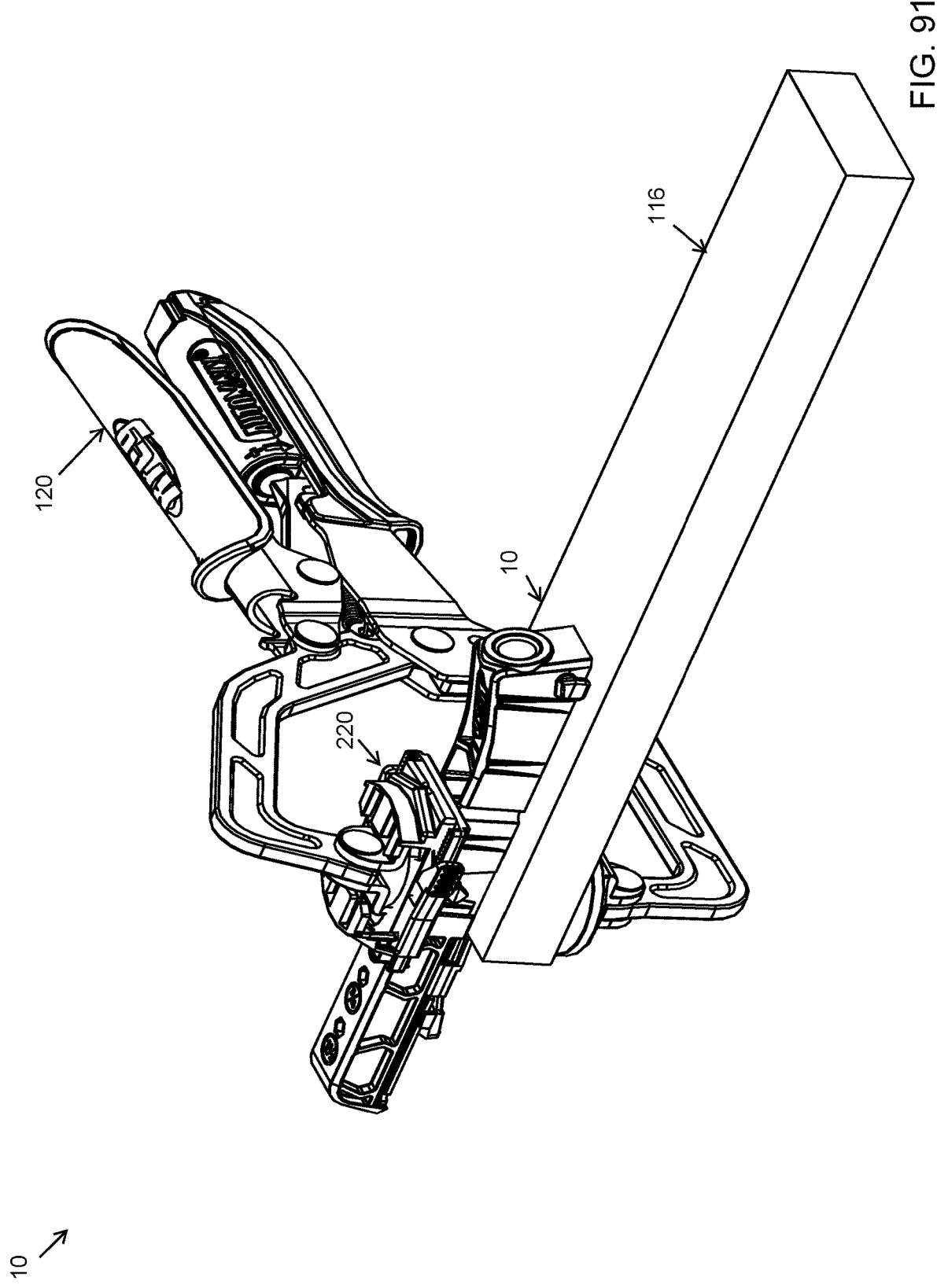
FIG. 91 is a perspective view of the mini pocket hole jig system shown in FIGS. 43-90 attached to the end of a workpiece by a clamp, the view showing the clamp pad attachment mechanism attached to the jig segment, the view showing the tail section attached to the jig segment; the view showing the clamp pad held within the clamp pad attachment mechanism, the view showing the clamp clamping the mini pocket hole jig system to the workpiece.
Figure 92:
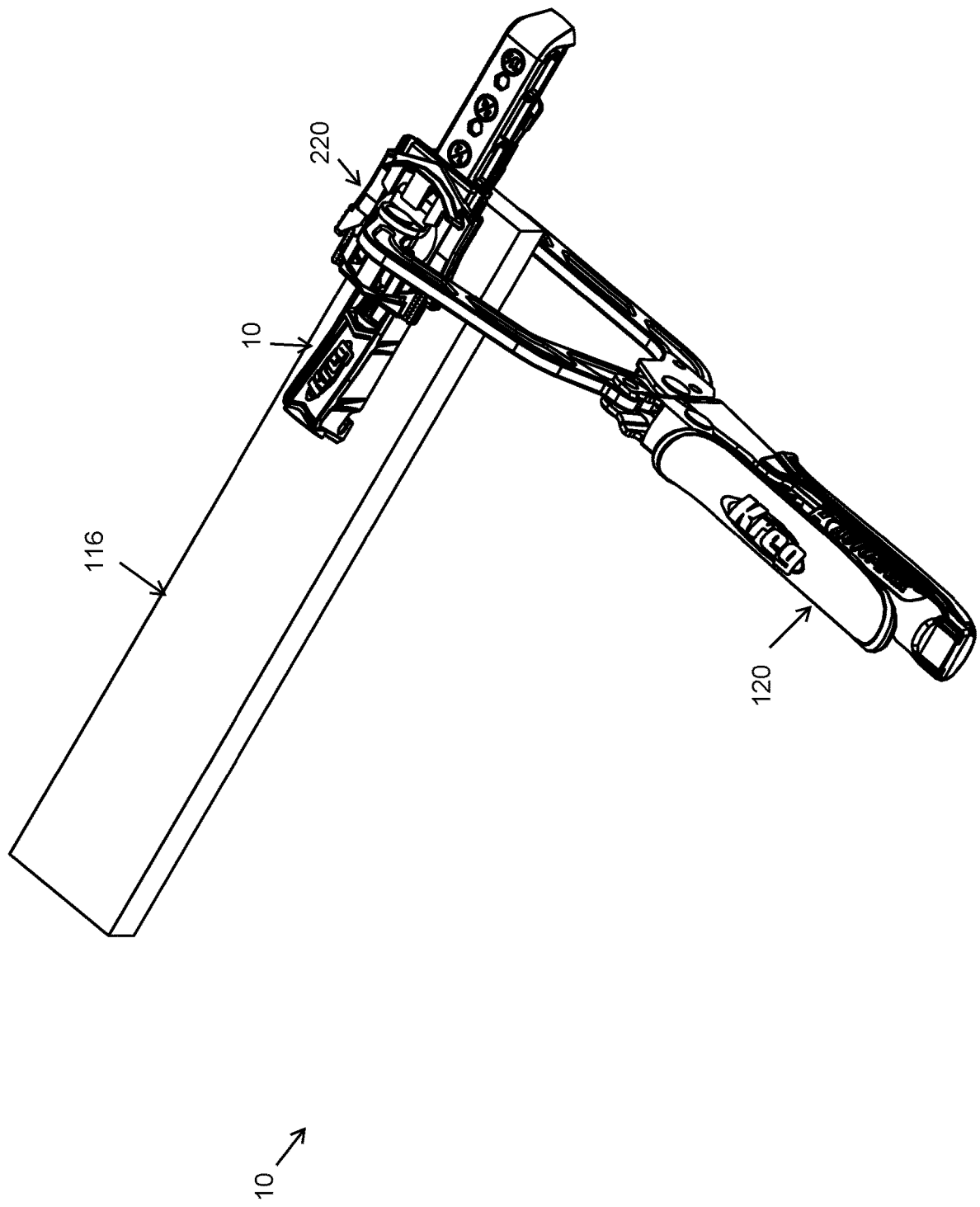
FIG. 92 is another perspective view of the mini pocket hole jig system shown in FIG. 91 attached to the end of a workpiece by a clamp.
Figure 93:
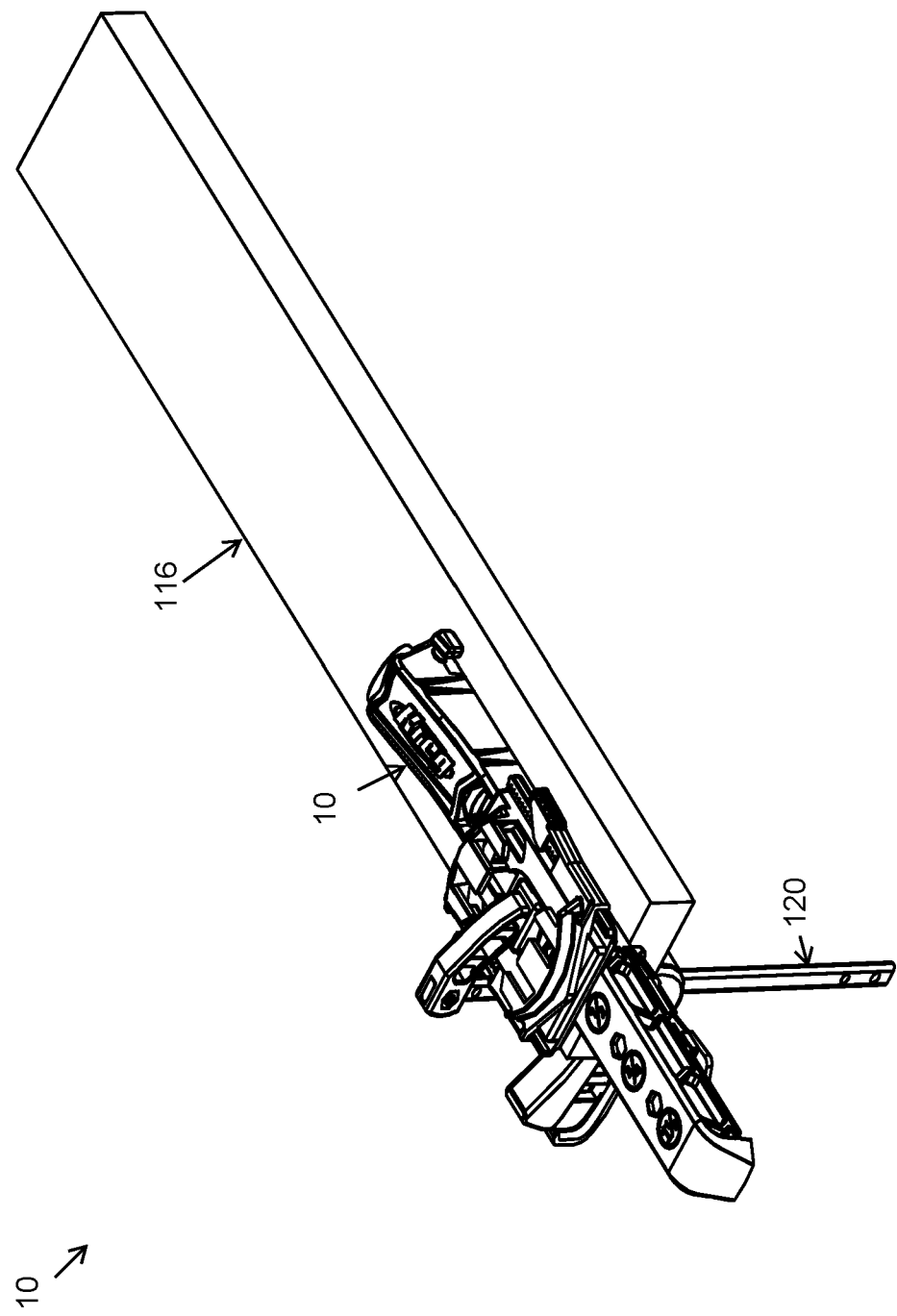
FIG. 93 is a perspective view of the mini pocket hole jig system shown in FIG. 91 and FIG. 92 attached to the end of a workpiece by a clamp, the view showing a different type of clamp as used in FIG. 91 and FIG. 92.
Figure 94:
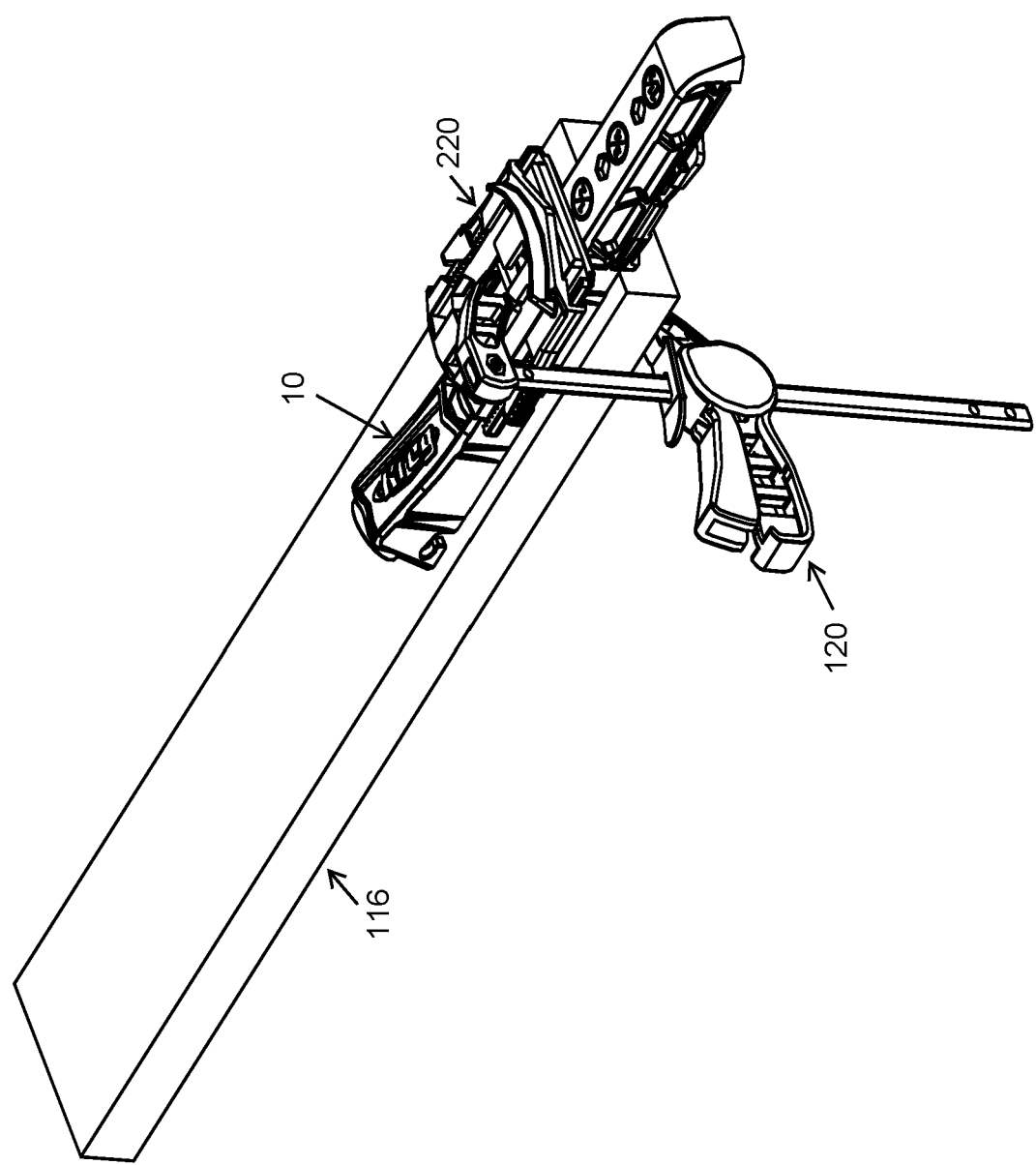
FIG. 94 is another perspective view of the mini pocket hole jig system shown in FIG. 93 attached to the end of a workpiece by a clamp.
Figure 95:
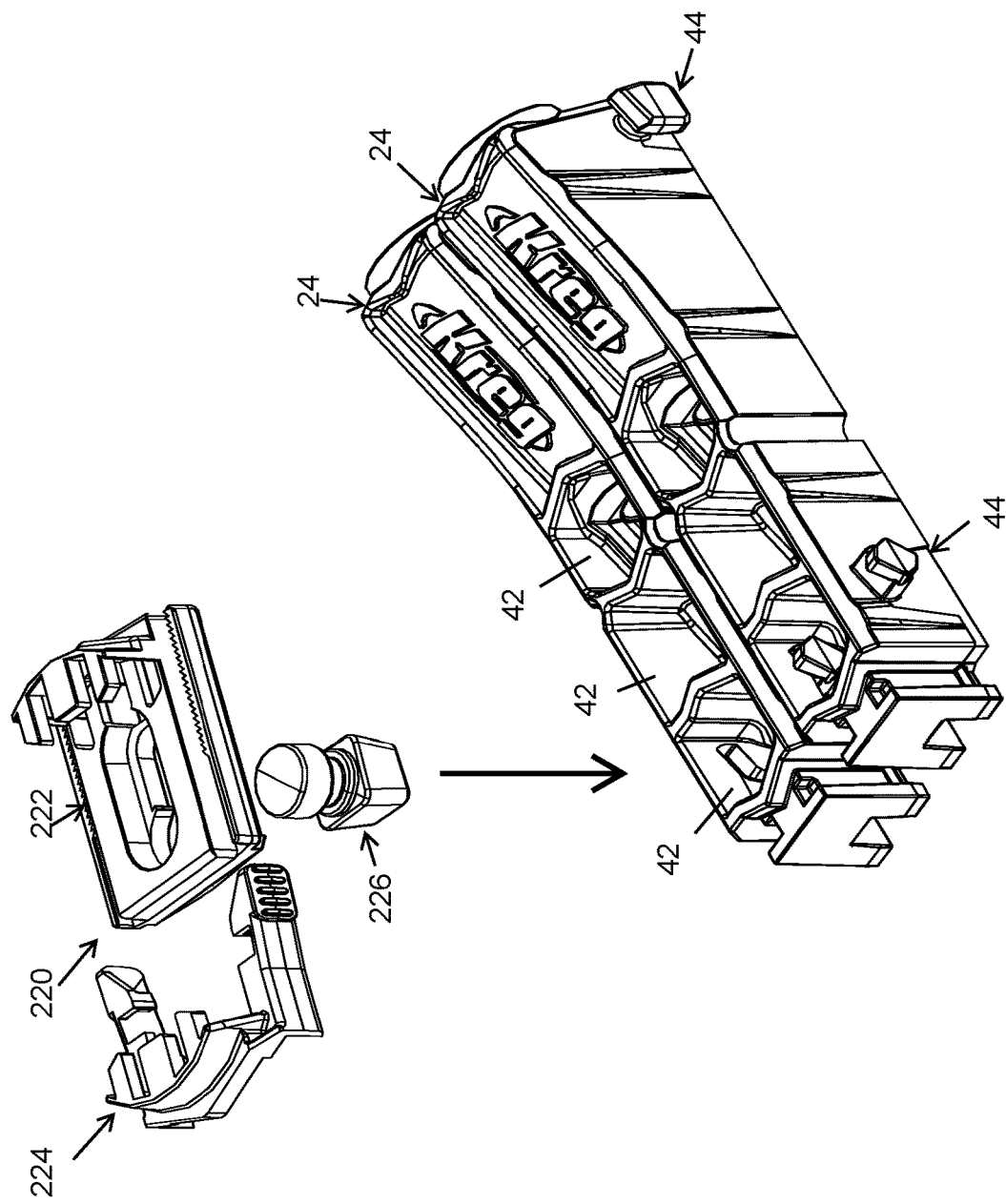
FIG. 95 is a perspective exploded view of the mini pocket hole jig system shown in FIGS. 43-90, the view showing two jig segments connected together in side-to-side locked alignment, the view showing an exploded clam pad attachment mechanism positioned above the jig segments, the view showing the connector aligned to be inserted within an opening in the top surface of one of the jig segments so as to facilitate connection of the clamp pad attachment mechanism to a jig segment.

Insert Ramps:

In one arrangement, as is shown with reference to FIGS. 36-38, the lower interior edges of the sides 72, 74 of tail section 68 include insert ramps 174. Insert ramps 174 are formed of any suitable size, shape and design and are configured to ease the insertion of stop feature 90 into the hollow interior 84 of tails section 68. More specifically, insert ramps 174 connect to the bottom edge of the interior side of sidewalls 72, 74 and angle inward as they extend upward. In the arrangement shown, as one example, two insert ramps 174 are presented, one to receive each of the arms 148 of stop feature 90. To insert stop feature 90 into the hollow interior 84 of tail section 68, arms 148 of stop feature 90 are aligned with insert ramps 174 of tail section 68. Once aligned, the stop feature 90 is forced upward into hollow interior 84. As stop feature 90 is forced upward, the sides 72, 74 flex outward as the insert ramps 174 guide the arms 148 upward. This continues until arms 148 pass the upper end of insert ramps 174 and enter slot 86 of tail section 68 at which point stop feature 90 is fully inserted within tail section 68 and the stop feature 90 is free to move forward and back within hollow interior 84 in a sliding fashion with arms 148 guided by and slot 86.

Alternative Arrangement—Stop Feature:

An alternative arrangement of stop feature 90 is presented with reference to FIGS. 39-42. In this arrangement, tail section 68 includes a groove 176 positioned in each exterior side 172, 174 of tail section 68 that runs laterally a distance along the length of tail sections 68. In the arrangement shown, these grooves 176 are positioned within a step 178, which narrows the width of the lower section of tail section 68. In this arrangement, grooves 176 extend from adjacent the forward end of tail section 68 until they terminate at step 178. In the arrangement shown, as one example, when viewed from the forward end of tail section 68, grooves 176 are generally square or rectangular in shape. Also, in the arrangement shown, as one example, the lower side of grooves 176 include stops 88 which are sized and shaped to receive arms 148 in stop feature 90 and are configured to set the position of stop feature 90 at various predetermined workpiece thicknesses.

In this arrangement, as one example, stop feature 90 includes a pair of flanges 180 that extend upward in approximate parallel spaced relation. Flanges 180 are spaced from one another and are sized and shaped to receive the lower end of tail section 68 within step 178. The upper end of flanges 180 includes guides 182 that are sized and shaped to fit within and slide along grooves 176. That is, in this arrangement, stop feature 90 is installed onto tail section 68 by aligning the inwardly extending guides 182 at the upper end of flanges 180 with the grooves 176 in the opposing sides of tail section 68. Once aligned in this manner, stop feature 90 is forced forward such that the guides 182 slide within grooves 176 and stop feature 90 fits around the lower end of tail section 68.

In this arrangement, the forward flange 152 is spring biased and is connected to the rearward flange 150 by hinge member 184 which allows forward flange 152 to flex up and down. As the forward end of forward flange 152 is pushed upward, forward flange 152 bends, flexes and/or articulates upward upon hinge member 184. Forward flange 152 includes a pair of flanges 186 that extend upward in approximate parallel spaced relation. Flanges 186 are spaced from one another and are sized and shaped to receive the lower end of tail section 68 within step 178. The upper end of flanges 186 includes arms 148 that are sized and shaped to fit within and slide along grooves 176 until they drop into stops 88 in the lower side of grooves 176 under the spring bias of hinge member 184. When the rearward flange 150 is installed on the tail section 68, and stop member 90 is slid rearward as the guides 182 slide within grooves 176, the forward flange 152 is pushed upward so as to align the arms 148 with grooves 176. Once forward flange 186 is pushed upward, causing forward flange 152 to flex and rotate upon hinge member 184, arms 148 are received within grooves 176. Once in this position, stop member 90 may be slid forward upon tail section 68 as the arms 148 and guides 182 slide within grooves 176. This sliding continues until stop member 90 is pushed rearward far enough until the arms 148 reach the first set of stops 88. Once the stop member 90 is pushed or slid far enough until the arms 148 reach stops 88, due to the spring bias of hinge member 184 the arms 148 fall or are pushed into grooves 88 under the spring bias of hinge member 184. In this position, stop members 90 are locked in place at a predetermined thickness that corresponds to a common workpiece thickness. To move the stop member 90 upon the tail section 68, the forward flange 150 is pushed upward, causing forward flange to rotate or flex on hinge member 184, until the arms 148 come out of grooves 88. Once arms 148 come out of grooves 88, stop member 90 may be slid along tail section 68 until the arms 148 again fall into another set of grooves 88.

This arrangement presents a relatively rigid tail section 68 and a relatively strong and durable stop feature 90. In this arrangement, because there are no slots or grooves 86 that extend through the sidewalls of tail section 68, the tail section 68 can withstand tremendous clamping pressure without breaking or collapsing.

Connected Jig Segments by a Combination of Rotating and Sliding:

With reference to FIGS. 43-63 and 109-128 an alternative arrangement of a mini pocket hole jig system 10 is presented. In this arrangement, adjacent jig segments 24 connect to one another with a combination of rotational movement as well as sliding movement. In doing so, adjacent jig segments 24 are essentially locked in place and are held together with superb strength rigidity and are practically impossible to unintentionally disconnect from one another. In addition adjacent jig segments 24 are held together with little to no relative movement to one another due to the rotating and sliding locking connection. Notably, FIGS. 43-63 do not show a spacer 48. However, a spacer 48 is hereby contemplated and operates in the same manner as is described herein with respect to jig segments 24. That is, spacers 48 include the same features as is described herein with respect to jig segments 24 and operate in the same manner as jig segments 24. As such, discussion regarding features of jig segments 24 applies equally to spacers 48. Also, FIGS. 43-63 do not show tail sections 68, however all teachings regarding tail sections 68 herein apply equally to the embodiments shown in FIGS. 43-63. Tail sections are shown in FIGS. and 109-128.

For the purposes of reducing redundancies and being concise, jig segments 24, and spacers 48, of the embodiment of FIGS. 43-63 and 109-128 include and incorporate all of the teachings described herein with respect to other embodiments of the system 10, unless specifically described otherwise. That is, the embodiment of FIGS. 43-63 i and 109-128 includes the previously described features and functionality of other embodiments unless specifically described otherwise.

In the arrangement shown, as one example, jig segments 24 include a first lock feature 44 positioned in a side 28, 30 of jig segment 24 positioned at one end 32, 34 of the jig segment 24, and a second lock feature 44 positioned at the other end 32, 34 of the jig segment 24, with both the first lock feature 44 and second lock feature 44 protruding out of the same side 28, 30 of the jig segment 24. In the arrangement shown, as one example, jig segments 24 include a first receiver 46 that is configured to receive first lock feature 44 and a second receiver 46 that is configured to receive second lock feature 44.

Lock Features:

In the arrangement shown, as one example, in FIGS. 43-63 and 109-128 lock features 44 are positioned in the left side 28 of jig segment 24 and receivers 46 are positioned in the right side 30 of jig segment 24, however the opposite is hereby contemplated as well, as well as any other placement. In the arrangement shown, as one example, in FIGS. 43-63 and 109-128 first lock feature 44 is positioned adjacent the forward end 32 of jig segment 24 and second lock feature 44 is positioned adjacent the rearward end 34 of jig segment 24, however the opposite is hereby contemplated as well, as well as any other placement. The farther the two lock features 44 are spaced from one another the greater the strength and stability of the connection. In the arrangement shown, as one example, in FIGS. 43-63 first receiver 46 is positioned adjacent the forward end 32 of jig segment 24 and second receiver 46 is positioned adjacent the rearward end 34 of jig segment 24, however the opposite is hereby contemplated as well, as well as any other placement.

In this arrangement, first lock feature 44 and second lock feature 44 are similar to one another in that they both include a post 122 that connects to the side of jig segment 24 and extends outward therefrom a distance before connecting to a foot 124 connected to the outward end of post 122. Post 122 and foot 124 are dimensionally different. That is, when viewed from the side, foot 124 of both lock features 44 is larger than post 122. Or, said another way, foot 124 extends past the exterior surfaces of post 122 at least in some places. This dimensional difference between posts 122 and feet 124 facilitates locking of adjacent jig segments 24 and prevents lateral separation of adjacent jig segments 24 once attached to one another.

In the arrangement shown, as one example, first lock feature 44 is positioned adjacent the upper side of the forward end 32 of the sidewall of jig segment 24, however any other placement is hereby contemplated. In the arrangement shown, as one example, second lock feature 44 is positioned adjacent the lower side of the rearward end 34 of the sidewall of jig segment 24, however any other placement is hereby contemplated.

First Lock Feature:

In the arrangement shown, as one example, when viewed from the side, the post 122 of first lock feature 44 is generally rectangular in shape and extends outward of the surface of sidewall of jig segment 24 in a generally perpendicular manner. The generally flat upper and lower surfaces of this rectangular shaped post 122 are positioned at an angle to the generally flat planes formed by the top side 36 and clamping surface 38 of jig segment 24. That is, the generally flat and planar upper and lower surfaces of post 122 of first lock feature 44 angle downward toward clamping surface 38 as they extend from rearward end 34 to forward end 32.

In the arrangement shown, as one example, foot 124 of first lock feature 44 is generally square or diamond shaped when viewed from a side, and generally flat and rectangular when viewed from the forward end 32 or rearward end 34 and includes generally flat and planar interior and exterior surfaces. In the arrangement shown, as one example, the interior and exterior surfaces of foot 124 of first lock feature 44 extend in approximate parallel spaced alignment to the surface of side 28 of jig segment 24 and extends in approximate perpendicular alignment to the upper and lower surfaces of post 122 and the length of extension of post 122. In the arrangement shown, as one example, the upper and lower ends of foot 124 extend above and below the upper and lower surfaces of post 122, respectively. However, any other shape or configuration is hereby contemplated for use.

Second Lock Feature:

In the arrangement shown, as one example, the post 122 of second lock feature 44 is generally cylindrical in shape and extends outward of the surface of sidewall of jig segment 24 in a generally perpendicular manner. In the arrangement shown, as one example, foot 124 of second lock feature 44 is generally square when viewed from a side, and generally flat and rectangular when viewed from the forward end 32 or rearward end 34 and includes generally flat and planar interior and exterior surfaces. In the arrangement shown, as one example, the interior and exterior surfaces of foot 124 of second lock feature 44 extend in approximate parallel spaced alignment to the surface of side 28 of jig segment 24 and extends in approximate perpendicular alignment to the length of extension of post 122. However, any other shape or configuration is hereby contemplated for use.

In the arrangement shown, as one example, the exterior edges of foot 124 of first lock feature 44 and second lock feature 44 are curved, sloped, chamfered or otherwise angled so as to facilitate easier insertion into receivers 46 and connection to adjacent jig segments 24 or spacers 68.

First Receiver:

In the arrangement shown, as one example, on the opposite side of jig segment 24 from first lock feature 44 and second lock feature 44, is first receiver 46. First receiver 46 is formed of any suitable size, shape and design and is configured to receive and hold first lock feature 44 while also allowing first lock feature 44 to rotate within first receiver 46 as well as slide into a fully locked position within first receiver 46. In the arrangement shown, as one example, first receiver 46 includes an opening 200 that has a corresponding size and shape so as to receive the foot 124 of first lock feature 44 therein with close and tight tolerances. With that said, the shape of opening 200 is configured to receive foot 124 in a particular orientation, as is described further herein. In one arrangement, the shape of opening 200 only allows the insertion of foot 124 therein in a single angular alignment while preventing the insertion of foot 124 in a different angular orientation or an opposite angular orientation. Opening 200 also includes recesses or other features that accommodate the elongated rectangular shape of post 122 of first lock feature 122 as the jig segments 24 are rotated with respect to one another to facilitate connection and assembly of adjacent jig segments 24. In the arrangement shown, as one example, the edges of opening 200 are curved, chamfered or angled inward slightly so as to facilitate easy insertion of foot 124 of first lock feature 44 therein.

In the arrangement shown, as one example, first receiver 46 includes a relief 202. Relief 202 is formed of any suitable size, shape and design and is configured to receive post 122 of first lock feature 44 as the two adjacent jig segments are slid with respect to one another. In the arrangement shown, as one example, relief 202 has a corresponding size and shape so as to receive the post 122 of first lock feature 44 therein with close and tight tolerances as the two jig segments 24 are slid with respect to one another. That is, in the arrangement shown, as one example, wherein when the post 122 of first lock feature 44 is generally rectangular in shape, relief 202 is similarly rectangular shaped and orientated to receive the post 122 when it slides forward into relief 202. With that said, the angle and position of the shape of relief 202 is configured to only align and receive post 122 after the foot 124 has been fully inserted within opening 200 followed by rotation of the jig segments 24 relative to one another. Once the jig segments 24 have been fully rotated with respect to one another, such that their clamping surfaces 38 are in generally flat and flush planar alignment, at that time, and only at that time does relieve 202 align with post 122. Once aligned, jig segments 24 may be slid with respect to one another at which point in time the rectangular shaped post 122 of first lock feature is received within the rectangular shaped relief 202 connected to opening 200.

In the arrangement shown, as one example, relief 202 is connected to the rearward side of opening 200. Also, in the arrangement shown, as one example, the upper and lower surfaces of relief 202 extend upward at an angle from clamping surface 38 to top side 36 as relief extends rearward from opening 200 toward rearward end 34. Any other position or shape is hereby contemplated for use.

In the arrangement shown, as one example, when first lock feature 44 is positioned within first receiver 46 and is fully rotated as well as slid in place, the upper surface of post 122 is in approximate flat and flush engagement with the upper surface of relief 202; the lower surface of post 122 is in approximate flat and flush engagement with the lower surface of relief 202; the rearward end of post 122 is in approximate flat and flush engagement with the rearward end of relief 202; and the inward facing surface of foot 124 that extends past post 122 is in flat and flush engagement with the inward surface of the area adjacent to relief 202. In this position, first lock feature 44 is fully locked in place within first receiver 46 and is prevented from laterally pulling out of first receiver 46.

Once fully assembled, to remove first lock feature 44 from first receiver 46, first lock feature 44 is slid away from the end of relief 202 and toward opening 200. Once post 122 of first lock feature 44 enters opening 200 the two jig segments 24 are rotated with respect to one another until the features of foot 124 of first lock feature 44 aligns with the features of opening 200 at which point the two jig segments 24 may be laterally moved away from one another as the foot 124 of one jig segment 24 moves out of the opening 200 of the first receiver 46 of the other jig segment 46.

Second Receiver:

In the arrangement shown, as one example, a second receiver 46 is positioned on the same side of jig segment 24 as first receiver 46, however the opposite arrangement is hereby contemplated for use. But unlike first receiver 46, which is positioned adjacent the forward end 32 of jig segment 24, second receiver 46 is positioned adjacent the rearward end 34 of jig segment 24, however the opposite arrangement is hereby contemplated for use. Second receiver 46 is formed of any suitable size, shape and design and is configured to receive and hold second lock feature 44 while also allowing second lock feature 44 to rotate into second receiver 46 as well as slide into a fully locked position within second receiver 46. In the arrangement shown, as one example, second receiver 46 includes a slot 204 that connects to a neck 206 and includes a collar 208 positioned between the slot 204 and neck 206. However any other shape is hereby contemplated for use.

In the arrangement shown, as one example, second receiver 46 includes a slot 204 that is sized and shaped to receive post 122 of second lock feature 44 therein with close and tight tolerances as the two jig segments 24 are rotated with respect to one another. Notably, the size, shape and orientation of the opening 200 of the first receiver 46 is configured to only allow insertion of foot 124 of lock feature 44 into opening 200 when the second lock feature 44 is positioned below second receiver 46 such that when the two jig segments are rotated together second lock feature 44 rotates toward and into second receiver 46 through slot 204. In the arrangement shown, as one example, slot 204 connects with the clamping surface 38. Or, said another way, slot 204 opens on its bottom side at clamping surface 38. In this way, as the two jig segments 24 are rotated with respect to one another the post 122 of second lock 44 feature slides upward within slot 204 while the larger foot 124 is captured in the space behind slot 204 within the body of jig segment 24. In the arrangement shown, as one example the lower end of slot 204 is curved, chamfered or otherwise angled to help guide the insertion of post 122 into slot 204 which eases assembly.

In the arrangement shown, as one example, slot 204 extends upward a distance from clamping surface 38 and the upper end of slot 204 connects to a neck 206. Like, slot 204, neck 206 is sized and shaped to receive post 122 of second lock feature 44 therein. In the arrangement shown, as one example, neck 206 extends rearward from slot 204 a distance and at an angle. In the arrangement shown, as one example, neck 206 extends rearward from slot 204 a distance and at an angle that is similar to if not identical to the distance and angle that relief 202 extends from first receiver 46.

In the arrangement shown, as one example, a collar 208 is positioned between slot 204 and neck 206. Collar 208 forms a narrow spot between slot 204 and neck 206. In this way, as the post 122 of second lock feature 44 moves from slot 204 to neck 206 the narrower collar 208 imparts friction on post 122 which requires force to overcome. Once enough force is applied and post 122 moves past collar 208, post 122 is frictionally held within neck 206 with tight and close frictional tolerances. To move post 122 from slot 204 to neck 206, jig segments 24 are slid with respect to one another. Once post 122 of second lock feature 44 is held within neck 206 due to the narrower collar 208 to remove post 122 from neck 206 enough force is applied to cause post 122 to overcome the frictional engagement of collar 208 on post 122. Once the post 122 is slid past collar 208 by laterally sliding adjacent jig segments 24 with respect to one another, the post 122 enters slot 204 and the two jig segments 24 may be rotated with respect to one another thereby allowing the post 122 of second lock feature 44 to exit the lower end of slot 204.

In this way, the combination of the features of first lock feature 44 and second lock feature 44 and first receiver 46 and second receiver 46 work in concert with one another to facilitate a secure connection between two adjacent jig segments 24 and/or spacers 48 by both rotational movement as well as by sliding movement.

Additional Lock Features and Receivers:

In the arrangement shown, as one example, only a single first lock feature 44 and a single first receiver 46 may be used as the jig segments 24 rotate upon this connection point between first lock feature 44 and first receiver 46. In the arrangement shown, only a single second lock feature 44 and a single second receiver 46 is shown for use. However, it is hereby contemplated that any number of second lock features 44 and second receivers 46 may be included in jig segment 24. These additional second lock features 44 and second receivers 46 may be placed at any position along any portion of the sides 28, 30 of jig segment 24, such as two, three, four, five or more second lock features 44 and second receivers 46. The addition of additional second lock features 44 and second receivers 46 provides additional strength and rigidity and strength of hold between opposing jig segments 24. Also, while second receivers 46 and second lock features 44 are shown adjacent the lower end of sides 28, 30 at the intersection of sides 28, 30 and clamping surface 38, it is hereby contemplated that second receivers 46 and second lock features 44 may be placed at the intersection of the top side 36 and sides 28, 30 as well.

Screw Receivers:

In the arrangement shown, as one example, the sides 28, 30 of main body 26 of jig segments 24 include screw receivers 210. Screw receivers 210 are formed of any suitable size, shape and design and are configured to facilitate the attachment of jig segment 24 to a workpiece 116. That is, in some situations, such as repairing a shelf or a table leg or a cabinet or another part, it is necessary to attach jig segment 24 in a way where a clamp 120 cannot be used. In this situation, jig segment 24 is placed against the workpiece 116 at the position where the pocket hole is to be drilled and a screw or nail or other attachment member is passed through screw receiver(s) 210 thereby holding the jig segment 24 in place. Once the jig segment 24 is held in place, a pocket hole may be drilled in the workpiece 24. Once the pocket hole is drilled, the nail, screw or other attachment member is removed thereby allowing for removal of the jig segment from the workpiece 116.

In the arrangement shown, as one example, a screw receiver 210 is positioned in each side 28, 30 of jig segment 24. In the arrangement shown, as one example, screw receiver 210, when viewed from above or below, is formed of approximately a half circle cut-out in the side 28, 30 of jig segment 24 that extends in a generally constant manner from top side 36 through clamping surface 38. In the arrangement shown, as one example, screw receivers 210 are positioned at about the middle of jig segment 24, with one screw receiver 210 positioned in each side 28, 30 such that the opposing jig segments 24 are aligned with one another, one on each side 28, 30.

When only a single jig segment 24 is used, a nail, screw or other attachment member is placed in each screw receiver 210. In this way, jig segment 24 is sandwiched between opposing nails or screws held in opposing sides of the jig segments 24. In this way, two screws are used, one in each screw receiver 210, to hold a single jig segment 24 to workpiece 116.

When two or more jig segments 24 (or a jig segment 24 and a spacer 48 for that matter), are connected together in side-by-side aligned connection, the screw receiver 210 of one jig segment 24 aligns with the screw receiver 210 of the other jig segment 24. In this way, when two jig segments 24 are connected together the adjacent screw receivers 210 form a cylindrical opening between the combined jig segments 24 that is configured to receive a screw or nail or other fastening member therein. In this arrangement, when two jig segments 24 are used a single nail, screw or other attachment member may be placed in the combined screw receivers 210 between the two jig segments 24. In this way, the single screw, nail or other attachment mechanism is sandwiched between adjacent jig segments 24. In this way, a single screw or nail or other attachment mechanism may be used to hold a two or more jig segments 24 to workpiece 116. In this arrangement, additional screws or nails may also be inserted in the exterior-positioned screw receivers 210 as well as the centrally positioned screw receiver(s) 210.

While only a single screw receiver 210 is shown placed in each side 28, 30 of jig segments 24, any number of screw receivers 210 are hereby contemplated for use, such as two, three, four, five or more. In addition, while a semi-circular shaped screw receiver 210 is shown, any other shape is hereby contemplated for use such as square, rectangular, triangular, oval, or the like. In addition, while screw receivers 210 are shown as recesses in the sides 28, 30 of jig segments 24, it is hereby contemplated for use that screw receivers 210 may be formed of openings that extend through the main body 26 of jig segments 24. Any other configuration for jig segments 210 is hereby contemplated for use.

Ramps:

In the arrangement shown, as one example, sidewalls 28, 30 of jig segments 24 include one or more ramps 212. Ramps 212 are formed of any suitable size, shape and design and are configured to provide frictional engagement between opposing jig segments 24 when opposing jig segments 24 are in a fully assembled state. In addition, ramps 212 are configured to force adjacent jig segments 24 away from one another when opposing jig segments 24 are in a fully assembled state thereby increasing the strength of hold and tension between the connecting surfaces of feet 124 of one jig segment 24 with the receiver 46 of the other jig segment 24. The presence of ramps 212 creates a more rigid overall tool when multiple jig segments 24 and/or spacers 48 are connected to one another.

In the arrangement shown, as one example, a plurality of ramps are positioned in the sides 28, 30 of jig segments 24 spaced between the forward end 32 and the rearward end 34. In the arrangement shown, three ramps 212 are positioned in spaced relation along sides 28, 30 of jig segments 24, however any other number of ramps 212 are hereby contemplated for use including zero, one, two, three, four, five, six or more. In the arrangement shown, as one example, when viewed from above or below, ramps 212 are generally smooth rounded or curved protrusions that bulge slightly outward from the generally planar sides 28, 30 of jig segments 24. In the arrangement shown, ramps 212 extend in a generally consistent fashion outward from sides 28, 30 from the top edge of the sides 28, 30 to the bottom edge of the sides 28, 30, however in some arrangements the sides 28, 30 angle slightly outward as they extend downward from the top side 36 to the clamping surface 38. The use of ramps 212 is particularly useful in facilitating a secure connection between jig segments 24 and spacers 48 in the arrangement where adjacent jig segments 24 are connected together in a sliding fashion.

Figure 96:
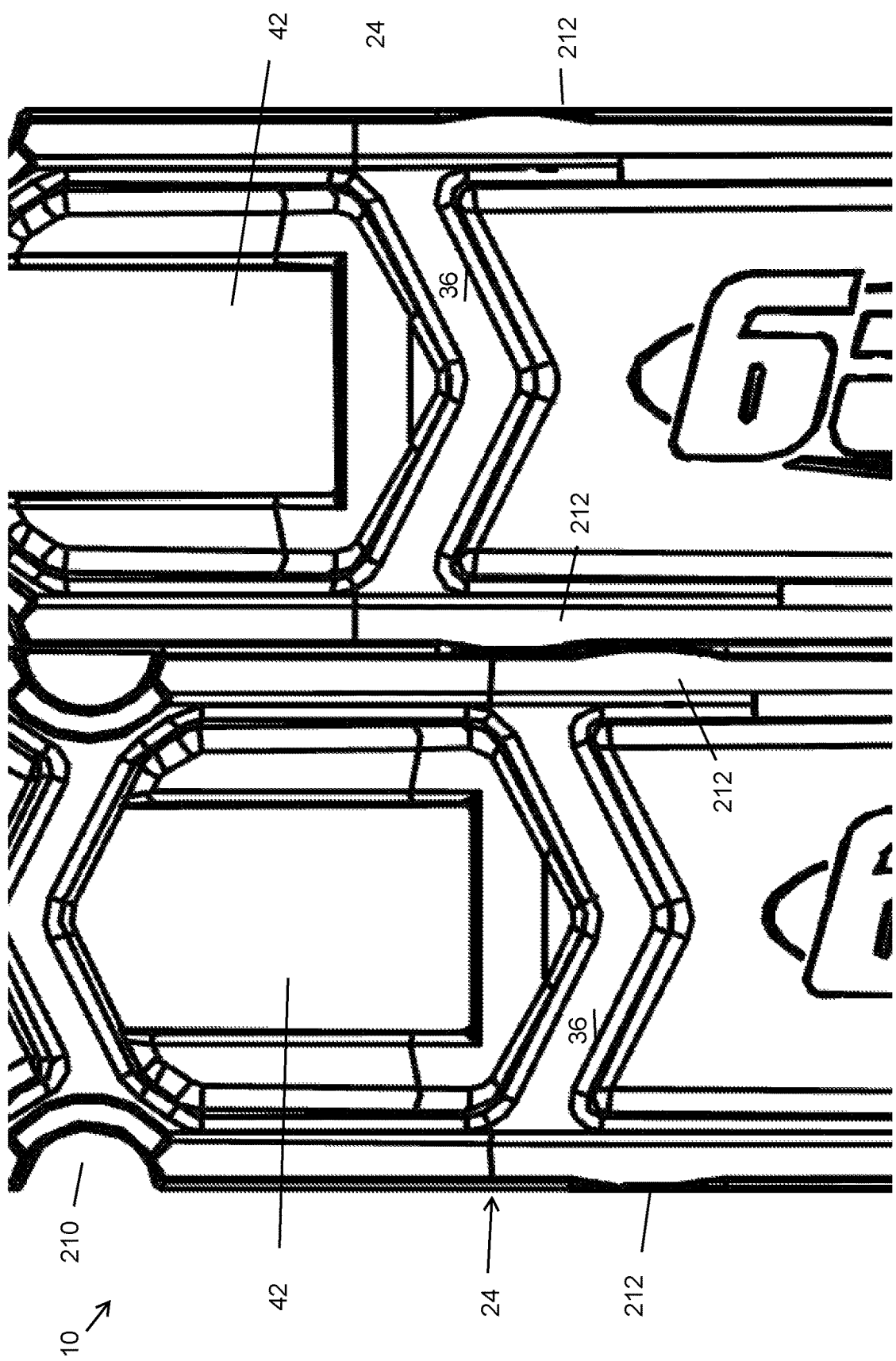
FIG. 96 is a close up top elevation view of a portion the mini pocket hole jig system shown in FIGS. 43-90, the view showing two jig segments connected together in side-to-side but offset alignment, the view showing ramps of the adjacent jig segments offset from one another prior to the two jig segments being slid laterally with respect to one another into a fully locked arrangement.

FIG. 96, is a close-up top view of two adjacent jig segments 24 that have been connected together by inserting the first lock feature 44 of one jig segment 24 into the first receiver 46 of the other jig segment 24 and the two jig segments 24 have been rotated such that their clamping surfaces 38 are in planar alignment. As shown in FIG. 96, in this position, the ramps 212 of each jig segment 24 are off-set from one another. That is, said another way, the peak of the curved surface of the ramps 212 of one jig segment 24 engage the side 28, 30 of the other jig segment 24. In this view, the ends 32, 34 of adjacent jig segments 24 are laterally offset.

Figure 97:
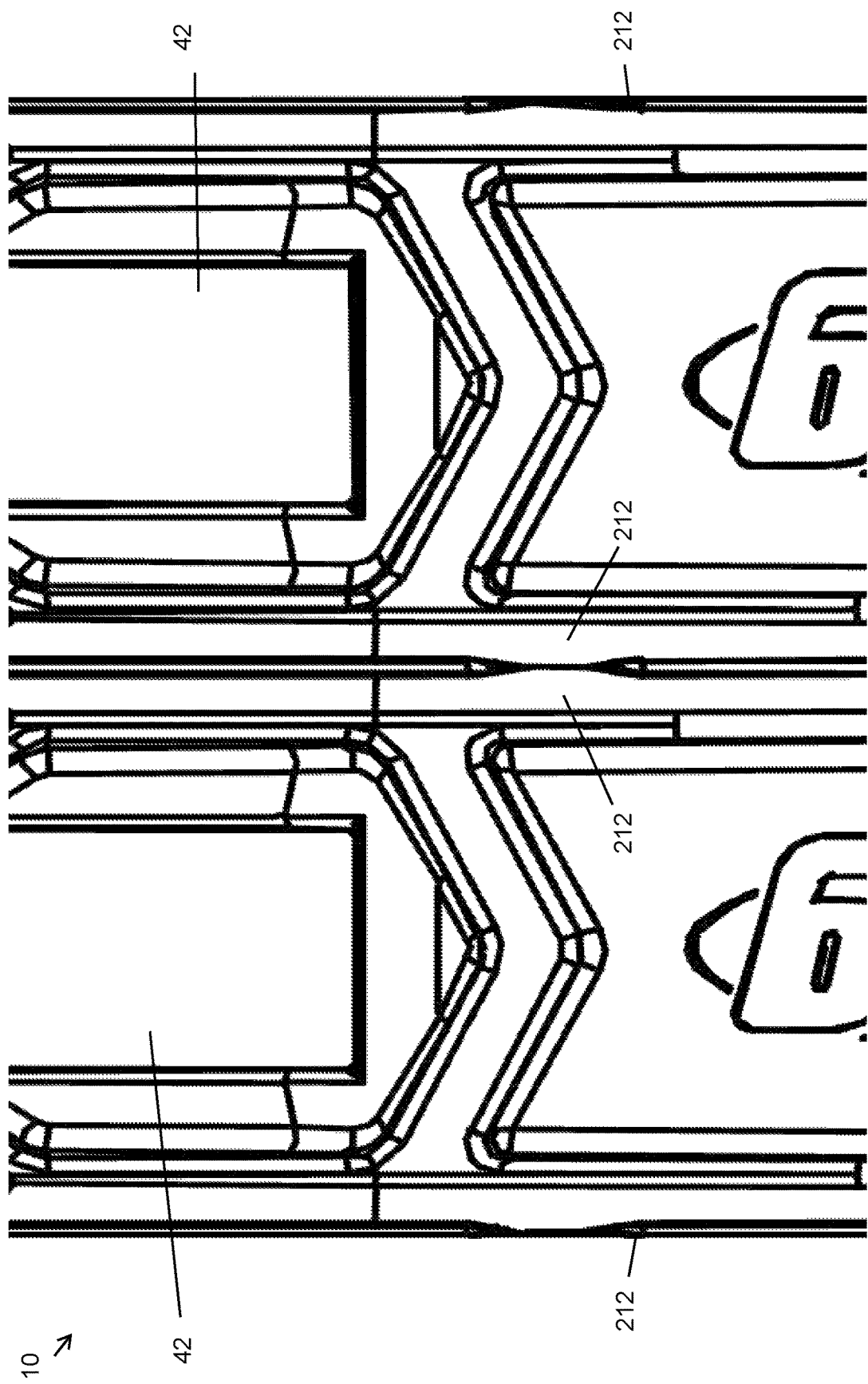
FIG. 97 is a close up top elevation view of a portion the mini pocket hole jig similar to that shown in FIG. 96, the view showing two jig segments connected together in side-to-side and laterally aligned alignment, the view showing ramps of the adjacent jig segments in alignment with one another thereby forcing the two jig segments away from one another so as to facilitate locking engagement and a tight fit between adjacent jig segments and/or spacers.
Figure 98:
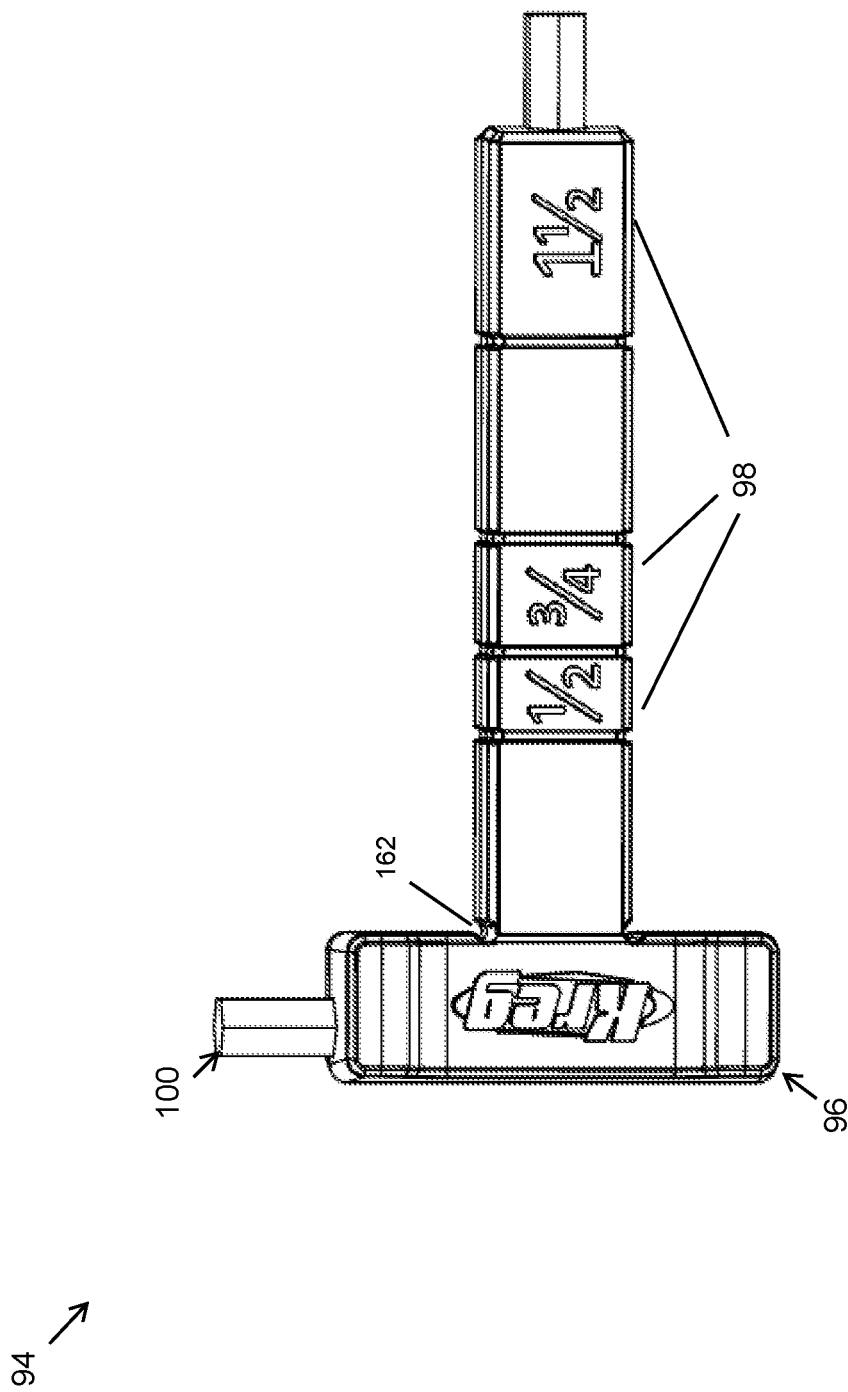
FIG. 98 is a side elevation view of another embodiment of a workpiece thickness gauge having a main body with an Allen wrench extending through the main body, the view showing the main body having a plurality of indicia that correlate to workpiece thickness.
Figure 99:
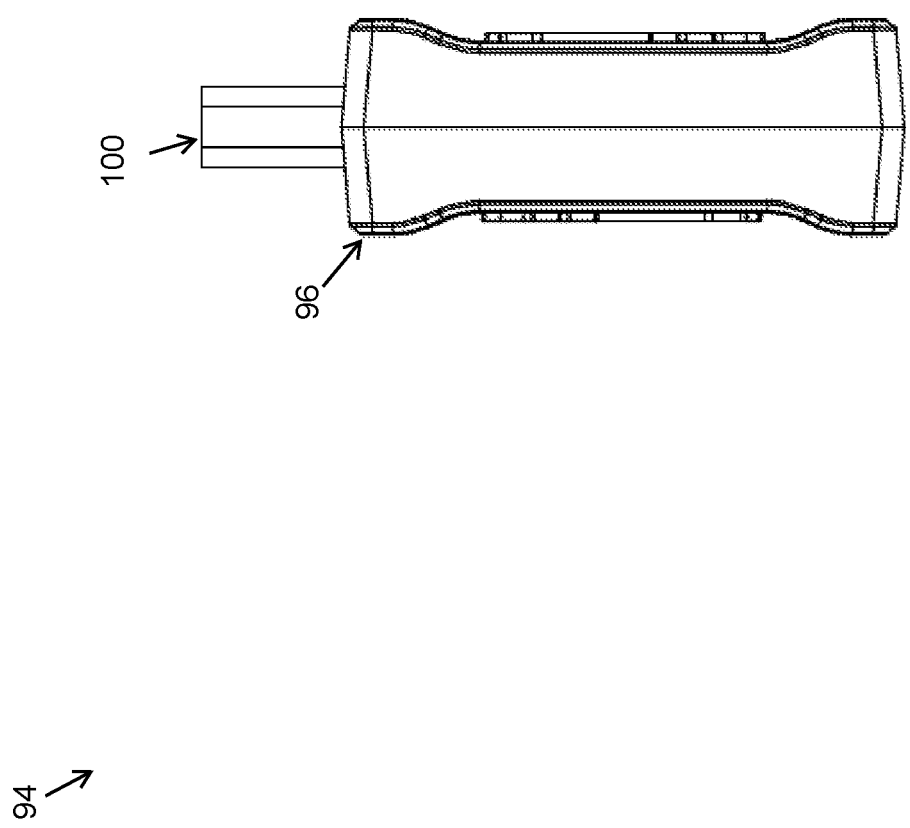
FIG. 99 is an end elevation view of the workpiece thickness gauge shown in FIG. 98.
Figure 100:
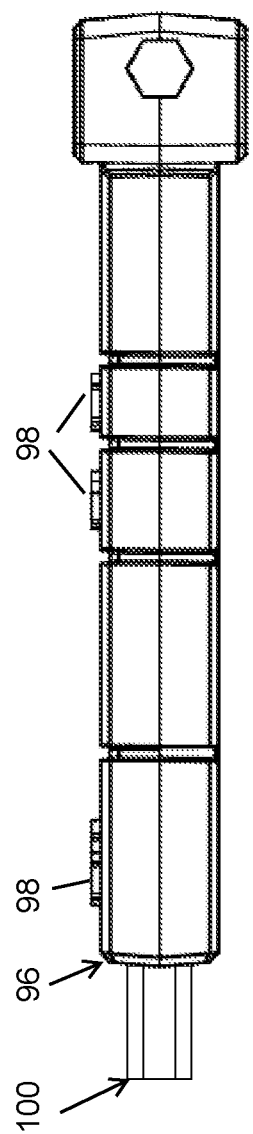
FIG. 100 is a top elevation view of the workpiece thickness gauge shown in FIG. 98.
Figure 101:
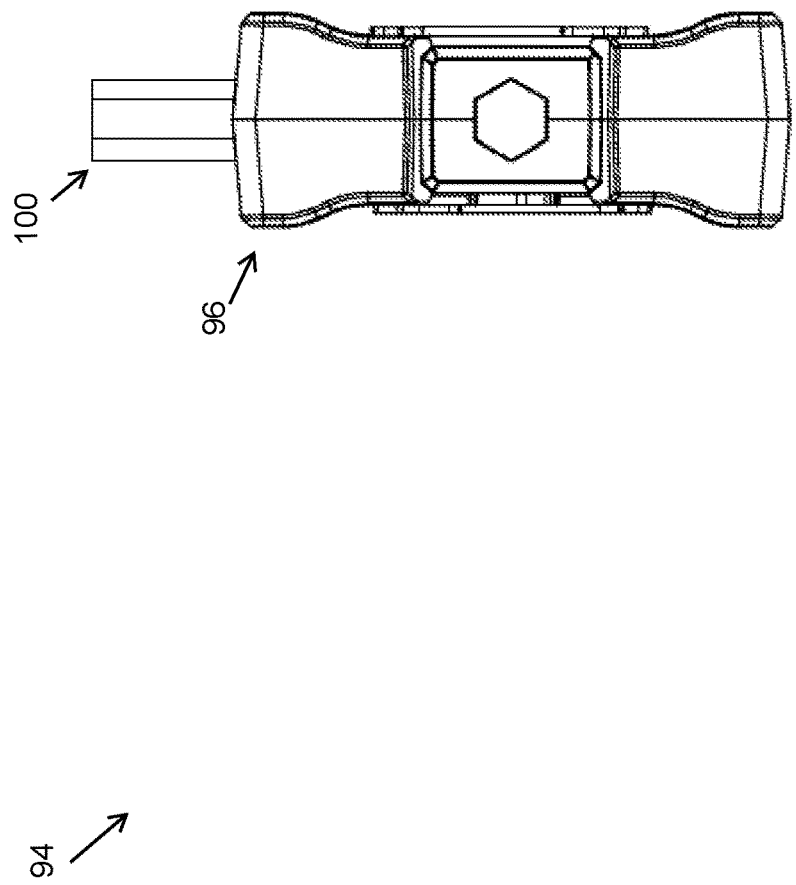
FIG. 101 is another end elevation view of the workpiece thickness gauge shown in FIG. 98.
Figure 102:
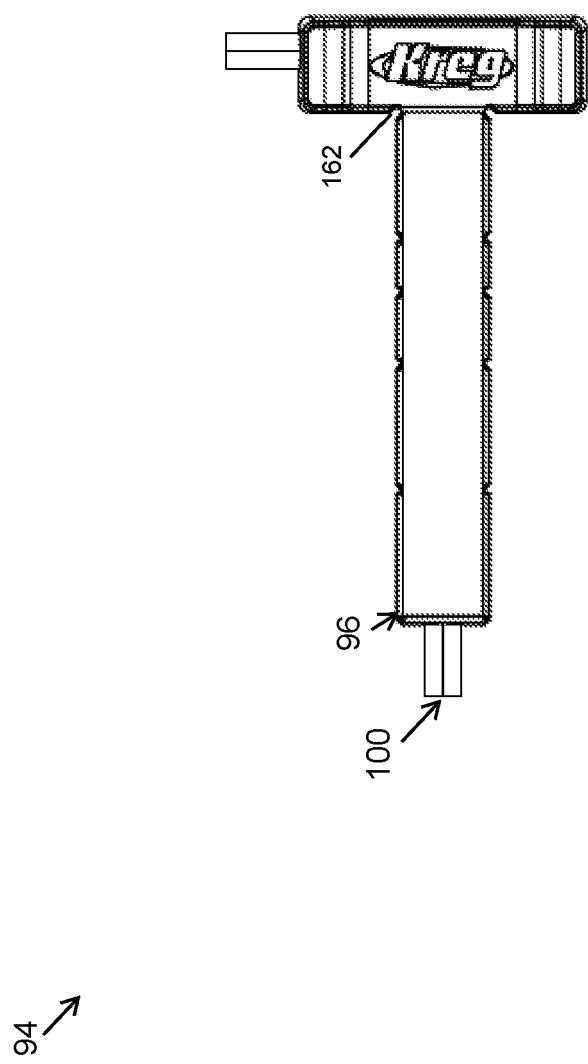
FIG. 102 is another side elevation view of the workpiece thickness gauge shown in FIG. 98.
Figure 103:
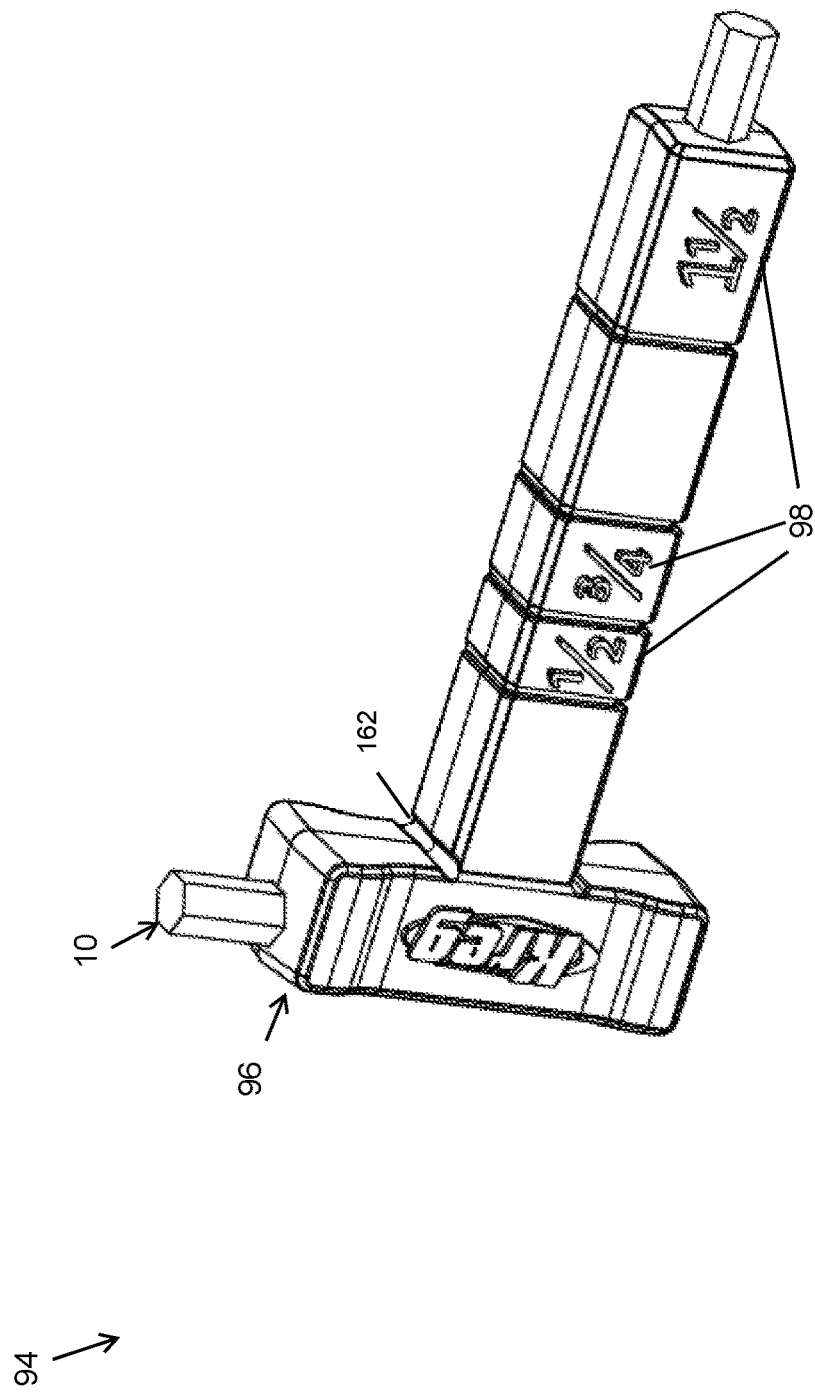
FIG. 103 is a perspective view of the workpiece thickness gauge shown in FIG. 98.
Figure 104:
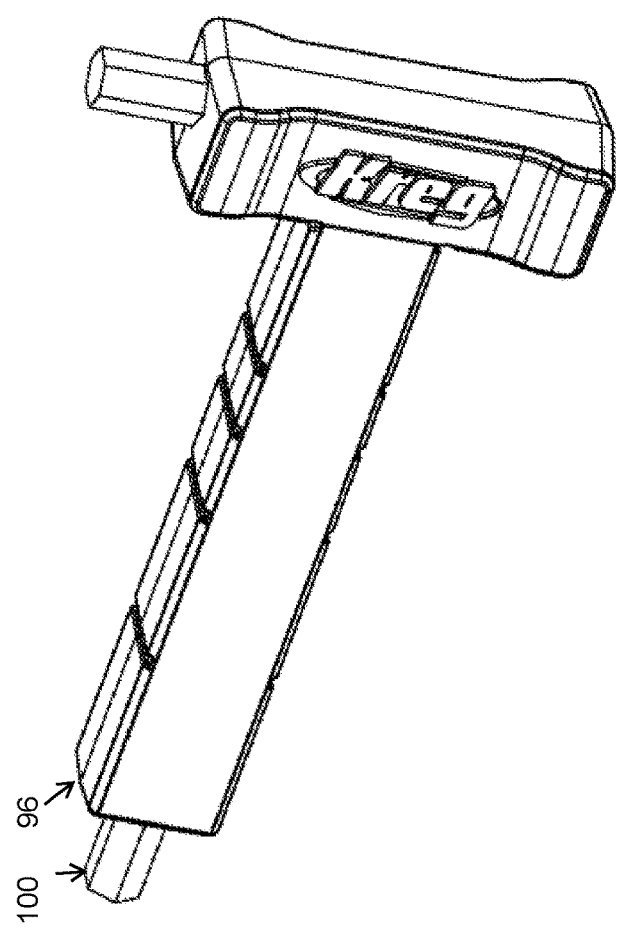
FIG. 104 is another perspective view of the workpiece thickness gauge shown in FIG. 98.
Figure 105:
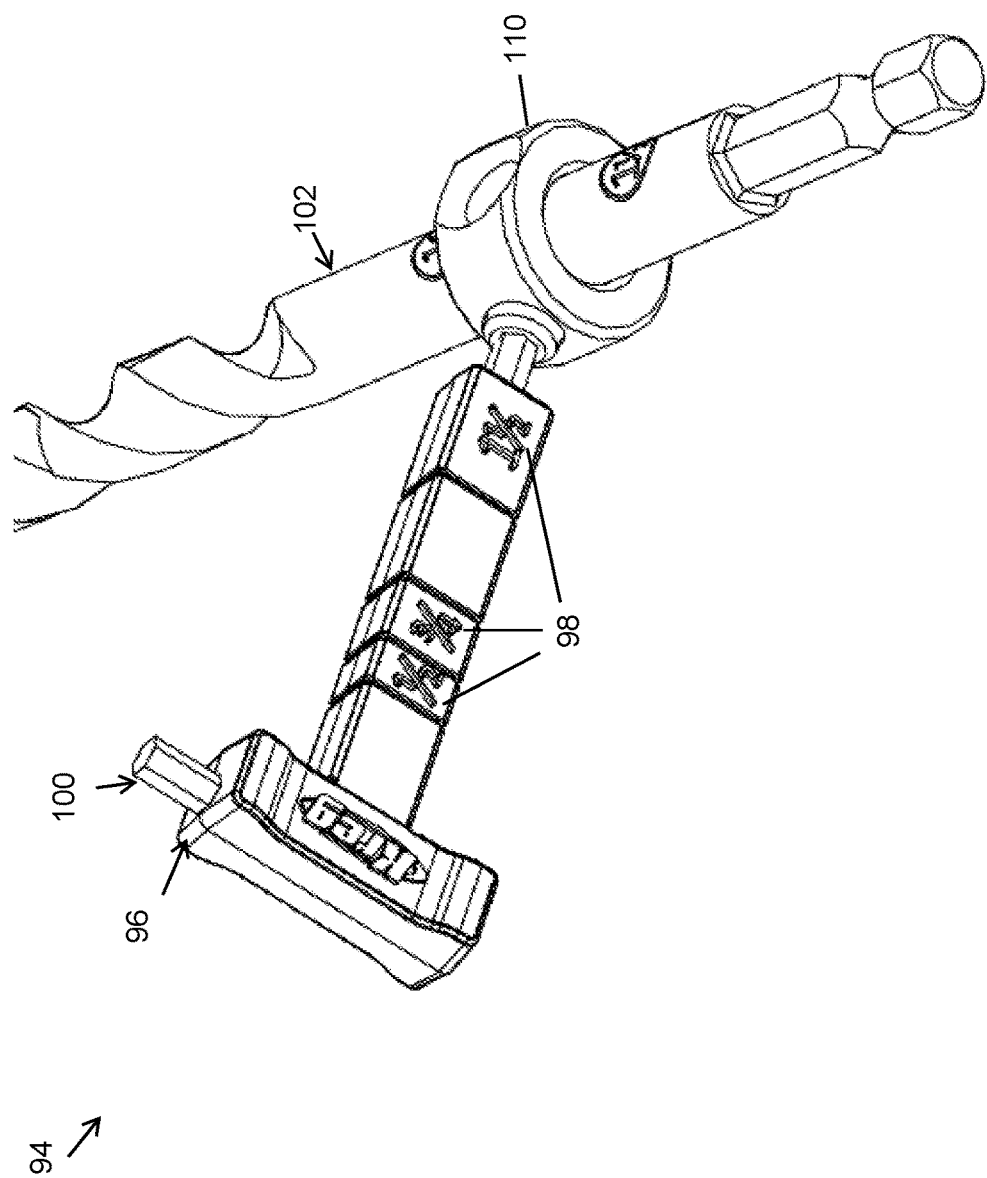
FIG. 105 is a perspective view of the workpiece thickness gauge shown in FIG. 98, the view showing the workpiece thickness gauge tightening the lock screw of a stop collar positioned around the shaft of a stepped drill bit.
Figure 106:
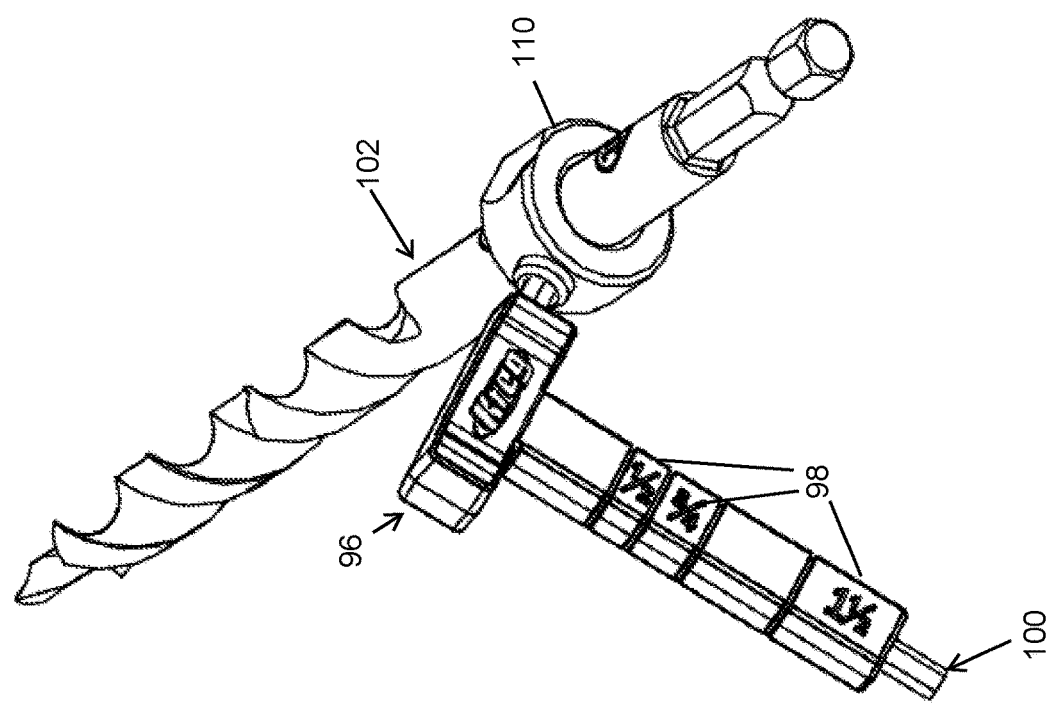
FIG. 106 is another perspective view of the workpiece thickness gauge shown in FIG. 98, the view showing the workpiece thickness gauge tightening the lock screw of a stop collar positioned around the shaft of a stepped drill bit.
Figure 107:
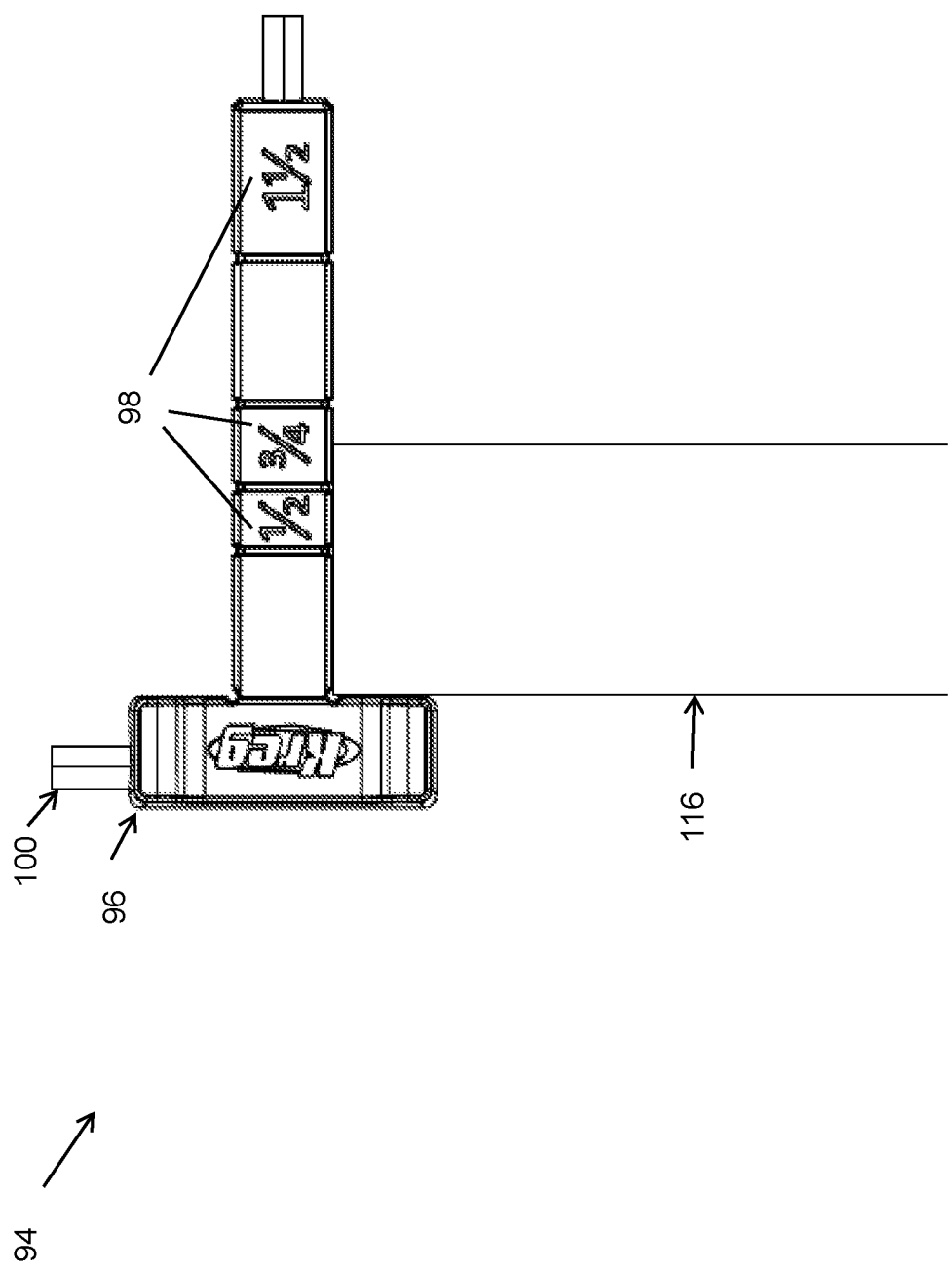
FIG. 107 is an elevation view of the workpiece thickness gauge shown in FIG. 98, the view showing the workpiece thickness gauge measuring the thickness of a workpiece.
Figure 108:
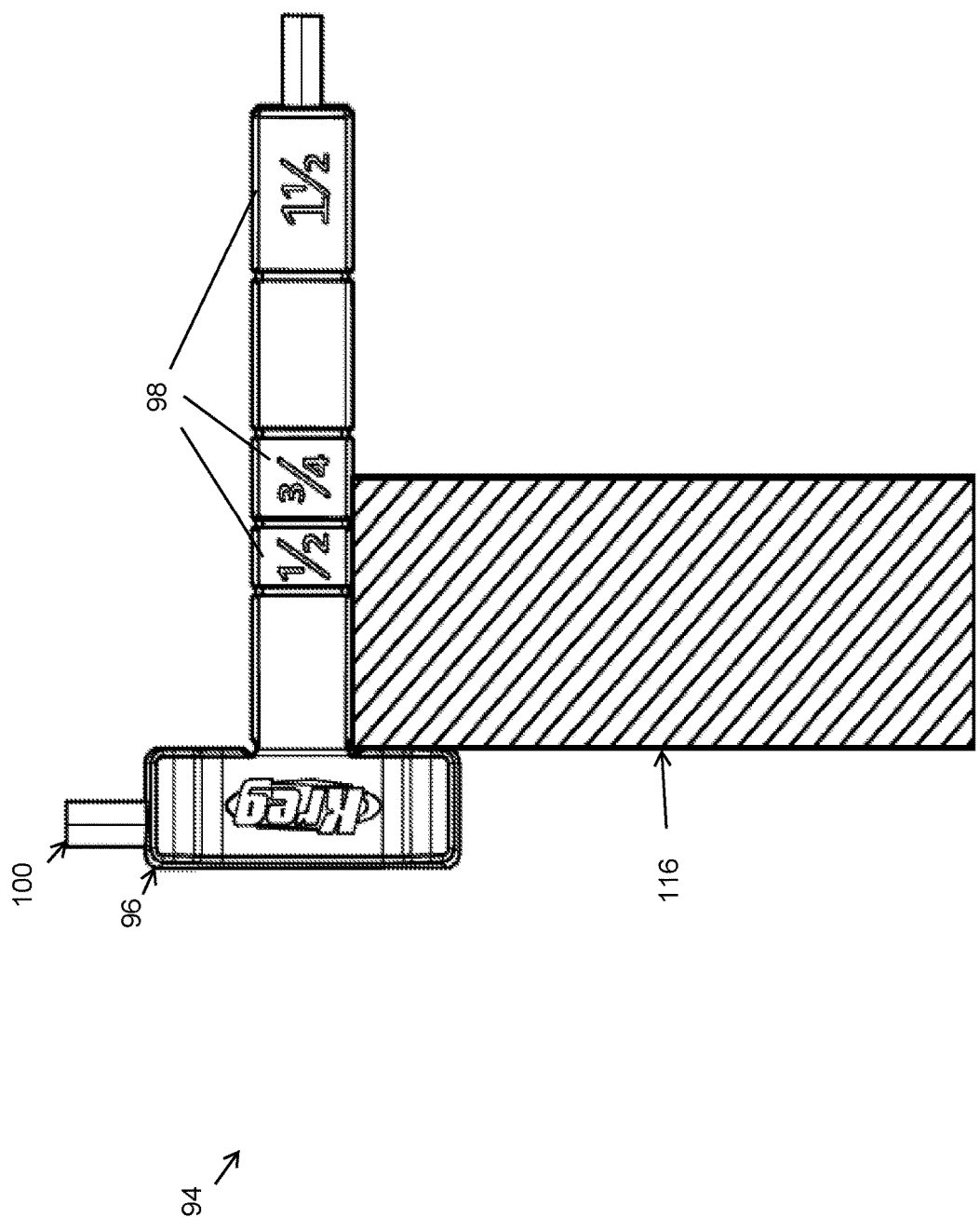
FIG. 108 is a close up elevation view of the workpiece thickness gauge shown in FIG. 107, the view showing the workpiece thickness gauge measuring the thickness of a workpiece.
Figure 109:
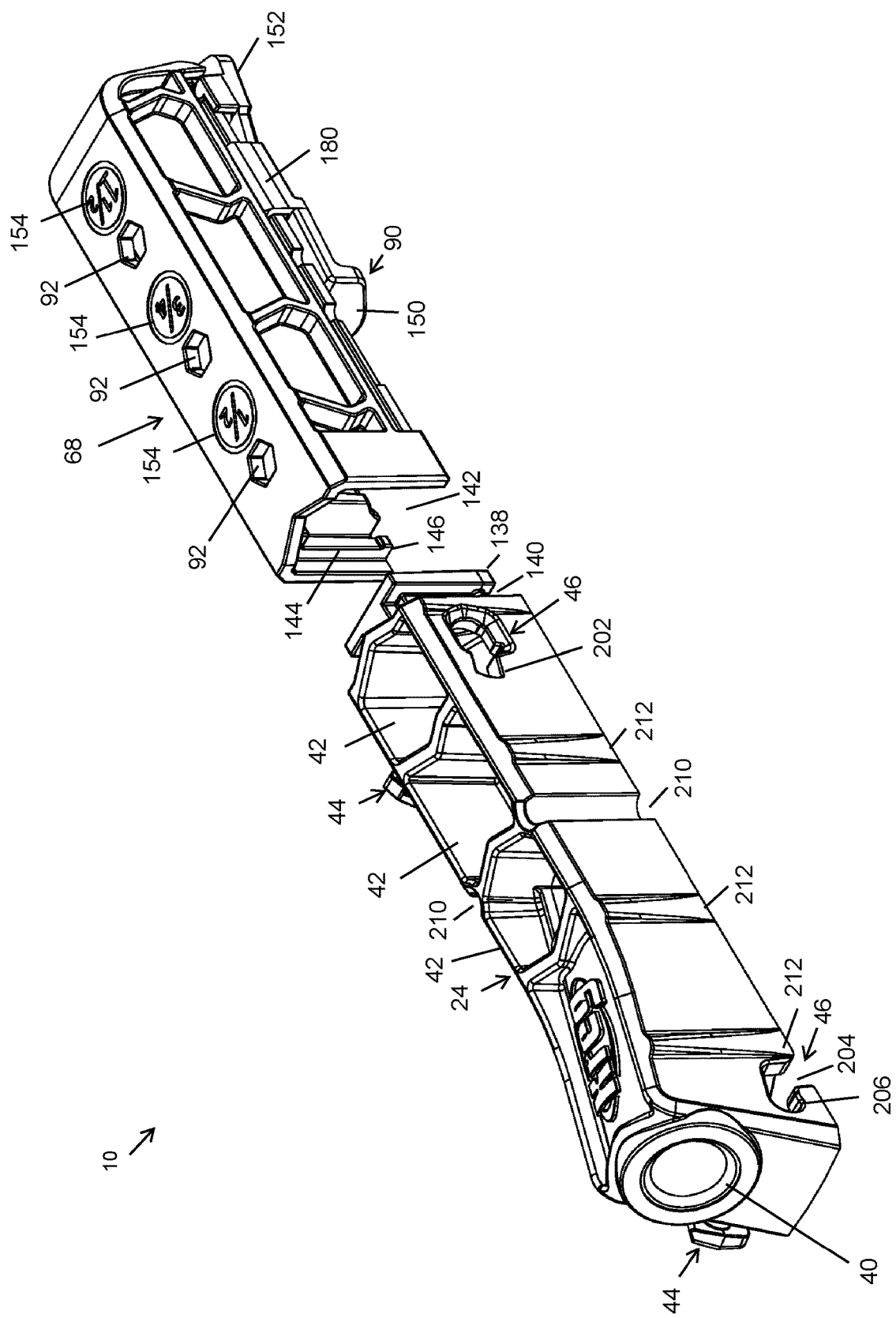
FIG. 109 is a perspective exploded view of the mini pocket hole jig system shown in FIGS. 43-97, the view showing the tail section exploded from the end of the jig segment.
Figure 110:
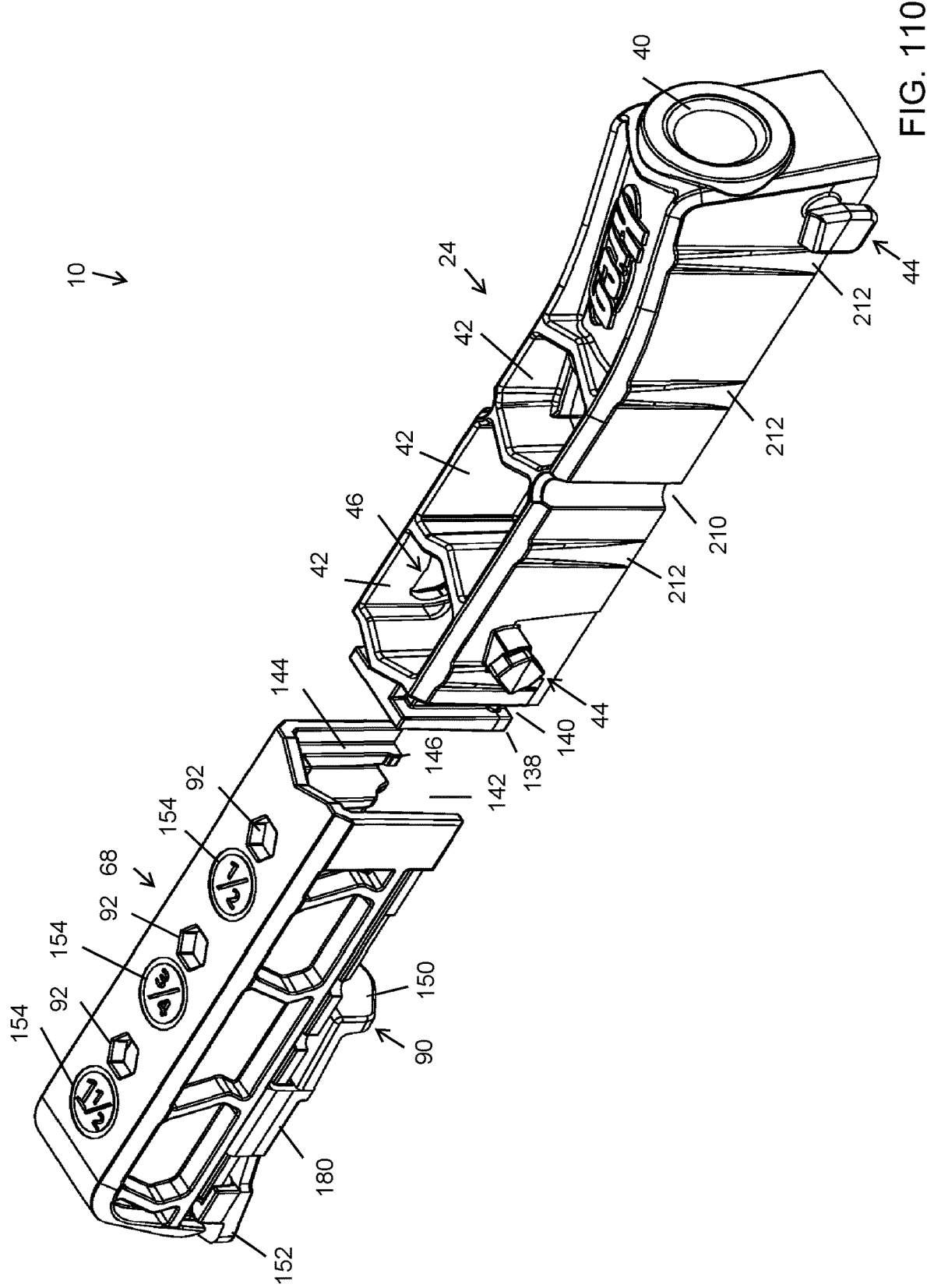
FIG. 110 is another perspective exploded view of the mini pocket hole jig system shown in FIG. 109, the view showing the tail section exploded from the end of the jig segment.
Figure 111:
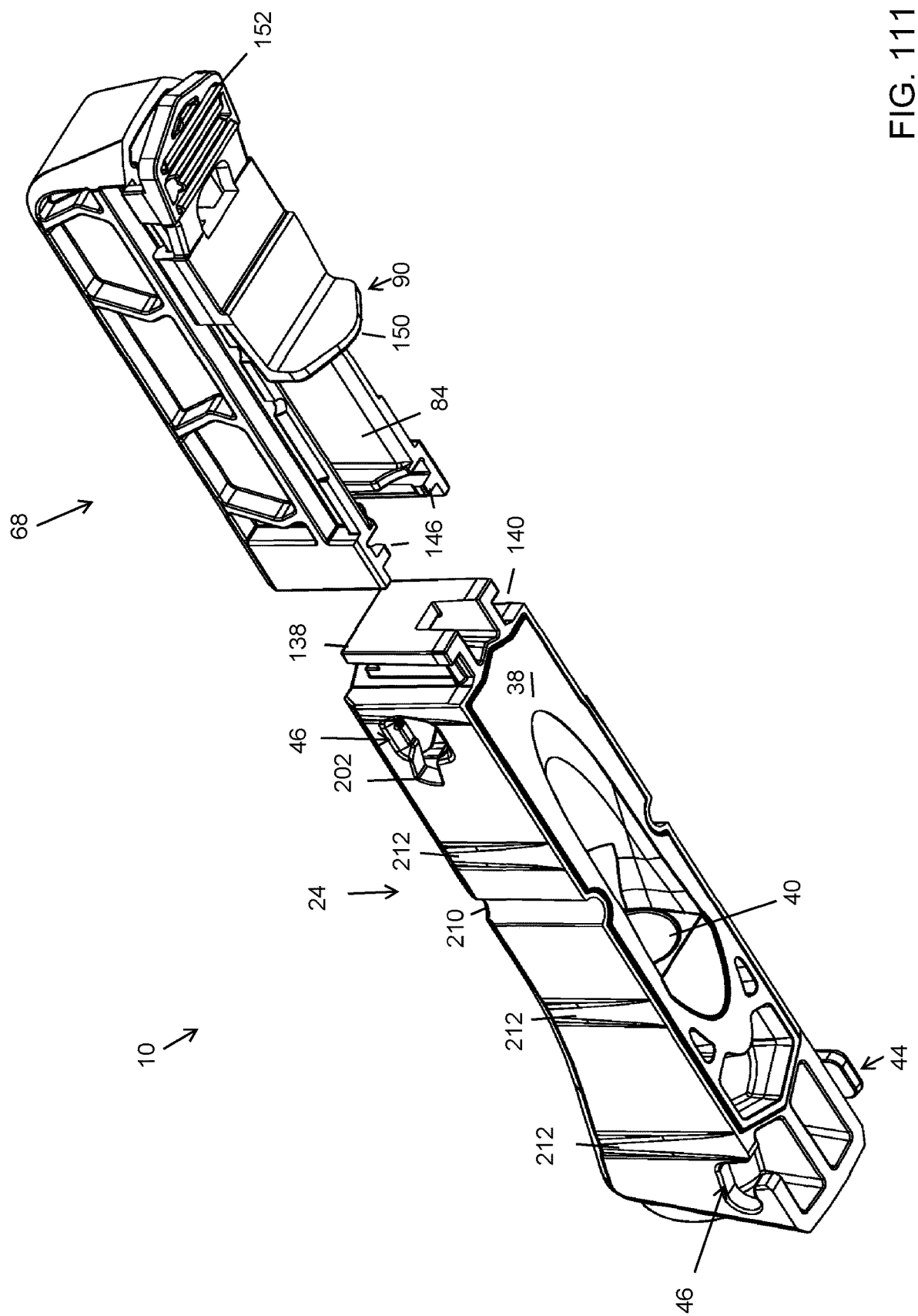
FIG. 111 is a bottom perspective exploded view of the mini pocket hole jig system shown in FIG. 109, the view showing the tail section exploded from the end of the jig segment.
Figure 112:
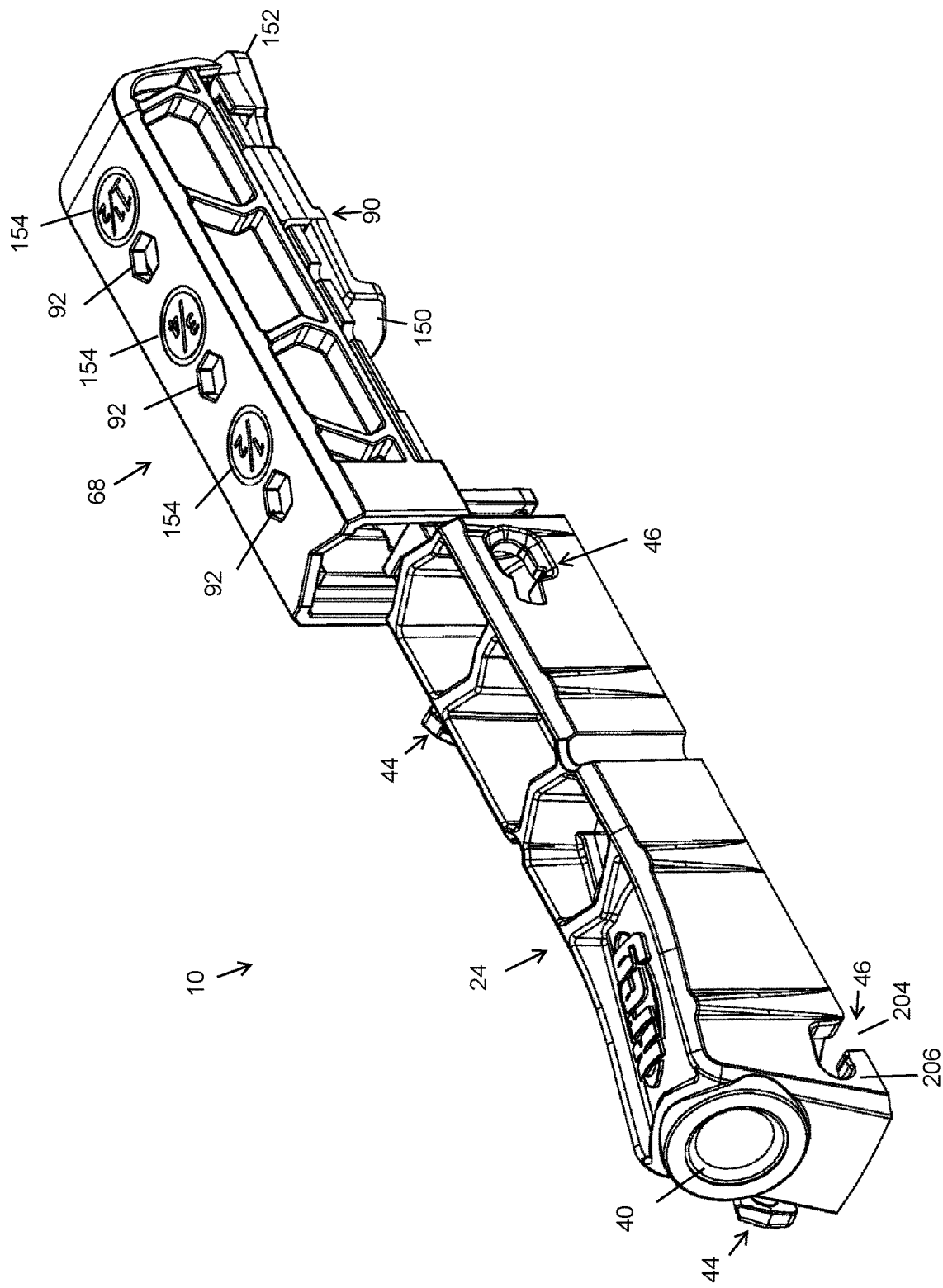
FIG. 112 is another perspective view of the mini pocket hole jig system shown in FIG. 109, the view showing the tail section partially slid over the connector at the end of the jig segment.
Figure 113:
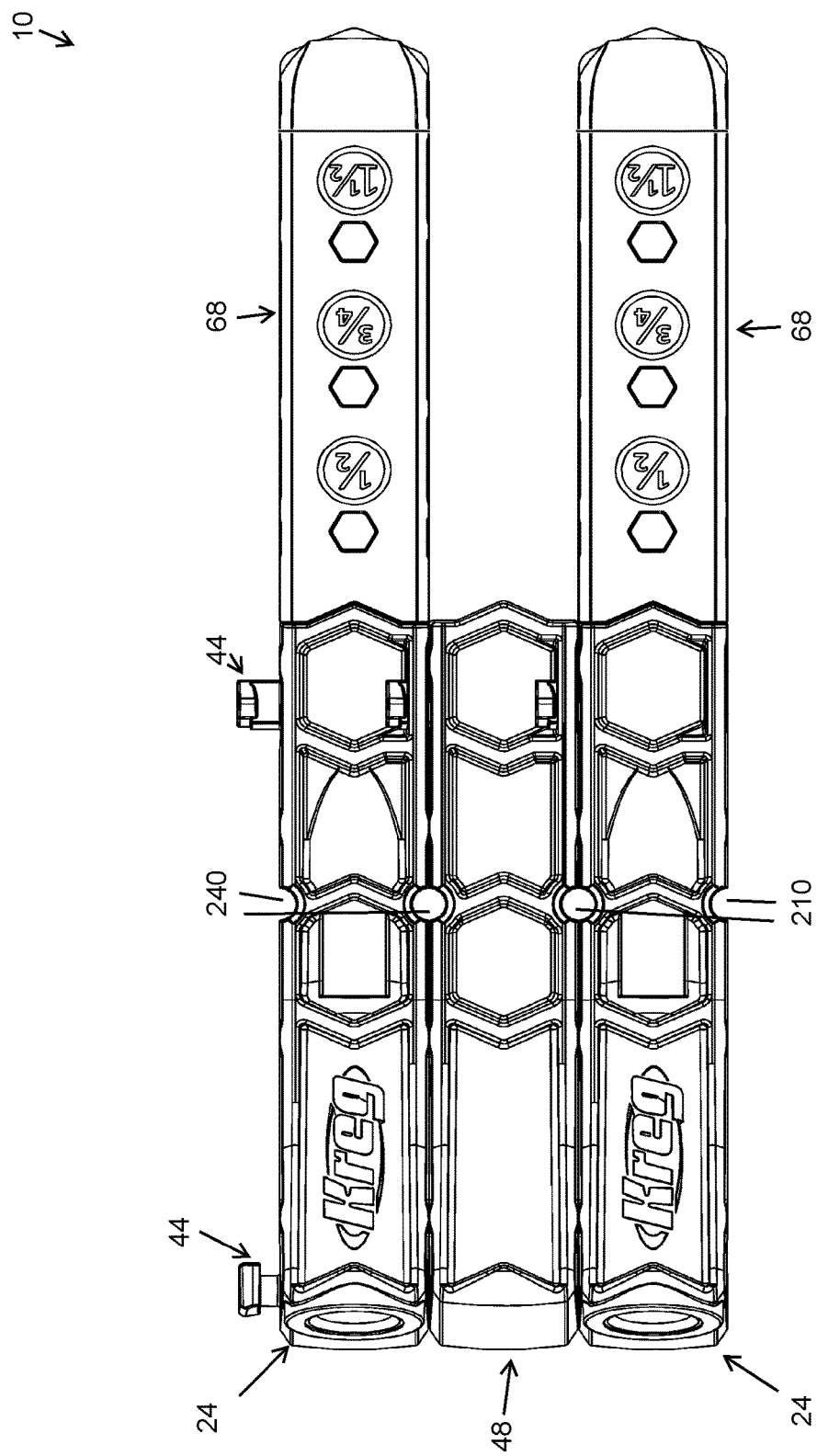
FIG. 113 is a top elevation view of the mini pocket hole jig system shown in FIGS. 43-97 and FIGS. 109-112, the view showing two jig segments with tail sections connected to the ends of the jig segments, the view showing the two jig segments connected in parallel spaced relation to one another with a spacer positioned between the two jig segments.
Figure 114:
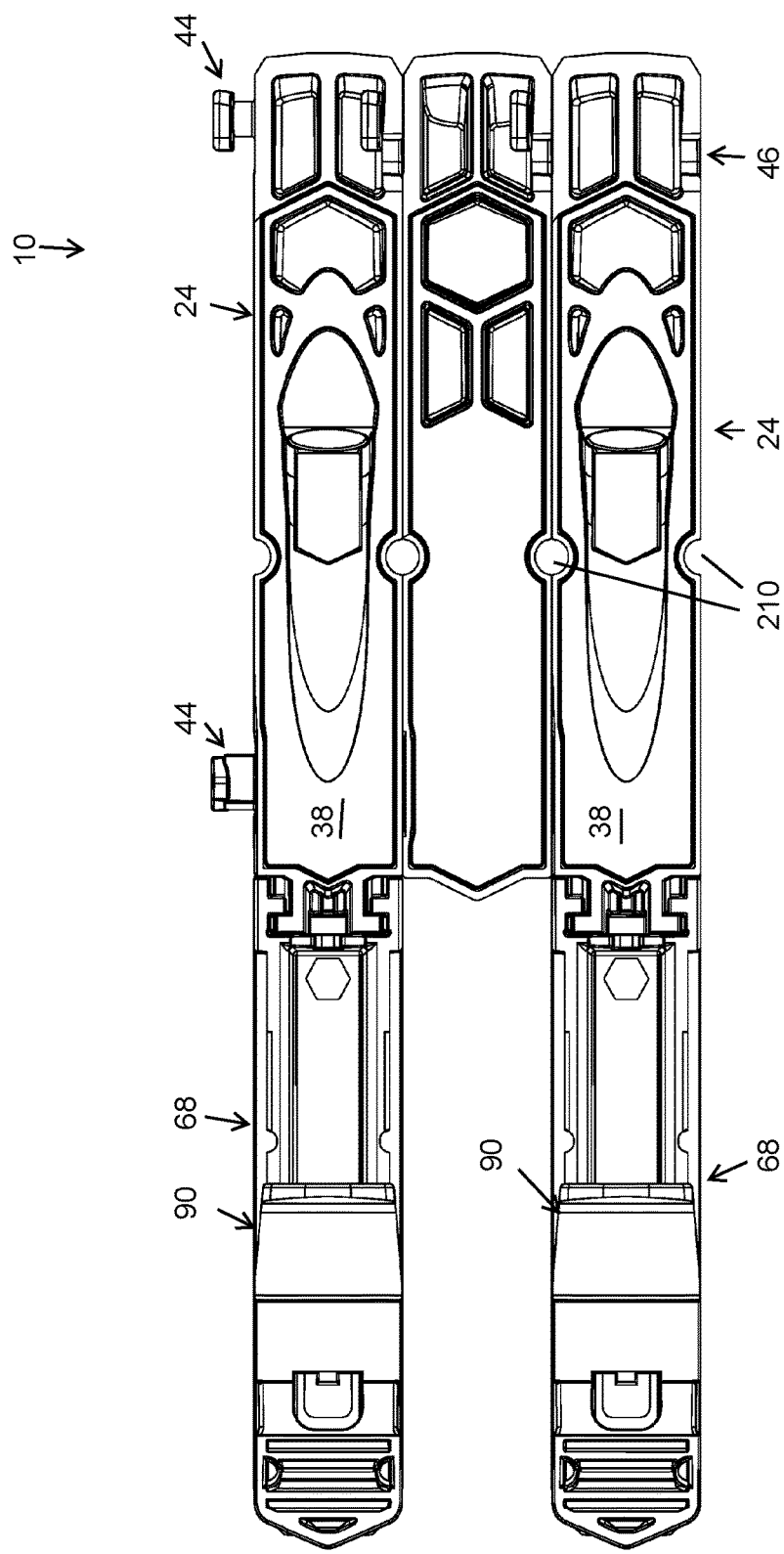
FIG. 114 is a bottom elevation view of the mini pocket hole jig system shown in FIG. 113.
Figure 115:
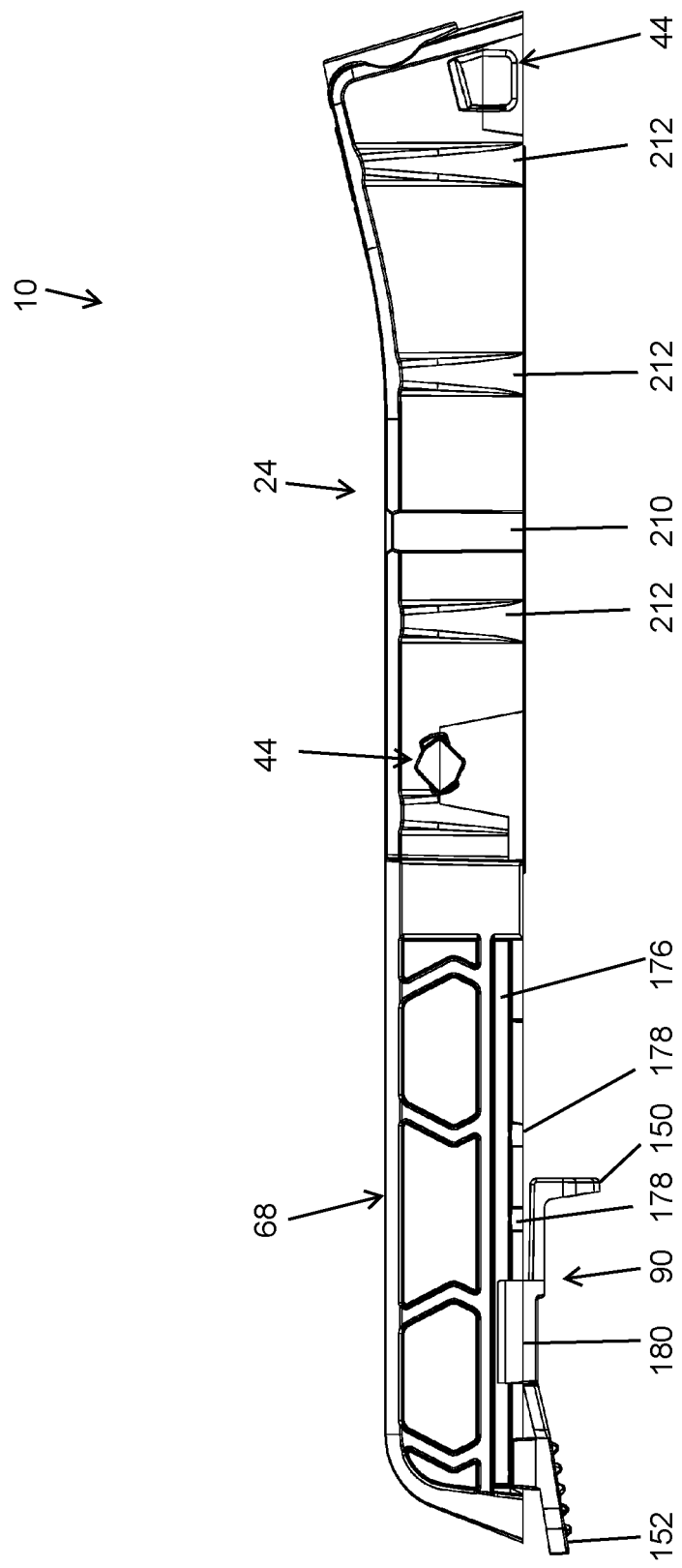
FIG. 115 is a side elevation view of the mini pocket hole jig system shown in FIG. 113.
Figure 116:
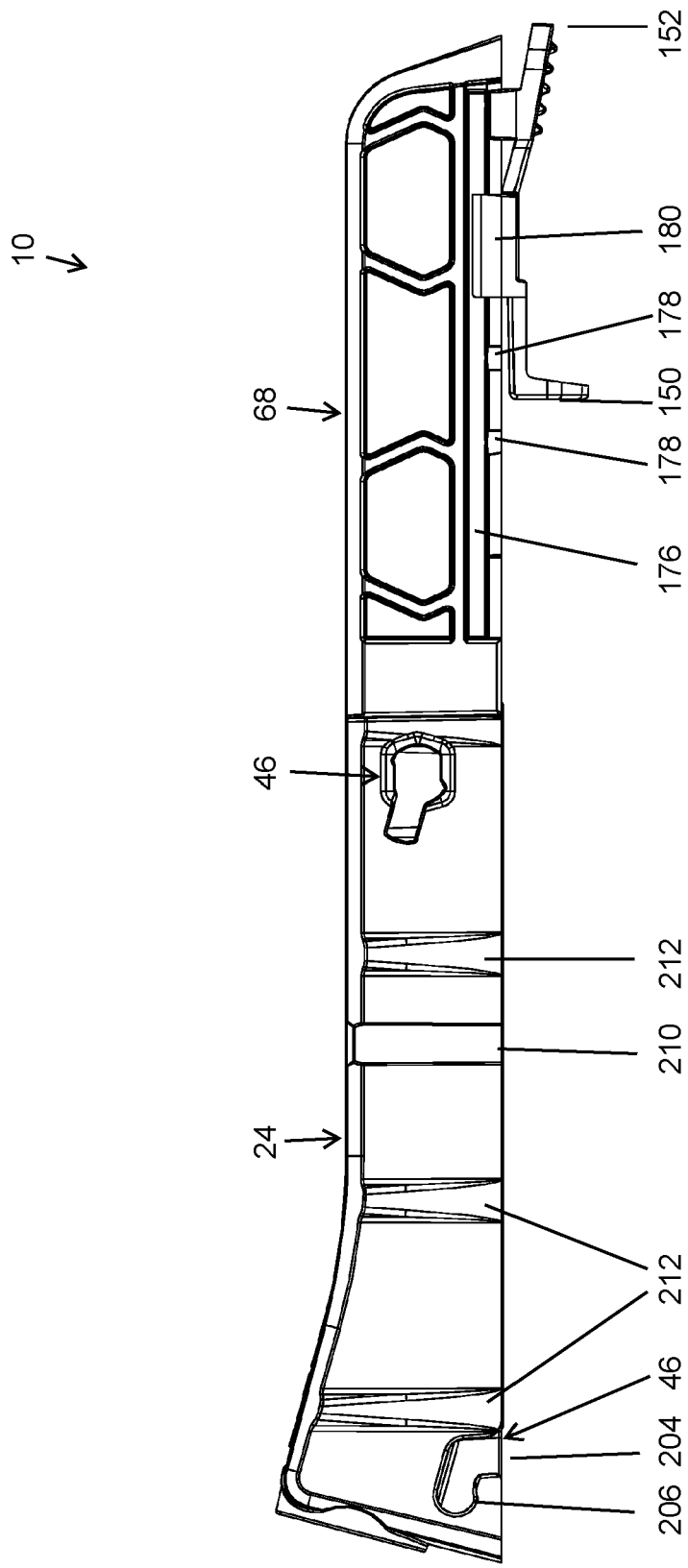
FIG. 116 is another side elevation view of the mini pocket hole jig system shown in FIG. 113.
Figure 117:
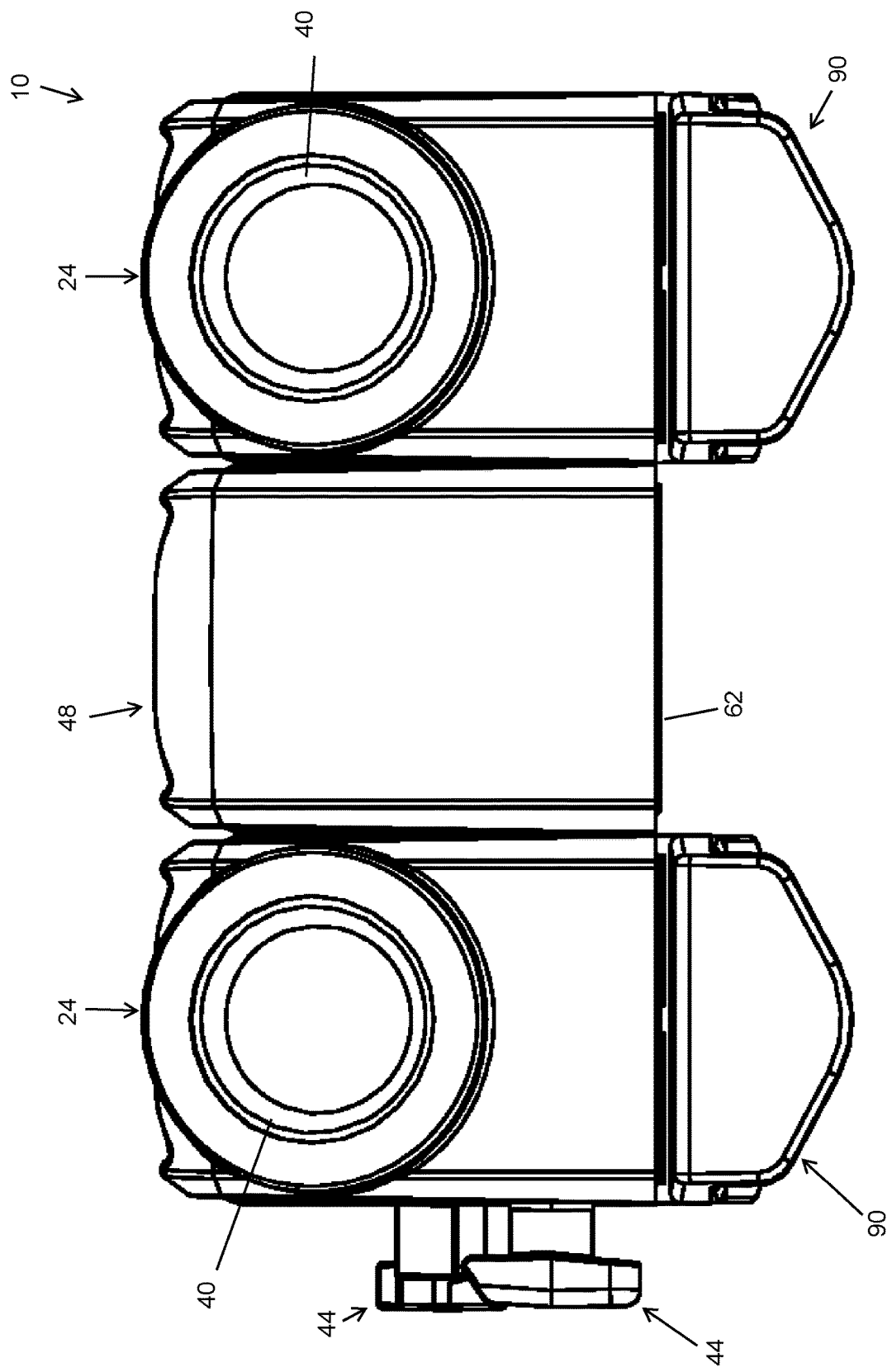
FIG. 117 is an elevation view of the rear side of the mini pocket hole jig system shown in FIG. 113.
Figure 118:
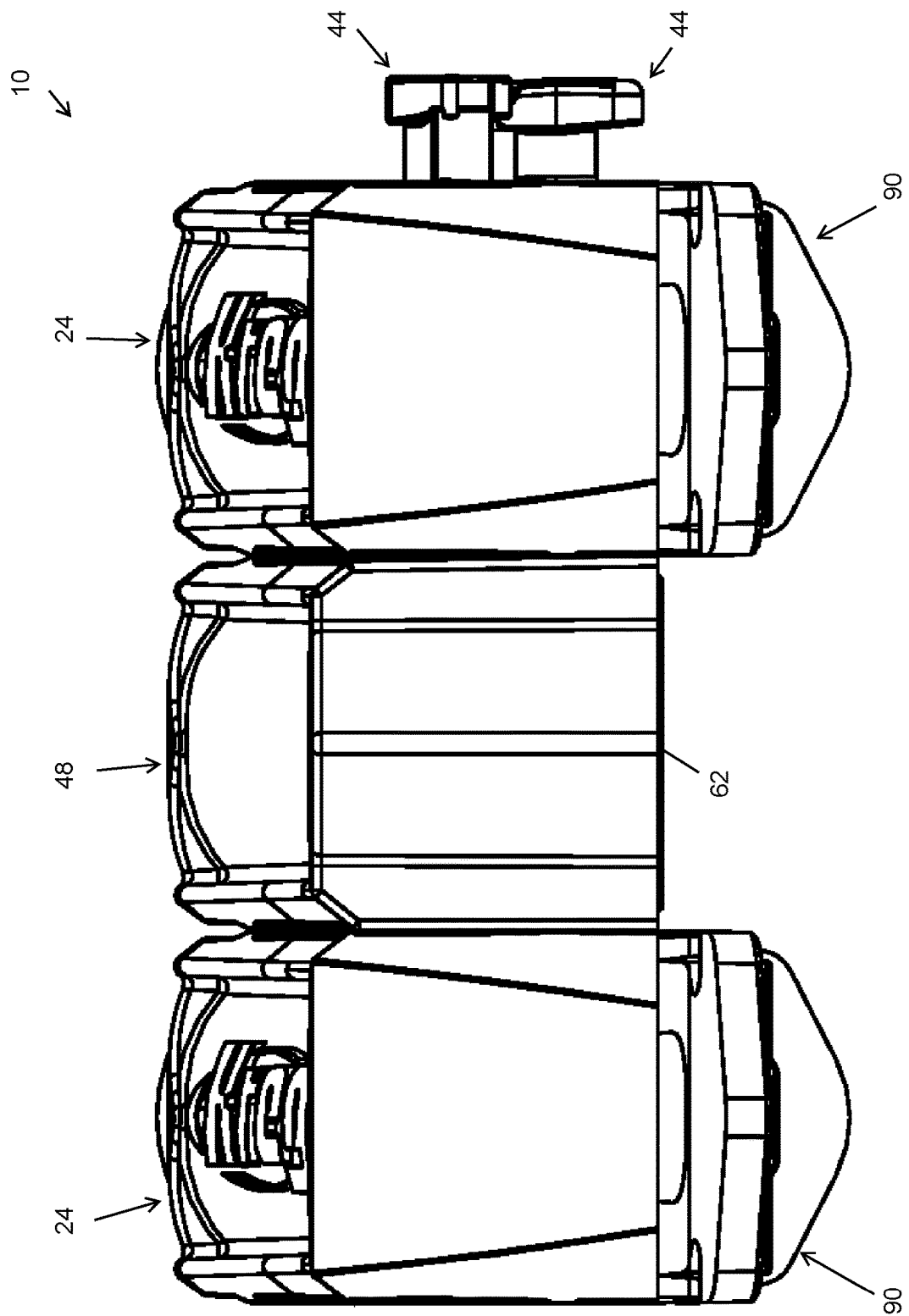
FIG. 118 is an elevation view of the front side of the mini pocket hole jig system shown in FIG. 113.
Figure 119:
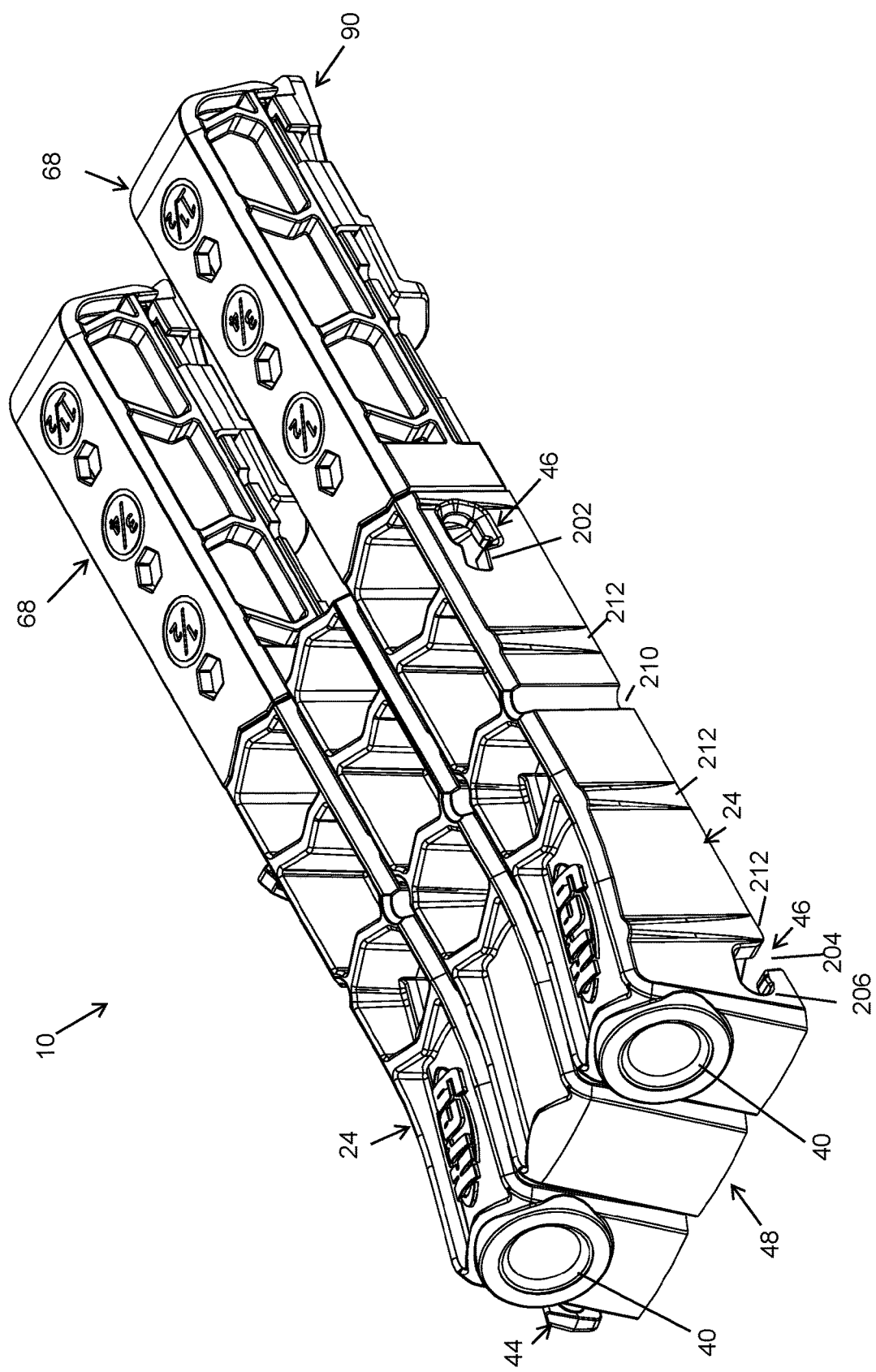
FIG. 119 is a perspective view of the mini pocket hole jig system shown in FIG. 113.
Figure 120:
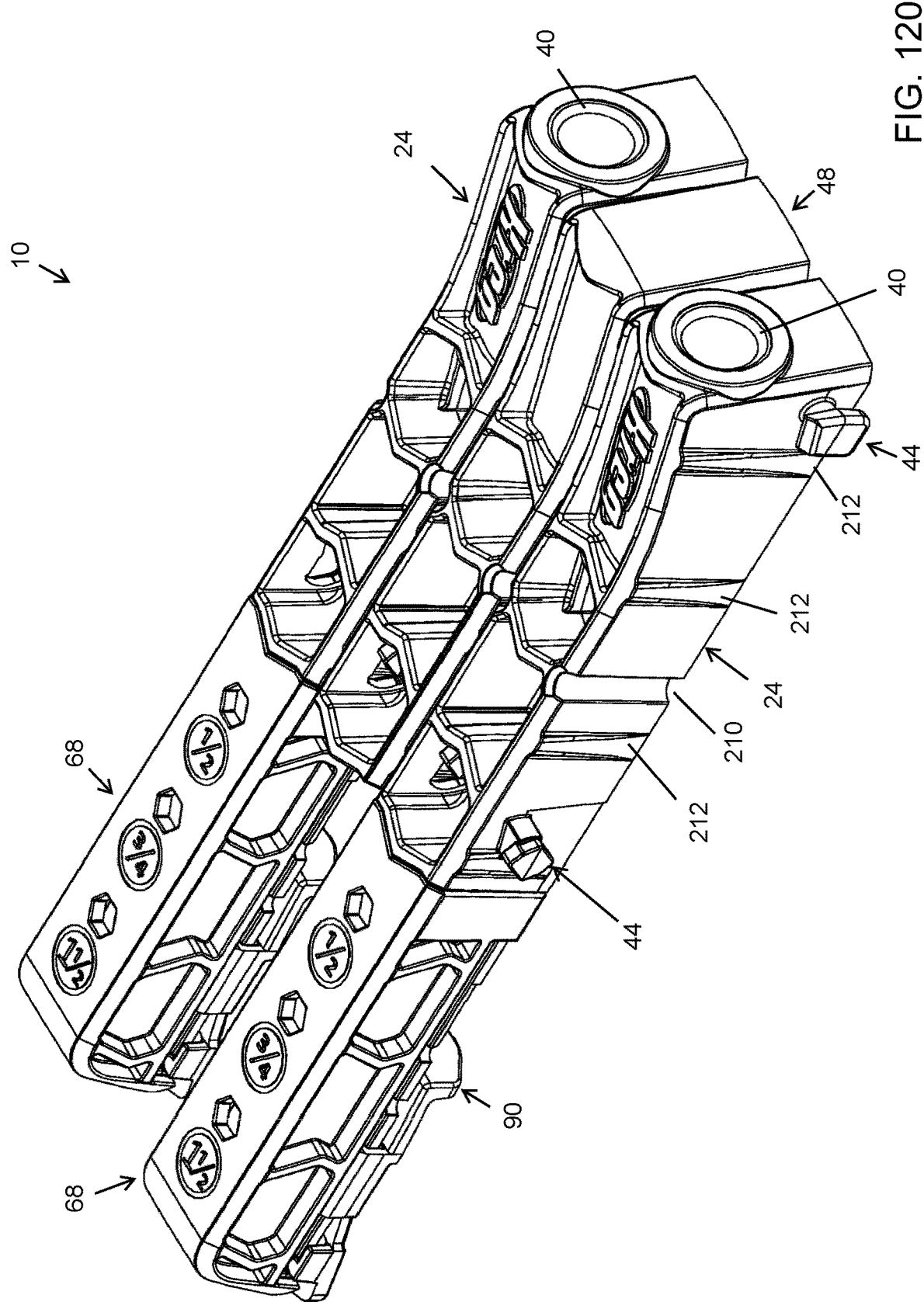
Figure 121:
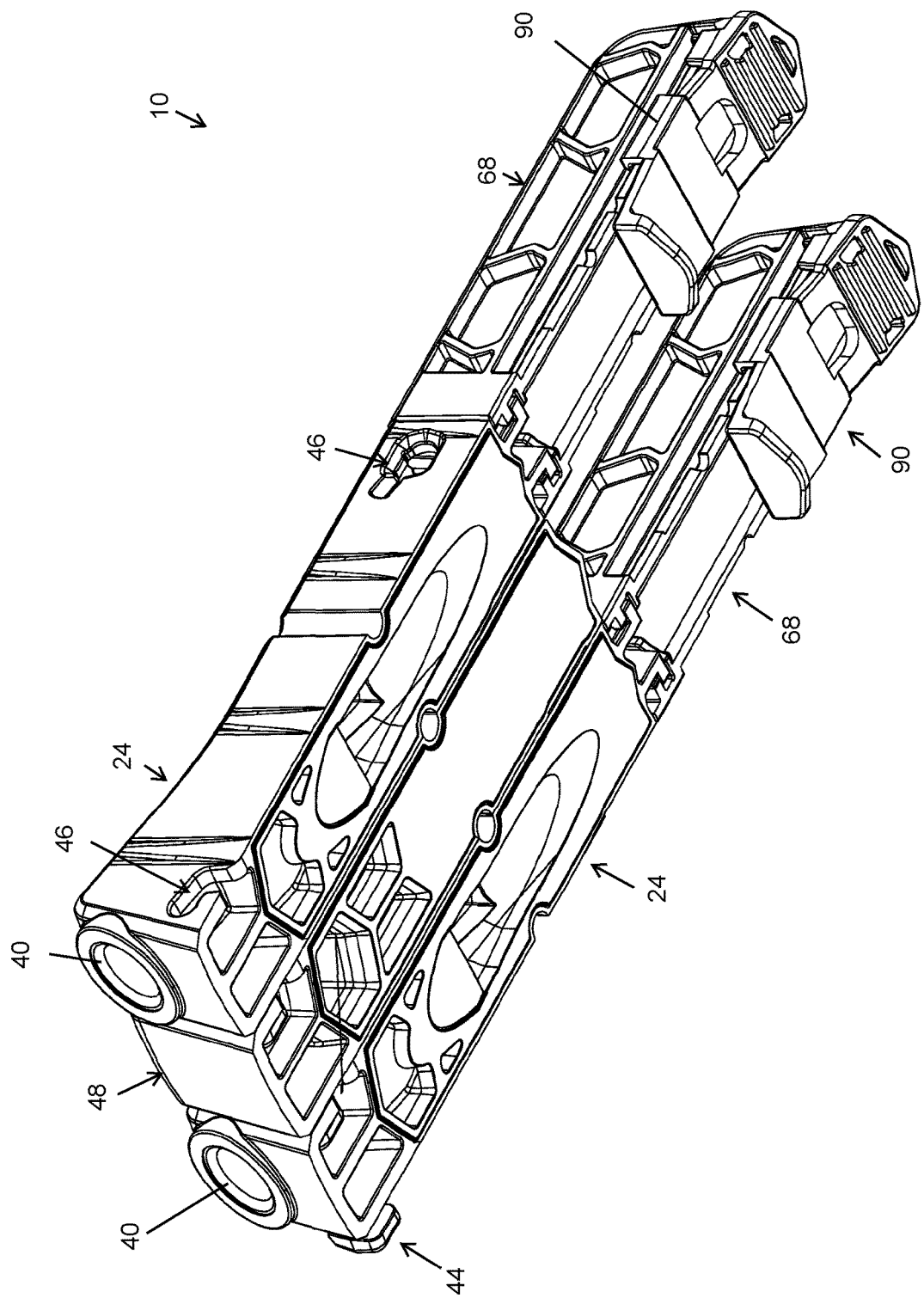
Figure 122:
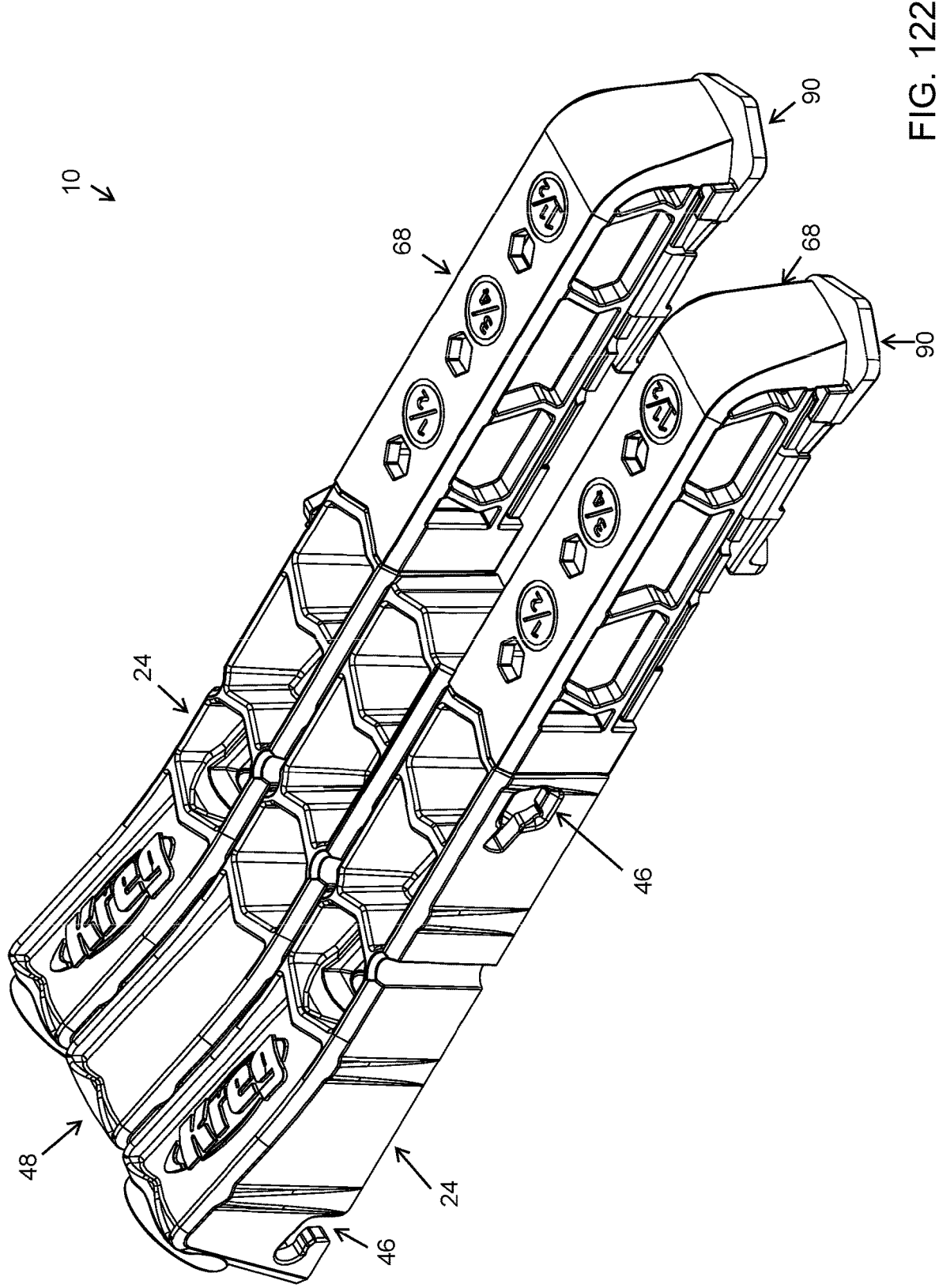
Figure 123:
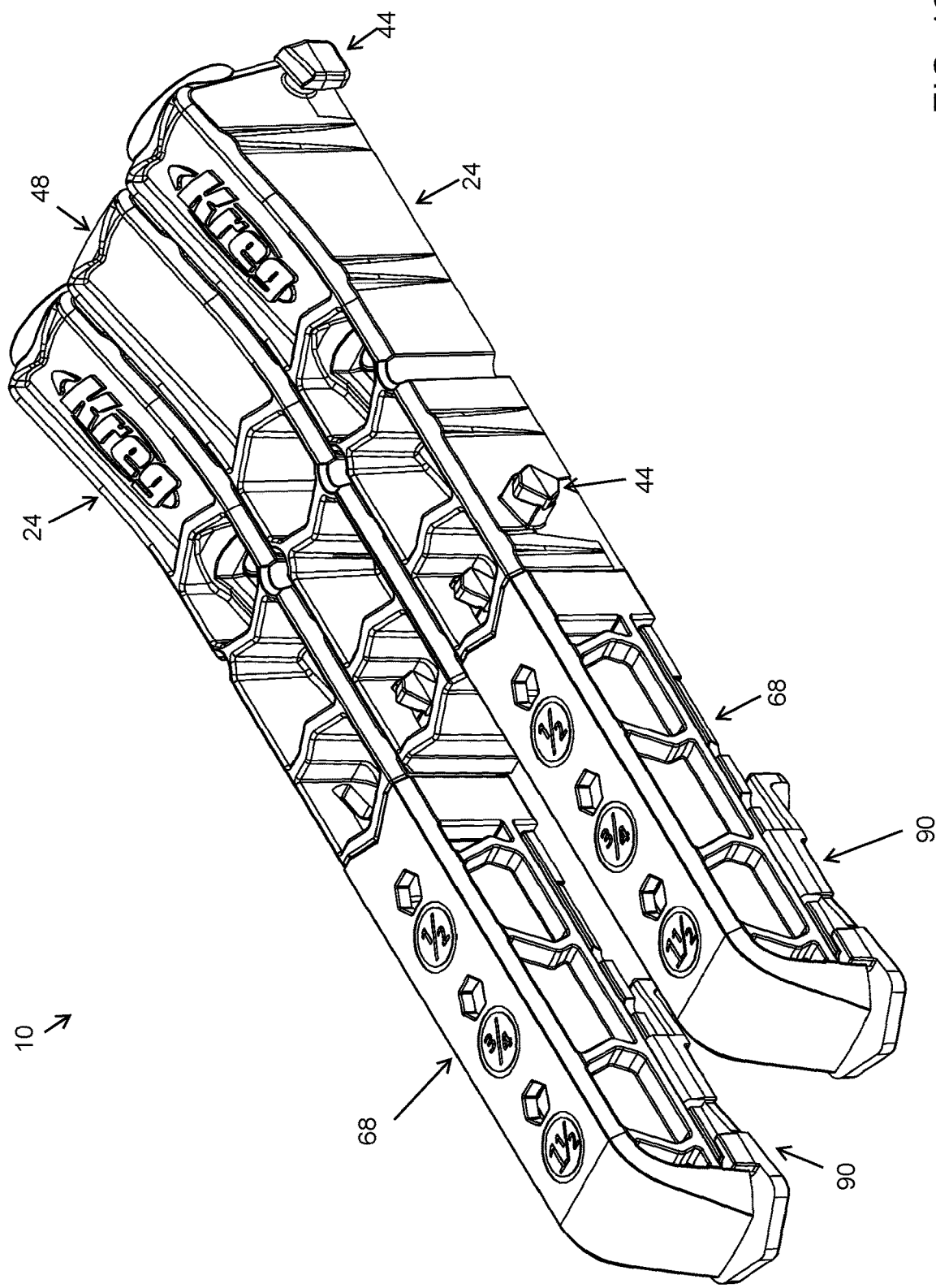
Figure 124:
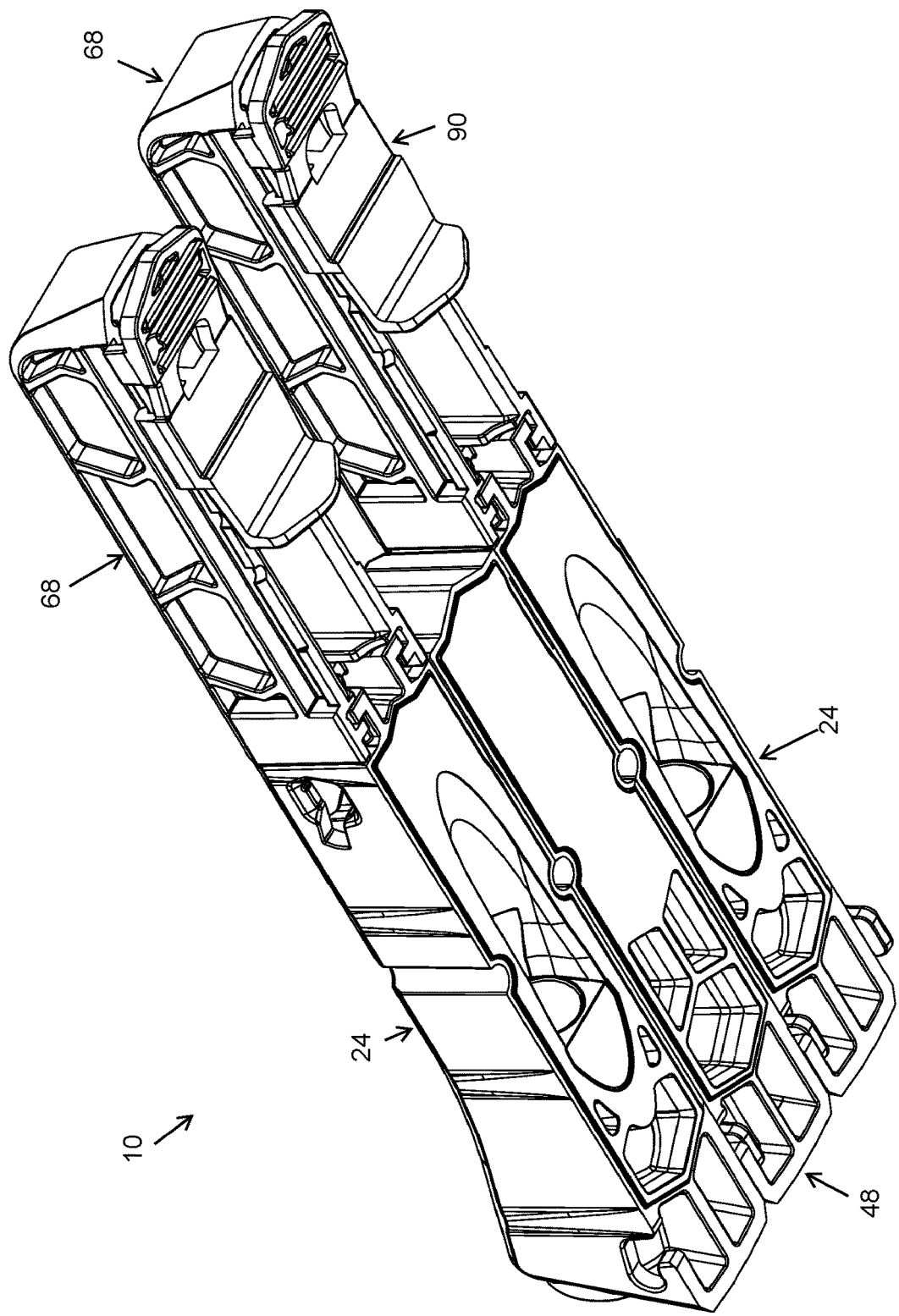
Figure 125:
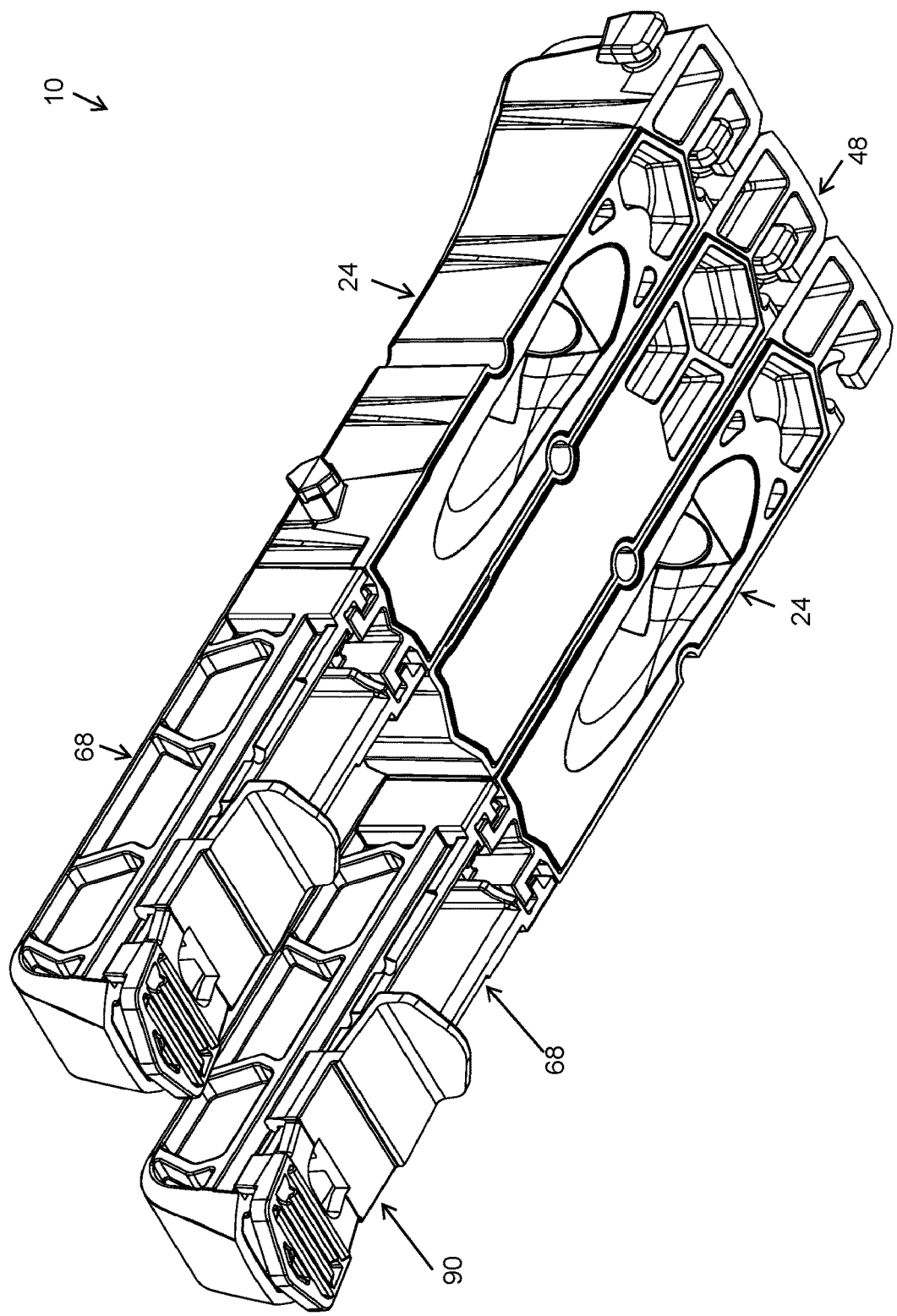
Figure 126:
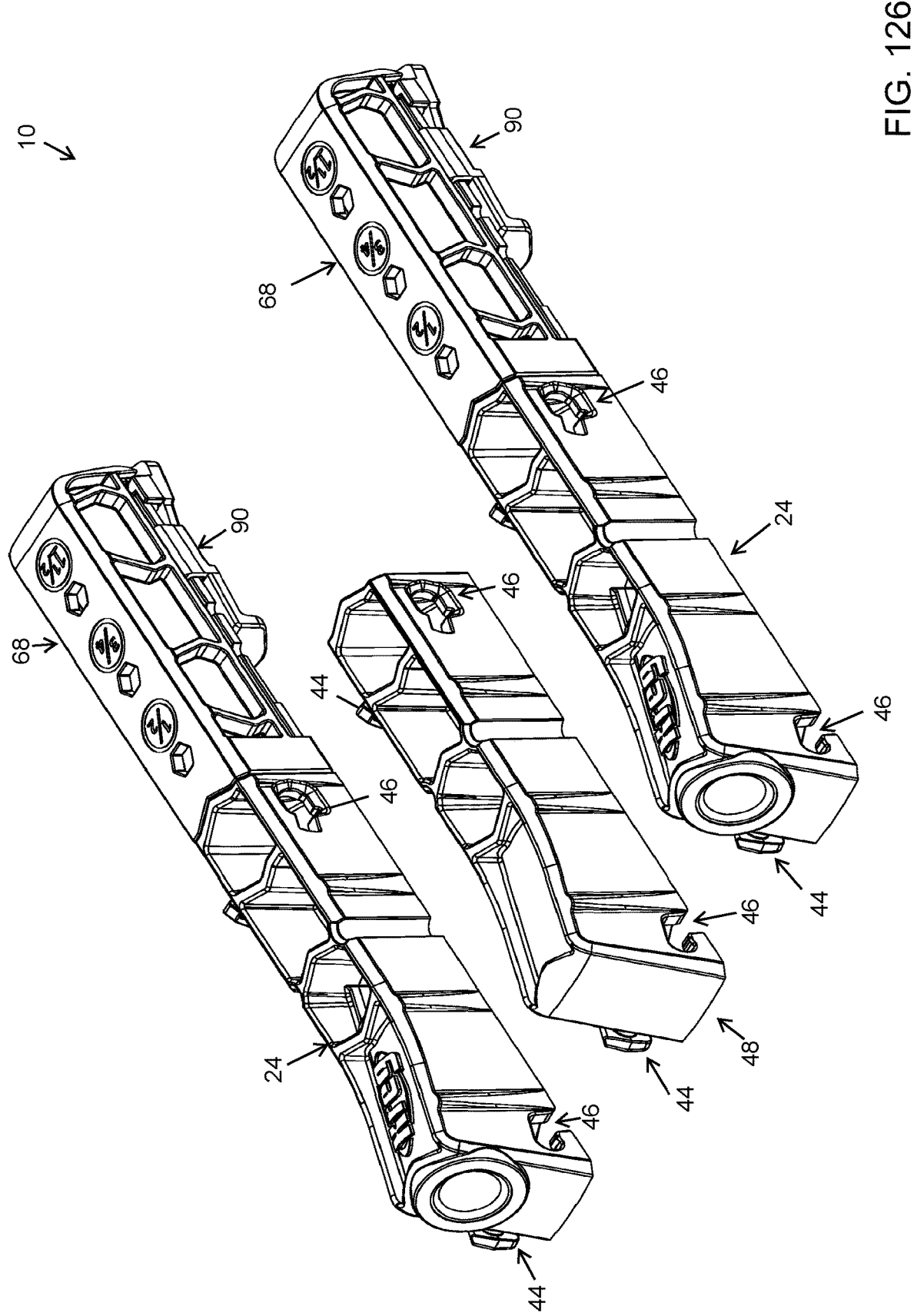
Figure 127:
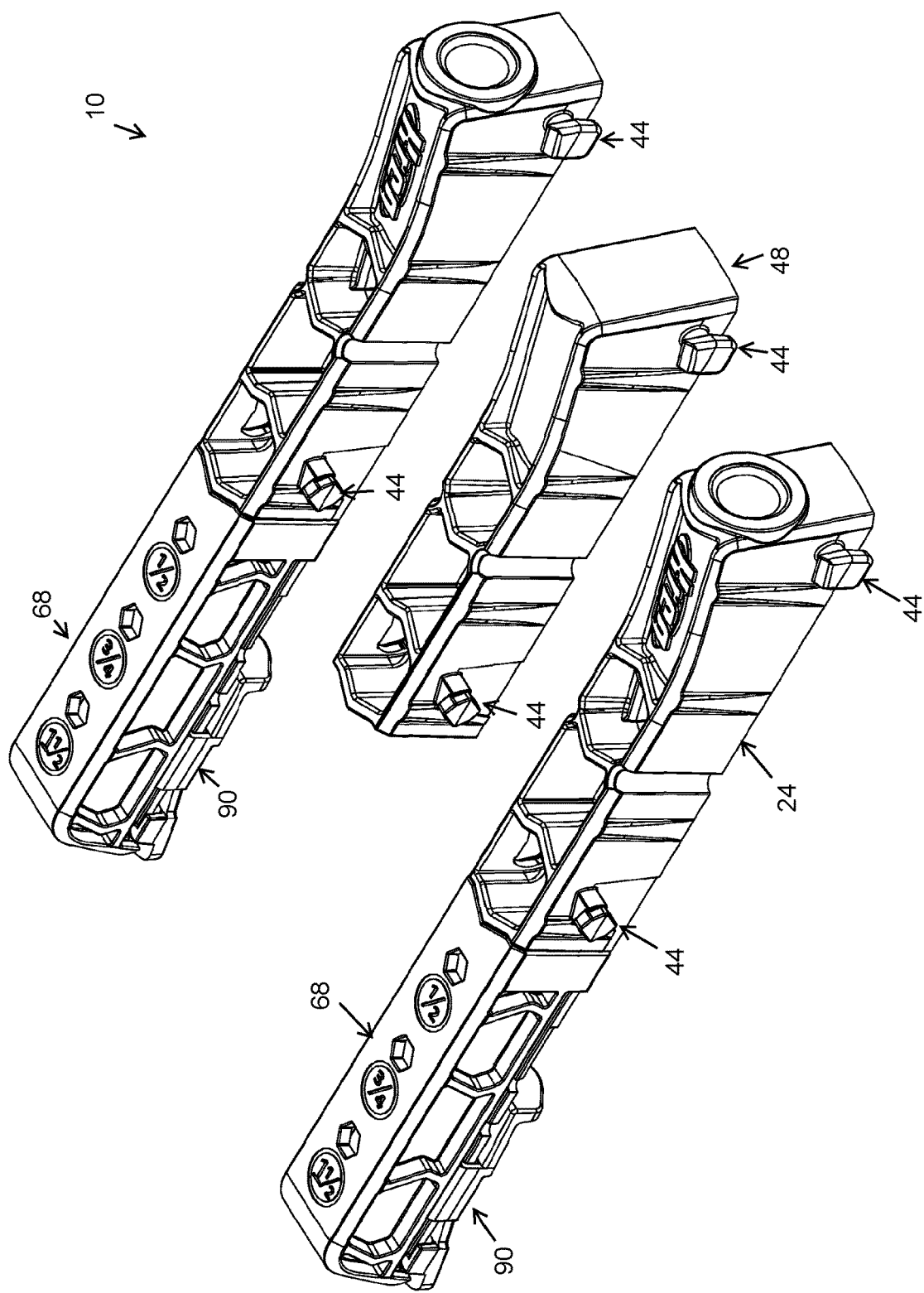

FIG. 97 is the same close-up top view of two adjacent jig segments 24 shown in FIG. 96, however in FIG. 97 the two jig segments 24 have been slid laterally with respect to one another such that the ends 32, 34 of the adjacent jig segments 24 are laterally aligned with one another. In this position, the ramps 212 of each jig segment 24 are aligned with one another. That is, said another way, the peak of the curved surface of the ramps 212 of one jig segment 24 engage the peak of the curved surface of the ramps 212 of the other jig segment 24. This engagement of adjacent ramps 212 has the effect of pushing adjacent jig segments 24 away from one another which has the tendency to strengthen the connection between the lock features 44 of one jig segment 24 and the receivers of the other jig segment 24. Engagement of the peaks of ramps 212 of adjacent jig segments 24 has a tendency to form a more-rigid combined pocket hole jig system 10. In the arrangement shown, as one example, as the adjacent jig segments 24 are slid with respect to one another to achieve a fully assembled state, the curved surface of the ramps 212 of one jig segment 24 smoothly slide over the curved surface of the ramps 212 of the other jig segment 24 until the ramps 212 of opposing jig segments 24 are in peak-to-peak engagement. In one arrangement, there is a flat section at the peak of ramps 212 which facilitates a natural resting area for adjacent ramps 212 to engage one another.

Method of Assembly:

To assemble the mini pocket hole jig system 10 of FIGS. 43-63, the following steps are performed:

Step 1—Insert First Lock Feature of one Jig Segment into First Receiver of the other Jig Segment: With reference to FIGS. 43-49, the first lock feature 44 in the forward end 32 of one jig segment 24 is inserted into the first receiver 46 in the forward end 32 of the other jig segment 24. To accomplish this, the two jig segments 24 are held at an angle to one another such that the shape of the foot 124 of the first lock feature 44 of one jig segment 24 aligns with the shape of the opening 200 of the first receiver 46 of the other jig segment 24. In one arrangement, this alignment between the foot 124 of the first lock feature 44 of one jig segment 24 aligns with the shape of the opening 200 of the first receiver 46 of the other jig segment 24 can only be accomplished in one particular orientation, due to the shape of the foot 124 and opening 200, thereby preventing improper assembly. Once the foot 124 of the first lock feature 44 of one jig segment 24 aligns with the shape of the opening 200 of the first receiver 46 of the other jig segment 24 the foot 124 of one jig segment 24 is inserted into the opening 200 of the other jig segment 24.

Step 2—Rotate The Jig Segments Until The Clamping Surfaces Align: With reference to FIGS. 50-55, with the first lock feature 44 in the forward end 32 of one jig segment 24 inserted into the first receiver 46 in the forward end 32 of the other jig segment 24, the two jig segments 24 are rotated with respect to one another until the clamping surfaces 38 of the adjacent jig segments 24 are in planar alignment with one another. This rotation occurs upon the axis of rotation formed by the engagement between the first lock feature 44 of one jig segment 24 with the first receiver 46 of the other jig segment 24. As the adjacent jig segments 24 are rotated with respect to one another, the second lock feature 44 of one jig segment 24 engages the second receiver 46 of the other jig segment 24. That is, as the adjacent jig segments 24 are rotated with respect to one another the foot 124 and post 122 of the second lock feature 44 of one jig segment 24 pass through the slot 204 of the second receiver 46 of the other jig segment 24. In this position, the planar clamping surfaces 38 and top sides of the adjacent jig segments 24 are in planar alignment to one another. However, the ends 32 34 of the adjacent jig segments 24 are offset from one another, as are the ramps 212, screw receivers 210.

Step 3—Slide The Jig Segments Until The Ends Align: With reference to FIGS. 56-63, with the first lock feature 44 in the forward end 32 of one jig segment 24 inserted into the first receiver 46 in the forward end 32 of the other jig segment 24, and the second lock feature 44 in the rearward end 34 of one jig segment 24 inserted into the second receiver 46 in the rearward end 34 of the other jig segment 24, and with the planar clamping surfaces 38 and planar top sides 36 of adjacent jig segments 24 in alignment, the two jig segments 24 are slid with respect to one another until the ends 32, 34 of adjacent jig segments 24 are in alignment with one another. That is, in this position, the adjacent jig segments 24 are slid laterally with respect to one another. Or, said another way, the adjacent jig segments 24 are slid along an axis that extends along the length of the main body 26 of jig segments 24 from forward end 32 to rearward end 34. As the adjacent jig segments 24 are slid with respect to one another several events occur simultaneously. First, the post 122 of the first lock feature 44 of one jig segment 24 enters the relief 202 connected to the opening 200 of the other jig segment 24. In one arrangement, there is a frictional engagement or a friction imparting member that causes engagement between the post 122 and relief 202 that helps to hold the post 122 into the relief 202 and helps to prevent unintentional disengagement. Second, the post 122 of the second lock feature 44 of one jig segment 24 enters the neck 206 of the second receiver 46 of the other jig segment 24. In one arrangement, there is a frictional engagement or a friction imparting member that causes engagement between the post 122 and neck 206 (such as collar 208) that helps to hold the post 122 into the neck 206 and helps to prevent unintentional disengagement. Third, the ramps 212 of the adjacent jig segments 24 slide over one another until they are in peak-to-peak engagement with one another. As the adjacent ramps 212 slide over one another they force the adjacent jig segments 212 away from one another thereby strengthening the connection between the lock features 44 and receivers 46 of the adjacent jig segments 24.

To disassemble fully connected jig segments 24, the opposite process is performed.

In this way a mini pocket hole system 10 is assembled from a plurality of jig segments 24 and/or spacers 48 by a combination of rotation as well as sliding. Assembly and disassembly is quick and easy and does not require any tools. Once assembled, the component parts are held together in a rigid and secure manner that practically eliminates the possibility of unintentional detachment.

Clamp Pad Attachment Mechanism:

With reference to FIGS. 64-95, a clamp pad attachment mechanism 220 is presented. Clamp pad attachment mechanism 220 is formed of any suitable size, shape and design and is configured to facilitate secure attachment of a clamp 120 to mini pocket hole jig system 10. In the arrangement shown, as one example, clamp pad attachment mechanism 220 includes a base 222, an adjustment member 224 and a connector 226 that work in concert with one another to connect to and hold the pad 118 of a clamp 120 and connect the clamp 120 to the mini pocket hole jig system 10.

In the arrangement shown, as one example, clamp pad attachment mechanism 220 includes a base 222. Base 222 is formed of any suitable size, shape and design and is configured to connect to the pad 118 of a clamp 120 as well as attach to the main body 26 of a jig segment 24 or a spacer 48 of a mini pocket hole jig system 10. In the arrangement shown, as one example base 222 when viewed from above or below forms a generally square or rectangular member with generally flat and straight ends 228 that extend in approximate parallel spaced relation to one another, and generally flat and straight sides 230 that extend in approximate parallel spaced relation to one another. Base 222 has a generally flat and planar upper surface 232 that extends in approximate parallel spaced relation to a generally flat and planar lower surface 234.

In the arrangement shown, as one example, base 222 includes an arm 236 that is positioned toward one end 228. In this arrangement, arm 236 extends upward a distance above the planar upper surface 232 of base 222. A plurality of fingers 238 extend forward from the upper end of arm 236 a distance over the planar upper surface 232. In this way, a space or lip is formed by the forward extension of fingers 238 from the upper end of arm 236. That is, a space is formed between the lower surface of fingers 238 and the upper surface 232 of base 222. This space is configured to receive and hold the edge of a pad 118 of a clamp 120 therein.

In the arrangement shown, as one example, a rail 240 extends along each side 230 of base 222 between opposing ends 228. In the arrangement shown, as one example, rails 240 include a plurality of notches or teeth 242 therein. In the arrangement shown, as one example, rails 240 and teeth 242 facilitate slidable connection of adjustment member 224 to base 222.

In the arrangement shown, as one example, base 222 includes a keyhole 244 positioned approximately in the center of base 222. Keyhole 244 is formed of any suitable size, shape and design and is configured to receive and hold connector 226 therein. In the arrangement show, as one example, keyhole 244 includes an opening 246 that connects to a slot 248 that is narrower than the opening 246 and has a pair of rails 250 positioned on each side of the slot 248 and form a step below upper surface 232 of base 222.

In the arrangement shown, as one example, clamp pad attachment mechanism 220 includes an adjustment member 224. Adjustment member 224 is formed of any suitable size, shape and design and is configured to connect to base 222 and slidably adjust its position so as to facilitate attachment of clamp pad attachment mechanism 220 to the pad 118 of a clamp 120. In the arrangement shown, as one example, adjustment member 224 includes an arm 254 that extends upward and includes a plurality of fingers 256 that extend forward from the arm 254.

In the arrangement shown, as one example, adjustment member 224 includes a pair of wings 258, one at each side of arm 254. These wings 258 extend forward from arm 254 at each outward side of arm 254 a distance and are configured to slidably connect to rails 240 in the sides 230 of base 222. The outward ends of wings 258 include a locking mechanism 260 that includes a catch 262 that is configured to engage the teeth 242 of rails 240 of base 222. In the arrangement shown, as one example, these locking mechanisms 260 are under a spring bias such that in their natural state when adjustment member 224 is connected to base 222, the locking mechanisms 260 have a tendency to move outward and away from base 222. This spring bias causes catch 262 to engage the teeth 242 on the inside surface of rail 240 thereby locking the position of adjustment member 224 on base 222. Notably, teeth 242 and catches 262 are configured to facilitate easy installation by being one-way, meaning that the adjustment member 224 may be slid onto the base 222 and the catches 262 will automatically move over the teeth 242 as the adjustment member 224 moves toward the arm 236 of base 222, however movement in the opposite direction, away from the arm 236 of base 222 is prevented. To move adjustment member 224 away from the arm 236 of base 222 pressure is applied to the outside surfaces of locking mechanisms 260. This causes the catches 262 to move inward and out of engagement with the teeth 242 which allows the adjustment member 224 to be slid away from the arm 236 of base 222. This arrangement allows the pad 118 of a clamp 120 to be placed under the fingers 238 of base 222 an d then the adjustment member 224 is slid forward until the fingers 252 overhang the pad 118 of clamp 120. In this position, the pad 118 of clamp 120 is captured between the arm 236 and fingers 238 of base 222 and the arm 254 and fingers 256 of adjustment member 224. Also, in this position, adjustment member 224 is prevented from moving backwards as the spring bias of locking mechanisms 260 holds catches 262 into engagement with teeth 242. To remove the pad 118 of clamp from clamp pad attachment mechanism 220, the lock mechanisms 260 of adjust member 224 are forced inward, thereby releasing catches 262 from teeth 242 and the adjustment member 224 is slid away from arm 236 on rails 240 thereby releasing the pad 118 of clamp 120. In this way, base 222 and adjustment member 224 are configured to quickly and easily and securely attach to the pad 118 of a clamp 120, while also allowing for quick and easy removal.

In the arrangement shown, as one example, clamp pad attachment mechanism 220 includes a connector 226. Connector 226 is formed of any suitable size, shape and design and is configured to connect to the clamp pad attachment mechanism 220 to a jig segment 24 or spacer 48. In the arrangement shown, as one example, connector 226 has an upper end 264, a lower end 266 and a neck 268. In the arrangement shown, as one example, upper end 264 is generally cylindrical in shape and is configured to fit through the opening 246 in the keyhole 244 of base 222, however any other shape is hereby contemplated for use. In the arrangement shown, as one example, lower end 266 is generally square, rectangular, trapezoidal, diamond or another shape and is configured to fit into and securely hold onto an opening 42 in the top side 36 of a jig segment 24 and/or spacer 48, however any other shape is hereby contemplated for use. In the arrangement shown, as one example, neck 268 is generally cylindrical in shape and smaller than upper end 264 and lower end 266 and is configured to fit within the slot 248 in the keyhole 244 of base 222, however any other shape is hereby contemplated for use.

In one arrangement, to secure connection to jig segment 24 and/or spacer 48, connector 226 is formed of a compressible material such as a rubber, a synthetic rubber, a rubber composite, a silicone, a plastic, a foam, a polyurethane, or any other compressible and flexible material or any combination thereof. In one arrangement, to help maintain a connection between connector 226 and jig segment 24 or spacer 48, the material that forms connector 226 has a high coefficient of friction, which helps connector hold onto the surfaces of opening 42.

In the arrangement shown, as one example, to attach clamp pad attachment mechanism 220 to a jig segment 24 or spacer 48, the lower end 266 of connector 226 is aligned with an opening 42 in the top side 36 of a jig segment 24 or spacer 48. Once aligned, the lower end 266 of connector 226 is forced into the opening 42. In doing so, the compressible material of connector 226 deforms, slightly, and engages the surfaces of opening 42. In this position, the high coefficient of friction of the connector 226 holds onto the surfaces of the jig segment 24 or spacer 48 thereby holding the two components together. To remove the clamp pad attachment mechanism 220 from a jig segment 24 or spacer 48, sufficient force is applied to pull the lower end 266 of connector 226 out of opening 42. In this way, clamp pad attachment mechanism 220 is quickly and easily attached to and removed from a jig segment 24 or spacer 48.

Tapering of Components:

In one arrangement, so as to facilitate the removal of components of the system 10 from the molds that they are formed in, the components taper slightly as they extend upward. That is, in this arrangement, the parts of the system 10 are slightly wider at their lower side than they are their upper side so as to facilitate easy removal from the molds that they are formed in. As such, while in some arrangements opposing sides are identified as being parallel in nature from one another, it is to be understood that this parallel alignment may in fact have a slight taper and therefore may not be perfectly parallel, but instead parallel save for the tapering.

From the above discussion it will be appreciated that the mini pocket hole jig system and related method of use, presented herein improves upon the state of the art.

Specifically, the mini pocket hole jig system presented: provides improved functionality over prior art systems; provides improved features over prior art systems; is relatively inexpensive; is easy to use; is intuitive to use; is strong and robust; can be used in many applications; is practically impossible to improperly set-up; provides unique functionality; is fast to use and fast to set-up; is safe to use; saves time; has a compact size; is adjustable, in depth as well as width; has a long useful life; can be used on outside edges on workpieces as well as inside corners; is high quality; improves efficiencies; is fun to use; improves the quality of the products made using the device; eliminates the need to review the set-up instructions to properly set up the system; that provides a visual feedback that the system is properly set-up, among countless other advantages and improvements.

It will be appreciated by those skilled in the art that other various modifications could be made to the device without parting from the spirit and scope of this disclosure. All such modifications and changes fall within the scope of the claims and are intended to be covered thereby.

What is claimed:

1. A stepped drill bit system for drilling pocket holes, comprising:
   a stepped drill bit;
   the stepped drill bit having a shaft;
   the stepped drill bit extending a length from a connection end to a drilling end;
   wherein the drilling end is configured to drill into a workpiece;
   the stepped drill bit having a larger diameter portion;
   the stepped drill bit having a stepped feature positioned at the drilling end, the stepped feature having a smaller diameter portion;
   the stepped drill bit having a plurality of indicia that correspond to workpiece thickness;
   a stop collar;
   the stop collar having an alignment feature;
   the stop collar having a securing member;
   wherein the stop collar is configured to be placed over the shaft of the stepped drill bit;
   wherein the plurality of indicia of the stepped drill bit are surrounded by markings;
   wherein the markings surrounding the plurality of indicia correspond in size and shape to the alignment feature in the stop collar,
   wherein when the stop collar is placed over the shaft of the stepped drill bit, and the alignment feature of the stop collar is aligned with a marking of the markings surrounding the plurality of indicia of the stepped drill bit and secured in place with the securing member, the stepped drill bit is configured to drill pocket holes in a workpiece having a thickness that corresponds to an indicia of the plurality of indicia surrounded by the marking the alignment feature is aligned with.

2. The system of claim 1, wherein the connection end is configured to be received in a chuck of a drill.

3. The system of claim 1, further comprising a workpiece thickness gauge, the workpiece thickness gauge having a plurality of indicia that indicate the thickness of a workpiece.

4. The system of claim 1, further comprising a workpiece thickness gauge, the workpiece thickness gauge having a plurality of indicia that indicate the thickness of a workpiece; wherein the plurality of indicia on the workpiece thickness gauge correspond to the plurality of indicia on the stepped drill bit.

5. The system of claim 1, wherein the alignment feature on the stop collar is an opening in the stop collar.

6. The system of claim 1, wherein the alignment feature on the stop collar is a hole in the stop collar.

7. The system of claim 1, wherein the alignment feature on the stop collar is a recess in the stop collar.

8. The system of claim 1, wherein the plurality of indicia of the stepped drill bit are etched into the stepped drill bit.

9. The system of claim 1, wherein the alignment feature on the stop collar is a circular opening.

10. The system of claim 1, wherein the plurality of indicia on the stepped drill bit include numerical values that correspond to workpiece thickness.

11. The system of claim 1, wherein the plurality of indicia on the stepped drill bit include a plurality of rings around the shaft of the stepped drill bit that correspond to workpiece thickness.

12. The system of claim 1, wherein the securing member is configured to secure the stop collar in position on the stepped drill bit when tightened; and
wherein the securing member is configured to permit the stop collar to be moved to a plurality of different positions along the stepped drill bit when loosened.

13. The system of claim 1, wherein the securing member is a threaded shaft that is configured to extend through the stop collar and engage the stepped drill bit thereby securing the stop collar in place.

14. The stepped drill bit system of claim 1,
wherein the alignment feature in the stop collar is an opening in the stop collar;
wherein when the opening in the stop collar is aligned with a selected marking of the markings surrounding the plurality of indicia, the stop collar is set to a depth of an indicia of the plurality of indicia surrounded by the selected marking of the markings surrounding the plurality of indicia.

15. The stepped drill bit system of claim 1, wherein each of the plurality of indicia of the stepped drill bit are encircled by markings;
wherein the alignment feature in the stop collar is an opening in the stop collar;
wherein the markings encircling the plurality of indicia correspond in size and shape to the opening in the stop collar.

16. The stepped drill bit system of claim 1, wherein the alignment feature in the stop collar is an opening in the stop collar;
wherein the indicia of the plurality of indicia of the stepped drill bit are held within generally circular markings which correspond in size and shape to the opening in the stop collar.

17. The stepped drill bit system of claim 1,
wherein the markings surrounding the plurality of indicia correspond in size and shape to an opening in the stop collar.

18. The stepped drill bit system of claim 1,
wherein the markings surrounding the plurality of indicia correspond in size and shape to an opening in the stop collar such that when the opening is aligned with a selected indicia of the plurality of indicia, the selected indicia is visible through the stop collar and the stop collar is set to a depth corresponding to the selected indicia.

19. The stepped drill bit system of claim 1, wherein the plurality of indicia of the stepped drill bit are encircled by markings;
wherein the markings encircling the plurality of indicia generally match an opening in the stop collar.

20. A stepped drill bit system for drilling pocket holes, comprising:
a stepped drill bit;
the stepped drill bit extending a length from a connection end to a drilling end;
the stepped drill bit having a shaft having a larger diameter portion and a stepped feature positioned at the drilling end, the stepped feature having a smaller diameter portion;
a plurality of indicia positioned on the shaft of the stepped drill bit, wherein the plurality of indicia correspond to workpiece thickness and include a number surrounded by a feature;
a stop collar;
the stop collar having an alignment feature, wherein the alignment feature is an opening in the stop collar;
the stop collar having a securing member;
wherein the feature of the plurality of indicia correspond in size and shape to the alignment feature in the stop collar;
wherein when the stop collar is placed over the shaft of the stepped drill bit, and the alignment feature of the stop collar is aligned with the feature of the plurality of indicia of the stepped drill bit and secured in place with the securing member, the stepped drill bit is configured to form a pocket hole in a workpiece, having a thickness that corresponds to a selected indicia of the plurality of indicia surrounded by the feature of the plurality of indicia the alignment feature is aligned with.

21. The system of claim 20, further comprising a pocket hole jig having a drill guide;
wherein the drill guide is configured to guide the stepped drill bit for drilling the pocket hole in the workpiece at an angle; and
wherein when the pocket hole jig is placed on the workpiece the pocket hole is drilled by inserting the stepped drill bit into the drill guide of the pocket hole jig and drilling the pocket hole in the workpiece at the angle until the stop collar engages the pocket hole jig.

22. The system of claim 20, further comprising a workpiece thickness gauge, the workpiece thickness gauge having a plurality of indicia that indicate the thickness of a measured workpiece.

23. The system of claim 20, further comprising a workpiece thickness gauge, the workpiece thickness gauge having a plurality of indicia that indicate the thickness of a measured workpiece; wherein the plurality of indicia on the workpiece thickness gauge correspond to the plurality of indicia on the stepped drill bit.

24. The system of claim 20, wherein the alignment feature on the stop collar is a hole in the stop collar.

25. The system of claim 20, wherein the alignment feature on the stop collar is a recess in the stop collar.

26. The system of claim 20, wherein the plurality of indicia of the stepped drill bit are etched into the stepped drill bit.

27. The system of claim 20, wherein the alignment feature on the stop collar is a circular opening.

28. The system of claim 20, wherein the plurality of indicia on the stepped drill bit include numerical values that correspond to workpiece thickness.

29. The system of claim 20, wherein the plurality of indicia on the stepped drill bit include a plurality of rings around the shaft of the stepped drill bit that correspond to workpiece thickness.

30. The system of claim 20, wherein the securing member is configured to secure the stop collar in position on the stepped drill bit when tightened;
wherein the securing member is configured to permit the stop collar to be moved to a plurality of different positions along the stepped drill bit when tightened.

31. The system of claim 20, wherein the securing member is a threaded shaft that is configured to extend through the stop collar and engage the stepped drill bit thereby securing the stop collar in place.

32. The system of claim 20, wherein the connection end is configured to be received in a chuck of a drill.

33. A stepped drill bit system for drilling pocket holes, comprising:
a stepped drill bit;
the stepped drill bit having a shaft;
the stepped drill bit extending a length from a connection end to a drilling end;
wherein the drilling end is configured to drill into a workpiece;
the stepped drill bit having a larger diameter portion;
the stepped drill bit having a stepped feature positioned at the drilling end, the stepped feature having a smaller diameter portion;
the stepped drill bit having a first indicia on the shaft of the stepped drill bit, wherein the first indicia includes a first marking that corresponds to a first workpiece thickness surrounded by a first feature that is generally circular in shape;
a stop collar;
the stop collar having an alignment feature;
wherein the alignment feature is an opening in the stop collar, wherein the opening in the stop collar is generally circular in shape;
the stop collar having a securing member;
wherein the stop collar is configured to be placed over the shaft of the stepped drill bit;
wherein the stop collar is set for the first workpiece thickness by aligning the opening in the stop collar around the first feature on the shaft of the stepped drill bit.

34. The stepped drill bit system for drilling pocket holes, of claim 33, further comprising:
the stepped drill bit having a second indicia on the shaft of the stepped drill bit, wherein the second indicia includes a second marking that corresponds to a second workpiece thickness surrounded by a second feature that is generally circular in shape;
wherein the stop collar is set for the second workpiece thickness by aligning the opening in the stop collar around the second feature on the shaft of the stepped drill bit.

35. A stepped drill bit system for drilling pocket holes, comprising:
a stepped drill bit;
the stepped drill bit having a shaft;
the stepped drill bit extending a length from a connection end to a drilling end;
wherein the drilling end is configured to drill into a workpiece;
the stepped drill bit having a larger diameter portion;
the stepped drill bit having a stepped feature positioned at the drilling end, the stepped feature having a smaller diameter portion;
the stepped drill bit having a plurality of generally circular markings that contain a workpiece thickness therein that are marked on the shaft of the stepped drill bit;
a stop collar;
the stop collar having an opening that extends through the stop collar;
wherein the opening in the stop collar is generally circular in shape;
the stop collar having a securing member;
wherein the stop collar is configured to be placed over the shaft of the stepped drill bit;
wherein the stop collar is precisely set for a selected workpiece thickness by aligning the opening in the stop collar with a generally circular marking of the plurality of generally circular markings on the shaft of the stepped drill bit.

36. A stepped drill bit system for drilling pocket holes, comprising:
a stepped drill bit;
the stepped drill bit having a shaft;
the stepped drill bit extending a length from a connection end to a drilling end;
wherein the drilling end is configured to drill into a workpiece;
the stepped drill bit having a larger diameter portion;
the stepped drill bit having a stepped feature positioned at the drilling end, the stepped feature having a smaller diameter portion;
the stepped drill bit having a plurality of indicia marked on the shaft of the stepped drill bit, wherein the plurality of indicia include a workpiece thickness positioned within a marking that extends around the workpiece thickness;
a stop collar;
the stop collar having an opening that extends through the stop collar;
wherein the opening in the stop collar corresponds in size and shape to the plurality of indicia on the shaft of the stepped drill bit;
the stop collar having a securing member;
wherein the stop collar is configured to be placed over the shaft of the stepped drill bit;
wherein the stop collar is precisely set by aligning edges of the opening in the stop collar with edges of the marking that extends around the workpiece thickness followed by tightening the securing member in place.

37. A stepped drill bit system for drilling pocket holes, comprising:
a stepped drill bit;
the stepped drill bit having a shaft;
the stepped drill bit extending a length from a connection end to a drilling end;
wherein the drilling end is configured to drill into a workpiece;
the stepped drill bit having a larger diameter portion;
the stepped drill bit having a stepped feature positioned at the drilling end, the stepped feature having a smaller diameter portion;
the stepped drill bit having a plurality of indicia that correspond to workpiece thickness;
a stop collar;
the stop collar having an alignment feature;
wherein the alignment feature is an opening in the stop collar;
the stop collar having a securing member;
wherein the stop collar is configured to be placed over the shaft of the stepped drill bit;
wherein when the stop collar is placed over the shaft of the stepped drill bit, and the alignment feature of the stop collar is aligned with a selected indicia of the plurality of indicia of the stepped drill bit and secured in place with the securing member, the stepped drill bit is configured to drill pocket holes in a workpiece having a thickness that corresponds to the selected indicia the alignment feature is aligned with, wherein the selected indicia of the plurality of indicia includes a number that corresponds to workpiece thickness surrounded by a marking that corresponds in size and shape to the opening in the stop collar.

* * * * *

UNITED STATES PATENT AND TRADEMARK OFFICE
CERTIFICATE OF CORRECTION

| | |
|---|---|
| PATENT NO. | : 11,504,778 B2 |
| APPLICATION NO. | : 17/114673 |
| DATED | : November 22, 2022 |
| INVENTOR(S) | : Scott Schaaf et al. |

It is certified that error appears in the above-identified patent and that said Letters Patent is hereby corrected as shown below:

In the Claims

Column 50, Line 58-63 Claim 30 should read as follows:
30. The system of claim 20, wherein the securing member is configured to secure the
stop collar in position on the stepped drill bit when tightened;
wherein the securing member is configured to permit the stop collar to be moved to a plurality of different positions along the stepped drill bit when loosened.

Signed and Sealed this
Twenty-first Day of February, 2023

*Katherine Kelly Vidal*

Katherine Kelly Vidal
*Director of the United States Patent and Trademark Office*